(12) United States Patent
Coleman

(10) Patent No.: US 11,889,603 B2
(45) Date of Patent: Jan. 30, 2024

(54) SYSTEM FOR ILLUMINATING AN ENVIRONMENT WITH REDUCED SHADOWS USING TWO ANGULARLY VARYING LIGHT EMITTING DEVICES

(71) Applicant: Zane Coleman, Elmhurst, IL (US)

(72) Inventor: Zane Coleman, Elmhurst, IL (US)

(*) Notice: Subject to any disclaimer, the term of this patent is extended or adjusted under 35 U.S.C. 154(b) by 0 days.

(21) Appl. No.: 18/165,325

(22) Filed: Feb. 6, 2023

(65) Prior Publication Data

US 2023/0389161 A1 Nov. 30, 2023

Related U.S. Application Data

(63) Continuation of application No. 17/532,881, filed on Nov. 22, 2021, now Pat. No. 11,576,243, which is a continuation of application No. 16/949,353, filed on Oct. 27, 2020, now Pat. No. 11,184,967, which is a continuation-in-part of application No. 16/406,005, filed on May 7, 2019, now Pat. No. 10,816,939.

(60) Provisional application No. 62/667,629, filed on May 7, 2018.

(51) Int. Cl.
| | |
|---|---|
| *F21V 14/02* | (2006.01) |
| *H05B 47/11* | (2020.01) |
| *H05B 45/12* | (2020.01) |
| *F21Y 115/10* | (2016.01) |

(52) U.S. Cl.
CPC ............. *H05B 47/11* (2020.01); *F21V 14/02* (2013.01); *H05B 45/12* (2020.01); *F21Y 2115/10* (2016.08)

(58) Field of Classification Search
CPC .......... F21V 14/02; H05B 45/12; H05B 41/11
USPC .......................................................... 362/618
See application file for complete search history.

(56) References Cited

U.S. PATENT DOCUMENTS

| 10,816,939 B1* | 10/2020 | Coleman | G01S 17/86 |
|---|---|---|---|
| 11,184,967 B2* | 11/2021 | Coleman | H05B 47/11 |
| 11,576,243 B2* | 2/2023 | Coleman | G01S 7/497 |
| 2012/0319616 A1* | 12/2012 | Quilici | F21V 5/007 |
| | | | 362/244 |
| 2017/0099713 A1* | 4/2017 | Perez | H05B 45/20 |
| 2017/0188432 A1* | 6/2017 | Bosua | H05B 45/60 |
| 2017/0310743 A1* | 10/2017 | Aoyama | G01R 27/04 |
| 2018/0073686 A1* | 3/2018 | Quilici | H05B 45/60 |
| 2022/0299190 A1* | 9/2022 | Chemel | F21S 4/28 |
| 2023/0052426 A1* | 2/2023 | Maddali | F21V 14/02 |

*Primary Examiner* — Christopher M Raabe
(74) *Attorney, Agent, or Firm* — Zane Coleman

(57) ABSTRACT

A system for illuminating an environment, includes a first and second angularly varying light emitting devices operable to adjust light flux output into different angular bins individually, the second angularly varying light emitting device further comprises an imager positioned to receive light reflected from the environment from the first and second angularly varying light emitting devices, wherein when the first angularly varying light emitting device emits first light flux onto on object or individual in the environment and the object or individual occludes the first light flux creating a shadow region on a surface of the environment, the second angularly varying light emitting device emits second light flux from one or more second light sources into an angular bin that illuminates the shadow region. In one embodiment, the shadow region is identified in part by differentiating between a possible dark surface and a region comprising a shadow.

22 Claims, 10 Drawing Sheets

Spatial zones
Open loop
Color enhancement
Luminance/illuminance contrast enhancement
High efficiency
Sunlight mimicry
Specification maintaining
    Illuminance specification
    Luminance specification
    Irradiance specification
    Radiance specification
    Relative light output specification
    Luminance uniformity,
    Illuminance uniformity
    Irradiance uniformity
    Radiance uniformity
    Color uniformity
    Spectral uniformity
    Uniformity mode
    Shadow reduction mode
    Light reflecting and light emitting object differentiation
Predictive illumination
Safety and security
Environmental monitoring
Smoke, heat, or CO detection mode
Tracking and/or Identification
Reduced or glare free illumination
Reduced light trespass or light trespass free
Reduced light pollution or light pollution free
Selective warming
Socially adaptive
Health monitoring
Environmental monitoring
Entertainment
Variable illumination for camera
Light field display
Light communication
Fixture or LED performance evaluation
Personal illumination device
Projection mode
Window avoidance
Circadian adaptation
Infrared remote controller
Seasonal affective disorder treatment
Ubiquitous display
Sign, display, or advertising
Bactericidal
Horticulture lighting
Aquacultural or Animal husbandry lighting
Human centric lighting
Myopia reduction mode
Multi-user mode
Reduced light pollution
Manual lighting
Pathway illumination

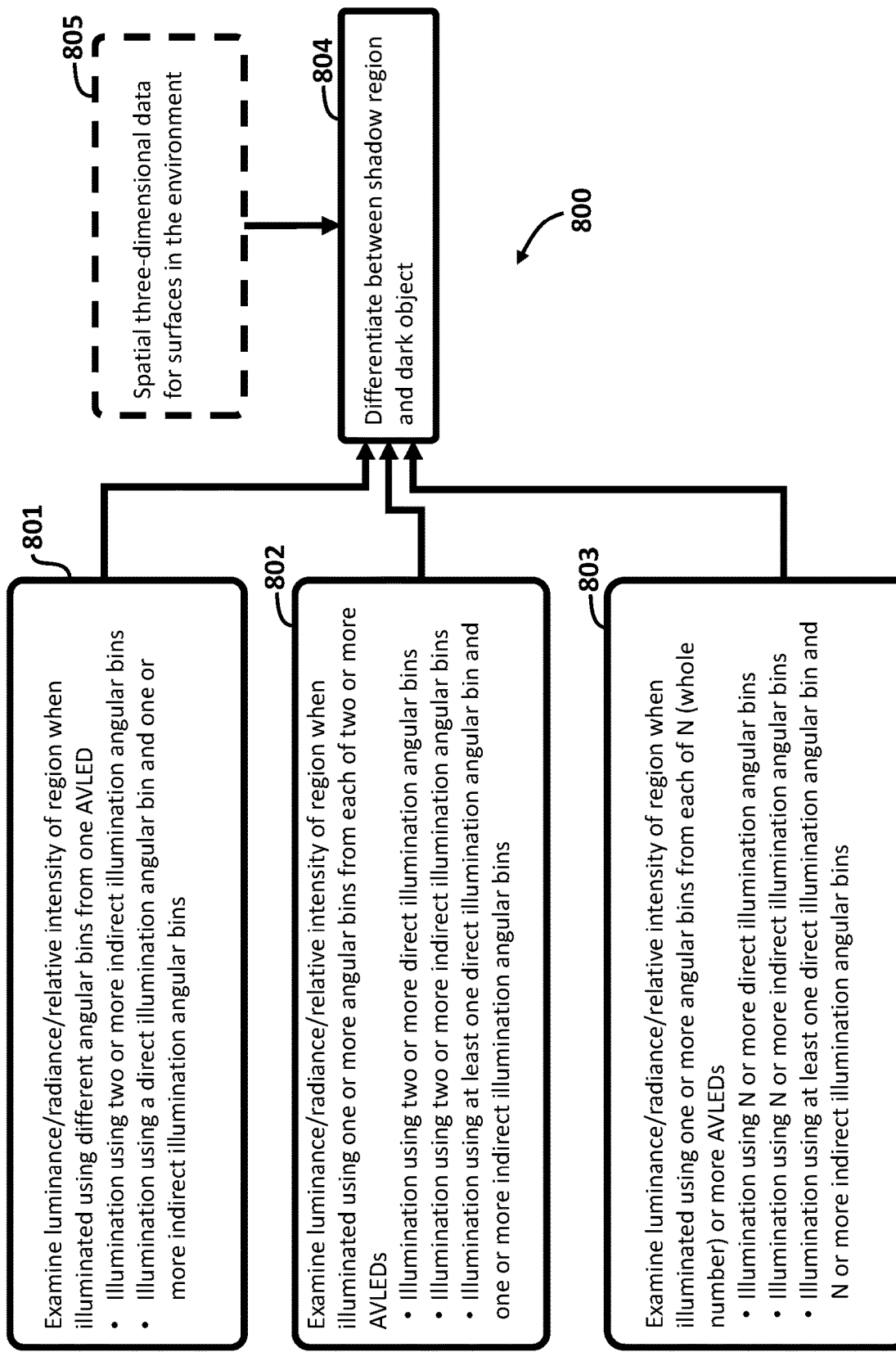

SYSTEM FOR ILLUMINATING AN ENVIRONMENT WITH REDUCED SHADOWS USING TWO ANGULARLY VARYING LIGHT EMITTING DEVICES

CROSS-REFERENCE TO RELATED APPLICATIONS

This application is a continuation of U.S. application Ser. No. 17/532,881, filed Nov. 22, 2021, entitled "Angularly varying light emitting device with a light sensor," which is a continuation of U.S. application Ser. No. 16/949,353, filed Oct. 27, 2020, entitled "Angularly varying light emitting device with an imager," which is a continuation-in-part of U.S. application Ser. No. 16/406,005, filed May 7, 2019, entitled "Method of illuminating an environment using an angularly varying light emitting device and an imager," which claims the benefit of U.S. Provisional Application No. 62/667,629 entitled "Angularly varying light emitting device comprising an imager," filed May 7, 2018, the entire contents of each are incorporated by reference herein.

BACKGROUND

Traditional light sources create shadows in the environment and direct light into spatial zones where the light is not needed. A system, devices and methods are needed that can optimize the illumination or irradiation of an environment for many different needs for modes of illumination or irradiation.

BRIEF SUMMARY

In one embodiment, an Angularly Varying Light Emitting Device (AVLED) or system comprising and AVLED comprises an imager wherein the spectral and/or flux output from the AVLED is adjusted to provide increased efficiency, increased safety, or other functionalities by independently adjusting the light flux output and/or spectral content of the light flux output for a plurality of angular bins of the AVLED, optionally using information from one or more images from one or more imagers.

BRIEF DESCRIPTION OF THE DRAWINGS

FIG. 3 is a tabular presentation illustrating examples of modes of illumination and/or irradiation for a one or more AVLEDs in an illumination and/or irradiation system comprising one or more AVLEDs.

FIG. 8 is a flow diagram illustrating a method of differentiating between a shadow region and a dark object 800.

DETAILED DESCRIPTION OF THE INVENTION

Figure 1:
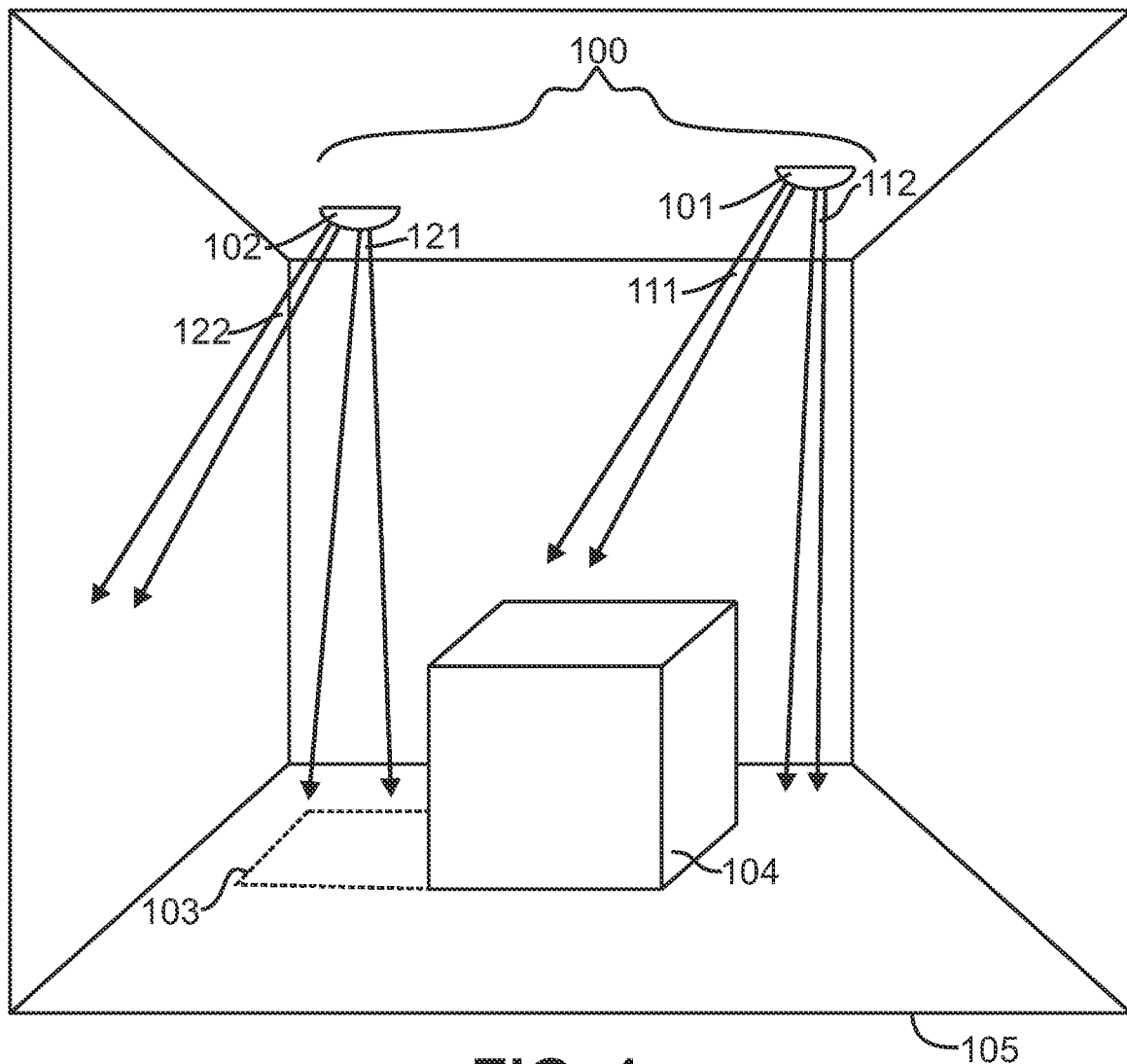
FIG. 1 is a side view of an embodiment of a system comprising a first AVLED and a second AVLED.

The features and other details of the invention will now be more particularly described. It will be understood that particular embodiments described herein are shown by way of illustration and not as limitations of the invention. The principal features of this invention can be employed in various embodiments without departing from the scope of the invention. All parts and percentages are by weight unless otherwise specified.

Glossary

In describing one or more embodiments, the following terms are defined as set forth below. When an element such as a layer, region or substrate is referred to herein as being "on" or extending "onto" another element, it can be directly on or extend directly onto the other element or intervening elements may also be present. In contrast, when an element is referred to herein as being "directly on" or extending "directly onto" another element, there are no intervening elements present. Also, when an element is referred to herein as being "connected" or "coupled" to another element, it can be directly connected or coupled to the other element or intervening elements may be present. In contrast, when an element is referred to herein as being "directly connected" or "directly coupled" to another element, there are no intervening elements present.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

Furthermore, relative terms, such as "lower" or "bottom" and "upper" or "top," may be used herein to describe one element's relationship to another element as illustrated in the Figures. Such relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "array" includes an arrangement of elements where the spacing between the elements in one or more directions may be regular, irregular, random, partially random, or some combination thereof. It includes non-planar arrangements of elements such as an arrangement of light emitting diodes along a surface of a hemisphere spaced at every 5 degrees from the radial center of the corresponding spherical shape, for example.

As used herein, the term "substantially," e.g., in the expressions "substantially circular", "substantially level", "substantially parallel", "substantially perpendicular", "substantially cylindrical", "substantially coaxial", etc., means at least about 90% correspondence with the feature recited. For example, an element that is "substantially circular" means that a circle can be drawn having the formula $x2+y2=1$, where imaginary axes can be drawn at a location where the y coordinate of each point on the structure is within 0.90 to 1.10 times the value obtained by inserting the x coordinate of such point into such formula. The expression "substantially level" means that at least 90% of the points in the surface which is characterized as being substantially level are located on one of or between a pair of planes which are level and which are spaced from each other by a distance of not more than 10% of the largest dimension of the surface. The expression "substantially parallel" means that two lines (or two planes) diverge from each other at most by an angle of 10% of 90 degrees, i.e., 9 degrees. The expression "substantially perpendicular", as used herein, means that at least 90% of the points in the structure which is characterized as being substantially perpendicular to a reference plane or line are located on one of or between a pair of planes (1) which are perpendicular to the reference plane, (2) which are parallel to each other and (3) which are spaced from each other by a distance of not more than 10% of the largest dimension of the structure. The expression "substantially cylindrical" (and analogous statements), as used herein, means that at least 90% of the points in the surface which is characterized as being substantially cylindrical are located on one of or between a pair of imaginary cylindrical structures which are spaced from each other by a distance of not more than 10% of their largest dimension. The expression "substantially coaxial" means that the axes of the respective surfaces define an angle of not greater than 10% of 90 degrees, i.e., 9 degrees.

As used herein, "angular bin" is a range of angles from an origin such as a light fixture or light emitting device. The range may be defined within in one plane, a range of angles defined by two orthogonal planes, a range of angles represented by theta and phi in spherical coordinates, or asymmetric or non-uniform range of angles defined by a closed shape projection onto a sphere with the source at the center. The angles in an "angular bin" may be defined relative to an axis or specific direction, such as the nadir in a downlight light fixture application or a direction perpendicular to a light emitting surface of the device (the device axis). In some embodiments, the axis of the device is the optical axis of the light output. In other embodiments, the optical axis is at an angle greater than 0 degrees from the device axis, and the light output is off-axis.

As used here, the "optical axis" of an angularly varying light emitting device (AVLED) emitting light from a plurality of sources, a single light source, an angular bin, or light output from an axial redirecting optical element redirecting light from one or more light sources is the central angle of the light output from the corresponding angularly varying light emitting device, light source, angular bin, or light output from an axial redirecting optical element, respectively when the corresponding light sources are emitting light at the same intensity or at their peak intensity during normal use.

The expression "light emitting device", as used herein, is not limited, except that it indicates that the device is capable of emitting light. That is, a lighting device can be a device which illuminates or irradiates an object, individual, animal, area or volume. For example, in one embodiment, the light emitting device is of the type, illuminates, irradiates, or is a component of one or more selected from the group: a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost. In another embodiment, the light emitting device is a device that is used for edge lighting, backlighting, or front-lighting an active or passive display or sign, (e.g., back light poster, signage, LCD displays). In another embodiment, the light emitting device is a light bulb replacement (e.g., for replacing AC incandescent lights, low voltage lights, fluorescent lights, etc.), a light used for outdoor lighting, light used for security lighting, light used for exterior residential lighting (wall mounts, post/column mounts), a streetlight, a ceiling fixture or wall sconce, an under cabinet light fixture, a lamp (floor and/or table and/or desk), a light fixture directing light upwards (uplighting) and/or downwards (down lighting), a landscape light, a track light, a task light, a specialty light, a ceiling fan light, an archival/art display light, a high vibration/impact light—work light, etc., a mirrors/vanity light, a flashlight, a head-worn lighting device illuminating or irradiating the environment external to the person wearing the head-worn lighting device (such as a helmet mounted lighting device, visor mounted lighting device, glasses mounted lighting device, head-mounted display lighting device, headlamp, or headband lighting device), or any other light emitting device providing illumination or irradiation of an object and/or environment or providing a visual display of sign, indicia, media, graphic, image, video, or combination thereof by emitting light.

A "spatial light modulator" or SLM as used herein is an object that imposes some form of spatially varying modulation on a beam of light. The modulation may modulate the intensity or phase of the incident light and the SLM may be electrically addressed or optically addressed.

"Optically coupled" as used herein means connected, whether directly or indirectly, for purposes of transmitting a light beam. A first and a second element may be optically coupled if a beam may be provided from the first element to the second element, whether or not an intermediate component manipulates the beam between the first and second elements.

A "light property" as used herein is the measured, estimated, or calculated luminance of a surface, radiance of a surface, relative intensity of a surface, color or spectral properties of light reflected from a surface, illuminance of a surface, irradiance of a surface, luminous exposure of a surface, region, or spatial zone, radiant exposure of a surface, region, or spatial zone, or color or spectral properties of light directed to a surface. As used herein, a "shadow zone", or "shadow region" is a spatial zone with a light property less than a target light property or light property in a spatial zone less than a neighboring (adjacent) spatial zone due to light occlusion from one or more surfaces. As used herein, a wavelength band of interest" is the spectral range of wavelengths of light of interest based on one or more selected from the group: the light emitting device application, the illumination mode, the irradiation mode, the light emitting device, and environment to be illuminated. As used herein, a first device, such as a first imager, is "remote from" a second device, such as a second imager when the first device and second device are not parts of a single device larger than the first or second device. For example, a first imager in a first AVLED downlight in the same ceiling as a second AVLED downlight is remote from a second imager in the second AVLED. In this example, the two imagers may be indirectly supported by the same ceiling or the same drop ceiling T-bar, powered by the same electrical power supply line, or in communication with each other or the same server, for example, and remain remote from each other as there is no larger device encompassing both imagers.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

System Comprising Angularly Varying Light Emitting Device

In one embodiment a system for providing illumination, irradiation, or a display comprises one or more angularly varying light emitting devices. In another embodiment, the system comprises an angularly varying light emitting device (AVLED) and one or more sensors (such as a camera, light sensor (photosensor), occupancy sensor, scanner, or position sensor, for example) where the AVLED comprises at least one sensor and/or a sensor is positioned remote from the AVLED and is in communication, directly or indirectly with the AVLED, or a control system comprising the sensor or in communication with the sensor is also in communication with the AVLED. The system and/or AVLED may operate in one or more illumination and/or irradiation modes. In another embodiment, the AVLED or system comprising at least one AVLED has a setup configuration and/or measurement that cycles through one or more light sources in one or more angular bins of one or more AVLEDs (herein called "angular cycling"), optionally adjusting the intensity over a range within each angular bin, and the light reflected from the environment is detected by a sensor or camera on the AVLED, one or more other AVLEDs, or another device comprising a sensor or camera such as a portable device or mobile phone. In this embodiment, a second AVLED can similarly cycle through the angular bins and the combined information from one or more sensors or cameras detecting the light from the AVLEDs cycling through the angular bins is used in one or more modes of operation (such as to follow by illumination an individual or animal, identify the location of an individual by illuminating the individual from one or more AVLEDs, determine the optimum angular bin of the optimum AVLED to use for illuminating or irradiating a location, determine the optimum AVLED to use to avoid glare to the eyes of an individual, provide variable illumination or irradiation controlled by an individual, provide predictive illumination to illuminate ahead of an individual taking into account possible shadows, or other modes disclosed herein).

Angularly Varying Light Emitting Device (AVLED)

An angularly varying light emitting device (AVLED) is a light emitting device with an electrically controllable light output that can vary angularly with an increase or decrease in the light flux output (including turning the light off or on) independently in one or more angular bins oriented at an angle relative to a device axis or light output surface. The change may occur automatically, such as a programmed change at a specific time in the future or automatically in response to data from one or more sensors, or the change may be manually controlled. The system comprising one or more AVLEDs and/or one or more AVLEDs may comprise one or more devices or components that facilitate an electrical power connection, control connection, or communication connection between the one or more AVLEDs (and optionally other devices), and/or between one or more sensors, and/or between one or more sensors and the one or more AVLEDs. In one embodiment, the one or more AVLEDs comprise at least one sensor, such as a camera, wherein the angular output of light from the one or more AVLEDs changes due to an analysis of data from the one or more sensor at one or more time periods. In another embodiment, the system comprises a fixed, mounted, or mobile controller, application or program on an input device (such as an application on a cellular phone) that changes or programs the system to change the angular output from the one or more AVLEDs immediately, in the future, automatically, in response to sensor input, in response to input from another device, or based on one or more modes of illumination or irradiation. In one embodiment, the system or one or more AVLEDs operate in one or more modes of illumination and/or irradiation.

Light Source of the AVLED

In one embodiment, the AVLED comprises one or more light sources selected from the group: inorganic light emitting diode, organic light emitting diode, active matrix organic light emitting diode, micro-light emitting diode device (micro-LED device), photonic crystal light emitting diode, light emitting polymer, polymer light emitting diode, light emitting diode emitting substantially polarized light, high efficiency plasma light source, nanocrystal based light emitting diode, quantum well-based light source, fluorescent light source or bulb, graphene-coated light emitting diode, direct emission from graphene, electroluminescent light source, light source with a luminophore, organic light emitting transistor, incandescent lamp, arc lamp, bioluminescent light source, cathodoluminescent light source, chemiluminescent light source, cryoluminescent light source, electrochemiluminescent light source, light emitting electrochemical cell, electroluminescent wire, field-induced polymer electroluminescent light source, laser, laser diode, solid-state laser, quantum well laser, whispering gallery mode laser, electrically pumped quantum dot based micro-ring laser, supercontinuum laser, piezoluminescent light source, photoluminescent light source, fluorescent light source, phosphorescent light source, photoluminescent polarizer, quantum rod based light source, nano-wire based light source, quantum dot electroluminescent, microplasma array (such as for UV spot disinfection or bactericide), excimer light source, and thermoluminescent light source. Examples of the light sources, systems comprising the light sources, accessories, and their related technology that may be incorporated into one or more embodiments include those described in Handbook of Advanced Lighting Technology, Editors Robert Karlicek, Ching-Cherng Sun, Georges Zissis, Ruiqing Ma, Springer International Publishing, Switzerland, 2017, Volume I, Parts I, II, and III (pp. 3-441), the pages are incorporated by reference herein. In one embodiment, the AVLED comprises a laser light source that illuminates one or more phosphors (such as phosphor layer 300 micron by 300 micrometers in size) such that a high lumen source may be generated in small area to be able to collimate and/or scan the light. In one embodiment, the AVLED comprises a red, green, blue, and white micro-LED array or a red, green, and blue micro-LED array and a white micro-LED array. Light sources with other colors or spectral bands such as amber, cyan, magenta, yellow, and/or ultraviolet may also be used in the micro-LED array. In one embodiment, the light from a red, green, and blue micro-LED array is combined with the light from a white micro-LED array using a beam combiner (which could be TIR based, polarization based, or spectral filter/dichroic filter based, for example) such as those used in projection displays light engines.

Angular Output of the AVLED Light Source

In one embodiment, the light source for the AVLED, such as a micro-array of light emitting diodes or an array of one of the other aforementioned light sources, is in a collimating package, has chip scale optics, primary optic, substrate free primary optic light emitter package, or has internal or surface diffractive structures with a dimension less than 1 or 5 micrometers in one or more directions that result in a reduced angular width of light output relative to a similar light source without the package, optics, or structures, respectively. In one embodiment, the reduced angular width light source has a light output full-angular width at half-maximum intensity in one light output plane or two orthogonal light output planes less than 60 degrees, 50 degrees, 40 degrees, 30 degrees, 20 degrees, 10 degrees, 8 degrees, 5 degrees, 4 degrees, 3 degrees, 2 degrees, and 1 degree.

Examples of packages, optics, photonic structures, diffractive structures that may be used to reduce the angular width of the light output of the light source and/or AVLED comprising one or more of the light sources are found in US Patent Publications US20160013373, US20090014740, US20080121912, US20080037116, US20060113638, US20150036358, US20100148193, US20080081531, US20180083156, US20100053980, and US20090045416, the contents of each are incorporated by reference herein.

In one embodiment, the angular light output from the light source is modified by one or more optical elements, lenses and/or the axis of the light output from one or more light sources, or an individual pixel of an array of light sources, is modified by an axially redirecting optical element (AROE). In one embodiment, an AVLED comprises a spatial array light source comprising a micro-LED array wherein each micro-LED has a reduced angular width (such as a full-angular width at half-maximum intensity in one light output plane or two orthogonal light output planes less than 5 degrees). In this embodiment, the AVLED may further comprise an AROE that redirects the optical axes of the light from each micro-LED into different directions and the reduced angular width enables a substantially focus-free lens, optical element, or AROE to direct the light output such that at a first distance from the AVLED or further, the light output for one or more angular bins is sufficiently defined and overlaps a neighboring angular bin by less than one selected from the group of 20%, 15%, 10%, 8%, 6%, and 5% of the angular width of the first bin in one or more output bins. In one embodiment, the first distance is greater than one selected from the group 0.1, 0.2, 0.3, 0.4, 0.5, 0.6, 0.7, 0.8, 0.9, 1, 1.5, 2, 3, 4, 5, 6, 7, 8, 9, and 10 meters. In one embodiment, the AVLED or AROE can be rotated, such as on a gimbal mount to direct the light output to a different range of angular bins.

Spectral Properties of the AVED or AVED Light Source

In one embodiment the light output of the AVLED or AVLED light source is substantially within the wavelength range between 400 nanometers and 700 nanometers, between 380 nanometers and 720 nanometers, above 700 nanometers, below 400 nanometers, between 380 nanometers and 420 nanometers, or within a combination of one or more of the aforementioned wavelength ranges. In one embodiment, the AVLED, spatial array of light sources, or light sources for each angular bin of a plurality of angular bins in an AVLED comprises one or more light sources emitting light within different wavelength bands, such as a red light emitting diode, a blue light emitting diode, a green light emitting diode, and a phosphor converted white light emitting diode. In another embodiment, the color of the light sent to each angular bin is selectively controlled independently in addition to the intensity or flux. In a further embodiment, the light from a plurality of light sources is directed into the same angular bin, such as by using the same axially redirecting optical element (or sub-element of the AROE) for the plurality of light sources, or a scanner and optionally a beam combiner. In another embodiment, one or more light sources or an AVLED comprising one or more light sources comprises an infrared light emitting light source. In this embodiment, the infrared light may be independently directed to different angular bins to warm an individual who may be sitting in different locations in the room. In one embodiment, an AVLED comprises a plurality of luminophores (such as different down conversion materials) in a pattern on an element that may spin or be imaged (such as described in US Patent Application Publication No. US20130194644, the entire contents are incorporated by reference herein).

In one embodiment, the light source emits light with a first wavelength band and the emitted light interacts with one or more luminophores such that the light output from the AVLED or light emitting device comprising the light source emits light in a second wavelength band different from the first wavelength band. In one embodiment, the luminophore (also referred to as a lumiphore or lumiphore) a comprises one or more selected from the group: phosphors, scintillators, alkaline-earth orthosilicate or aluminates (optionally with Europium and/or Manganese), Barium ortho-silicates, Barium-Strontium-orthosilicate mixed crystals, $BaMgAl_{10}O_{17}:Eu^{2+}$ (BAM), $Y_2O_3$:Eu phosphor, ZnS:Mn, ZnS-based phosphors, CdS phosphor, Europium(II)-doped alkaline earth aluminates, $Y_2SiO_5:Ce^{3+}$ phosphors, $Zn_2SiO_4$:Mn(P1) phosphors, Oxide phosphor, Cerium(III)-doped YA (YAG:$Ce^{3+}$, or $Y_3Al_5O_{12}:Ce^{3+}$ or $Y_3Al_5O_{12}$:Ce) (including substituting the cerium with other rare-earth elements such as terbium and gadolinium and can even be further adjusted by substituting some or all of the aluminum in the YAG with gallium), Europium(II)-doped β-SiAlON, SiAlON phosphor and a red $CaAlSiN_3$-based (CASN) phosphor, green emitting copper and aluminum doped zinc sulfide (ZnS:Cu,Al) phosphor, SrGa$_2$S$_4$:Eu phosphors, Y$_3$Al$_5$O$_{12}$:Ce phosphors, (Y,Gd)$_3$Al$_5$O$_{12}$:Ce phosphors, Gd$_3$Al$_5$O$_{12}$:Ce phosphors, quantum dots, quantum nanospheres, other phosphors such as are commonly known in the field of light emitting diode lighting, cathode ray tube phosphors, fluorescent lamp phosphors, high pressure mercury and metal halide lamps, black-light fluorescent lamps, luminophores or phosphors such described in US patent application publication number US20040090174A1, quantum nanoplatelets such as described in US patent application publication No. 20180107065, and luminophores or phosphors such as described in the Handbook of Advanced Lighting Technology, Editors Robert Karlicek, Ching-Cherng Sun, Georges Zissis, Ruiqing Ma, Springer International Publishing, Switzerland, 2017, Volume I, Part II, "Phosphors for White LEDs" by Chun Che Lin, Wei-Ting Chen, and Ru Shi Liu, pp. 181-222, the pages are incorporated herein by reference. In another embodiment, the luminophore comprises a down-shifting material that reduces the wavelength of the light after passing through the material (such as a frequency doubling crystal, for example). In another embodiment, the luminophore comprises a non-linear optical element that provides one or more selected from the group: second-harmonic generation (SHG), or frequency doubling, generation of light with a doubled frequency (half the wavelength), two photons are destroyed, creating a single photon at two times the frequency; third-harmonic generation (THG), generation of light with a tripled frequency (one-third the wavelength), three photons are destroyed, creating a single photon at three times the frequency; high-harmonic generation (HHG), generation of light with frequencies much greater than the original (typically 100 to 1000 times greater), sum-frequency generation (SFG), generation of light with a frequency that is the sum of two other frequencies (SHG is a special case of this); and difference-frequency generation (DFG), generation of light with a frequency that is the difference between two other frequencies. In one embodiment, the AVLED comprises one or more luminophores that comprise one or more selected from the group: a thin microstructured potassium titanyl phosphate material, a periodically poled potassium titanyl phosphate (PPKTP) material, a lithium niobate material, a lithium triborate material, a beta barium borate material, lithium tantalate (LiTaO$_3$), cesium lithium borate, potassium niobate, potassium dihydrogen phosphate, monopotassium phosphate, self-frequency-doubling crystal, active-ion doped LiNbO3 series crystals, active ions doped YAB crystals, active ions doped rare-earth calcium oxyborate (RECOB) crystals including Nd:GdCOB, active ion (Yb3+ or Nd3+) doped La$_2$CaB$_{10}$O$_{19}$ (LCB) crystals, neodymium doped ferroelectric crystals, Nd:Ca$_3$TaGa$_3$Si$_2$O$_4$ (Nd:CTGS), Nd:Ca$_5$(BO$_3$)$_3$F, Nd:BaCaBO$_3$F, and whitlockite-type vanadates crystals.

Flux Output

In one embodiment, one or more light sources or at least one AVLED has a radiant flux output greater than one selected from the group: 0.05, 0.1, 0.5, 1, 2, 5, 10, 20, 30, 50, 100, 200, 500, and 1000 watts. In another embodiment, one or more light sources or at least one AVLED has a radiant flux output less than one selected from the group: 0.05, 0.1, 0.5, 1, 2, 5, 10, 20, 30, 50, 100, 200, 500, and 1000 watts. For example, in one embodiment, an AVLED comprises a micro-LED array comprising an array of 1,024 LEDs, with an average radiant flux output less than 0.5 Watt each and the average total radiant flux output of the AVLED at full power is greater than 500 watts. In a further embodiment, one or more light sources or at least one AVLED has a luminous flux output greater than one selected from the group: 0.05, 0.1, 0.5, 1, 2, 5, 10, 20, 30, 50, 100, 200, 300, 500, 1000, 1500, 2000, 5000, 10,000, and 20,000 lumens. In another embodiment, one or more light sources or at least one AVLED has a luminous flux output less than one selected from the group: 0.05, 0.1, 0.5, 1, 2, 5, 10, 20, 30, 50, 100, 200, 300, 500, 1,000, 1,500, 2,000, 5,000, 6,000, 10,000, and 20,000 lumens. For example, in one embodiment, an AVLED comprises a micro-LED array comprising an array of 1,024 white LEDs, with an average luminous flux output less than 5 lumens each and the average total radiant flux output of the AVLED is less than 6,000 lumens. In another embodiment, an AVLED comprises a micro-LED array comprising an array of 1,024 white LEDs, with an average luminous flux output less than 3 lumens each and the average total radiant flux output of the AVLED is less than 4,000 lumens. In one embodiment, the intensity of one or more light sources disclosed herein may be modulated using pulse modulated signals, pulse width modulated signals (PWM), pulse amplitude modulated signals (PAM), pulse code modulated signals (PCM), Pulse Frequency Modulation (PFM), analog control signals (e.g., current control signals, voltage control signals), or combinations and/or modulations of the foregoing signals, or other control signals. Other modulation techniques known in the display and lighting industries may be used for one or more light sources of an AVLED. Example modulation methods such as PWM, PAM, and PCM, and may be used with one or more light sources, such as described in US Patent Application Publication No. US20060237636 and U.S. Pat. No. 7,923,935, the entire contents of each are incorporated by reference herein.

Form of the AVLED

In one embodiment, a system for providing angularly varying illumination and/or irradiation comprises an angularly varying light emitting device (AVLED). In one embodiment, the AVLED is or comprises one or more light emitting devices. The AVLED or light emitting device may be installed, portable, mounted, mobile, or capable of being two or more of the aforementioned types. In one embodiment, the AVLED is one or more selected from the group: light fixture, light bulb, replacement light bulb, light source (such as one or more described above), portable light emitting device, wireless light emitting device, wired light emitting device, wearable light emitting device, personal illumination device, personal irradiation device, and mounted light emitting device, and may be incorporated into another device or fixture, such as a display (such as a television or liquid crystal display), sign, exit sign, fire alarm, smoke alarm, cellular phone, portable electronic device, mounted electronic device, vehicle (such as an automobile or automotive headlight), article of clothing, apparel, or accessory (such as a shirt, shoe, belt, belt-buckle, watch or smart watch (as a display and/or for illuminating an environment external to the watch), ring, earring, coat, vest, uniform, suit, hat, glove), bag (such as a handbag, tote, satchel, briefcase, backpack, for example), appliance (such as a refrigerator or stove) vacuum cleaner, sink, faucet, showerhead, doorknob, door, or cabinet. In one embodiment, the AVLED is a can light, troffer light, cove light, recessed light, torch lamp, floor lamp, chandelier, surface mounted light, pendant light, sconce, track light, under-cabinet light, emergency light, wall-socket light, exit light, high bay light, low bay light, strip light, garden light, landscape light, building light, outdoor light, street light, pathway light, bollard light, yard light, accent light, background light, black light, flood light, safelight, safety lamp, searchlight, security light, step light, strobe light, follow-spot light, or wall-washer light, flashlight, wall light, ceiling light, ceiling fan light, window light, door light, floor light, car light, or vehicle light. In one embodiment, the AVLED includes, is, or may have substantially the same form, shape, spectral light output, color temperature, luminous flux, ballast, driver, lamp circuit, dimmer circuit, control circuits, auxiliary equipment or base as a light source, lamp, bulb, or luminaire as described or shown in IESNA Lighting Handbook, $9^{th}$ Edition, chapter 6 titled Light Sources or Chapter 7 titled Luminaires, or as described or shown in The Lighting Handbook, IES $10^{th}$ Edition, Chapter 7 titled Light Sources: Technical Characteristics or Chapter 13 titled Light Sources Application Considerations, the entire contents of each book are incorporated by reference herein.

In one embodiment, a system comprising illumination may comprise one or more AVLEDs (or an AVLED may comprise one or more spatial array light sources) oriented with their peak light output direction in one or more of the following configurations: one oriented up, one oriented down; one oriented up, one oriented down, one oriented left and one oriented right opposite the left; one oriented horizontally to the left and one oriented horizontally to the right opposite the left; one oriented left, one oriented right opposite the left, one oriented 90 degrees to the left direction and orthogonal to the up direction, and one oriented −90 degrees from the left direction orthogonal to the up direction; and one oriented down, one oriented left and one oriented right opposite the left, one oriented 90 degrees to the left direction orthogonal to the down direction, and one oriented −90 degrees from the left direction orthogonal to the down direction; and one oriented up, one oriented down, one oriented left and one oriented right opposite the left, one oriented 90 degrees to the left direction orthogonal to the up direction, and one oriented −90 degrees from the left direction orthogonal to the up direction (such as all faces of a 6-sided die).

Replacement Bulb

In one embodiment, the AVLED is in the form of replacement light bulb for installing into an existing light fixture or device. For example, in one embodiment, the AVLED is in the form of replacement bulb with an Edison type screw base, candelabra base, and/or a bulb shape of A19. In this embodiment, the AVLED may comprise one or more sensors and/or a camera within the bulb or base of the bulb and the luminous intensity of light emitted into two or more angular bins may be adjusted independently. In another embodiment, the AVLED is in the form of replacement light bulb for a linear fluorescent fixture or device (such as a light fixture comprising one or two linear fluorescent bulbs that have length of approximately two feet). In these two previous embodiments, the AVLED may comprise one or more sensors and/or a camera at the one or more bases of the bulb or along the length of the bulb and the luminous intensity of light emitted into two or more angular bins may be adjusted independently. In one embodiment, an AVLED comprises a spatial array light source and a plurality of lightguides directing light from one or more pixels of the spatial array light source into a corresponding plurality of angular bins such that the intensity of the light from each angular bin may be independently controlled to produce an angularly varying light emitting device. In another embodiment, the AVLED in the form of a replacement bulb comprises one or more sensors or cameras or comprises an electrical circuit including an optical or radio transceiver, transmitter, and/or receiver that communicates with one or more external sensors and/or cameras or devices comprising one or more sensors and/or cameras, or a computing device receiving information from one or more sensors and/or cameras directly or indirectly through another device. In another embodiment, an AVLED in the form of a replacement bulb for a linear fluorescent or liner light emitting diode based bulb includes a plurality of light emitting diodes in a substantially linear array along the length of the bulb (such as along the 2 foot length of a linear bulb) where the light output from two neighboring LEDs (and optionally axially redirecting optical elements) direct light into a two different angular bins in a plane orthogonal to a length direction comprising the longer dimension of the bulb (such as a direction comprising the 2 foot length of the linear bulb).

Drone AVLED

In one embodiment a light emitting system comprises a plurality of AVLEDs on vehicles, water crafts, air crafts, or drones (such as flying drones, miniature drones, or insect type drones). In another embodiment, the drones comprising AVLEDs are part of a network and fly autonomously, under a direction or mode, manually, or in a programmed motion. In one embodiment a light emitting system comprises a plurality of AVLEDs on drones such that the drones provide safe illumination and/or irradiation in a battlefield, blind enemy combatants by illuminating and/or irradiating them from one or more directions and optionally illuminating and/or irradiating them only such that in a night battle, the night vision of the group attacking the enemy combatants is substantially maintained since the light is not directed into their eyes. In another embodiment, a laser is used as a light source for an AVLED such that the drones may remain at a very high, safe altitude and maintain the ability to blind one or more enemy combatants in a battle by tracking them and increasing the light output in an angular bin that provides glare, dazzling illumination, blinding, or high intensity illumination and/or irradiation toward the enemy combatant. In this embodiment, the drones could automatically position themselves in the visual field near areas of interest for the enemy combatants (such as the drone hovering far away but at a small angle above where the combatant believes there are being attacked from). In this manner, the light would be blinding when the enemy combatant looked toward the group attacking such that aiming would be very difficult, in the day or night. A large number of drones with AVLEDs could be used and each one could collectively illuminate and/or irradiate more than one enemy combatant and optionally track the location of the combatants themselves (such as by thermal imaging cameras) or in combination from information from other drones or drones with AVLEDs, or using information from other sensors or cameras, such as thermal imaging satellites or thermal imaging cameras. In another embodiment, the AVLEDs illuminate and/or irradiate pathways, devices, objects, places, people, or animals with infrared light such that they are visible using infrared or night vision goggles. In this manner, a group on a mission, for example, could have their pathways and/or dark areas illuminated and/or irradiated with infrared light and without the light directed into their goggles using a plurality of drones with AVLEDs with sensors, cameras, and/or infrared cameras. In another embodiment, a drone comprises one or more AVLED with less than 10 angular bins and the AVLED redirects the optical axis of the light output by redirecting the AVLED, such as by using an electronically controlled gimbal mount. Other AVLED operational modes, such as disclosed herein, may be used in a system with AVLEDs on independently moving craft, vehicles, or drones and may be controlled using one or more AVLED control methods or interfaces disclosed herein. In one embodiment, the drones with AVLEDs fly autonomously or semi-autonomously such that when provided with an object or target of interest, they fly independently avoiding each other and obstacles or terrain and optimally illuminate and/or irradiate (such as illuminating from an different angular bins at least 10 degrees apart from each other from at least 4 different drones) the (optionally moving) object or target using the AVLEDs (and optionally using sensors, cameras, or infrared cameras positioned on the drones for identification and/or tracking of the object or target of interest).

AVLED Accessory

In one embodiment, an AVLED is an accessory for a watch, wearable device, or mobile phone or an AVLED is formed by adding an accessory axial redirecting optical element to a light source such as a smart watch display or display for a mobile phone. For example, in one embodiment, an accessory for a watch (or mobile phone) includes a wide angle lens and attachment mechanism to place the wide angle lens above a light emitting watch (or display of the mobile phone) such the light emitting surface is substantially positioned beneath the wide angle lens and the light from the display pixels of the watch are independently controllable to emit light independently into a plurality of angular bins.

AVLED Comprising a Spatial Array Light Source (Direct Emissive or Light Source and SLM) and Axially Redirecting Optical Element (AROE)

In one embodiment, an AVLED comprises a spatial array light source. The spatial array light source may be a direct emissive light source where individually addressable light sources emit light in a spatial array, or a light source and a spatial light modulator, where the light from the spatial array light source may be modified by an axially redirecting optical element (AROE). In one embodiment, the AVLED comprising the spatial array light source comprises an AROE which redirects the optical axis of two or more light sources (or illuminated and/or irradiated pixels or regions) in the spatial array light source such that the angular peak intensity from each of the two or more light sources (or illuminated and/or irradiated pixels or regions) are in different directions and the light output from the two or more light sources (or illuminated and/or irradiated pixels or regions) are in different angular bins and the intensity of the light in each bin may be independently modulated. For example, in one embodiment, an AVLED comprises a substantially planar array of micro-LEDs (comprising an array of LEDs with a largest dimension of the light emitting surface less than 0.1 millimeter) of 32 LEDs by 32 LEDs with optical axes substantially perpendicular to the substantially planar array of LEDs, and an AROE comprising a wide angle lens (such as a fisheye lens) that directs the optical axis of the light from each pixel into a different angular bin. In one embodiment, the intensity and/or flux of the light from each spatial light source (or illuminated and/or irradiated pixel or region) is independently controlled. The light output from each light source (or illuminated and/or illuminate pixel or region) or the entire array may be controlled or modulated (such as driven by a pulse-width modulation) at a frequency higher than about 60 hertz such that there is no apparent visible flicker from the AVLED light output. In a further embodiment, the AVLED comprises a light source and a spatial light modulator that modulates or controls the light (such as one or more light sources illuminating and/or irradiating a transmissive liquid crystal display (LCD) or reflective LCD) to adjust the intensity and may modulate the intensity at a frequency higher than about 60 hertz such that there is no apparent flicker.

Direct Emissive Spatial Array Light Source

In one embodiment, the light source for the AVLED is a direct emissive spatial array where the emission of each light emitting pixel (or a combination of light emitting pixels) of the array may be independently controlled. In on embodiment, the direct emissive spatial array light source is one or more selected from the group: light emitting diode array, micro-led array (wherein the average largest dimension of the light emitting surface of the light emitting diode is less than 0.1 millimeter), nano-LED array (where at least one dimension of the light emitting surface of the light emitting diode is substantially one micrometer or less), organic light emitting diode display, carbon nanotube array, field emission array, array of lasers, array of laser diodes, an array of lasing pixels, or an array of other light sources disclosed here or a combination of light source disclosed herein.

Light Source and SLM

In one embodiment, the AVLED comprises an AROE, one or more light sources, and a spatial light modulator. The one or more light sources may include, for example, one or an array of light emitting diodes illuminating and/or irradiating a transmissive or reflective LCD in a backlight or frontlight configuration, respectively. In one embodiment, the light source is an array of independently controllable light sources that may be independently turned on or off, and the intensity and/or flux is modulated by the spatial light modulator. In another embodiment, the light source illuminates and/or irradiates an area of the SLM comprising more than one pixel and the light intensity and/or flux is modulated by the SLM. In one embodiment, the light source is an edge-lit tapered lightguide with layers of different refractive indexes (both lower than the waveguide's refractive index) such that light preferentially exits from one side of the lightguide due to extraction features on the lightguide (or in the lightguide) and a reverse prism film or angular redirecting film.

Axially Redirecting Optical Element (AROE)

An axially redirecting optical element (AROE) is an optical element that redirects the optical axis of a light source, light emitting pixel, or light emitting region from a first direction into a second, different direction in one or more light output planes for a plurality of light emitting pixels or regions. The optical axis of a light source, light emitting pixel, or light emitting region, as used herein, is the direction of the central angle or peak intensity of the light output from the light source, light emitting pixel, or light emitting region. The AROE may be spaced from the light emitting pixel or region along the optical axis of light from the spatial array light source or AVLED. In one embodiment, the AROE (or each optical element of an AROE) positioned to redirect the optical axis of light from one light source of the spatial array of light sources comprises a different optical element for each light source or a different optical element or orientation of the optical element for each light source of the spatial array of light sources.

In another embodiment, the number of light emitting pixels or regions of the spatial array light source directed by the AROE into a single angular bin is greater than one selected from the group 1, 2, 4, 6, 10, 15, and 20. In another embodiment, the intensity and/or flux of light for one angular bin of the AVLED is adjusted by turning off, reducing the drive current, or modulating a plurality of light emitting pixels or regions of the spatial array light source that are directed by the AROE into the single angular bin of the AVLED. For example, in one embodiment an AVLED comprises a 32×32 array of 1,024 micro-LEDs, each emitting about 4 lumens of white light. In this example, an AROE may direct an array of 2×2 micro-LEDs into a particular angular bin (and it may optionally angularly mix the light, by multiple total internal reflections of a waveguide, such that the light output from each micro-LED is substantially uniform across the angular bin (such that the minimum luminous intensity in the angular bin divided by the maximum luminous intensity in the angular bin is greater than 0.7, for example). In this example, the luminous flux directed into the angular bin by the AROE may be changed from 0 lumens to about 13.6 lumens (assuming about an 85% optical efficiency of the AROE) by adjusting the output of each micro-LED in the 2×2 array of micro-LEDs. Similarly, in this example, the AROE may direct the light from the remaining 1020 micro-LEDs into 255 angular bins in a configuration with equal number of LEDs per angular bin. In another embodiment, the number of light sources per angular bin of an AVLED changes across the AROE. For example, in one embodiment, the central angular region of light output from an AVLED comprises more than one selected from the group: 2, 4, 6, 10, and 15 light sources per angular bin and the wider angular region comprises less than one selected from the group: 2, 4, 6, 10, and 15 light sources per angular bin. In one embodiment, the central angular region is the angular region within one selected from the group: 1, 2, 4, 10, 15, 20, 25, 30, 40, 50, and 60 degrees of the optical axis of the AVLED (such as the direction of nadir in a downlight light fixture or the angularly central angle of light output when all of the light source and the AVLED are emitting light at their largest intensity and flux in all angular bins). In one embodiment, the wider angular region is the angular region within one selected from the group: 1, 2, 4, 10, 15, 20, 25, 30, 40, 50, and 60 degrees of the largest angle of light emitting from the AVLED in an angular bin. In another embodiment, the wider angular region is the angular region greater than one selected from the group: 40, 50, 60, 65, 70, 75, 80 and 85 degrees from the optical axis of the AVLED.

In one embodiment, the AVLED comprises a spatial array of light sources and the AROE redirects the optical axis of the light emitting pixels or regions in the central region of the array to angular bins within the central angular region and the optical axis of the light emitting pixels or regions outside the central region of the array to the wider angular region. In one embodiment, the central region of the array of the light emitting pixels or regions is the area of a circle centered at the geometric center of the spatial array of light source with an area less than one selected from the group of 50%, 40%, 30%, 20%, and 10% of the total area defined by the outer boundaries of light emitting region of the spatial array light source. In one embodiment, the light emitting pixels or regions are considered within the central region if all or a portion of the light emitting pixel or region is within the central region boundary.

In one embodiment, the AROE comprises an ultra-wide-angle lens, Nikon 2100 lens or similar type lens, Pleon lens (such as the 5-element type), Goerz Serie X Hypergon Doppel Anastigmat, Zeisss Topogon, Russar-21 1330 lens, Russar MP-2 lens, Tipo Biogon, Ludwig Bertele Biogon 900 or Zeiss Biogon 90°, Biogon f/4.5, Biogon 38 mm f/2.8 lens, Biogon 53 mm f/4.5, Biogon 75 mm f/4.5, Universal Aviogon 1200 lens, Biogon 60 mm f/5.6, Heerbrugg AG Aviogon 120° f/5.6, Carl Zeiss S-Biogon 40 mm f/5.6, Carl Zeiss Hologon 1:8, Zeiss Hologon 12.5 mm f/8 120°, Zeiss Hologon 15 mm f/5.6 110°, or fish eye lens. In one embodiment, the AROE is an anamorphic projection lens that redirects light into larger angles in a first output plane (such as the x-z output plane) than a second output plane orthogonal to the first output plane (such as the y-z output plane) where z is the optical axis of the AROE or AVLED device axis or optical axis. In another embodiment, the AROE comprises an ultra-wide-angle lens which, when used as an imaging lens for receiving light an imaging light onto an imager, would result in an angle of view between 90 and 180 degrees. In one embodiment, the AROE comprises a lens with a focal length less than or equal to one selected from the group: 20, 15, 10, 8, 6, 5, 4, 3, 2, 1.5, 1.4, 1.3, 1.2, 1.1, 1.0, 0.9, and 0.8 millimeters. As used in the context of imaging, an object-to-image mapping function is the manner of conversion or mapping of a side object or point to an image point position displacement from the image center. In an imaging context, the distance of an image point from the image center, r, is dependent on the focal length of the optical system, f, and the angle from the optical axis, theta, where theta is in radians. In a stereographic (conform) mapping function $r=2\times f\times\tan(\theta/2)$. In an equidistant (linear scaled) mapping function $r=f\times\theta$. In an equisolid angle (equal area) mapping function $r=2\times f\times\sin(\theta/2)$. In an orthographic mapping function $r=f\times\sin(\theta)$. Although term "mapping function" is typically used in imaging, it can be used in reference to projection or directing light from a small spatial array light emitter toward a wide angular range. Thus, in the context of an AVLED, the "r" in the mapping functions is the distance from the geometric center of the light source array to the geometric center of a first light source and theta is substantially the angle from the optical axis of the light source array to the optical axis of the light from the first light source in the far field. In one embodiment, the AROE comprises a lens, such as an ultra-wide-angle lens, with a mapping function selected from the group: gnomonical, stereographic, equidistant, equisolid angle, orthographic, and a combination of two of the aforementioned mapping functions. For example, an AVLED comprising an AROE with a 2 millimeter focal length lens with an equisolid angle mapping function can direct light from a substantially planar micro-LED spatial array light source emitting light with an optical axis normal to the substantially planar light emitting surface such that the central axis of light from a micro-LED with a geometric center positioned 2 millimeters from the geometric center of the micro-LED array is 60 degrees from the optical axis of the micro-LED array of light sources. In another example, an AVLED comprising an AROE with a 2 millimeter focal length lens with an orthographic mapping function will direct light from a substantially planar micro-LED spatial array light source emitting light with an optical axis normal to the substantially planar light emitting surface such that the central axis of light from a micro-LED with a geometric center positioned 2 millimeters from the geometric center of the micro-LED array is 90 degrees from the optical axis of the micro-LED array of light sources.

In another embodiment, the AROE comprises an ultra-wide-angle lens or other optical element which directs light from a spatial array light source into angular bins within an angular output range of angles between 100 degrees and 180 degrees. In a further embodiment, AVLED comprises a spatial array light source and an AROE that directs light into angular bins within an angular output range that includes angles greater than one selected from the group: 180 degrees, 190 degrees, 200 degrees, and 210 degrees. In this embodiment, the light output from the AROE may have a direction component greater than 90 degrees from the optical axis of the AVLED such that light is directed with an angular component in a direction opposite the optical axis of the AVLED such that light is directed backwards, such as in a light fixture AVLED that provide up-lighting as well as downlighting. In one embodiment, the AROE comprises a zoom lens or zoom optical element wherein the focal length of the lens or optical element may be changed (electronically or manually). In one embodiment, an AVLED comprises an AROE with a focal length that is electronically controlled to focus the image corresponding to one or more angular bins at one or more surfaces of the external environment. For example, in one embodiment, the spatial array light source provides a grid or dot illumination pattern light output and the AVLED further comprises an imager wherein the AVLED changes the focus to increase the contrast of the pattern such that the image of the spatial light array (or SLM) is substantially in focus at one or more locations within the environment.

In one embodiment, an AROE includes a one or more light reflecting surfaces, aluminum coated surfaces, silver coated surfaces, specularly reflecting metallic surface, mirrors, front surface mirrors, planar mirrors, total internal reflection surface with a radius of curvature less than 0.5 meters in one or more light output planes (or the light reflecting surface is a faceted surface following a curve with a radius of curvature less than 0.5 meters in one or more light output planes).

In one embodiment, an AROE comprises a cross-sectional shape (or portion thereof) in one or more planes orthogonal to the optical axis of the AROE that is one or more selected from the group: rectangular, square, beveled edge rectangular, rounded edge rectangular, circular, curved, ellipsoidal, parabolic, or hyperbolic.

The percent distortion for a lens is typically calculated as a percentage of the field height and may be calculated from the equation % Distortion=((AD−PD)/PD)×100%, where AD is the Actual Distance, PD is the Predicted Distance measured using a dot pattern (such a spatial array light source). In one embodiment, an AVLED comprises an AROE where higher levels of distortion at angular bins further from the optical axis or device axis of the AVLED may be acceptable. In on embodiment, the AROE comprises a lens (such as a grouping of individual lens elements or a single lens element) with a percent distortion greater than one selected from the group of 1%, 2%, 3%, 5%, 7%, and 10% at the outermost angular bins. In on embodiment, the AROE comprises a lens (such as a grouping of individual lens elements or a single lens element) with a percent distortion less than one selected from the group of −1%, −2%, −3%, −5%, −7%, and −10%. In one embodiment, an AVLED comprises a spatial array light source and an AROE wherein one or more light sources of the spatial array light source (such as the outer light sources) are imaged onto one or more surfaces of the room or environment such that they are blurry and may blend to one or more neighboring pixels to avoid spatial non-uniform light properties between spatial zones (such as dark or low luminance lines, rings, or grids between the images of the light source in the far field). In one embodiment, the modulation transfer function of the AROE for the frequencies of outer, neighboring spatial zones corresponding to neighboring outer angular bins is less than one selected from the group of 0.7, 0.6, 0.5, 0.4, 0.3, and 0.2. In one embodiment, the modulation transfer function of the AROE for the frequencies of outer, neighboring spatial zones corresponding to neighboring outer angular bins is greater than one selected from the group of 0.5, 0.6, 0.7, 0.8, and 0.9. In this embodiment, for example a higher MTF enables more accurate/defined illumination and/or irradiation.

In one embodiment the AROE comprises one or more lenses of the type: simple lens, conic lens, freeform lens, aspheric lens, biconic lens, lens with a toroidal surface, lenslet array, microlens array, lens with a surface modeled by a biconic surface with x, y, and Zernike polynomial terms added, lens with a freeform surface based on the Chebyshev polynomials, superconic asphere with fast convergence, tilted lens, lens with a surface modeled by a cubic spline (rotationally symmetric fit to eight points), super lens (lens comprising one or more metamaterials) to surpass the diffraction limit, and achromatic super lens.

In one embodiment, an AROE includes a first optical element (such as an ultra-wide angle lens) and a second element (such as torus or semi-torous with a mirrored curved surface) spaced from the first optical element, physically coupled to the first optical element, and positioned to redirect light from the first element. In this embodiment, for example, the second element could be a torus with a mirrored surface and the radius of the torus from the center of the tube to the center of the torus and the position of the torus are chosen to reflect light from an outer output range from the first optical element into angles greater than 90 degrees from the optical axis of the AVLED. In one embodiment, the AROE comprises a plurality of optical elements wherein each optical element individually redirects the optical axis of one or more light sources into only substantially one angular bin. In one embodiment, the plurality of optical elements are physically connected and/or optically coupled. In one embodiment, an AVLED comprises an AROE with a plurality of lightguides that each redirect the optical axis from one or more light sources of the spatial array light source such that the one or more light sources direct light into an angular bin. In one embodiment, the lightguides are substantially cylindrical in a cross-sectional shape, such as a polymer fiber optic lightguide, wherein the lightguides are curved such that the output angles of the light existing the lightguides are at a larger angle to the optical axis of the AVLED than the light entering the lightguides. In one embodiment, the lightguides fan away from the central axis direction as the lightguides are positioned further from the center of the spatial array of light sources. In one embodiment, the cross-sections of the lightguides are substantially constant along the length of the lightguide (the length direction being the longest dimension of the lightguide along which light propagates within the lightguide). In another embodiment, one or two orthogonal dimensions of the cross-section of the lightguides increases along the length of the lightguide from the light source to the light output surface. In one embodiment, the light input surface for the lightguide is a substantially planar face oriented at an angle greater than on selected from the group 10, 20, 30, 40, and 50 degrees from the length direction or optical axis of the lightguide for light sources of the spatial array light source that are greater than 25% of the total length of the spatial array of light sources in a first light output plane from the geometric center of the spatial array of light sources in the first light output plane. In another embodiment, the plurality of lightguides of the AROE positioned to receive light from a plurality of light sources corresponding to a plurality of angular bins are physically connected at the output surface of the AROE. In a further embodiment, the plurality of lightguides are adhered, joined, welded, or integrally formed such that they are connected at the light input surface and/or light output surface. In another embodiment, the AROE comprises a plurality of plates comprising lightguides formed therein where the plates are stacked to create an array of lightguide positioned to receive light from the spatially array light source. In one embodiment, the AROE comprises a plurality of rings comprising lightguides oriented in a radial direction of the ring or with a directional component in the radial direction of the ring.

In a further embodiment, the AROE comprises one or more passive or active (switchable) versions of optical elements selected from the group: diffractive optical elements, multi-level diffractive lens (which may comprise concentric diffraction patterns), holographic optical elements, diffraction grating, linear diffraction grating, holographic optical element, diffractive optical element, hologram, multiplexed hologram, holographic stereogram, blazed grating, variable blaze dynamic grating, binary grating, multi-level grating, embossed grating, volumetric grating, embossed hologram, volumetric hologram, volume phase hologram, broadband wavelength hologram (with a wavelength bandwidth greater than 20 nanometers for at least 70% diffraction efficiency), broadband wavelength grating (with a wavelength bandwidth greater than 20 nanometers for at least 70% diffraction efficiency) polarization grating, stacked polarization gratings, anisotropic grating, anisotropic hologram, polarization hologram, geometric phase lens, polarization directed flat lens, Bragg polarization grating, optical axis grating, shearing grating, metamaterial grating, resonant waveguide grating, meta-resonant waveguide grating, polarization-dependent metagrating, cycloidal diffractive waveplate, vector hologram, vector grating, geometric phase hologram, Fresnel zone plate, offset Fresnel zone plate, photon sieve, azimuthally structured Fresnel zone plate, liquid crystal grating (and liquid crystalline grating), liquid crystal hologram, phase grating, holographic polymer photonic crystal, electrowetting-based beam steering element, liquid crystal optical phased array, vertical continuous optical phased arrays, imprinted diffraction grating such as disclosed in US patent application publication No. 20180107110, and a stack of two or more of the aforementioned gratings, holograms, or elements. In another embodiment, the AROE, comprises a spatial array light source with first light sources emitting light with a first peak wavelength and second light sources emitting light with a second peak wavelength different from the first wavelength by at least 20 nanometers, wherein the AROE comprises a first diffractive and/or holographic optical element positioned to receive light from the first light sources (such as positioned above the first light source) and a second diffractive and/or holographic optical element positioned to receive light from the second light sources (such as positioned above the second light source) wherein the first diffractive and/or holographic optical elements have a different optical structure than the second diffractive and/or holographic optical elements (such as a different pitch and/or blazed grating angle). For example, in one embodiment, an AVLED comprises an outer ring of micro-LEDs (which may be substantially collimated with an angular FWHM intensity less than 10 degrees) emitting light at a wavelength of 622 nanometers has a first diffraction grating with a first radial pitch positioned above the micro-LEDs to substantially diffract light into a range of first polar angles and a second ring of micro-LEDs emitting light at a wavelength of 530 nanometers with a second diffraction grating with a second radial pitch different from the first radial pitch. In another embodiment, a plurality of light sources with peak wavelength differences greater than 20 nanometers comprise a diffraction and/or holographic optical element with a constant pitch above the set of light sources such that the light from the different light sources is emitting into different angles and different angular bins. In this embodiment, a set of light sources with different peak wavelengths can emit light through a diffractive, holographic, or other diffractive or wavelength selective scattering element with a constant first pitch and a second set of light sources of light sources with the same set peak wavelengths can be positioned to emit light through a diffractive, holographic, or optical element with a different pitch (and/or blaze angle or other optical feature) such that the light from output for each wavelength from each different diffractive and/or holographic optical element can be accounted used to direct light into the appropriate angles for an angular bin. For example, a red, green, and blue collimated (or reduced angle light source) micro-LED (or micro-laser) set emits light into a diffractive optical element with a first pitch with red diffracting into a first angle, green diffracting into a second angle, and blue diffracting into a third angle. In this manner, a different set of RGB collimated (or reduced angle light source) micro-LEDs (or micro-lasers) that emits light into a second diffractive optical element with a second pitch where the green light diffracts into the first angle, and a third set of RGB collimated (or reduced angle light source) micro-LEDs (or micro-lasers) could emit light into a third diffractive optical element with a third pitch where the blue light diffracts into the first angle. In this example, using the three gratings and 3 sets of RGB light sources, red, green, and blue light can be directed into the first angle (corresponding to a central angle in a first angular bin, for example) and the color of the light directed into the first angular bin may be controlled by adjusting the relative intensity from the red, green, and blue light sources from different sets of micro-LEDs (or micro-lasers). In a further embodiment, an AVLED comprises an AROE with one or more broadband polarization gratings, or broadband stack of polarization gratings that diffracts light from a plurality of light sources in the spatial array light source. In a further embodiment, the AVLED comprises a zero-order filter to absorb zero-order light above the gratings designed to diffract light into angles away from the optical axis of the light source. In another embodiment, the AROE further comprises at least one linear polarizer and/or circular polarizer to polarize light incident on the grating (such as a broadband polarization grating) In one embodiment, the AROE comprises a refractive Fresnel lens, total-internal reflection (TIR) Fresnel lens, or a hybrid refractive TIR Fresnel lens for each individual light source in the spatial array light source, a plurality of light sources in the spatial array of light sources, or for all of the light sources in the spatial array of light sources. In one embodiment, the refractive Fresnel lens, total-internal reflection (TIR) Fresnel lens, or a hybrid refractive TIR Fresnel lens comprises ring-shaped elements, or other optical element such as a primary optic of the light source, and the AROE comprises substantially the same optical features within a ring circle except for rotation. For example, one embodiment an AVLED comprises a spatial array light source comprising a plurality of micro-LEDs disposed in a concentric circular array and an AROE comprising optical elements in a concentric circular array, each positioned above a single micro-LED to redirect the optical axis of the light from the micro-LED, wherein each optical element in a first circle of optical elements (corresponding to a different theta value in spherical coordinates with the device axis or optical axis of the AVLED at theta of 0 and phi at 0) of the concentric circular array of micro-LEDs redirects the optical axis of the underlying micro-LED of the circle of micro-LEDs into substantially the same phi angle in spherical coordinates. In this embodiment, the AVLED may be a downlight where the optical axis of the AVLED is the nadir and a ring of LEDs in the circular array of micro-LEDs is directed to the same angle phi from the optical axis (nadir). In one embodiment, the same optical element is positioned over each micro-LED in the ring and the rotation of the optical element varies around one or more circles (along the theta angle).

In another embodiment, AVLED comprises an AROE comprising an individual lens, optic, or optical element for each light source in the spatial array of light sources. In one embodiment, the AROE comprises a plurality of lenses, optics, or optical elements physically connected directly to each other, indirectly to each other, or not physically connected directly through the AROE. In one embodiment, the AVLED comprises a plurality of AROEs wherein each AROE is a primary optic for each light source in the spatial array of light sources. Primary optics for light sources may include optical elements in the form of total internal reflection optics, refractive optics, diffractive optics, holographic optics, reflective optics (such as mirrored coatings), photonic optical elements, optical elements comprising a luminophore, or a combination of two or more of the aforementioned optical elements. In one embodiment, the primary optics are optically coupled/and or mounted or physically connected to the packaging for the light source or the light source directly. In another embodiment, an AVLED comprises a plurality of AROEs in the form of primary optics for each light source in the spatial array of light sources. In another embodiment, the AROE for each light source or optical elements of the AROE for each light source, that are positioned substantially along a circle, line, or curve are substantially the same optical element that may be rotated along the circle, line, or curve, respectively, in the light output plane of the array of light sources or rotated along the circle, line, or curve, respectively, in a plane orthogonal to the light output plane (such as a plane substantially comprising or parallel to the light source array).

In one embodiment, an AVLED or AROE comprises an aperture in optical path of light from the light source to the light exiting surface of the AVLED (such as the outer surface of the AROE or a transparent protective lens). In one embodiment, this aperture is adjustable to a smaller diameter to sharpen the boundaries between spatial zones (bringing the spatial zones more into focus) corresponding to one or more light sources, and optionally reduces the total light flux output from the AVLED. In another embodiment, adjusting the aperture to a larger diameter spreads each spatial zone closer to a neighboring spatial zone and/or causes the light from each spatial zone to spread and leak into one or more neighboring zones (bringing the spatial zones more out of focus) and optionally increases the total light flux output from the AVLED.

In one embodiment, the AROE is an array of micro-optical or nano-optical elements wherein the elements are formed in-situ above a spatial array light source. In another embodiment, the AROE is formed separately and later optically coupled to a spatial array light source or one or more components of an AVLED such that each element directs light from the corresponding light emitting source below it into a particular angular bin. In one embodiment, the AVLED comprises a spatial array light source, an AROE, and one or more apertures to filter out light from going into more than one angular bin. For example, in one embodiment, a spatial array light source comprises an array of optical elements above the light sources (such as micro-LEDs) and redirects more than 50% of the light to a desired angular bin, and more than 80% of the remaining light is blocked from going into another angular bin by an aperture or corresponding array of apertures positioned above the corresponding optical elements. In this embodiment, the shapes and/or sizes of the apertures may be adjusted to prevent stray light from going into an undesigned aperture or angular bin. In one embodiment, a percentage of light flux output less than 1%, 2%, 5%, 10%, 20%, 30%, 40% and 50% of the light output for the pixel (or the entire spatial array light source) is permitted to leave the AVLED in an angular bin that is outside the target angular bin or the angular bin comprising the peak luminous or radiant intensity.

Angular Properties of AVLED or AROE

In one embodiment, an AVLED comprises one or more AROEs and the angular output of light from the AVLED is substantially the same as light output from the one or more AROEs. In one embodiment, the angular width of the angular bins of the light output from an AVLED or AROE varies (theta and/or phi in the spherical coordinate system) as the angle from the optical axis increases. In one embodiment, the angular width of the angular bins of the light output from an AVLED or AROE (theta and/or phi in the spherical coordinate system) substantially increases as the angle from the optical axis increases. In one embodiment, the angular width of the angular bins of the light output from an AVLED or AROE (theta and/or phi in the spherical coordinate system) substantially decreases as the angle from the optical axis increases.

In one embodiment, the light output from the AVLED comprises a plurality of high-resolution angular bins and a plurality of low-resolution angular bins. In one embodiment, the high-resolution angular bins of an AVLED comprises bins with an angular width in theta and/or phi spherical coordinates less than one selected from the group 20, 15, 12, 10, 8, 6, 5, 4, 3, 2, 1, and 0.5 degrees. In one embodiment, the low-resolution angular bins of an AVLED comprises bins with an angular width in theta and/or phi spherical coordinates greater than one selected from the group 10, 15, 20, 25, 30, 35, 40, and 45, degrees. In one embodiment, an AVLED comprises high-resolution angular bins at angles higher than a first angle from the optical axis of the AVLED and low-resolution angular bins at angles less than the first angle. For example, in one embodiment, an AVLED comprises a plurality of high-resolution angular bins with angular widths in theta and phi less than 10 degrees at phi angles from the optical axis (or nadir) of the AVLED greater than 45 degrees and low-resolution angular bins with angular widths in theta and phi greater than 10 degrees at phi angles from the optical axis (or nadir) of the AVLED less than 45 degrees. In another embodiment, an AVLED comprises a plurality of high-resolution angular bins with angular widths in theta and phi less than 5 degrees at phi angles from the optical axis (or nadir) of the AVLED less than 45 degrees and low-resolution angular bins with angular widths in theta and phi greater than 5 degrees at phi angles from the optical axis (or nadir) of the AVLED greater than 45 degrees. In one embodiment, an AVLED comprises light output with high-resolution angular gins, low-resolution angular bins, then high-resolution angular bins as the angle phi moves from the optical axis of the AVLED toward higher angles of phi in spherical coordinates (with the optical axis located at a theta of 0 degrees and phi at 0 degrees). In one embodiment, an AVLED comprises light output with low-resolution angular bins, high-resolution angular bins, then low-resolution angular bins as the angle phi moves from the optical axis of the AVLED toward higher angles of phi in spherical coordinates (with the optical axis located at a theta of 0 degrees and phi at 0 degrees). In one embodiment, the angular width of the angular bins of the AVLED vary in one or more AVLED light output planes. For example, in one embodiment, an AVLED comprises spatial array light source comprising a scanning laser and a remote phosphor plate or coating that may be un-patterned such that the size of the spot on the phosphor plate or coating can vary across the plate or coating. In this embodiment, the spots on the phosphor plate or coating create the array of light sources which may be imaged or projected by the AVLED.

In one embodiment, the AVLED comprises user changeable angular bins and/or angular bin widths. For example, in one embodiment, a user (including an installer) of the AVLED may increase the angular bin width over a first range of angles, such as theta from 45 to 90 degrees. In another embodiment, at least one of the angular bin width, light output, and number of angular bins is asymmetric with respect to the optical axis of the AVLED and/or AROE, a first light output plane, and/or a second light output plane orthogonal to the first light output plane. In one embodiment, an AVLED comprises at least one selected from the group of: 2, 4, 6, 8, 10, 20, 30, 40, 50, 60, 70, 80, 90, 100, 120, 140, 160, 180, 200, 220, 240, 260, 280, 300, 400, 500, 600, 800, 1,000, 1,500, 2,000, 3,000, 5,000, 10,000, 15,000, 20,000, and 40,000 individually addressable angular bins. In one embodiment, the angular output from a first angular bin of an AVLED overlaps the angular bin of a neighboring angular bin in the theta or phi angle by at least one selected from the group 2%, 5%, 8%, 10%, 15%, 20%, and 30% of the first angular bin width in the theta or phi angle, respectively. In one embodiment, the angular output from a first angular bin of an AVLED overlaps the angular bin of a neighboring angular bin in the theta or phi angle by less than one selected from the group 10%, 8%, 6%, 5%, 4%, 3%, 2%, and 1% of the first angular bin width in the theta or phi angle, respectively. In one embodiment, the AVLED comprises one or more angular bins extending to a phi angle from the optical axis (or nadir) of the AVLED greater than or equal to 60, 70, 80, 90, 100, 110, 120, 130, 140, 150, 160, and 180 degrees.

In one embodiment, the AVLED or system comprising an AVLED dynamically adjusts the location and/or angular width of one or more angular bins based on input or information (such as feedback) from one or more sensors, controllers, programs, and/or modes. For example, in one embodiment, a user may switch from a low angular resolution (bins with a large angular width) entertainment mode (such as background color enhancement matching the color of images on a television) to a high angular resolution reduced glare illumination mode in order reduce glare to room occupant while providing sufficient illumination. In one embodiment, an AVLED or system comprising and AVLED comprises one or more cameras or sensors detecting dimensions of the three-dimensional environment around the camera or sensor and automatically adjusts the location and/or width of one or more angular bins based on real-time measurement, adaptive, continuous, or predetermined sampling of one or more dimensions of objects, people, items, or a combination thereof for a particular mode of operation.

In one embodiment, the AVLED comprises a manually or electronically adjustable means to change the average angle in a plurality of angular bins changes. For example, in one embodiment, the relative position of the spatial array light source (or light source and spatial light modulator) and the AROE changes such that the average angles in a plurality of angular bins of the AVLED change. In another embodiment, one or more optical elements in the AROE changes relative to other elements of the AROE (such as in a zoom lens) to change the average angle in a plurality of angular bins of the AVLED. In one embodiment, an AVLED changes the average angle in a plurality of angular bins by one or more components selected from the group: spatial array light source, spatial light modulator, AROE, and component of the AROE automatically, electronically, or manually translating in a direction with a component parallel to the optical axis or device axis of the AROE or AVLED by one or more means selected from the group: manually adjusting a dial or knob, pressing a button, manually sliding or translating one or more of the aforementioned components, linear actuator, leadscrew actuator, piezoelectric actuator, twisted and coiled polymer actuator, electromechanical actuator, stepper motor linear actuator, moving coil actuator, and moving iron controllable actuator. In one embodiment, the average angle in a plurality of angular bins of an AVLED are changed automatically, by the user, manually, and/or electronically (optionally through an interface on a remote device) in order to better align the angular bins (and/or total angular width of the angular bins) to a room, environment, and/or spatial region wherein the control of the incident light flux is desired. For example, in one embodiment, the AVLED, using images derived from an imager on the AVLED and/or images from imagers not on the AVLED may optimize the angles in a plurality of angular bins to achieve one or more light properties in one or more modes of illumination for one or more surfaces or regions in the environment (such as walls, doors, ceilings, floors, etc.).

In one embodiment, the AVLED comprises an AROE that redirects by reflection (total internal reflection or reflection from a metallic surface or coating, holographic coating, dielectric coating, diffractive coating, multilayer reflective material, or other reflective material) light from one or more light sources from a range of first angles to a range of second angles with a directional component opposite to the optical axis of the AVLED. For example, in one embodiment, a ceiling-mounted AVLED with an optical axis parallel to the nadir comprises an AROE comprising an annular-shaped reflective surface on a suspended sheet below the one or more light sources of the AVLED such that the AROE reflects a portion of the light received from the one or more light sources (the angles above 45 degrees from the nadir, for example) into directions with a directional component in a direction opposite to the nadir (back toward the ceiling around the AVLED, for example).

Spatial Array Light Source

In one embodiment, an AVLED comprises a spatial array light source comprising an arrangement of light emitting regions or light sources, such as an array of micro-LEDs, or apertures that are illuminated and/or irradiated by one or more light sources (such as a backlight LCD illuminated and/or irradiated by 4 light emitting diodes, a digital micromirror device illuminated and/or irradiated by one or more light sources, or a reflective LCD illuminated and/or irradiated by one or more light sources. In one embodiment, an AVLED comprises a plurality of spatial array light sources and/or one or more light sources and a plurality of scanners and/or AROEs. In one embodiment, an AVLED comprises a plurality of projectors wherein the angular output from each projector does not substantially overlap with the angular output from another projector (such as to provide a wider range of illumination and/or irradiation angles). In another embodiment, an AVLED comprises a plurality of projectors wherein the angular output from each projector substantially overlaps with the angular output from another projector (such as to provide an increased light flux output for one or more particular angular bins (where the light is emitted from 2 or more projectors into a single angular bin, for example.

In one embodiment, the spatial array light source comprises scanning a focused or small beam of light across a phosphor such that illuminated and/or irradiated regions of the phosphor individually (for a brief period of time) behave as spatial emitting light source due to the emission of the light from the phosphor material (such as a planar phosphor film, phosphor plate, quantum dot plate, or other luminophore material). In one embodiment, the spatial array light source is a two-dimensional or three-dimensional arrangement of light sources (or illuminated and/or irradiated apertures) and is a circular array, concentric circular array, rectangular array, star-shaped array, irregular array, non-uniform array, hemispherical array (such as an arrangement of light sources substantially along the outer surface of a hemispherical shape) spherical array, ellipsoidal array, triangular array, pentagonal array, hexagonal array, heptagonal array, octagonal array, nonagonal array, decagonal array, polygonal array, polyhedral array, or a combination of one or more of the aforementioned arrangements. In one embodiment, the shape of the illuminated and/or irradiated aperture or light source emitter (at the aperture, light source, exit aperture of the emitter package, the emitter package (which may include a primary optic) is one or more of the following shapes: rectangular, square, circular, polygonal, hexagon, triangle, octagonal, polyhedron hemispherical, ellipsoidal, rectangular, pyramidal, faceted, cube, hexahedron, parallelepiped, prism, pentagonal prism, regular polygon, or a combination of one or more of the aforementioned shapes. In one embodiment, one or more light sources of the spatial array of light sources comprises a largest average dimension, average smallest dimension, average dimension within one or more light output planes, average diameter, average radius, less than one selected from the group 2, 1, 0.5, 0.100, 0.075, 0.04, 0.03, 0.02, 0.01, 0.008, 0.006, 0.004, 0.003, and 0.001 micrometers. In another embodiment, one or more light sources of the spatial array of light sources comprises a largest average dimension, average smallest dimension, average dimension within one or more light output planes, average diameter, average radius, greater than one selected from the group 2, 1, 0.5, 0.100, 0.075, 0.04, 0.03, 0.02, 0.01, 0.008, 0.006, 0.004, 0.003, and 0.001 micrometers.

In one embodiment, an AVLED comprises a spatial array light source with greater than at least one selected from the group of: 2, 4, 6, 8, 10, 20, 30, 40, 50, 60, 70, 80, 90, 100, 120, 140, 160, 180, 200, 220, 240, 260, 280, 300, 400, 500, 600, 800, 1,000, 1,500, 2,000, 3,000, 5,000, 10,000, 15,000, 20,000, 40,000, 60,000, 80,000, and 100,000 individually addressable light sources or illuminated and/or irradiated pixels (such as the number of pixels in an SLM) or illuminated and/or irradiated regions that may be turned on and off. In a further embodiment, each light source or pixel may be dimmed to greater than one selected from the group of 2, 4, 6, 8, 10, 20, 40, 50, 60, 80, 100, and 200 intensity levels. In one embodiment, the average peak radiant flux emitted from each light source (or illuminated pixel/aperture) of the spatial array light source is greater than one selected from the group: 0.05, 0.1, 0.5, 1, 2, 5, 8, 10, 20, 40, 50, 80, 100, 200, 500, 800, and 1000 milliwatts, evaluated by measuring the total flux output from the entire spatial array light source and dividing by the number of emitting light sources or irradiated pixels/apertures. In one embodiment, the average peak luminous flux emitted from each light source (or illuminated pixel/aperture) of the spatial array light source is greater than one selected from the group: 0.05, 0.1, 0.5, 1, 2, 5, 8, 10, 20, 40, 50, 80, 100, 200, 500, 800, and 1000 lumens, evaluated by measuring the total luminous flux output from the entire spatial array light source at the highest operating intensity from each pixel, and dividing by the number of emitting light sources or illuminated pixels/apertures. In another embodiment, the spatial array light source comprises an array of one or more types of light sources described herein for an AVLED.

In one embodiment, an AVLED comprises a spatial array light source and an AROE wherein the number of discrete light sources (which can be independently controlled) per 5 or 10 degrees of illumination (such as a 5 degree angular bin, or 4 angular bins whose angular range includes 10 degrees) in theta and/or phi is larger for angular bins closer to the optical axis of the AVLED (or nadir, for example) than angular bins further from the optical axis of the AVLED. For example, in one embodiment, 20 micro-LEDs emit light into angular bins equal to or within 5 degrees from the nadir of an AVLED (such as angular bins with phi less than or equal to 5 degrees) in the form of a downlight with a device axis or an optical axis parallel to the nadir (phi=0 degrees) and 5 micro-LEDs emit light into angular bins with a total angular width of 5 degrees centered at an angle theta=0 degrees and phi=60 degrees or angular bins including light into angles from theta=0 to 180 degrees and phi=57.5-62.5 degrees. In one embodiment the ratio of number of light sources of an AVLED emitting light into a first set of one or more angular bins to the number of light sources in a second set of one or more angular bins, each set having a total angular width less of phi less than 10 degrees (and optionally theta=0 to 180 degrees), is greater than one selected from the group 1, 2, 5, 10, and 20. In some embodiments, higher resolution or number of light sources in one or more angular bins are needed at higher angles from the nadir (or device axis or optical axis) than lower angles from the nadir (or device axis or optical axis), such as, for example, a museum selectively illuminating artwork hanging on walls. In one embodiment, the first set of angular bins are at an angle phi greater than 40 degrees and the second set of angular bins are at an angle phi less than 40 degrees from the nadir, optical axis, and/or device axis. In some embodiments, higher resolution or number of light sources in one or more angular bins are needed at lower angles from the nadir (or device axis or optical axis) than higher angles from the nadir (or device axis or optical axis), such as, for example, an automobile headlight AVLED or a grocery store light fixture mounted on a high ceiling. In one embodiment, the first set of angular bins are at an angle phi less than 40 degrees and the second set of angular bins are at an angle phi greater than 40 degrees.

In one embodiment, an AVLED comprises a spatial array light source and one or more light absorbing walls (along the entire array of light sources, or along each or a plurality (set) of the light sources) with directional components parallel to the light output axis of the light sources in the spatial array light source that absorb light at angles greater than one selected from the group 40, 45, 50, 55, 60, 65, 70, 75, and 80 degrees. For example, in one embodiment, an AVLED comprises a micro-LED array spatial array light source and a grid (or array) of light absorbing walls between the micro-LEDs in a first direction orthogonal to the light emitting axis of the micro-LEDs and between the micro-LEDs in a second direction orthogonal to the light emitting axis of the micro-LEDs and the first direction. In one embodiment, by blocking high angle light from the light sources, the light flux from a first spatial zone overlapping the light flux output from a second, neighboring light source in a second spatial zone neighboring the first spatial zone may be reduced to less than one selected from the group: 10%, 8%, 6%, 4%, 3%, 2%, 1%, and 0.5%. In one embodiment, the light absorbing walls are an array of frustrated conical light absorbing walls with the light sources centered in the smaller circular surfaces of the frustrated conical walls wherein the height and angle of the walls determine the angular cut-off of light from the light sources due to absorption from the light absorbing walls. In another embodiment, the light absorbing walls are a rectangular array of angled light absorbing walls (such as the walls of square frustrum, pyramid frustrum, or trapezoidal prism, for example) with the light sources centered axially between the walls wherein the height and angle of the walls determine the angular cut-off of light from the light sources due to absorption from the light absorbing walls.

Rotating Spatial Array Light Source

In one embodiment, an AVLED comprises an array of light sources (such as a linear array) that is rotated in a plane with a component orthogonal to the optical axis of the light sources such that over a full period of rotation, a circular array of light sources is generated. In this embodiment, a first light source of the array of light sources is spatially and time synchronized to emit light similar to a circular array of light sources. By synchronizing the light sources with the location and driving the flux output accordingly, the light output from the spinning array of light sources may be input into an AROE and output from the AVLED into a range of angular bins corresponding to the time and location of the light sources. In this embodiment, the width of the angular bin may be discretized by pulsing the light sources or the angular bins may be effectively continuous with adjacent angular bins by modulating the light flux output continuously. In one embodiment, the AVLED comprises a plurality of rotating linear arrays of light sources extended radially from the center of rotation. In one embodiment, the linear arrays extend from the center of rotation outward in a light emitting plane. In another embodiment, the linear arrays extend along diameters of a circle of rotation. In one embodiment, the linear arrays are straight or curved. In one embodiment, an AVLED comprises a spatial array light source that is rotated about an axis of rotation and the light flux output is synchronized to emit light into specific angular bins. In one embodiment, the AVLED comprises one or more linear arrays of light sources wherein the linear array is curved in the light output plane such that the light sources further from the axis of rotation are closer to the environment to be illuminated than the light sources closer to or on the optical axis of rotation. In one embodiment, an AVLED comprises a spatial array light source on a flexible substrate such that the array is curved outward in the +z direction parallel to the device axis or optical axis of the AVLED. In one embodiment, an AVLED comprises a spatial array light source persistence of vision display comprising a plurality of light sources that are rotated such that the light output from the AVELD appears to be a constant illumination without flicker.

LED Array, Micro-LED Array, or Nano-LED Array

In one embodiment, the spatial array light source is an array of light emitting diodes (LEDs), an array of micro-LEDs, an array of nano-LEDs, or an array of organic light emitting diodes (OLEDs), including phosphorescent OLEDs and transparent OLEDs. In one embodiment, the AVLED comprises light sources (and/or an array of light emitting diodes) with spectral output corresponding to the color or spectral output of white, warm white, cool white, daylight, red, green, blue, amber, yellow, cyan, magenta, infra-red, or ultraviolet light output. As used herein, nano-LEDs have an average largest dimension less than 1 micron and micro-LEDs have an average largest dimension less than about 100 micrometers. In one embodiment, an AVLED comprises one or more superluminescent light emitting diodes or a micro-SLED array (micro-Superluminescent Light Emitting Diode array). In this embodiment, the SLED may be speckle free, quasi-collimated (for example with an angular FWHM intensity less than 5 degrees), and/or linearly polarized.

Laser Array, Micro-Laser Array, or Nano-Laser Array

In one embodiment, the spatial array light source comprises one or more selected from the group: an array of laser diodes, an array of micro-lasers, an array of nano-lasers, an array of organic laser diodes (OLEDs), an array of vertical-cavity surface-emitting lasers, an array of surface emitting lasers, an array of vertical-external-cavity surface-emitting-lasers (VECSELs), an array of hybrid silicon lasers, an array of interband cascade lasers (ICLs), an array of semiconductor ring lasers, an array of phase locked lasers, and an array of quantum cascade lasers.

Spatial Array Emitter (or Light Source and SLM) Shape

In one embodiment, the shape of the array of the spatial array light source (or pixels or apertures receiving light from one or more light sources) is substantially planar, substantially non-planar, substantially curved in one or two mutually orthogonal light output planes, substantially spherical, substantially hemispherical, substantially arcuate, or a combination of two or more of the aforementioned shapes. In one embodiment, an AVLED comprises a plurality of spatial array emitters (spatial array light sources) oriented at different angles and angles less than 90 degrees to the optical axis or device axis of the AVLED. In one embodiment, an AVLED comprises four substantially planar spatial array light emitters, one oriented at an angle less than −20 degrees to the AVLED optical axis or device axis in a first light output plane, one oriented at an angle greater than +20 degrees to the AVLED optical axis or device axis in the first light output plane, one oriented at an angle less than −20 degrees to the AVLED optical axis or device axis in a second light output plane orthogonal to the first light output plane, one oriented at an angle greater than +20 degrees to the AVLED optical axis or device axis in the second light output plane. In this embodiment, the AVLED may comprise a fifth substantially planar array light emitter oriented substantially orthogonal to the optical axis or device axis of the AVLED, and optionally between two pairs of spatial array light emitters.

AVLED Comprising a Substantially Spherical or Hemispherical Spatial Array Light Source In one embodiment, the optical axes of the plurality of light sources (or apertures receiving light from one or more light sources, such as an LCD in the shape of a hemisphere) vary along the array. By using light sources or apertures oriented along the surface of a curve, arc, sphere, hemisphere, or non-planar shape, the optical axes of the light sources (or light exiting an aperture or pixel) can vary for each source (or aperture or pixel) position along the surface of the substantially curved, substantially arcuate, substantially spherical, substantially hemispherical, or substantially non-planar shaped spatial array light source. In this embodiment, if the orientation of the optical axes of the light sources (or light from the apertures or pixels) is sufficiently close to the desired angular peak for the angular bins, an AROE may not be needed. In one embodiment, an AVLED comprising a spatial array of light sources positioned along a shape or surface that is substantially curved, substantially arcuate, substantially spherical, a stepwise surface (where the light sources or pixels may be positioned substantially along a curved line but on stepped structures), substantially hemispherical, or a combination of two or more of the aforementioned surfaces or shapes and the AVLED may comprise one or more optical elements (such as lens, or array of lenses, or other optical element disclosed herein) that refracts, reflects, diffracts, or otherwise redirects at least a portion of light from the light source or light sources such that the spatial array light source such that it defines the angular width of one or more angular bins of the AVLED (such as by partially collimating the light or reducing the angular width in one or more light output planes). In one embodiment, the spatial array light sources positioned along a non-planar shape comprise a primary and/or secondary optical element that reduces the width of the angular bin associated with one or more light sources in the array of light sources such that it is a reduced angular width light source or light sources.

Spatial Light Modulator (SLM)

In one embodiment, an AVLED comprises one or more light sources that illuminate and/or irradiate a spatial light modulator to create a spatial array light source, and an AROE. In this embodiment, the illuminated and/or irradiated SLM may be treated as a direct emission light source (such as an LED array) and the axes of the light from each pixel (effectively a light source) may be redirected by the AROE. In one embodiment, the AVLED comprises a spatial array of light sources illuminating and/or irradiating a SLM where the light output from the spatial array of light sources is spatially modulated in addition to the modulation of the SLM such that the dynamic range of the AVLED is increased over the SLM and a substantially constant average intensity from the illuminating and/or irradiating light sources. In one embodiment, the optical axis of the light from each pixel (or light source) in a spatial array light source varies across the array in one or more array directions (such as in a row, column, or radial direction of the array) and an AROE may further redirect the optical axis of the light from the spatial array of light sources. In one embodiment, the light from one or more light sources is incident on an AROE prior to reaching an SLM such that the angle of the optical axis for the light reaching each pixel of the SLM varies. For example, in one embodiment, light from an array of light source is incident on a diffuser and/or other mixing optic (such as a fly's eye microlens array) and diffused such that the color and/or spatial uniformity is substantially uniform (such as a minimum divided by the maximum luminous intensity is greater than 70% and/or a CIE 1976 (L*, u*, v*) color space Au'v'<0.01), and the image of the diffuser is focused by a lens with an F/# less than 1.5 through a spatial light modulator such the focus is on the opposite side of the SLM. In this embodiment, the axis of each pixel is at a slightly different angle and an AROE may optionally be used prior to the focal point or after the focal point to further redirect the light (such as increasing the angle of the axes corresponding to the pixels and angular bins). In one embodiment, the thickness of the SLM (such as the thickness of the LCD stack between outer surfaces of the polarizers) is less than one selected from the group 2, 1.5, 1.3, 1.2, 1.1, 1.0, 0.9, 0.8, 0.7, 0.6, 0.5, and 0.4 millimeters such that shadowing due to parallax is minimized. In one embodiment, an AVLED comprises two or more AROEs to further increase (or decrease) the angle of the optical axis of one or more pixels or light sources (such as having an AROE on either side of a SLM) or one AROE where the light passes through the AROE twice (such as positioning an AROE between one or more light sources and a reflective LCD where the light from the light source passes through the AROE prior to reflecting from the reflective LCD and after reflecting from the reflective LCD where the single AROE may magnify (increase) the angles after reflection from the reflective LCD, for example).

In one embodiment, the AVLED comprises an array of light sources modulated to at least 10 light output levels (such as by pulse-width modulation or current modulation), a SLM, and a AROE wherein the maximum dynamic range of the light output in one or more angular bins includes light output extending into a range of lumens (or Watts) selected from the group: 0.01 to 20,000, 0.05 to 5,000, 0.01 to 5,000, 1 to 10,000, 1 to 20,000, 0.01 to 1,000, 0.01 to 500, 1 to 5,000, 5 to 5,000, 10 to 1,000, 10 to 100, 1 to 100, 0.5 to 100, 0.1 to 100, 0.01 to 100, and 1 to 50. In one embodiment, the AVLED comprises an array of light sources modulated to at least 10 light output levels (such as by pulse-width modulation or current modulation), a SLM, and a AROE wherein the maximum dynamic range of the light output in one or more angular bins includes light output greater or less than a range of lumens (or Watts) selected from the group: 0.01 to 20,000, 0.05 to 5,000, 0.01 to 5,000, 1 to 10,000, 1 to 20,000, 0.01 to 1,000, 0.01 to 500, 1 to 5,000, 5 to 5,000, 10 to 1,000, 10 to 100, 1 to 100, 0.5 to 100, 0.1 to 100, 0.01 to 100, and 1 to 50.

In one embodiment, the AVLED comprises two spatial light modulators, a first holographic SLM displaying the hologram forming the real image on the first intermediate real image plane, and a second spatial light modulator at a second intermediate image plane to intensity modulate the real image. This second SLM may comprise, for example, a digital micro mirror device such as the Texas Instruments DLP™, or a liquid crystal on silicon (LCOS) SLM, or some other SLM technology. Preferably the resolution of the second SLM is greater than that of the first SLM, and the projector includes an image processor to decompose the image data into a lower spatial frequency component used to generate the hologram data, and a higher spatial frequency component for intensity modulating a real image from the hologram. This dual modulation architecture provides a number of advantages including physical compactness and improved image resolution and contrast. Systems comprising two SLMs including a holographic SLM are disclosed in US20130194644, the entire contents are incorporated by reference herein.

In one embodiment, an AVLED comprises one or more light sources and one or more active, electronically addressed spatial light modulators (SLMs) that spatially modulate the intensity and/or phase of light incident from the one or more light sources where the one or more SLMs are a modulator type (such as the type of modulator used in a display) or selected from the group: liquid crystal display (LCD), transmissive display, reflective display, transmissive LCD, reflective LCD, nematic liquid crystal display, liquid crystal on silicon (LCOS) display, ferroelectric LCOS display, twisted nematic display, in-plane switching display, advanced fringe field switching display, vertical alignment display, blue phase mode display, zenithal bistable device, guest-host liquid crystal display, polymer dispersed liquid crystal display, holographic polymer dispersed liquid crystal display, phase retardation liquid crystal display, cholesteric display, bistable twisted nematic display, grating aligned zenithal display, microelectromechanical mirror (MEM) based display, biaxial MEM based display, digital micromirror device (DMD) based display, electrophoretic display, time-multiplexed optical shutter display, color sequential display, interferometric modulator display, bistable display, electronic paper display, LED display, thin-film-transistor display, segmented display, passive matrix display, active matrix display, electrostatic display, electrowetting display, electrokinetic display, micro-cup EPD display, photonic crystal display, electrofluidic display, electrochromic display, deformable mirror display, multiple quantum well display, time-multiplexed optical shutter display, phase spatial light modulator, diffractive spatial light modulator, holographic spatial light modulator, or other liquid crystal based display or display technology known in the art for spatially modulating light.

AROE on or within a Light Source

In one embodiment, an AVLED comprises one or more light sources where an AROE is effectively within or optically coupled to the light source such that the output from the light source is not parallel to the surface normal of the light source light emitting surface, outer surface of the AROE optically coupled to the light source, or to a direction orthogonal to an array direction of the spatial array of light sources. For example, in one embodiment, the light source includes a light emitting diode with photonic structures and/or nanostructures (such as a metasurface comprising subwavelength nanostructures that can include titanium dioxide nanofins) which may be anisotropic within the volume of the light emitting diode or on the surface of the light emitting diode (or on the surface or within the AROE optically coupled the outer surface of the light source) such that the optical axis of the light exiting the light source or exiting the AROE optically coupled to the light source has an angle to the surface normal of the light source, or AROE, or to a direction orthogonal to an array direction of the spatial array of light sources greater than one selected from the group: 0, 2, 5, 8, 10, 150, 20, 25, 30, 35, and 40 degrees. For example, in one embodiment, the internal or surface structure of the light emitting diode comprises angled or blazed grating that diffracts light with a first peak wavelength (such as diffracting light with a peak wavelength at 630 nanometers and wavelength bandwidth from 600 to 640 nanometers with more than a 50% diffraction efficiency) to an angle of 30 degrees from the normal to the LED surface or to a direction orthogonal to an array direction of the spatial array of light sources. In another embodiment, a plurality of light sources in a spatial array light source each comprise a different AROE structure within the volume of the LED or optically coupled to the surface of the LED such that the light exits at different non-zero angles to the surface normal of the LED light output surface or to a direction orthogonal to an array direction of the spatial array of light sources (such as perpendicular to a planar spatial array light source that may have step-like surface such as a blazed grating). In one embodiment, AVLED comprises a spatial array light source and an AROE optically coupled to the light output surface of the spatial array light source. In this embodiment, the AROE may include linear blazed gratings where the pitch and/or angle of the blazed grating varies across the array such that the spatial locations within the array will emit light with increasing optical axis angles for a single color light source (or single wavelength range), such as red LEDs, relative to the position of the LED along the array. In another embodiment, an AVLED comprises a spatial array light source and a first AROE that redirects light in a first light output plane from the spatial array of light sources into larger angles from the surface normal of the light source, the surface normal AVLED, or a direction orthogonal to an array direction of the spatial array of light sources, and the AVLED further comprises a second AROE (such as an AROE with features orthogonal to the first AROE) that redirects the light from the spatial array of light sources after being directed by the first AROE in a second light output plane into larger angles from the surface normal of the light source, the surface normal AVLED, or a direction orthogonal to an array direction of the spatial array of light sources. For example, in one embodiment, an AVLED comprises a micro-LED array spatial array of light sources substantially arranged in an array in an x-y plane and emitting light with a directional component in the z direction. In this embodiment, the AVLED comprises a first blazed diffraction grating (a first AROE) with features linear in the y direction and a pitch that varies in the x direction across the spatial array light source where the first AROE diffracts light from the red micro-LEDs of the micro-LED array into increasing optical axis angles from the normal to the array direction (z direction) in the x-z output plane as the position of the red micro-LEDs vary across the array in the x direction. In this embodiment, the AVLED may comprise a second blazed diffraction grating (a second AROE) with features linear in the x direction and a pitch that varies in the y direction across the spatial array light source positioned to receive light from the first AROE where the second AROE diffracts light from the red micro-LEDs of the micro-LED array into increasing optical axis angles from the normal to the array direction (z direction) in the y-z output plane as the position of the red micro-LEDs vary across the array in the y direction. In this example, the optical axis angles from the normal for the light from blue micro-LEDs and green micro-LEDs will also change based on the position in the array in the x-z light output plane and the y-z output plane due to the first AROE and second AROE, respectively. In one embodiment, the pitch of the first AROE and/or first and second AROE varies non-linearly across the array.

In one embodiment, the AVLED comprises an AROE in the form of a spatial array of one or more gratings or holograms (such as polarization gratings) corresponding to one or a group of light sources in a spatial array of light sources. In this embodiment, the gratings or holograms (such as polarization gratings) may be broadband such that the optical axis of white light may be redirected efficiently. In one embodiment, the grating or hologram is a polarization gratings, anisotropic grating, anisotropic hologram, polarization hologram, optical axis grating, cycloidal diffractive waveplate, vector hologram, vector grating, geometric phase holograms, liquid crystal grating (and liquid crystalline grating), liquid crystal metasurface, liquid crystal hologram, phase grating, or a stack of two or more of the aforementioned gratings or holograms. These holograms or gratings, stacks, and their methods of manufacture are known in the art of liquid crystal technology and described, for example, in U.S. Pat. Nos. 5,576,862, 6,128,058, 6,153,272, 6,242,061, 7,196,758, 7,692,759, 8,064,035, 8,339,566, and 8,520,170, US Patent Application Publication Nos. US20030090618, US20090073331, US20110027494, US20130194537, US20130027656, US20140252666, and US20150022745, the contents of each are incorporated by reference herein.

In one embodiment, an AVLED comprises a spatial array light source (or a scanning light source) and an AROE comprising an array of electronically adjustable optical elements. These elements could be liquid lenses, fluid lenses, an array of thermo-optical elements and microheaters, switchable gratings/refractive elements using liquid crystalline material and an electric field, electrically switchable metalenses, optical metasurface (such as one or more types using chemical approaches, electrical gating and photocarrier excitation, optical nonlinearity tuning, reconfigurable metasurface for active device, beam steering device, mechanical actuation, phase change material, magneto-optic control, modulating the dielectric environment, varifocal lenses and dynamic holograms, dynamic phase, amplitude, and polarization control, ultrafast modulated metasurfaces, nonreciprocity, frequency conversion and time refraction, or time reversal and negative refraction), electrically switchable gratings, reconfigurable optical elements, optofluidic elements, acousto-optical elements. In one embodiment, an AVLED comprises a spatial array light source and two or more AROEs, where a first AROE redirects light from different portions of a spatial array light source into one or more angular bands, and a second AROE redirects light from the one or more angular bands into different angular bins with smaller angular ranges than the angular bands. In one embodiment, three, four, five, or more AROEs are similarly used for different angular bands and/or angular bins within the angular bands.

In one embodiment, the orientation and/or position of the AROE relative to a spatial array light source or one or more light sources is adjustable by a physical mechanism (such as a fine adjustment screw with a thread count greater than 40, 50, 60, 70, 80, and 90 threads per inch, or a rotary screw mount, for example) or an electronically adjustable mechanism along one or more axes or rotation about one or more axes of the AROE (such as the optical axis and/or one or two mutually orthogonal axes orthogonal to the optical axis of the AROE). In one embodiment the alignment of one or more angular bins may be aligned with physical structures or objects in the environment by using a physical or electronic adjustment mechanism and/or rotary mount. In another embodiment, the range of angular bins in one or more light output planes may be adjusted to expand or contract (such as by positioning the AROE closer to or further away from the spatial array light source along a z axis) or be off-center or centered (such as by translating the AROE relative to the spatial array light source along an x or y axis orthogonal to the z axis) to the environment, portions of the environment, or relative to objects in the environment by one or more adjustment mechanisms. For example, in an AVLED test setup mode, every other angular bin could be illuminated along with every outer angular bin to visually see the corresponding spatial zones illuminated (and their angular width) in a bordered checkerboard pattern and range of angular bins such that adjustments could be made for alignment or registration purposes. In one embodiment, the AVLED comprises two orthogonally linear optics or optical elements with orthogonally linear portions such that the angular width and/or the corresponding spatial zones in two orthogonal light output planes may be modified independently to accommodate particular shapes of the environment. For example, an AVLED setup with symmetrical light output in two orthogonal light output planes at 45 degree angles to opposing walls of a square room may be rotated to align the light output planes to be perpendicular to opposite walls of the square room. In the case of a rectangular-shaped room, after aligning the light output planes to be perpendicular to opposite walls, one of the linear AROEs of may be adjusted (in the z-direction for example) to increase the light flux output at the higher angles (such as by increasing or magnifying the range of angles) in the light output plane parallel to the length direction longer than the width direction of the rectangular room to provide more light flux for the distant walls/floors. In one embodiment the adjustment may be performed in real-time such that the spatial zones for each angular bin or collection of angular bins are visible.

One or More Light Sources and One or More Scanning Elements

In one embodiment, an AVLED comprises one or more light sources emitting light to one or more scanning elements such that the light is re-directed into a plurality of angular bins as the scanning element moves. In one embodiment, the light source comprises one or more LEDs or lasers and the scanner comprises one or more biaxial microelectromechanical system (MEMS) scanner or a nanoelectromechanical system (NEMS) scanner. For example, in one embodiment, an AVLED comprises a red, green, and blue directly modulated laser diodes with their beams expanded (and optionally collimated) to illuminate a digital micromirror device. In another embodiment, an AVLED comprises an LED-based or laser-based projector (such as a picoprojector). In another embodiment, an AVLED comprises one or more scanning elements selected from the group: rotating mirror scanner, resonant galvanometer scanner, servo-controlled galvanometer scanner, raster scanner, vector scanner, piezoelectric actuator scanner, magnetostrictive actuator scanner, microscanner, nanoscanner, rotating prism scanner (such as two rotating Risley prisms), acousto-optic deflector, electro-optic deflector, scanning fiber, MEMS scanner, NEMS scanner, biaxial MEMS scanner, biaxial NEMS scanner, holographic laser projection, diffractive laser projection, two electrostatic MEMS scanners, phased array scanning, rotating optical element, rotating prism sheet, optofluidic laser scanner, rotatable liquid prism, transparent polygonal scanner, two axis gimballed scanner, GRISM scanner (two rotating prisms and a diffractive element), liquid crystal phase array, polarization grating, variable blaze gratings, lattice-shifted photonic crystal waveguide, variable period liquid crystal scanner, variable index of refraction liquid crystal scanner, birefringent prism scanner, Wollaston prism scanner, piezoelectric film scanner, bulk piezoelectric sheet scanner, a diffractive optical element or grating (such as a polarization grating) on a electrostatic mirror or MEMS, electroholography scanner, electrically controlled diffraction grating, and a combination of 2 or more of the aforementioned scanners including stacks of scanners. In one embodiment, the AVLED comprises other elements commonly used with different scanning or projection technologies (including picoprojection technology) such as one or more beamsplitters, beam combiners, dichroic filters, elements that reduce speckle (such as microlens arrays, birefringent materials), phosphor or luminophore components, color wheels, optical components including lenses, F-Theta lenses, and cooling elements or systems.

In one embodiment, the AVLED comprises an array of light sources with a reduced angular width, which could be in a rectangular array, circular array, or other arrangement such as a cross or star and the AVLED comprises a collection of prisms, gratings, Fresnel lenses, hybrid Fresnel lenses, or other optical elements arranged on a disc or drum (such as disclosed in U.S. Pat. No. 5,806,969 or US Patent Application Publication No. US20100254142, the entire contents of which is incorporated by reference herein) that may be rotated such that the light from the spatial array of light sources is synchronized for the prisms. In one embodiment, the optical elements of a rotating disc vary in concentric circles, such as a cylindrical lenses with different radii oriented in a radial direction wherein as the disc rotates, the light from the light sources is incident on varying parts of cylindrical lenses of different radii such that optical axis of the light is directed into different directions.

In one embodiment, the scanner comprises an AROE in combination with a scanning element or technology. For example, in one embodiment, a biaxial MEMS scanner comprises a metalens (such as a metasurface comprising a subwavelength nanostructures, including arrays of titanium dioxide nanofins for broadband lens performance, for example), polarization grating, diffractive optical element, grating element, film or coating on the surface such that the scanning angle is increased over the reflection angle by a single pass through a reflective diffractive or holographic element or two passes through a transmissive diffractive or holographic element. In embodiment, the light output from a spatial array of light sources (or a subset of a spatial array of light sources) is focused onto (or converged toward) a scanning surface (such as a biaxial MEMs scanner mirror) by using optics (such as relay optics or focusing optics) such that the reflection from the scanner redirects the light output from substantially the entire spatial array of light sources (or subset of the array) which may be subsequently magnified or enlarged to increase the angles of the reflected light.

In one embodiment, an AVLED comprises a plurality of light sources and a scanner wherein the intensity of the light in a particular angular bin is controlled by modulation of the light flux output of one or more light sources and optionally the scanning properties of the scanner. For example, in one embodiment four white micro-LEDs in a micro-LED array spatial array light source emit reduced angular width light that is directed into a single angular bin by a scanner and each light source may comprise pulse-width modulation or intensity modulation and the scanner speed or diffraction efficiency (in scanning embodiments where it may be modulated) may also be modulated or changed to adjust the light output or perceived light output in one more angular bins of the AVLED.

In one embodiment, an AVLED comprises a diffraction (or holographic) grating and light sources with different peak wavelengths (such as red, green, and blue, for example) spatially offset from each other emitting light toward the grating such that the peak wavelengths from two or more of the light sources are diffracted into substantially the same angle such as parallel to the surface normal of the grating, for example. In embodiments disclosed herein where a spatial array light source is described, one or more light sources and one or more scanning elements may be used to provide angular bins of illumination and/or irradiation for those embodiments instead of a spatial array light source.

Scanner or AROE Also Directs Light to Sensor

In one embodiment, an AVLED comprises one or more light sources and an imager (imaging sensor) or photosensor wherein the one or more light sources have one or more optical paths for the light to travel from the one or more light sources into their respective angular bin, and the light reaching the imager (or photosensor) from the environment shares at least a portion of the one or more optical paths. In one embodiment, by sharing a portion of the same optical path, the association of the light output with the measured light input has a higher correlation due to a reduced or absent axial correction factor. In this embodiment, for example, the light source and imager may share a portion of the same optics (such as an AROE or scanner, for example). In one embodiment, the AVLED comprises a beamsplitter (which could be based on polarization, wavelength, or a partially reflective coating) that redirects incident light from the environment to the imager and/or redirects light from the one or more light sources toward and AROE, scanner, or into one or more angular bins. In one embodiment, the AVLED comprises a light source array wherein the light source array can be electrically reconfigured to measure ambient light incident from one or more angular bins. For example, in one embodiment, the spatial array light source comprises an array of micro-LEDs wherein at times between providing light output, a plurality of the micro-LEDs of the micro-LED array can be used to measure a current and/or voltage that corresponds to a relative intensity of ambient light from reflected from the corresponding spatial zone or region of the environment illuminated and/or irradiated by the corresponding angular bin. Similarly, in one embodiment, an AVLED comprises one or more light emitting diodes emitting light to a scanner that directs the light into angular bins for illumination and/or irradiation. In this embodiment, between times where the light emitting diodes are emitting light, the AVLED can be configured to measure the voltage and/or current from the light emitting diodes to measure a relative intensity in angular bins of ambient light scanned in reverse to the AVLED light output. In one embodiment, an AVLED comprises at least one light source and an imager or light sensor wherein the scanner redirects the optical axis of the light source into one or more angular bins of light exiting the AVLED and the scanner redirects ambient light to the imager or light sensor. In one embodiment, the redirection of the light source optical axis and redirection of ambient light onto the imager or light sensor occurs simultaneously (such as in the case of one or more light sources positioned adjacent, near, or at a first deviation angle to the imager or light sensor) or sequentially.

In one embodiment, the voltage and/or current from one or more light emitting diodes in an AVLED due to ambient illumination and/or irradiation are measured in a measurement mode that occurs at least once every time period selected from the group: 0.001, 0.005, 0.01, 0.012, 0.015, 0.0166, 0.02, 0.05, 0.1, 0.2, 0.5, 0.8, 0.9, 1, 2, 5, 8, 10, 12, 15, 20, 25, 40, 50, 60, 120, and 200 seconds. In one embodiment, the time period during which the light is measured is less than one selected from the group: 0.001, 0.005, 0.01, 0.012, 0.015, 0.0166, 0.02, 0.05, 0.1, 0.2, 0.5, 0.8, 0.9, 1, 2, 5, 8, 10, 12, 15, 20, 25, 40, 50, 60, 120, and 200 seconds. For example, in one embodiment, the AVLED comprises a spatial array light source comprising an AROE and an array of micro-LEDs that are configured to emit light at a pulse-width modulated frequency greater than 60 hertz wherein one or more cycles of the modulation, instead of outputting light, a measurement of the voltage and/or current from all or a plurality of the micro-LEDs is measured or evaluated. In this embodiment, the ambient light reaching the AVLED within the different angular bins can be evaluated (such as the case when sunlight or other non-AVLED changes the illumination and/or irradiation needs from the AVLED such that the AVLED does not need to emit light into those angular bins (or can emit less light into those angular bins) due to the increase in ambient light to save energy and/or prevent over-illumination and/or irradiation or bright spots in the environment. In one embodiment, the AVLED comprises one or more temperature sensors to measure and/or predict the junction temperature of the one or more light sources or to take into account effects of the temperature of the one or more light sources on the measured voltage and/or current. In another embodiment, the AVLED monitors the voltage and/or current from one or more light sources such as light emitting diodes and compares the voltage and/or current for the light source with a reference voltage and/or current. The reference voltage and/or current may be the voltage and/or current when all or a predetermined portion of the other light sources are emitting light at a predetermined intensity level into an environment where there are substantially no other light sources emitting light at the same time (such as a dark room). In this example, the increase in current and/or voltage can account for an increase in light within the corresponding angular bin for the light source over the reference condition. In another embodiment, the voltage and/or current of the light source is measured and monitored while the light source is emitting light to look for changes that may be due to a change in ambient light reaching the light source (taking into account voltage or current changes due to a monitored temperature variation). For example, in one embodiment, a system comprises a plurality of AVLEDs, each comprising a micro-LED array spatial array light source and an AROE wherein the voltage and/or current of a first micro-LED of a first AVLED is measured and monitored while the light source is emitting light. In this example, a particular region (such as spot on the floor) in the environment is illuminated and/or irradiated by a first angular bin from the first AVLED light mounted on or in the ceiling and a second angular bin from a second AVLED mounted on or in the ceiling three meters away from the first AVLED. In this embodiment, when an individual walks into the room below and between the first and second AVLED and between the particular region and the second AVLED, a shadow or reduced intensity appears on the particular region due to the individual blocking light from the second AVLED. In this embodiment, the first AVLED may measure a sudden reduction in voltage and/or current from the first LED which receives light from the first angular bin. In this embodiment, the first AVLED may increase the intensity or luminous flux output from the first LED to illuminate the shadow, providing a more uniform luminous shadow free or reduced-shadow visibility environment. In one embodiment, a third AVLED mounted on or in the ceiling three meters from the first and second AVLEDs increases the luminous flux output in a third angular bin that illuminates the particular spot. In one embodiment, the AVLED comprises a plurality of light sources, wherein when one or more of the plurality of light sources emits light that light exits the AVLED in a first angular bin, and when the one or more light sources is emitting light or not emitting light (optionally with remaining light sources of the plurality of light sources emitting light into other angular bins) one or more components of the AVLED measures the voltage of the one or more light sources to an accuracy and/or resolution greater than 0.5, 0.3, 0.1, 0.05, 0.01, 0.005, 0.001, 0.0005, and 0.0001 volts and/or measures the current through the one or more light sources to an accuracy and/or resolution greater than one selected from the group: 0.5, 0.3, 0.1, 0.05, 0.01, 0.005, 0.001, 0.0005, 0.0001, 0.00005, and 0.00001 amps. In one embodiment, an AVLED comprises a micro-LED array spatial array light source comprising a plurality of red, green, and blue micro-LEDs emitting light which exits the AVLED in a first angular bin, wherein at a first time period, the AVLED or one or more components of the AVLED measure the voltage and/or current of the red, green, and blue micro-LEDs to determine a relative intensity of the ambient light in each of the corresponding red, green, and blue wavelength spectrums associated with the micro-LEDs received by the AVLED in the first angular bin (such as due to light reflecting from a colored object, for example). In one embodiment, the AVLED comprises an AROE or scanner which redirects the optical axis of one or more light sources emitting light and the AROE or the scanner also redirects ambient light onto one or more light sensors (or the light sources themselves electrically configured to switch to a light receiving measurement mode) which may be used as occupancy and/or vacancy sensors. In this embodiment, at least a portion of the optical path of one or more light sources is shared with the occupancy and/or vacancy sensors such that an additional optic for the occupancy and/or vacancy sensor is not needed. In one embodiment, the AROE comprises an optical element with a light transmittance for wavelengths between 8 and 14 micrometers greater than one selected from the group: 35%, 40%, 45%, 50%, 55%, 60%, 65%, and 70%. In one embodiment the AROE is a refractive and/or total internal reflection based optical element formed from a material comprising at least 80% polyethylene or polypropylene.

Light Source Also Provides Depth Information

In one embodiment, an AVLED comprises one or more light sources and a scanner wherein at least one of the light sources provides 3D information based on LIDAR or other light measurement technique based on reflected light. In one embodiment, the AVLED comprises a visible light laser providing visible illumination of an environment that also provides coherent or incoherent illumination of the environment (for measuring amplitude changes in the reflected light or for measuring Doppler shifts or changes in the phase of the reflected light from the environment, respectively) to generate 3-dimensional data of the environment in combination with one or more sensors or detectors. In another embodiment, an AVLED comprises one or more light sources (such as red, green and blue lasers) providing visible illumination via a first scanner and an infrared laser using the same scanner to illuminate and/or irradiate the room, wherein the infrared laser is part of a LIDAR system that provides depth and/or 3D information for the environment. In this embodiment, by using the same scanner, only one scanner is required for illumination and measurement and the angular bins of the light output from the AVLED illuminating the environment for individuals and the 3D scanning depth information can be readily synchronized and/or aligned to each other. In one embodiment, the AVLED or system comprising an AVLED comprises a hyperspectral terahertz imager to determine structure or 3D depth features of objects and/or the environment. In one embodiment, the AVLED or system comprising an AVLED comprises one or more imagers and one or more structured light generators to perform "Ghost imaging" of the environment to determine structure or 3D depth features of objects and/or the environment.

Sensor

In one embodiment, an AVLED, an illumination and/or irradiation system comprising one or more AVLEDs, and/or a device (such as a smartphone, automobile, vehicle, craft, portable device, tablet, computer, wall box controller, or controller) in communication with one or more AVLEDs or system comprising one or more AVLEDs comprises one or more sensors selected from the group: antenna, a Global Positioning System (GPS) sensor (which may include an antenna tuned to the frequencies transmitted by the satellites, receiver-processors, and a clock), accelerometer (such as a 3D accelerometer), gyroscope (such as a 3D gyroscope), magnetometer, touch screen, button or sensor, temperature sensor, humidity sensor, proximity sensor, pressure sensor, blood pressure sensor, heart rate monitor, ECG monitor, body temperature, blood oxygen sensor, body fat percentage sensor, stress level sensor, respiration sensor, biometric sensor (such as a fingerprint sensor or iris sensor), facial recognition sensor, eye tracking sensor, security identification sensor, altimeter, magnetometer (including 3D magnetometer), digital compass, photodiode, vibration sensor, impact sensor, free-fall sensor, gravity sensor, motion sensor (including 9 axis motion sensor with 3 axis accelerometer, gyroscope, and compass), IMU or inertial measurement unit, tilt sensor, gesture recognition sensor, eye-tracking sensor, gaze tracking sensor, radiation sensor, electromagnetic radiation sensor, X-ray radiation sensor, light sensor (such as a visible light sensor, infra-red light sensor, ultraviolet light sensor, photopic light sensor, red light sensor, blue light sensor, and green light sensor), microwave radiation sensor, back illuminated sensor (also known as a backside illumination (BSI or BI) sensor), electric field sensor, inertia sensor, haptic sensor, capacitance sensor, resistance sensor, biosensor, barometer, barometric pressure sensor, radio transceiver, Wi-Fi transceiver, Bluetooth™ transceiver, cellular phone communications sensor, GSM/TDMA/CDMA transceiver, near field communication (NFC) receiver or transceiver, camera, CCD sensor, CMOS sensor, microphone, voice recognition sensor, voice identification sensor, gas sensor, electrochemical gas sensor (such as one calibrated for carbon monoxide), gas sensor for oxidizing gases, gas sensor for reducing gases, breath sensor (such as one detecting the presence of alcohol), glucose sensor, environmental sensor, sensors that can detect or provide information related to the blood alcohol level of an individual, pH sensor, sensor that monitor pulse, heartbeat, or body temperature of an individual in the environment receiving light from the AVLED or operating a vehicle, craft, and/or portable device. In one embodiment, one or more AVLEDs or system comprising one or more AVLEDs processing information received from the one or more aforementioned sensors and changes the light flux output in one or more angular bins and/or the color of the light output in one or more angular bins of the one or more AVLEDs. In another embodiment, the portable device includes eyewear, headwear, head-mounted display, wrist wear (such as a watch, bracelet, or band), or other wearable device that may comprise one or more of the aforementioned sensors and/or imagers.

The sensor providing information to one or more AVLEDs or system comprising one or more AVLEDs may be a component of the AVLED, portable device, the vehicle, an aftermarket or accessory item of the AVLED, vehicle, or portable device, such as a sensor on a wireless phone (such as a smart phone), a sensor on a bracelet with a Bluetooth™ transceiver, a sensor built into the steering wheel of a vehicle (such as pulse monitor, for example) or as an aftermarket add-on to the vehicle or vehicle steering wheel, for example.

Accelerometer Sensor

In one embodiment, one or more of the AVLEDs, portable devices (such as a portable device comprising an AVLED), and/or vehicles (such as a vehicle comprising one or more AVLEDs) comprises one or more accelerometers. In one embodiment, the one or more accelerometers are selected from the group: micro electro-mechanical system (MEMS type accelerometer), single axis accelerometer, biaxial accelerometer, tri-axial accelerometer, 6 axis accelerometer, multi-axis accelerometer, piezoelectric accelerometer, piezoresistive accelerometer, capacitive accelerometer, gravimeter (or gravitometer), bulk micromachined capacitive accelerometer, bulk micromachined piezoelectric resistive accelerometer, capacitive spring mass base accelerometer, DC response accelerometer, electromechanical servo (Servo Force Balance) accelerometer, high gravity accelerometer, high temperature accelerometer, laser accelerometer, low frequency accelerometer, magnetic induction accelerometer, modally tuned impact hammers accelerometer, null-balance accelerometer, optical accelerometer, pendulous integrating gyroscopic accelerometer (PIGA), resonance accelerometer, seat pad accelerometers, shear mode accelerometer, strain gauge, surface acoustic wave (SAW) accelerometer, surface micro-machined capacitive accelerometer, thermal (sub-micrometer CMOS process) accelerometer, IMU (inertial measurement unit), and vacuum diode with flexible anode accelerometer. In one embodiment, the AVLED, portable device, and/or vehicle comprise two or more different types of accelerometers. Accelerometers are sensitive to the local gravitational field and linear acceleration and can be recalibrated for linear acceleration readings and orientation using data from one or more portable device sensors, one or more vehicle sensors, and/or other external data or input, for example.

Positioning System

In one embodiment, a system for illumination and/or irradiation comprises one or more AVLEDs with one or more first sensors (or one or more AVLEDs in direct communication with or operatively in communication with (such as using a network) the portable device and/or vehicle which comprises one or more first sensors) or components that can provide information for determining a global position or location (such as longitudinal and latitudinal coordinates), relative position or location (such as determining that the location of the portable device is near a door of a room or on a table, in an individual's left hand, in a vehicle, or within a pocket or purse, for example), or local position or location (on a freeway, in a vehicle, on a train). In one embodiment, the AVLED, portable device, and/or vehicle comprise one or more Global Positioning System receivers that provide position information. In another embodiment, the AVLED, portable device, and/or vehicle comprises one or more radio transceivers wherein triangulation or time signal delay techniques may be used to determine location information. Example radio transceivers that can be used to determine a position or location include radio transceivers operatively configured to transmit and/or receive radio signal in the form of one or more channel access schemes (such as Time Division Multiple Access (TDMA), Code division multiple access (CDMA), Frequency Division Multiple Access (FDMA), Global System for Mobile Communications (GSM), Long Term Evolution (LTE), packet mode multiple-access, Spread Spectrum Multiple Access (SSMA). In another embodiment, one or more radio transceivers, such as one operatively configured for Bluetooth™ or an IEEE 802.11 protocol (such as Wi-Fi), is used to triangulate or otherwise provide information used to determine the global, local, or relative position or location information of the AVLED, portable device, and/or vehicle. Other techniques which may be utilized to determine the location or position of the AVLED, portable device, and/or vehicle include computing its location by cell identification or signal strengths of the home and neighboring cells, using Bluetooth™ signal strength, barometric pressure sensing, video capture analysis, audio sensing, sensor pattern matching, video pattern matching, and thermal sensing.

Gyroscope

In one embodiment, the AVLED, portable device, and/or vehicle comprise one or more sensors providing orientation information and/or angular momentum information. In one embodiment, the portable device and/or vehicle comprise one or more gyroscopes selected from the group: MEMS gyroscope, gyrostat, fiber optic gyroscope, vibrating structure gyroscope, IMU (inertial measurement unit) and dynamically tuned gyroscope.

Compass

In one embodiment, the AVLED, portable device, and/or vehicle comprises an instrument that provides direction information in a frame of reference that is stationary relative to the surface of the earth. In one embodiment, the portable device and/or vehicle comprises a compass selected from the group: magnetic compass, digital compass, solid state compass, magnetometer-based compass, magnetic field sensor-based compass, gyrocompass, GPS based compass, Hall effect-based compass, and Lorentz force-based compass.

Pulse or Heartrate Monitor

In one embodiment, the AVLED, portable device, and/or vehicle, or an accessory or add-on in communication with the AVLED, portable device, and/or vehicle, comprises a pulse monitor or heart rate monitor. The pulse or heart rate information may be analyzed directly, or in combination with other information such as environmental information or information derived from one or more images taken by a camera, to help determine level of health, or monitor a level of health, such as monitoring if an elderly person's heartrate is below a first threshold.

Multi-Sensor Hardware Component

In one embodiment, the AVLED, portable device, vehicle, and/or system comprising an AVLED comprises a multi-sensor hardware component comprising two or more sensors. In one embodiment, the two or more sensors measure two or more fundamentally different properties, such as a multi-sensor hardware component comprising an accelerometer and gyroscope to measure acceleration and orientation simultaneously or sequentially. In another embodiment, the two or more sensors measure properties at different times, at different portable device locations or positions, at different portable device orientations, or along different axes or directions. For example, in one embodiment, the AVLED, portable device, and/or vehicle comprise a multi-sensor hardware component comprising: multiple gyroscopes; multiple accelerometers; one or more accelerometers and one or more gyroscopes; one or more gyroscopes and a digital compass; or one or more gyroscopes, one or more accelerometers, and a compass. In another embodiment, one or more sensors, processors, gyroscopes, digital compasses, or global positioning systems are combined into a single hardware component (such as an integrated component that can be placed on a rigid or flexible circuit board). In one embodiment, the speed of re-calibration of the AVLED, portable device, and/or vehicle movement is increased by integrating the one or more sensors (and optionally a processor) into a single multi-sensor hardware component. In one embodiment a sensor is combined with a processor in a single hardware component. In one embodiment, a portable device comprises a multi-sensor hardware component comprising a digital compass, an accelerometer, and a gyroscope.

Light Sensor (Photosensor)

In one embodiment, a system comprising one or more AVLEDs, an AVLED, a portable device, and/or a vehicle comprises a light sensor (also referred to as a photosensor) and/or spectral light sensor. In one embodiment, the light sensor is an ambient light sensor collecting light from a wide range of angles. In another embodiment, the light sensor is an angular bin light sensor such that light (or spectral light) from only one or more angular bins (or one or more angular bins at a time in the case of an AVLED with a scanner) is measured by the light sensor. In one embodiment, the ambient light sensor comprises a silicon based photosensor and one or more selected from the group: IR (infrared) filter that filters out infrared light, a UV filter that filters out UV light, and a photopic correction filter. In one embodiment, the light sensor is a multi-channel light sensor. In one embodiment, the light sensor comprises a plurality of color sensors (such as red-, green-, and blue-filtered photodiodes) and optionally a clear channel and/or IR blocking filter. Other sensor types and associated technology components and system design using sensors is known in the field of lighting and examples are disclosed, for example, in the Handbook of Advanced Lighting Technology, Editors Robert Karlicek, Ching-Cherng Sun, Georges Zissis, Ruiqing Ma, Springer International Publishing, Switzerland, 2017, Volume I, Part IV, "Intelligent Lighting System Integration," sections titled "Dimming," "Conventional IR and Ultrasonic Sensor Systems," "Ambient and Spectral Light Sensors," and "Ambient Light Sensor Integration," pp. 443-533, and pp. 607-634, the pages are incorporated by reference herein.

Camera or Imaging Sensor

In one embodiment, a system comprising one or more AVLEDs, an AVLED, a portable device, and/or a vehicle comprises one or more imaging sensors (such as a CCD imager or CMOS imager). As used herein, one or more cameras, imaging sensors, photosensors, or pixels (or detectors) of one or more of the aforementioned may generate images or sensor information that correspond to the light (or light property) detected from an environment. In embodiments discussed herein, the light detected by the light sensor, camera, imager, imaging sensor, one or more photosensors, etc. may not necessarily create a clear image (such as when the detector is not positioned at the focal plane and an 'image" is blurry), but may include information corresponding to light from an angular range or spatial zone. As such, in embodiments referencing an imager or image, the "image" or information received from an "imager" may correspond to a "spatial image" including spatial information such as light from a spatial zone, or an "angular image" that may include information related to the light received from an angular bin and may not appear to be clear image or in focus. In one embodiment, the imaging sensor is calibrated to provide substantially the luminance, irradiance, estimated or calculated illuminance information, estimated or calculated irradiance information, and/or color or spectral information of the objects, individuals, components, room contents, or environment contents. In another embodiment, the illuminance and/or irradiance value of the object, individual, components, room contents, or environmental contents is estimated using additional information such as an initial illuminance and/or irradiance or color value calibration point measured by another device. In one embodiment, the system comprising one or more AVLEDs comprises one or more imagers or cameras positioned (or mounted) remote from the AVLED and/or any light emitting device for illumination and/or irradiation of the environment. In one embodiment, a system comprising a first AVLED with at least one imaging sensor and a second imaging sensor not in the first AVLED (such as on a second AVLED or on a portable device such as a cellular phone) wherein the first and second imaging sensors are calibrated to provide substantially the luminance, irradiance, estimated or calculated luminance or illuminance, estimated or calculated radiance or irradiance, and/or color or spectral information of the objects or contents of the environment (such as a desktop work plane). In this embodiment, the luminance (or illuminance, irradiance, or radiance) values from the two imagers can be used to increase the accuracy of prediction of the illuminance, irradiance or color values of light on the object or contents of the environment being evaluated. In one embodiment, the imager is a color CCD or CMOS imager with pixels measuring red, green, and blue light. In one embodiment, the pixels below a green color filter of an imager with red, green and blue color filters, are used to approximate the luminance and/or illuminance, irradiance, or radiance information. In one embodiment, an AVLED or system comprising an AVLED comprises a monochrome CCD, CMOS, or other imager and a photopic correction filter (and optionally a UV and/or IR filter) to measure the relative intensity spatially (or angularly) and calculate the luminance and/or illuminance. In one embodiment, an AVLED comprises an imager or sensor with one (such as a single photosensor) or more (such as an array of photosensors, silicon photodiodes, CCD, or CMOS imagers, for example) photodetectors and one or a plurality of light filters transmitting different light spectrums. In one embodiment, the light filters transmitting different light spectrums comprises red, green, and blue color filters, such as used with a color camera. In another embodiment, the light filters transmitting different light spectrums comprises tristimulus color filters whose transmittance spectra are similar to the CIE color matching functions (such as red (two lobes X/red and X/blue), green (Y), and blue (Z) absorptive filters), such as in a tristimulus colorimeter. In one embodiment, the AVLED comprises a tristimulus colorimeter and measures the color and/or luminance of one or more surfaces, spatial zones, or angular bins of the AVLED. In one embodiment, one or more of the plurality of light filters transmits infrared light more than visible light, such as an infrared bandpass filter used with one or more photosensors to detect heat or fire (such as an infrared imager) for a safety or security mode or detect, measure, or estimate temperature in a selective warming mode. In one embodiment, one or more light properties evaluated by the imager or one or more photosensors on an AVLED are calibrated relative to one or more light sources of the AVLED. In this embodiment, for example, a more accurate measurement of the reflective properties (such as spectral reflectance) of one or more surfaces in the environment may be obtained, particularly if the calibration is configured for measuring the reflective properties using two or more light sources emitting light from the AVLED with different spectral properties (such as red, green, and/or blue LEDs). In one embodiment, the spectral properties of one or more spectral filters for one or more sensors, or each photosensor in an array of photosensors (such as an imager for a camera) is evaluated at the factory such that the accuracy of the device is increased due to variations in color filter properties in manufacturing, for example. In one embodiment, an AVLED comprises a color CCD imager or color CMOS imager, and a color filter array with red, green, and blue color filters, wherein the AVLED (or system comprising the AVLED) estimates the color of the light from one or more angular bins, spatial zones, or surfaces from information derived from the color CCD imager or color CMOS imager. In one embodiment, the AVLED comprises an imager with a filter array positioned between the imager and the environment wherein the filter array comprises visible light filters (such as red, green, blue, or one or more tristimulus filters, for example) and one or more filters for non-visible light (such as bandpass filters that have an average transmittance above 80% for light with wavelengths between 800 nm and 1200 nm and an average transmittance less than 20% for light between 400 nm and 700 nm, for example).

In one embodiment, an AVLED comprises one or more photosensors and a diffraction grating, holographic optical element, prism, or other optical element that redirects light with different wavelengths into different angular and/or spatial positions such that the one or more photosensors measures the relative intensities for different wavelengths of light from one or more angular bins corresponding to one or more spatial zones or surfaces in the environment. In this embodiment, the one or more photosensors and/or the optical element may share a portion of the same optical path with one or more light sources of the AVLED (such as a scanning laser light source, or AROE also directing light to the photosensor or imager).

In one embodiment, an illumination or irradiation system comprises two or more AVLEDs, each comprising an imaging sensor (optionally calibrated for luminance or radiance) and portable device (such as a cellphone or tablet computer) comprising an imaging sensor (which may optionally calibrated for luminance or radiance of objects imaged or total illuminance or total irradiance taking into account lenses or AROE used) configured to receive light from the two or more AVLEDs. For example, in one embodiment, a cellular phone is positioned on a place of interest with the camera imaging sensor oriented upwards toward the ceiling with the two or more AVLEDs in the field of view (or optionally in the field of view when a wide-angle lens accessory is attached to the cellular phone camera imaging sensor). In this example, with all of the AVLEDs and optionally other sources of light turned off or blocked, a first AVLED could cycle light output from each angular bin (optionally with different light flux output from a single light source, different flux light output from different light sources providing light to the angular bins, and/or light sources of different colors such as red, green and blue outputting different light flux light into the same angular bin) and the imaging sensor (or other photosensor such as one used to adjust the display luminance) on the cellular phone or portable device could measure one or more selected from the group: substantially the absolute illuminance or irradiance reaching the cellphone imaging sensor, substantially the absolute color or spectral properties of the light reaching the cellphone imaging sensor, substantially the relative illuminance or irradiance reaching the cellphone imaging sensor, substantially the relative color or spectral properties of the light reaching the cellphone sensor, and the light from which angular bins reaches the imager directly or indirectly using the cellphone camera imaging sensor which takes into account indirect light received from the AVLED such as light reflecting from the ceiling or walls. In this example, the measurements by the cellphone sensor could be repeated for additional AVLEDs such that one or more optimum angular bins from one or more optimum AVLEDs could be used to illuminate and/or irradiate the place of interest. In one embodiment, identifying the angular bin from the AVLED that directly illuminates the imager on the portable device (such as smartphone) provides a location along a direction for the portable device to aid in determining the spatial location and/or orientation of the portable device and/or the imager wherein angular cycling a plurality of AVLEDs for a specific location of a portable device with an imager enables triangulation and/or calculation of the relative or absolute location of the portable device and/or the imager (optionally in combination with other spatial three-dimensional information), which may optionally increase the accuracy of a calculation and/or estimation of one or more light properties from one or more images from the imager.

In one embodiment, the optimum angular bins or AVLEDs could be determined based on rules for different modes such as using the most efficient AVLED and angular bin; using the AVLED and angular bin that avoids potential glare at the place of interest or for common or determined paths of travel and/or other places of interest in the room, space, or environment; using a preferential style illumination determined by the individual (such as a particular color or white color temperature or a user chosen guideline that 50% of the illuminance must be indirect illuminance such as from ceilings or walls); using the AVLED and angular bin for illuminating the place of interest that minimizes the total number of angular bins and/or AVLEDs needed to illuminate the space or room, or using an optimum angular bin and/or optimum AVLED based on the operating mode for the AVLED or system comprising the AVLED such as disclosed herein. In one embodiment, the imager images an environment with a wide angle of view, such as an imager with a wide-angle lens, an ultra-wide-angle lens, or a fisheye lens, an AROE, or other optical lens or optical element as discussed elsewhere herein (such as in the context of an AROE).

In one embodiment, an AVLED or system comprising an AVLED comprises an imager or light sensor array receiving light from an environment wherein adjacent pixels on the imager or light sensor array do not correspond to adjacent parts of the environment (adjacent pixels correspond to spatial zones separated by one or more intervening spatial zones). In this embodiment, the imager or light sensor array does not image the environment in a constant or continuous spatial relationship. In this embodiment, the imager or light sensor array images the environment in a spatially separated relationship such that one or more first pixels corresponding to a first region of the environment adjacent a second region of the environment are adjacent one or more pixels corresponding to a third region of the environment separated from the first region or do not correspond to a region of the environment. In one embodiment, the imager or light sensor array is a small aperture imager, light field sensor, light field imager (plenoptic imager), a thin monolithic camera array, snapshot light field camera using an array of micro-optical elements, multi-device light field system, sequential light field capture system, programmable aperture sequential light field capture system, or light field camera wherein angular information from incident light is recorded in addition to the intensity can be determined from the imager or light sensor array. In one embodiment, a first plurality of imager pixels of an imager or light sensors in an array of light sensors receives light from substantially only one optical element, lens, or AROE wherein the plurality of imager pixels or light sensors indicate or provide angular information of the incident light. In one embodiment, the first plurality is greater than 1, 2, 4, 6, 8, 10, 15, 20, 30, 40, 60, 80, 100, and 150 pixels or light sensors. In one embodiment, the AVLED comprises an array of optical elements or AROEs which each direct incident light to different imager pixels or light sensors in a light sensor array. In one embodiment, the AVLED comprises a light field imager, such as a monolithic camera array wherein the light received on the imager is processed to provide angular, spatial, and/or range image or depth map/depth information.

In one embodiment, an AVLED comprises a polarized light imager that can record the intensity of polarized light from a first range of polarization angles, dynamically from more than one range of polarization angles, s-polarized light, p-polarized light, elliptically polarized light, or circularly polarized light. In one embodiment, the imager comprises one or more active or passive polarization filters, wherein the captured image information can be used to help determine if a surface is a specularly reflecting surface and/or a diffusely reflecting surface, or a variation between specularly reflecting and diffuse reflecting. In one embodiment, the imager detects light from a first range of s-polarized light and calculates the location of a glossy or specularly reflective surface in an environment such that glare into an individual's eyes can be avoided when calculating which of one or more light sources, from one or more angular bins, from one or more AVLEDs can be used to illuminate one or more regions of the environment (spatial zones) such as a glossy surface, specularly reflecting surface, or a surface with a specularly reflective component with a relative intensity greater than 1.5 times the average intensity of the neighboring angular ranges greater than 5 degrees from the angle of peak reflective intensity.

In one embodiment, an AVLED comprises a spatial array light source, such as a micro-LED array, and an AROE wherein light detecting pixels or light sensors are positioned between two or more light sources. In this embodiment, by placing the light source next to (or next to and behind or next to and above) the light receiving pixel or light sensor in one or more directions parallel to a plane comprising the array of light sources, they can substantially share the same angular bin. For example, in one embodiment, the AVLED comprises a micro-LED array with light detecting pixels or sensors positioned between substantially all (or a first group) of the micro-LEDs in a direction parallel the array of micro-LEDs. In this embodiment, the light emitted from the micro-LEDs and the light received by the light detecting pixel substantially share the same optical axis such that the light emitted from a first micro-LED propagates through an AROE, such as an ultra-wide angle lens, into a first angular bin and light from the environment received by the AVLED or AROE in the first angular bin (or corresponding to the first angular bin) propagates through the AROE to a first CCD pixel, CMOS pixel, light sensor adjacent to the first micro-LED.

In one embodiment, an AVLED comprises a spatial array of the same type of electrical components (such as a diode that can emit light when supplied with electrical current at a specific voltage or receive light and generate current at a voltage) wherein a first set of one or more of the components electrically configured to receive and/or measure incident light are positioned in the array between two or more components electrically configured to emit light. For example, in one embodiment, an AVLED comprises a micro-LED (or other light source) spatial array of light sources electrically configured such that at least one or more of the group: 5%, 10%, 20%, 30%, 40%, 50%, and 60% of the micro-LEDs (or other light sources) in the micro-LED array are electrically configured to receive light and the voltage and current can be used to indicate the relative intensity of the light reaching the micro-LED over a first wavelength range. In one embodiment, an AVLED comprises a substantially checkerboard-like array of alternating light sources and light sensors. In one embodiment, an AVLED comprises a plurality of light emitters and light sensors on the same substrate (optionally of the same component and optionally arranged in a checkerboard-like pattern) and at least one of the light emitters and/or the light sensors comprise a phosphor or luminophore. In one embodiment, an AVLED comprises a plurality of light sources and a plurality of light sensors of substantially the same component (optionally on the same substrate) wherein a first set of the plurality of light sources emit light into a first angular bin of the AVLED and a second set of the plurality of light sensors are positioned adjacent, near to, surrounding, or on opposite sides of the first set, and receive light from the environment from substantially the first angular bin. For example, in one embodiment, an AVLED comprises a micro-LED spatial array of light sources and a micro-diode array of light sensors (micro-light emitting diodes configured electrically to receive light and provide a current at a voltage) wherein each light source comprises four light sensors positioned around each light source, and optionally, a first light source emits light into a single angular bin of the AVLED and the four light sensors positioned around the light emitting micro-LED receive light from the first angular bin. In one embodiment, an AVLED comprises a spatial array of light sources intermixed with a spatial array of light sensors wherein the positions or arrangements of the light sources and light sensors are at least one selected from the group: alternating; non-uniformly spaced from each other; at a ratio of light sources to light sensors selected from the group greater than 10:1, greater than 5:1, greater than 3:1, greater than 2:1, greater than 1:1, less than 1:1, less than 1:2, less than 1:3, less than 1:4, less than 1:5, less than 1:10; positioned such that greater than 1, 2, 3, 4, 5, 6, 7, 8, 9, and 10 light sources substantially surround a first light source or are substantially positioned between a first light source and a nearest light source.

In one embodiment the spatial array of light sources comprises light transmitting regions between a first set of two or light sources (or substantially all of the light sources) and an imager or array of light sensors positioned below the spatial array of light source (on the side opposite the light emitting side of the spatial array of light sources) such that light external to the AVLED passes through the AROE (and/or is redirected by a scanner) passes through the light transmitting region and is detected by the pixel or light sensor. In this embodiment, the light emitted by one or more of the light sources is emitted into a first angular bin and the light from the environment received by the AVLED or AROE in the first angular bin (or corresponding to the first angular bin) passes through the light transmitting region adjacent the one or more light sources to the pixel or light sensor. Thus, in this embodiment, light from at least one light source emits light into a first angular bin, and the pixel or light sensor receives light from the environment through the light transmitting region next to the at least one light source corresponding to the same angular bin. In one embodiment, stacking the spatial array light source above the imager (with light transmitting regions between light source) or stacking the imager or light sensor array (with light transmitting regions between the imager pixels or light sensors) above a spatial array of light sources substantially reduces the thickness and enables substantially co-axial illumination (and/or irradiation) and detection for one or more angular bins. In one embodiment, the AVLED comprises a spatial array light source and imager or array of light sensors disposed to receive light from the environment wherein one or light sources of the spatial array of light source are positioned to emit light into a single angular bin of the ALVED and one or more pixels of the imager or light sensors of the array of light sensors are positioned receive light from the environment in the first angular bin and the optical axis of the light from the light source to the to the environment and the optical axis of the light from the environment to the one or more pixels of the imager or light sensor do not deviate by more than a first deviation angle within the AVLED. In one embodiment, the first deviation angle is less than one selected from the group: 20, 15, 10, 9, 8, 7, 6, 5, 4, 3, 2, and 1 degrees. In one embodiment, the difference between the angle of the optical axis of the light from at least one first light source at the light emitting surface of the light source and the angle of the optical axis of the light incident on at least one first pixel of the imager or at least one first light sensor of the array of light sensors in an AVLED is less than the first deviation angle. In one embodiment, the difference between the angle of the optical axis of the light from at least one first light source at the light emitting surface of the light source emitting light into a first angular bin and the angle of the optical axis of the light received from the environment from the first angular bin incident on at least one first pixel of the imager or at least one first light sensor of the array of light sensors in an AVLED at the light detecting surface of the first pixel or first light sensor is less than the first deviation angle. In another embodiment, the distance between a center point of a light source of a spatial array of light sources and the center point of pixel of an imager or light sensor in an array of light sensors in (or as projected onto) a first plane perpendicular to the optical axis of light from the light source at the light emitting surface of the light source is less than a first emitter-sensor distance which is less than one or more selected from the group: the dimension of the light emitting portion of the light source in the first plane in a first direction or first direction and second direction orthogonal to the first direction; two times the dimension of the light emitting portion of the light source in the first plane in a first direction or first direction and second direction orthogonal to the first direction; three times the dimension of the light emitting portion of the light source in the first plane in a first direction or first direction and second direction orthogonal to the first direction; four times the dimension of the light emitting portion of the light source in the first plane in a first direction or first direction and second direction orthogonal to the first direction; the dimension of the pixel or light sensor sensitive to incident light in the first plane (or projected onto the first plane) in a first direction or first direction and second direction orthogonal to the first direction; two times the dimension of the pixel or light sensor sensitive to incident light in the first plane (or projected onto the first plane) in a first direction or first direction and second direction orthogonal to the first direction; three times the dimension of the pixel or light sensor sensitive to incident light in the first plane (or projected onto the first plane) in a first direction or first direction and second direction orthogonal to the first direction; four times the dimension of the pixel or light sensor sensitive to incident light in the first plane (or projected onto the first plane) in a first direction or first direction and second direction orthogonal to the first direction; 10 millimeters, 5 millimeters, 2 millimeters, 1 millimeter, 0.5 millimeters, 0.3 millimeters, 0.2 millimeters, 0.1 millimeters, 0.05 millimeters, 0.04 millimeters, 0.03 millimeters, 0.02 millimeters, 0.01 millimeters, 0.008 millimeters, 0.006 millimeters, and 0.004 millimeters. In one embodiment, shortest distance between the light emitting region of one or more light sources in a spatial array of light sources in an AVLED and a pixel of an imager or light sensor, corresponding to the same angular bin or different angular bins of the AVLED is less than the first emitter-sensor distance.

In one embodiment, the light transmitting region of the spatial array of light sources, or the imager or array of light sensors, comprises a window or an aperture. In another embodiment, portions of the spatial array of light sources, or the imager or array of light sensors, define the boundaries of the light transmitting region (the aperture of the light transmitting region). In one embodiment, a microlens array (or other array of optical elements) is positioned above the light sources and/or the light sensors. In this embodiment, the microlenses in the microlens array can help reduce the angular width of the light from the light source and/or focus the light through the aperture. In another embodiment the AVLED comprises light transmitting regions between sets of one or more light sources of a spatial array of light sources that is stacked above an imager wherein the aperture of the light transmitting region causes light incident through the aperture from a first range of angles to spread across the pixels or light sensors beneath the light sources. In this embodiment, the plurality of pixels or light sensors beneath the light transmitting region can provide additional angular intensity information for the light received from within an angular bin, and can optionally provide intensity of light information of the light received from the environment for angular ranges smaller than the angular width of the angular bin. In one embodiment, the light transmitting regions between the light sources of the spatial array of light sources comprise a microlens or other optical element that focuses or redirects light through the apertures of the light transmitting regions. In this embodiment, the angular resolution of the light within the angular bin of the AVLED due to the imager pixels or light sensors beneath the light sources may be increased and/or the total light flux reaching the imager pixels or light sensors can be increased. In one embodiment, by using a spatial array light source with light transmitting regions, windows, or apertures stacked above an imager, the number of imager pixels or light sensors used could be higher than if the light sensors are positioned between light sources in the same plane or substrate. In one embodiment, the separation between the lower light output surface of the light transmitting region (or window or aperture) of the spatial array light source stacked above an imager in an AVLED and the light sensitive surface of the imager is: less than one selected from the group: 5, 4, 3, 2, 1, 0.5, 0.4, 0.3 0.2, 0.1, 0.08, 0.06, 0.04, 0.02, and 0.01 millimeters; less than one selected from the group: 20, 10, 15, 10, 9, 8, 7, 6, 5, 4, 3, 2, and 1 times the largest dimension of the pixel or light sensor on the light receiving surface; and/or greater than one selected from the group: 20, 10, 15, 10, 9, 8, 7, 6, 5, 4, 3, 2, and 1 times the largest dimension of the pixel on the light receiving surface.

In one embodiment, the optical axis of the light exiting an AVLED is offset from the optical axis of the light for the imager or array of light sensors. In another embodiment, an offset from the axial difference between the light sources (and/or one or angular bins) and the imager pixels or light sensors (or imager pixels or light sensors corresponding to the one or more angular bins) is calculated and taken into account and the calculations may include information from other sensors (such as from other imagers from other AVLEDs, one or more 3D room scanners or LIDARS) such that the distance to the object evaluated by the imager in the AVLED can be determined to increase the accuracy of the offset calculation of the luminance, irradiance, derived or estimated illuminance and/or irradiance information, relative intensity information, and/or color or spectral information of the object of interest in the angular bin for the AVLED.

In one embodiment, a system comprising one or more AVLEDs comprises a portable device comprising and imager wherein the location and orientation of the camera is evaluated or recorded in real-time and luminance information, irradiance information, derived or estimated illuminance information, derived or estimated irradiance information, relative intensity information, and/or spectral or color information for regions (or light reflected from regions) of the room or environment occluded from view or not in the field of view of the AVLEDs is recorded and/or evaluated or estimated to provide information for one or modes (such as high efficiency mode, shadow reduction mode, or user selected guideline mode for indirect illuminance, for example). In one embodiment, the imager on a portable device provides luminance information, derived or estimated illuminance information, relative intensity information, and/or color information for regions in the environment occluded from view or not within the viewing angle of an imager or array of light sensors on one or more AVLEDs in the system.

In one embodiment, the AVLED, vehicle, and/or portable device (or an accessory or add-on in communication with the AVLED, portable device, and/or vehicle) comprises a camera or imaging sensor that captures images that can be processed to monitor or determine (directly or in combination with other information) information such as one or more selected from the group: the location and/or movement of one or more individuals or objects (including other AVLEDs) in an environment; the angular light output (flux and/or color) from one or more angular bins from one or more AVLEDs (optionally including the estimated light output (flux and/or color) in each and/or all angular bins from an AVLED comprising the camera or imaging sensor); the estimated illuminance, irradiance, luminance, radiance, relative intensity, spectral properties, and/or color uniformity of the light output from an angular bin; the calibrated or reflected luminance, radiance, and/or color (or spectral properties) of one or more objects, individuals, structures in the environment (or components thereof); calibrated or estimated relative illuminance, irradiance, and/or color (and/or reflected irradiance, luminance, and/or color) and boundaries of the light output (including angular bin boundaries and optionally overlap of the angular bins) in the angular field or spatially in a three-dimensional environment due to each light illuminating and/or irradiating an angular bin (such as where more than one light source in a spatial array light source illuminates a particular light output angular bin), each angular bin, and/or all angular bins from an AVLED; the calibrated or relative illuminance and/or color (or spectral properties) due to external illumination and/or irradiation (such as daylight or traditional non-AVLED fixtures or lamps; the location, color (or spectral properties), and reflected luminance of the illumination field (or reflected radiance of the irradiation field) from each angular bin (and optionally from each light source illuminating each angular bin) from each AVLED; the three-dimensional spatial layout of the environment (such as the structure of a room and its contents); the total three-dimensional illumination (and/or irradiation) of the environment (such as the illumination profile of a room and its contents) optionally from each light source and/or each angular bin; the light output from an AVLED including monitoring for damage or failure of one or more light sources in the AVLED or damage or failure of the AVLED; the location of the eyes, gaze direction, or other properties of one or more eyes of one or more individuals in the environment; the location and orientation of one or more imagers or cameras in the environment; the location and/or orientation of one or more AVLEDs in the environment; the calculated or estimate angular output (or illuminance and/or light flux output) from one or more bins from one or more AVLEDs based on imaging from an imager remote from the one or more AVLEDs (or from an imager on a different AVLED); information in the form of light communication (such as Li-Fi cellular wireless networking (re)using lights such as light emitting diodes for communication) from another device such as a portable device, vehicle, or other AVLED; the location of one or more objects, individuals, structures in the environment (or components thereof) that is estimated or evaluated to be below a threshold temperature or above a threshold temperature (such as by using an infrared imager to identify an individual who is relatively cool and/or relatively warm, an overheating device, a fire locally, or a fire beyond one or more objects or structures of the room); and identify a specular reflection (or a reflection with more than 70% of the light reflecting within 5 degrees of the specular reflection angle) from one or more angular bins, one or more LEDs from one or more angular bins, and/or one or more AVLEDs (such that those reflections could be reduced or eliminated, for example, to reduce or eliminate reflected glare, for example).

In one embodiment, an AVLED, vehicle comprising an AVLED, a portable device comprising an AVLED, or an accessory or add-on in communication with the AVLED, portable device, and/or vehicle) comprises a camera that captures images or information related to the eyes, which may include, for example, pupil size, eye orientation, vergence, gaze direction or duration, or an image of the iris or retina. In one embodiment, the AVLED, vehicle, and/or portable device (or accessory in communication with the AVLED, portable device, and/or vehicle) comprises one or more sensors that monitor the eyes of the AVLED operator, portable device operator, and/or vehicle operator, respectively to provide images that can be analyzed to provide information such as gaze direction and/or pupil locations. In one embodiment, this information could be analyzed, and the illumination and/or irradiation by the AVLED of objects or areas in the field of view centered around the gaze direction could be increased, or illumination and/or irradiation directed toward the pupil (or eyes) of the individual from one or more AVLED could be reduced to reduce and/or eliminate glare. In one embodiment, the image or video capture, image or video analysis, calculations or estimations of illuminance and/or irradiation and/or angle of origin of light onto or more surfaces, regions, individuals, or subparts thereof, and/or calculations for optimum light flux and/or color output for a preferred angular AVLED, angular bin of the AVLED, light source of the AVLED angular bin, is performed by one or more processors on an AVLED, a portable device comprising an AVLED, or a vehicle comprising an AVLED.

In one embodiment, the portable device comprises wearable glasses, eyewear, head-mounted display, contact lenses, or headwear, any of which may comprises one or more of the aforementioned sensors (such as one or more cameras monitoring the external environment, monitoring gaze direction, and/or pupil location) that provide information such as discussed above. In another embodiment, one or more eye contact lenses worn by the individual provides information related to the gaze direction, pupil size, or other eye related information. In another embodiment, an AVLED comprising a camera, a camera mounted in a vehicle, a camera built-into a phone, a camera built into a portable device, or an accessory or add-on camera in communication with an AVLED, vehicle, and/or portable device captures images that provide information such as discussed above. In one embodiment, the other eye related information may include eyelid state or motion properties (such as droopy or sleepy eyelid movement, blinking rate, or closed eyelids), eye orientation, an image of the iris or retina, or eye movement or fixation. In one embodiment, the eye-related information directly or in combination with other information (such as pulse) from one or more sensors provides predictive health or status information of the individual (such as identifying the individual is asleep). In one embodiment, the AVLED, portable device, and/or vehicle comprises a camera that provides identification information such as identifying the AVLED operator, portable device operator (such as smartphone operator or head wearable device operator), and/or vehicle operator using facial recognition and/or iris recognition optionally in combination with other information (such as fingerprint or other biometrics). In one embodiment, a vehicle may comprise an AVLED or a AVLED may be attached to a vehicle (or mounted or worn on a person) within one selected from the group: 3, 4, 8, 16, and 32 inches from the driver's eye position. In this embodiment, the AVLED or remote processor may identify retroreflective objects (such as a retroreflective sign, retroreflective article of clothing, or other retroreflective object), or possible retroreflective objects in the environment based on an imager on the AVLED or remote from the AVLED (optionally from illumination by the AVLED and/or angular scan of the AVLED) and selectively increase the illuminance in the one or more angular bins corresponding to the spatial zone with the retroreflective object (or possible retroreflective object) or device such that the luminance of a retroreflective sign, article of clothing or other retroreflective article or device increases.

In one embodiment, an AVLED or system comprising one or more AVLEDs comprises an infrared imager configured to measure infrared light in the environment. In one embodiment, the information from the infrared imager can processed to provide one or selected from the group: indication and estimation of relative intensity of daylight penetration into the environment; identification and/or indication of presence and/or movement of an individual, object, or thing in the field of view of the infrared imager or environment; identification of unwanted pests or animals for rescue; termite detection; wildlife surveys; indication of location of thermal sources (such as a fire in a fireplace, fire on a candle, building or object on fire, wildfire monitoring, flame detection, fire behind a wall, floor, door or ceiling, electrical components dissipating heat, portable heaters, appliance generating heat, etc.); indication of environmental temperature variations (such as in a greenhouse or for HVAC utilization or optimization; indication of health (such as a fever or poor circulation for health concern at home or disease control at an airport), or thermal comfort of an individual; angular output range or effectiveness of warming by a thermal AVLED in a selective warming mode; determine the safest path for travel of environmental occupants to exit the environment in event of fire; navigation assistance (such as in a vehicle, water craft, air craft, or individual walking or running at night); indication of thermal leaks, air leaks, poor insulation, etc. in the building envelope or room envelope (including real-time energy auditing); military or defense application (night vision for individuals using a head-worn or helmet-mounted AVLED, or night vision for a drone with an AVLED, for example); gas detection; counter surveillance; indication of equipment or component status (such as excessive or overheating for quality control or predictive maintenance (early failure warning)) on mechanical or electrical equipment (including power lines or power transformers); detection of pollution effluent; and other known uses for infrared imagers.

In one embodiment, an AVLED, portable device, vehicle, or system comprising one or more AVLEDs comprises a spectrometer configured to receive ambient light. In one embodiment, the spectrometer receives ambient light directly, through an AROE, by a scanner, through a separate optical element, or through one or more angular bins of the AVLED. In one embodiment the spectrometer provides a spectral resolution of the spectral properties of the light output from one or more light sources (such as AVLEDs, other light emitting devices, or solar radiation) and/or the color properties of one or more objects, individuals, things, or components thereof in an ambient environment external to the AVLED reflecting light emitted from the AVLED greater than one selected from the group: 200, 100, 80, 60, 40, 30, 20, 15, 10, 8, 6, 4, 2, 1 and 1 micrometers. In one embodiment, a system comprises an AVLED comprising a first imager and a second imager at a distance from the first imager greater than one selected from the group 1, 2, 3, 4, 5, 6, 7, 8, 9, 10, 11, 12, 13, 14, and 15 feet. In one embodiment, a system comprises a first AVLED comprising a first imager and a second AVLED comprising a second imager wherein the first AVLED is separated from the second AVLED by a distance greater than one selected from the group 1, 2, 3, 4, 5, 6, 7, 8, 9, 10, 11, 12, 13, 14, and 15 feet. In one embodiment, the AVLED or system comprising an AVLED comprises a scanning detector, such as a line scanning detector wherein the detector, or an optical element between the detector and the environment (such as an AROE) translates, rotates, and/or changes its optical properties such that a 2-dimensional (or three-dimensional) scan of the environment may be achieved, from which one may estimate or calculate one or more light properties for one or more spatial zones, regions, surfaces, and/or angular bins.

In one embodiment, the pixel information of an imager for the group of pixels corresponding to an angular bin are combined for analysis. In this embodiment, by using, for example, the information corresponding to an angular bin, the image resolution is matched to the angular bins, which may have a lower resolution and/or non-uniform spatial representation such that privacy of individual's may be protected. In one embodiment, the imager data for the pixels in an angular bin is averaged, such as measured/estimated/ calculated light properties (such as illuminance, luminance radiance, irradiance, spectral power distribution of reflect light, or other properties disclosed herein) based on one or more images. In one embodiment, the spatial pixels of an image or collection of information corresponding to larger angles from the nadir or normal to the optical axis of the imager have a lower resolution than angles closer to the nadir or normal to the optical axis of the imager.

Color Scanning

In one embodiment, a phone, tablet or other computing device comprising color filters or a spectrometer may be use to evaluate the color of one or more objects or regions of an environment. For example, a user with a portable device such as a phone with a built-in or attached spectrometer accessory may walk through the environment to scan the reflectance of objects based on given input spectrum (such as by illumination by only a light source on the phone or by the measured spectrum of one or more light sources capable of illuminating the object such as an AVLED), preferably using direct illumination only. The spectral reflectance of the object or region can then be used to determine the optimum red, green, and blue, or red, green, blue, and white color ratio for illumination of the specific object or surface to yield efficient illumination for Uniform Color Scale or high color reproduction, or could be for a user selectable gamut, spectrum or color effect (such as high color saturation mode).

Occupancy and/or Vacancy Sensor

In one embodiment, a system comprising one or more AVLEDs, an AVLED, a portable device, and/or a vehicle comprises one or more occupancy or vacancy sensors selected from the group: passive infrared sensor, pyroelectric based sensor, thermopile-based sensor, thermistor-based sensor, PZT based sensor, and ultrasonic occupancy sensor. As used herein, an "occupancy sensor" is a sensor that will turn off the light fixture or AVLED when the sensor does not detect occupancy. As used herein, a "vacancy sensor" is a sensor where a person entering the space manually turns on the light fixture or AVLED and the light fixture or AVLED turns off after a period of time after the sensor does not detect occupancy. In one embodiment, an AVLED or system comprising an AVLED comprises an occupancy sensor or vacancy sensor of the infrared type and/or the ultrasonic type. Infrared sensors or Ultrasonic sensors, their configurations, features, and designs are known in the art and can be implement in the AVLED or system comprising an AVLED such as described in Handbook of Advanced Lighting Technology, Editors Robert Karlicek, Ching-Cherng Sun, Georges Zissis, Ruiqing Ma, Springer International Publishing, Switzerland, 2017, Volume I, Part IV, "Intelligent Lighting System Integration," section titled "Conventional IR and Ultrasonic Sensor Systems," pages 465-513, the contents of the pages are incorporated by reference herein. In one embodiment, an AVLED and/or system comprising an AVLED comprises one or more imagers wherein the images captured from the imagers are analyzed to determine occupancy and/or vacancy of the room or environment.

Ambient Light Sensor

Ambient light sensors typically integrate the flux in a spatial environment and adjust the total light output of one or more luminaires to substantially maintain the target illuminance (or target ambient level setting). In one embodiment, an AVLED or system comprising an AVLED comprises an ambient light sensor that is used to provide illuminance, irradiance, illuminating and/or irradiating spectral properties or color, estimated luminance, estimated radiance, reflected light spectral properties, estimated light flux, estimated reflected light spectral properties, or estimated reflected light flux in an environment from one or more light sources in an angular bin of an AVLED, from one or more angular bins of an AVLED, or from one or more AVLEDs. Ambient light sensors that can be used in an AVLED or system comprising and AVLED and their configurations, functionality, architecture, capabilities, functional integration, and component integration and sensing are described in Handbook of Advanced Lighting Technology, Editors Robert Karlicek, Ching-Cherng Sun, Georges Zissis, Ruiqing Ma, Springer International Publishing, Switzerland, 2017, Volume I, Part IV, "Intelligent Lighting System Integration," section titled "Ambient and Spectral Light Sensors," pages 515-533, the contents of the pages are incorporated by reference herein.

Sensor Arrays at Location

In one embodiment, a system comprising an AVLED includes an array of sensors positioned at locations within the environment that provide illuminance and/or irradiance information, spectral light properties of incident light, or other sensor information such as disclosed herein for one or more selected from the group: or more light sources in an angular bin of an AVLED, one or more angular bins of an AVLED, and one or more AVLEDs in a system comprising a plurality of AVLEDs. In another embodiment, a system comprising an AVLED includes a portable device or vehicle comprising a portable (or vehicle mounted) array of sensors that can be re-positioned at locations within the environment that provide illuminance and/or irradiance information, spectral light properties of incident light, or other sensor information such as disclosed herein for one or more selected from the group: or more light sources in an angular bin of an AVLED, one or more angular bins of an AVLED, and one or more AVLEDs in a system comprising a plurality of AVLEDs for a plurality of locations in the environment when the array of sensors is moved.

Scanner (Lidar), etc. for Three-Dimensional Spatial Information

In one embodiment, an AVLED, system comprising an AVLED, a portable device, or a vehicle comprises a 3D sensor for determining the physical location of objects or boundaries of an environment or 3D representations of the environment and optionally communicates the information to the AVLED or system comprising the AVLED. In one embodiment the 3D sensor is one or more selected from the group: 3D scanning sensor, laser scanning, LIDAR, light detection and ranging sensor, structure from motion (SFM) sensor, sonar, photogrammetric image processing of images from an imager, white light structured scanner, infra-red light structured scanner, structured light scanner, and sensors combining imaging and depth mapping or 3D scanning. In one embodiment, the AVLED or system comprising an AVLED obtains three-dimensional spatial data from one or more methods selected from the group: angular cycling the AVLED and one or more image sensors; a plurality of image sensors and one or more light emitting devices; a translatable and/or rotatable portable imaging sensor (such as a camera in a cellphone or other portable electronic device); from a device with a spatial three dimensional scanner (such as a vehicle with LIDAR); manually entered spatial information; automatically generated spatial information from one or more devices or the AVLED; one or more accelerometers, positioning systems, gyroscopes or compass (such as to determine the position and/or orientation of the AVLED relative to a reference location and/or direction), the angular light output from one or more light emitting devices (such as light fixtures or AVLEDs); spatial information from a new environment, a previously measured environment, an environment to be measured, an environment from which spatial three-dimensional data is known, entered into the system, or available such as from a computer server; and one or more AVLEDs adjusts the light flux output from one or more light sources in two or more angular bins based on the three-dimensional spatial data. Techniques for LIDAR and spatial three-dimensional measurement are known in the industry and example LIDAR systems are described in US Patent Application Publication No. 20180120433. In one embodiment, the AVLED comprises a three-dimensional time-of-flight array to provide spatial three-dimensional information. In one embodiment, the AVLED comprises one or more high frequency infrared light emitting diodes or vertical cavity surface emitting lasers modulating light at a frequency greater than 10, 20, 30, or 40 megahertz to illuminate one or more regions, surfaces, and/or spatial zones to determine spatial three-dimensional information using time-of-flight analysis.

In one embodiment, the AVLED comprises one or more radar emitting devices that can measure distances as well as speed. In another embodiment, an illumination and/or irradiation system comprises two or more AVLEDs comprising two radar emitting devices that enable triangulation for spatial three-dimensional information.

In one embodiment, a head worn device (such as a head worn display device, an HMD, augmented reality headset, virtual reality headset, illuminating headwear device for illumination of the environment, irradiating headwear device for irradiation of the environment, or display device worn on a head) comprises an AVLED that can increase or decrease light output from one or more light sources corresponding to one or more angular bins based on gaze tracking and/or eye tracking information from one or more imagers of on the head worn display device. In one embodiment, a head worn device comprising the AVLED adjusts the light output from one or more light sources in one or more angular bins of the AVLED to provide one or more changes in illumination and/or irradiation selected from the group: changing the light flux or spectral output of an angular bin of an AVLED corresponding to where one is looking; changing the light flux or spectral output of an angular bin of an AVLED corresponding to a region that overlaps with an augmented image displayed on the head worn device (such as reducing the light output in the angular bin such that the displayed image contrast is increased by reducing the illumination of the background behind the image), changing the light flux (such as reducing the light output) or spectral output of an angular bin of an AVLED corresponding to the location of eyes of a nearby person or a sensor sensitive to light (such as another imager or photosensor, which could be on another nearby head worn device with another AVLED, such as with night vision goggles where the AVLED can illuminate and/or irradiate the environment without illuminating and/or irradiating the eyes or imager of other night vision goggles detected in the environment such as by an imager or determination of coordinates of the other imager or eyes).

In one embodiment, an AVLED or system comprising one or more AVLEDs comprises a radar system based on Direct-Sequence Spread Spectrum (DSSS) radar or Frequency Modulated Continuous Wave (FMCW) radar. In one embodiment, the system comprises an antenna array. In another embodiment, a system comprises a plurality of AVLEDs defining an antenna array wherein each AVLED of the plurality of AVLEDs comprises an antenna, and the antenna array emits radio waves to monitor the three-dimensional environment for movement, environmental changes, 3D tracking, interactive gestures for AVLED (or AVLED system control) or other forms of movement or environmental changes.

In one embodiment, an AVLED comprises one or more lasers and a confocal non-line-of-sight (NLOS) imager to derive three-dimensional spatial information. In this embodiment, the AVLED (or a laser) illuminates light into one or more dense arrays of points in the environment and the NLOS imager images and detects the time required for a direct reflection and indirect illumination. In this embodiment, the AVLED may comprise a laser wherein the AVLED imager measures the time required for the direct illuminated reflected light from one or more light sources and the time for the indirect reflection from other surfaces for each point of the dense array of points. This information is then processed by an algorithm to resample the data in a time domain, performing a three-dimensional convolution operation, then an inverse filter in a Fourier domain. Then, resampling the convolved data in a depth dimension can derive the surfaces of reflection that are not necessarily directly visible (i.e. around a corner, for example) by the imager.

Position Sensor

In one embodiment, the AVLED, portable device, vehicle, and/or system comprising an AVLED comprises a position or location sensor or system for measuring the location of objects or individuals or one or more AVLEDs globally, and/or relative to each other or another object or reference location. In one embodiment, the position sensors uses one or more methods or sensors selected from the group: radio wave frequency triangulation, local GPS, Bluetooth triangulation, IEEE 802.11 signal triangulation, time delay differences, cellular triangulation, external tracking/location identification, one or more accelerometers in combination with other information from one or more sensors, radar or other 3D Scanning system, and imaging system using photogrammetric image processing of images from one or more imagers.

In one embodiment, the AVLED, system comprising one or more AVLEDS, the portable device and/or vehicle comprise one or more Global Positioning System receivers that provide position information. In another embodiment, the AVLED, system comprising one or more AVLEDS, the portable device and/or vehicle comprises one or more radio transceivers wherein triangulation or time signal delay techniques may be used to determine location information. Example radio transceivers that can be used to determine a position or location include radio transceivers operatively configured to transmit and/or receive radio signal in the form of one or more channel access schemes (such as Time Division Multiple Access (TDMA), Code division multiple access (CDMA), Frequency Division Multiple Access (FDMA), Global System for Mobile Communications (GSM), Long Term Evolution (LTE), packet mode multiple-access, Spread Spectrum Multiple Access (SSMA). In another embodiment, one or more radio transceivers, such as one operatively configured for Bluetooth™ or an IEEE 802.11 protocol (such as Wi-Fi), is used to triangulate or otherwise provide information used to determine the global, local, or relative position or location information of the AVLED, component of the system comprising one or more AVLEDS, the portable device and/or the vehicle. Other techniques which may be utilized to determine the location, position, and/or orientation information for the AVLED, system comprising one or more AVLEDS, the portable device and/or vehicle include computing its location by cell identification or signal strengths of the home and neighboring cells, using Bluetooth™ signal strength, barometric pressure sensing, video capture analysis, audio sensing, sensor pattern matching, video pattern matching, and thermal sensing.

Other Sensors

In one embodiment, the AVLED, portable device, vehicle, and/or system comprising an AVLED comprises one or more sensors, sensing inputs and/or sensing devices selected from the group: a charge-coupled device, black silicon sensor, IR sensor, acoustic sensor, induction sensor, motion sensor, optical sensor, opacity sensor, proximity sensor, inductive sensor, Eddy-current sensor, passive infrared proximity sensor, radar, capacitance sensor, capacitive displacement sensor, hall-effect sensor, magnetic sensor, GPS sensor, thermal imaging sensor, thermocouple, thermistor, photoelectric sensor, ultrasonic sensor, infrared laser sensor, inertial motion sensor, MEMS internal motion sensor, ultrasonic 3D motion sensor, accelerometer, inclinometer, force sensor, piezoelectric sensor, rotary encoders, linear encoders, chemical sensor, ozone sensor, smoke sensor, volatile organic compound sensor, heat sensor, magnetometer, carbon dioxide detector, carbon monoxide detector, oxygen sensor, smoke detector, metal detector, rain sensor, altimeter, GPS, detection of being outside, detection of context, detection of activity, object detector (e.g. billboard), marker detector (e.g. geo-location marker for advertising), laser rangefinder, sonar, capacitance, optical response, heart rate sensor, micro-doppler radar (such as for sensing movement, identifying objects, or detecting through walls), and RF/micropower impulse radio (MIR) sensor.

In one embodiment, the AVLED, portable device, vehicle, and/or system comprising an AVLED comprises one or more interaction and/or control interface for user action capture inputs and/or devices selected from the group: a head tracking system, camera, voice recognition system, body movement sensor (e.g. kinetic sensor), eye-gaze detection system, tongue touch pad, sip-and-puff systems, joystick, cursor, mouse, touch screen, touch sensor, finger tracking devices, 3D/2D mouse, inertial movement tracking, microphone, wearable sensor sets, robotic motion detection system, optical motion tracking system, laser motion tracking system, keyboard, virtual keyboard, virtual keyboard on a physical platform, context determination system, activity determination system (e.g. on a train, on a plane, walking, exercising, etc.) finger following camera, virtualized in-hand display, sign language system, trackball, hand-mounted camera, temple-located sensors, glasses-located sensors, Bluetooth communications, wireless communications, and satellite communications.

Software

In one embodiment, the portable device and/or vehicle comprise one or more processors (such as microprocessors) operatively configured to execute one or more algorithms, analyze information, communicate information, and/or execute one or more operational modes for the AVLED or system comprising the AVLED. One or more algorithms disclosed herein may be executed on one or more processors of the AVLED, portable device, the vehicle, or a remote device (such as a remote server). In one embodiment, the AVLED, portable device, or vehicle comprises software or software components executing one or more algorithms. The software and/or data may be stored on one or more non-transitory computer-readable storage media. The software may be the operating system or any installed software or applications, or software, applications, or algorithms stored on a non-transitory computer-readable storage medium of the portable device and/or vehicle. One or more software components may comprise a plurality of algorithms, such as for example, a communication algorithm, a movement isolation algorithm, an algorithm that processes information received from one or more sensors or input devices, an algorithm that determines the location or position of the AVLED, operator of the portable device, vehicle, operator of the vehicle, or the portable device, an algorithm that determines the 3D dimensional properties of the environment, the optimal illumination and/or irradiation by one or more light sources representing all or a portion of light into one or more angular bins of one or more AVLEDs based on one or more AVLED operational modes, an algorithm tracking one or more individuals and/or the eyes of one or more individuals in an environment, and an algorithm determining the spatial/geometric shape and location properties, spectral absorption properties, spectral reflection properties, specular reflection surface properties (such as a glossy reflection that occurs from a surface with an ASTM D523-89 60 degree gloss greater than one selected from the group: 15, 20, 30, 50, 70, and 100), illuminance, irradiance, luminance, radiance, incident light flux, reflected light flux, and movement properties of one or more objects, surfaces, individuals or components thereof in an environment when illuminated and/or irradiated by light from one or more light sources from one or more angular bins of one or more AVLEDs.

On or more algorithms may be executed within the framework of a software application (such as a software application installed on a portable cellular phone device, AVLED, or vehicle) that may provide information to an external server or communicate with an external server or processor that executes one or more algorithms or provides information for one or more algorithms to be executed by a processor on the portable device, AVLED, or vehicle. One or more operations performed by algorithms disclosed herein may be executed by one or more algorithms, software components, or software applications on one or more processors of the AVLED, component of a system comprising one or more AVLEDs, the portable device, the vehicle, a processor remote from the AVLED, portable device and/or vehicle, or a processor in operative communication with the AVLED, component of the system comprising the AVLED portable device, and/or vehicle.

In another embodiment, the AVLED, system comprising one or more AVLED, portable device, and/or vehicle comprises a processor that executes one or more algorithms and/or a non-transitory computer-readable storage medium comprises one or more algorithms that analyzes data, separates data, receives data, transmits data, provides alerts, notifications or information, communicates to a remote operator or another AVLED, and/or communicates with an analysis service provider or other third party service or data provider.

Monitoring Algorithm

In one embodiment, an AVLED, system comprising one or more AVLEDS, portable device, and/or vehicle comprises a processor or is in communication with a processor that executes a monitoring algorithm that performs one or more functions selected from: recording data from sensors, recording images and/or video from one or more imagers or cameras, recording sound from a microphone, monitoring user interface components (touchscreen, keypad, buttons, etc.) of the AVLED, system comprising one or more AVLEDs, portable device and/or vehicle, monitoring the light flux and/or spectral light output from one or more light sources from one or more angular bins of one or more AVLEDs (which may be remote from an AVLED monitoring the output).

Connection Between AVLEDS and/or Sensors and/or External Devices

In one embodiment, an AVLED, system comprising one or more AVLEDS, portable device, and/or vehicle comprises one or more devices for communicating with one or more AVLEDs, systems comprising one or more AVLEDS, portable devices, vehicles, and/or subcomponents thereof using one or more communication methods selected from the group: electrical, optical, acoustical, radio frequency, electrical circuit including an optical or radio transceiver, transmitter, and/or receiver that communicates with one or more external sensors and/or cameras or devices comprising one or more sensors and/or cameras, or a computing device receiving information from one or more sensors and/or cameras directly or indirectly through another device. In one embodiment, a system for providing illumination and/or irradiation comprises a network of AVLEDs that communicate to each other directly or through a hub (or central processor) to provide information to each other the hub for determining the light output from one or more light sources in one or more angular bins in one or more AVLEDs for one or more modes of operation disclosed herein. In another embodiment, a system for providing illumination and/or irradiation comprises a network of devices comprising AVLEDs, the network comprising one or more devices selected from the group: light fixture, lamp, light bulb, light emitting device, portable device (such as a smartphone), sensor, head worn or head-mounted device (such as head mounted AR/VR or display device or night vision goggles), body worn device (such as a smartwatch, belt, or shoe), vehicle, computer, terminal, interface device or controller (such as a tablet, wall-switch). In one embodiment, the AVLEDs emit light through an angular bin corresponding to direct illumination, direct irradiation, indirect illumination, or indirect irradiation (via one or more reflections) of the networked device to which the AVLED is in optical communication (such as a controller on a table, wall switch, portable device, or other AVLED). In this embodiment, the power required for communication can be reduced since the light can be directed to only where it is needed (no or less light could be directed out into the other angular bins) and the signal to noise ratio can be increased. In one embodiment, the location and/or orientation of the device to which the AVLED is communication is determined (such as by LIDAR, image analysis from an imager on the AVLED, etc.) and using the light field map for all of the light sources for each angular bin for each AVLEDS, the optimum light source(s) from the optimum angular bin from the optimum AVLED can be used to communicate to the device optically through the light output (such as modulation of the light output at a frequency greater than 60 hertz such that the light modulation is not visible). In this embodiment the light output needed for communication could be reduced greatly since a direct "line of sight" (or optionally using an indirect reflection) can be used by the optimum light source, angular bin, and AVLED to imager on another AVLED or device comprising an imager.

In one embodiment, one or more AVLEDs emit a synchronization light signal to correlate the time for AVLED to turn off, turn on, or change the light output or color in one or more angular bins to an imager and/or sensor on a remote AVLED, a remote portable device, and/or a remote vehicle. For example, in one embodiment a ceiling mounted AVLED emits a signal light (such as light at a first frequency greater than 60 hertz and/or light output pattern at the first frequency) into an angular bin directed toward a cellular phone held by an individual (wherein the appropriate angular bin for the cellular phone may be determined by an imager on the AVLED, for example) indicating that the AVLED will begin an illumination and/or irradiation sequence starting in 0.5 seconds that cycles through the angular bins (or uses angular cycling disclosed herein) with one or more intensities and/or one or more colors. In this embodiment, for example, electrical delays and/or network latency can be substantially reduced such that the accuracy of the evaluation of the effects of the varying AVLED light output by an imager on the cellular phone (which may be calibrated for luminance, radiance, and/or color) can be improved due to a more accurate synchronization.

In one embodiment, the spatial arrangement of a plurality of AVLEDs and/or cameras or sensors is provided, inputted, or determined by one or more AVLEDs or devices, and the light properties for one or more spatial zones is designated to be determined/evaluated by a particular AVLED and/or camera or sensor based on the spatial arrangement. For example, in a long hallway with a linear array of AVLEDs numbered 1, 2, 3, and 4, the first AVLED, #1, in the beginning of the hallway may be selected to provide light property information for the spatial zones or area of the environment near it (or that is closer to #1 than another AVLED and/or camera or sensor) and spatial zones which are closer to other AVLEDs (such as AVLED #4 at the end of the hallway) may be determined to be evaluated by those AVLEDs (AVLED #4 for example) and/or cameras or sensors closer to those spatial zones. Furthermore, for those angular bins corresponding to the distant spatial zones, the system may determine to omit collection of data or analysis of data (from images for example) from the particular unchosen AVLED and/or camera or sensor to reduce computational load and information. In the example above, AVLED #1 or processor in communication with it could omit the analysis of portions of the image from an imager or AVLED #1 corresponding to the spatial zones directly beneath (and closer to) AVLED #4 and likewise AVLED #4 or a processor in communication with it could omit analysis of portions of the image from a camera on AVLED #4 corresponding to the regions directly beneath (or closer to)

AVLED #1 to reduce computation time and/or communication bandwidth. In one embodiment, one or more AVLEDs or a system or processor in communication with one or more AVLEDs automatically determines which images or light property information sources (such as light sensors or images from a particular AVLED) to use for one or more spatial zones based on rules that include one or more selected from the group: location from the one or more AVLEDs to the spatial zone, evaluation of noise of the light property (or pixel noise) of the spatial zone evaluated from the one or more AVLEDs, imagers, or light sensors (such as by evaluating the noise present from reflected light at the spatial zone for a particular illumination/irradiation by a particular AVLED), threshold light property value (such as minimum measured or estimated illuminance or luminance for the spatial zone, for example), threshold exposure time, threshold intensity value for the pixel, or threshold value for one or more other light properties for the spatial zone. In one embodiment, the reduction in information from the reduction in spatial zones analyzed reduces the information transferred to one or more central processors. For example, in the example above, an illumination system comprising AVLEDs 1, 2, 3, 4 in the hallway and a processor remote from the AVLEDs, the remote processor may direct AVLED #1 to not process information in the image taken from its camera corresponding to the spatial zone under AVLED #4, and thus the information sent by AVLED #1 (or further processed by AVLED #1) is reduced and if the information is sent to the remote processer, the reduced information facilitates faster transmission/reduced network bandwidth. In one embodiment, the information from one or more AVLEDs and/or imagers or sensors to be used for analysis may be determined individually for the light output from each (or a selection) of angular bins from each or a selection of AVLEDs. In one embodiment, the determination is done initially, at random or regular intervals, or when one or more light property minimums or maximum thresholds has been met. For example, in the above hallway example, if the floor of the hallway is glossy, the light from AVLED #4 from an angular bin that reflects specular light from the floor to AVLED #1's imager would cause saturation in the image. In this example, an imager on AVLED #2 could be used to evaluate a light property of the spatial zone on the floor where AVLED #4 illuminated it since it is outside of the glare zone even though AVLED #1 may be closer to the spatial zone. In other embodiments, the information from one or more AVLEDs, imagers, or light sensors could be determined to be used because of shadowing or objects occluding the view from an imager on an AVLED, for example.

Communication Hardware Component

In one embodiment, an AVLED, system comprising one or more AVLEDS, portable device, and/or vehicle comprises one or more communication hardware components selected from the group: radio transceiver, Wi-Fi transceiver, Bluetooth™ transceiver, cellular phone communications sensor, GSM/TDMA/CDMA transceiver, near field communication (NFC) receiver or transceiver, optical communication component (such as light sources, laser diodes, light emitting diodes, and photodetectors), and wired electrical communication component.

Example radio transceivers that can be used to determine a position or location include radio transceivers operatively configured to transmit and/or receive radio signal in the form of one or more channel access schemes (such as Time Division Multiple Access (TDMA), Code division multiple access (CDMA), Frequency Division Multiple Access (FDMA), Global System for Mobile Communications (GSM), Long Term Evolution (LTE), packet mode multiple-access, Spread Spectrum Multiple Access (SSMA).

In one embodiment, the AVLED, system comprising one or more AVLEDs, portable device, and/or vehicle communicates with other devices in a network (such as a light fixture comprising another AVLED) a remote server or processor, or a portable device using one or more communication architectures, network protocols, data link layers, network layers, network layer management protocols, transport layers, session layers, or application layers, or using one or more serial communication architecture selected from the group of RS-232, RS-422, RS-423, RS-485, PC, SPI, ARINC 818 Avionics Digital Video Bus, Universal Serial Bus, FireWire, Ethernet, Fiber Channel, InfiniBand, MIDI, DMX512, SDI-12, Serial Attached SCSI, Serial ATA, HyperTransport, PCI Express, SONET, SDH, T-1, E-1 and variants (high speed telecommunication over copper pairs), and MIL-STD-1553A/B.

In one embodiment, the AVLED, system comprising one or more AVLEDs, portable device, and/or vehicle communicates with other devices in a network (such as a light fixture comprising another AVLED) a remote server or processor, or a portable device using one or wired or wireless control protocols selected from the group: Digital Addressable Lighting Interface specified by technical standards IEC 62386 and IEC 60929, Digital Signal Interface, DMX512 (DMX) based system, KNX based system, analog control, digital lighting control, 0-10V based system, AMX192 based system (AMX), D54 based system, MIDI, ZigBee, 6LoWPAN, Z-Wave, EnOcean, TALQ, Bluetooth Mesh, RDM, Architecture for Control Networks (CAN), BACnet, LonWorks, KNX, X10, HomePlug, and G.hn.

In one embodiment, the AVLED, portable device, vehicle, and/or system comprising one or more AVLEDs communicates wirelessly using optical communication. Examples of optical communication models such as Single-Input/Single-Output (SISO) Model, Multiple-Input-Multiple-Output (MIMO) Model, calibrations and integration with radio frequency and visible light communication models or systems are known in the art and can be used by one or more AVLEDs and are described, for example, in Handbook of Advanced Lighting Technology, Editors Robert Karlicek, Ching-Cherng Sun, Georges Zissis, Ruiqing Ma, Springer International Publishing, Switzerland, 2017, Volume I, Part IV, "Optical Wireless Applications," (pp. 635-700), the pages are incorporated by reference herein.

In one embodiment, the AVLED, system comprising one or more AVLEDs, portable device, and/or vehicle communicates with other devices in a network (such as a light fixture comprising another AVLED) a remote server or processor, or a portable device using one or more protocols selected from the group of Ethernet, GFP ITU-T G.7041 Generic Framing Procedure, OTN ITU-T G.709 Optical Transport Network also called Optical Channel Wrapper or Digital Wrapper Technology, ARCnet Attached Resource Computer NETwork, ARP Address Resolution Protocol, RARP Reverse Address Resolution Protocol, CDP Cisco Discovery Protocol, DCAP Data Link Switching Client Access Protocol, Dynamic Trunking Protocol, Econet, FDDI Fiber Distributed Data Interface, Frame Relay, ITU-T G.hn Data Link Layer, HDLC High-Level Data Link Control, IEEE 802.11 WiFi, IEEE 802.16 WiMAX, LocalTalk, L2F Layer 2 Forwarding Protocol, L2TP Layer 2 Tunneling Protocol, LAPD Link Access Procedures on the D channel, LLDP Link Layer Discovery Protocol, LLDP-MED Link Layer Discovery Protocol—Media Endpoint Discovery, PPP Point-to-Point Protocol, PPTP Point-to-Point Tunneling Protocol, Q.710 Simplified Message Transfer Part, NDP Neighbor Discovery Protocol, RPR IEEE 802.17 Resilient Packet Ring, StarLAN, STP Spanning Tree Protocol, VTP VLAN Trunking Protocol, ATM Asynchronous Transfer Mode, Frame relay, MPLS Multi-protocol label switching, X.25, Layer 1+2+3 protocols, MTP Message Transfer Part, NSP Network Service Part, CLNP Connectionless Networking Protocol, EGP Exterior Gateway Protocol, EIGRP Enhanced Interior Gateway Routing Protocol, ICMP Internet Control Message Protocol, IGMP Internet Group Management Protocol, IGRP Interior Gateway Routing Protocol, IPv4 Internet Protocol version 4, IPv6 Internet Protocol version 6, IPSec Internet Protocol Security, IPX Internetwork Packet Exchange, SCCP Signalling Connection Control Part, AppleTalk DDP, IS-IS Intermediate System-to-Intermediate System, OSPF Open Shortest Path First, BGP Border Gateway Protocol, RIP Routing Information Protocol, ICMP Router Discovery Protocol: Implementation of RFC 1256, Gateway Discovery Protocol (GDP), Layer 3.5 protocols, HIP Host Identity Protocol, Layer 3+4 protocol suites, AppleTalk, DECnet, IPX/SPX, Internet Protocol Suite, Xerox Network Systems, AH Authentication Header over IP or IPSec, ESP Encapsulating Security Payload over IP or IPSec, GRE Generic Routing Encapsulation for tunneling, IL Internet Link, SCTP Stream Control Transmission Protocol, Sinec H1 for telecontrol, SPX Sequenced Packet Exchange, TCP Transmission Control Protocol, UDP User Datagram Protocol, 9P Distributed file system protocol, NCP NetWare Core Protocol, NFS Network File System, SMB Server Message Block, SOCKS "SOCKetS", Controller Area Network (CAN), ADC, AFP, Apple Filing Protocol, BACnet, Building Automation and Control Network protocol, BitTorrent, BOOTP, Bootstrap Protocol, CAMEL, Diameter, DICOM, DICT, Dictionary protocol, DNS, Domain Name System, DHCP, Dynamic Host Configuration Protocol, ED2K, FTP, File Transfer Protocol, Finger, Gnutella, Gopher, HTTP, Hypertext Transfer Protocol, IMAP, Internet Message Access Protocol, Internet Relay Chat (IRC), ISUP, ISDN User Part, XMPP, LDAP Lightweight Directory Access Protocol, MIME, Multipurpose Internet Mail Extensions, MSNP, Microsoft Notification Protocol, MAP, Mobile Application Part, NetBIOS, File Sharing and Name Resolution protocol, NNTP, News Network Transfer Protocol, NTP, Network Time Protocol, NTCIP, National Transportation Communications for Intelligent Transportation System Protocol, POP3 Post Office Protocol Version 3, RADIUS, Rlogin, rsync, RTP, Real-time Transport Protocol, RTSP, Real-time Transport Streaming Protocol, SSH, Secure Shell, SISNAPI, Siebel Internet Session Network API, SIP, Session Initiation Protocol, SMTP, Simple Mail Transfer Protocol, SNMP, Simple Network Management Protocol, SOAP, Simple Object Access Protocol, STUN, Session Traversal Utilities for NAT, TUP, Telephone User Part, Telnet, TCAP, Transaction Capabilities Application Part, TFTP, Trivial File Transfer Protocol, WebDAV, Web Distributed Authoring and Versioning, DSM-CC Digital Storage Media Command and Control, and other protocols known by those in the art for digital communication between two devices.

Information Transfer Medium for AVLED, Portable Device, or Vehicle and Operator

In one embodiment, the AVLED, system comprising the AVLED, portable device and/or vehicle comprises an information transfer medium that provides information to the operator of the AVLED, operator of the system, operator of the portable device, or operator of the vehicle. In one embodiment, the information transfer medium is one or more selected from the group: display (such as liquid crystal display, organic light emitting diode display, electrophoretic display, projector or projection display, head-up display, augmented reality display, head-mounted display, or other spatial light modulator); display of an image onto one or more surfaces in the environment using an AVLED wherein the light from one or more light sources and/or one or more angular bins is emitted from the AVLED in an a pattern that creates an image, indicia, indicator, or sign on one or more surfaces of the environment; speaker; visible indicator (such as a pulsing light emitting diode or laser, or a light emitting region of the AVLED, portable device or vehicle); and mechanical indicator (such as vibrating the portable device, a seat, or a steering wheel).

In one embodiment, the AVLED, portable device, vehicle, and/or system comprising an AVLED comprises one or more interfaces, control techniques, or methods for interactive user movements or actions for controlling or initiating commands (such as those which can be determined by an imager on an AVLED, portable device, or vehicle or 3D scanner on an AVLED, portable device, or vehicle) selected from the group: head movement, head shake, head nod, head roll, forehead twitch, ear movement, eye movement, eye open, eye close, blink one eye, eye roll, hand movement, clench fist, open fist, shake fist, advance fist, retract fist, voice commands, sip or puff on straw, tongue movement, finger movement, one or more finger movements, extend finger crook finger, retract finger, extend thumb, make symbol with finger(s), make symbol with finger and thumb, depress finger of thumb, drag and drop with fingers, touch and drag, touch and drag with two fingers, wrist movement, wrist roll, wrist flap, arm movement, arm extend, arm retract, arm left turn signal, arm right turn signal, arms akimbo, arms extended, leg movement, leg kick, leg extend, leg curl, jumping jack, body movement walk, run turn left, turn right, about-face, twirl, arms up and twirl, arms down and twirl, one left out and twirl, twirl with various hand and arm positions, finger pinch and spread motions, finger movement (e.g. virtual typing), snapping, tapping hip motion, shoulder motion foot motions, swipe movements, and sign language (e.g. ASL).

Modes of Illumination and/or Irradiation

In one embodiment, the AVLED, illumination and/or irradiation system comprising one or more AVLEDs, portable device comprising an AVLED, or vehicle comprising an AVLED operates in one or modes of illumination and/or irradiation selected from the group: standard occupant; standard non-occupant; predictive; user configurable; socially adaptive; reflective adaptive (adapts to reflectivity of object); ambient light adaptive (adapts to ambient light conditions (sunlight, etc.); energy saving mode-which AVLED (or which bins from a single AVLED best illuminates the space taking into account sunlight and reflections illuminating the environment; multi-fixture network adaptive (which fixture is most efficient at illuminating space) or contribute more/less to light up dark spots; Spatial zone mode, Open loop mode, Color enhancement mode, Luminance/illuminance contrast enhancement mode, High efficiency mode, Sunlight mimicry mode, Specification maintaining mode, Illuminance specification mode, Luminance specification mode, Irradiance specification mode, Radiance specification mode, Relative light output specification mode, Luminance uniformity, mode, Illuminance uniformity mode, Irradiance uniformity mode, Radiance uniformity mode, Color uniformity mode, Spectral uniformity mode, Uniformity mode, Shadow reduction mode, Light reflecting and light emitting object differentiation mode, Predictive illumination mode, Safety and security mode, Environmental monitoring mode, Smoke, heat, or CO detection mode, Tracking and/or Identification mode, Reduced or glare free illumination mode, Reduced light trespass or light trespass free mode, Reduced light pollution or light pollution free mode, Selective warming mode, Socially adaptive mode, Health monitoring mode, Environmental monitoring mode, Entertainment mode, Variable illumination for camera mode, Light field display mode, Light communication mode, Fixture or LED performance evaluation mode, Personal illumination device mode, Projection mode, Window avoidance mode, Circadian adaptation mode, Infrared remote controller mode, Seasonal affective disorder treatment mode, Ubiquitous display mode, Sign, display, or advertising mode, Bactericidal mode, Horticulture lighting mode, Aquacultural or Animal husbandry lighting mode, Human centric lighting mode, Myopia reduction mode, Multi-user mode, Reduced light pollution mode, and Manual lighting mode, where the system with the AVLED may use one or more cameras on one or more AVLEDs or remote to the AVLEDs to create 3D model of the room or environment.

In one embodiment, the AVLED, system comprising one or more AVLEDs, portable device comprising an AVLED, or vehicle comprising an AVLED comprises one or more spatial zones corresponding to one or more areas of surfaces of an environment which can be illuminated and/or irradiated more or less (or not illuminated and/or irradiated at all if desired) by one or more light sources from one or more angular bins from one or more AVLEDs. The spatial zones may be determined automatically (in initial setup, in substantially real time, periodically, or on demand) by the analysis of the environment such as by 3D scanning and/or imaging to isolate specific objects, animals, insect, things, or individuals (such as a couch, piece of furniture, office desk, hallway, hanging picture, vehicle on a road, pedestrian on the road, or sign on the road, for example). The isolation can be determined by one or a combination of color boundaries, luminance boundaries, radiance boundaries, relative intensity boundaries, volumetric shape boundaries (from 3D scanning and/or varying illumination, and/or irradiation, and/or imaging photogrammetry), and user identified or chosen boundaries.

In one embodiment, one or more image sensors in an illumination system comprising one or more AVLEDs actively monitors the environment to adjust the light flux output from one or more light sources in one or more angular bins in one or AVLEDs to actively maintain or optimize for one or more modes of illumination and/or irradiation such a specification maintenance mode or track mode. Each mode of illumination and/or irradiation may have an initial setup or later time period for changing the parameters or values for one or more specifications.

In one embodiment, one or more angular bins and/or corresponding spatial zones for an AVLED operate in a plurality of modes of illumination and/or irradiation wherein the mode priority and/or weighting factor may be set by the user (using a graphical interface on a portable device such as a cellular phone, for example), at the factory, remotely, or automatically determined by a processor on the illumination system comprising the AVLED. For example, in one embodiment a first set of angular bins of an AVLED is configured to operate in a high efficiency mode with a priority weighting of 80 and shadow reduction mode with a priority weighting of 20 and a second set of angular bins different from the first set of angular bins configured to operate in an illuminance specification mode of 500 lux with a priority weighting of 80 and a glare reduction mode with a priority weighting of 20. In one embodiment the priority weighting for each mode is on a relative scale, such as 1 to 100, where a weighting of the highest value, such as 100, means that the mode requirement or specification is optimized or met before other modes are considered, and scales less than the maximum value, such as less than 100, are relative weightings relative to the other modes (such as priority weighting of 90 will be prioritized or weighted twice as much as a mode with a priority weighting of 45).

For any of the modes of illumination and/or irradiation disclosed herein, the spatial zone information, desired output or setup configurations, parameters for the particular zone, 3D spatial arrangement, frequency of update (frequency of angular cycling), resolution of the angular output, angular range of the AVLED light output, mode priority for one or more spatial zones or angular bins, or other configuration of one or more AVLEDs (including priority and priority of indirect illumination preference) may be stored in one or more AVLEDs or on a central device in electrical or wireless communication with one or more AVLEDs on a non-transitory computer-readable storage media. In some embodiments, preferences for a particular individual entering the environment may be read from a device on the individual and/or from a server, possibly after identifying the individual (or the individual's preferences, such as preferring a white color temperature less than 3000 Kelvin). In one embodiment, an AVLED or system comprising an AVLED utilizes one or more lighting control options or modes selected from the group: on/off, dimming, scene control, photosensor dimming, photosensor switching, occupancy control, and time control. Controlling one or more light fixtures using these control options, the hardware and setup required, options, features, protocols, layouts are described in The Lighting Handbook, IES $10^{th}$ Edition, Chapter 16, Lighting Controls, the contents are incorporated by reference herein, and can be incorporated into an AVLED and/or system comprising an AVLED.

Spatial Zones—Automatically Determined or User Definable

In one embodiment, the AVLED, system comprising one or more AVLEDs, portable device comprising an AVLED, or vehicle comprising an AVLED, comprises an interface, such as a display with a touchscreen, wherein a user can select one or more spatial zones (areas of one or more surfaces of an environment) where the illumination and/or irradiation may be controlled or changed. In one embodiment, the illumination and/or irradiation from an AVLED can be controlled to provide one or more specific illumination and/or irradiation properties selected from the group: illuminance (or alternatively a relative intensity or luminance for the surface based on the illumination), irradiance (or alternatively a relative intensity or radiance for the surface based on the irradiation) color or spectral illumination and/or irradiation (from one or more AVLED light sources with different spectral output corresponding to different colors, wavelengths, or from an optical element or AROE that separates light from a broadband source into different spectral bands such as a diffractive element, for example), illumination and/or irradiation from a particular angular bin from a particular AVLED or set of AVLEDs, and illumination and/or irradiation from a particular AVLED or set of AVLEDs (such as choosing a set of AVLEDS and/or angular bins of AVLEDs that will not generate glare that would reach the user's eyes for normal (automatically determined or manually input) positions of the user in the environment).

For example, in embodiment, a user on a smartphone viewing an image of the environment, such as room, on the display may tap one or more regions of the image (or optionally zoom in using two fingers, for example) to select the region to define the zone for changing the illuminance properties (such as increasing the illuminance or changing the color of illumination). The user may also choose which AVLED illuminates and/or irradiates the spatial zone or which mode of operation to use for the illumination and/or irradiation. In this embodiment, the user may select one or more spatial zones to form a group for illumination and/or irradiation under one or more criteria of one or more operational modes. In one embodiment, as the users finger hovers near a region of the display, or touches a region of the display, the outline of a defined object, individual, animal, or thing is shown on the display such that the boundaries of the spatial zone is defined. For example, in one embodiment, the user touches on the region of the display corresponding to a desk, the display adds a blinking red line outlining the desk from the perspective of the camera or viewer and the user taps the region again to confirm the selection of the desk, and following a follow-on prompt, selects to increase (or decrease) the illuminance and/or irradiance to a specific value (or sets the spatial zone for an anti-glare illumination mode, and/or sets the spatial zone for an energy efficient illumination mode or other mode disclosed herein). In one embodiment, a user interface for one or more AVLEDs comprises a verification event button or trigger to output light flux (such as light flux output at a high level and constant for a predetermined period of time or blinking on-off-on-off, etc. light output) into all of the selected angular bins or spatial zones identified by the user (optionally for one or more modes of illumination and/or irradiation). In one embodiment, the user selects an object, individual, or animal that is moving or can move and the one or more AVLEDs track the movement and provide illumination to the object, individual, or animal while it is moving from one or more light sources in one or more angular bins from one or more AVLEDS. In one embodiment, the camera used to view the environment and select and/or modify the illumination and/or irradiation properties is on a portable device or vehicle. In a further embodiment, the environment is viewed in real-time (as in a live view) such that the user selects the region of the display while the user can re-position or orientate the camera, providing a virtual window or region selection. In another embodiment, the source of the image, video, live-stream, or view displayed to select the zone is from one or more imagers positioned remotely from the portable device, on one or more AVLEDs, on a head-worn device, and the 3-D information from a scanner or other technique disclosed herein identifies the spatial region to be illuminated and/or irradiated by one or more light sources from one or more angular bins of one or more AVLEDS. In one embodiment, a network or system comprises one or more AVLEDs and one or more control devices wherein the view from one or more imagers on the control device and/or the one or more AVLEDs are mapped to a three-dimensional space such that the spatial zones can be view, identified, and/or illuminated and/or irradiated by the one or more AVLEDs. In one embodiment, the selection of one or more regions for a zone includes gesturing toward the region (such as pointing at the region). For example, a user could start a zone identification mode and point to a region or space to be identified as being within a zone and an AVLED on the ceiling of a room comprising an imager could identify the direction the user is pointing (optionally by using additional information from or more 3D scanners or imagers on other AVLEDs). Since it is difficult to determine the exact vertical direction (polar angle with the user at the origin) using a camera above the user (at a polar angle of 0 degrees, for example) when a user is pointing to a region in the environment, the AVLED above the user with the imager and/or other AVLEDs with imagers may cycle through the one or more light sources in one or more angular bins to determine the polar angle and/or azimuth angle by analyzing the light field illuminating and/or irradiating the finger of the individual (or arm) and/or the shadows created by the angular variations. In this manner, a single AVLED with a single imager can determine spatial and/or angular information of objects, or individuals, or other things in a room by changing the angle of incidence for direct illumination, direct irradiation, indirect irradiation, or indirect illumination and examining the effects of the illumination and/or irradiation of the objects, individuals, or other things and/or their corresponding shadows and calculating the angles from the 3D spatial information including the position of the AVLED and position of the object or individual of interest relative to the AVLED, and optionally other information from 3D scanner, for example. In one embodiment, the AVLED, system comprising one or more AVLEDs, portable device comprising an AVLED, or vehicle comprising an AVLED comprises a 3D scanner, LIDAR scanner, structure from motion sensor, imager and photogrammetric image processing capabilities such that the position and orientation of a gesture motion can be determined with sufficient resolution to identify a region of space identified by the user to be added to a spatial zone for illumination and/or irradiation.

One could use a laser pointer to illuminate region to identify it for a spatial zone. One could enter into a "Learn mode" linked to sensor (such as an imager) in communication with an AVLED or fixture for adjusting the light output. One could indicate to illuminate a specific object for a spatial zone (a painting, sink area, reading area, etc.), the illumination and/or irradiation properties or change in illumination and/or irradiation could be automated, in response to trigger event for example, such as using SmartThings hub by Samsung and an IFTTT (If This Then That) routine through an iftt.com server. In on embodiment, the user can design his/her illuminance and/or irradiance preferences and/or other light properties for each spatial zone, set of times, for any time of day, or relative region such as indicate to illuminate 10 meters around me, all pathways, etc. all day. (personalized illumination profile). One could illuminate only aspects of landscape lighting that one wants. The user could changeable illumination profile to eliminate/reduce hot spots send more or less light here than there, make something more or less red (highlight an object from one image and change the color of it using output from one or more AVLEDs), increase color saturation in a zone, reduce color saturation in a zone. One could manually adjust illumination of one or more zones using one or more light sources from one or more zones from one or more AVLEDs to reduce and/or eliminate glare by, for example, using a walk through glare reduction mode while looking at AVLED light fixtures to detect eyes via retroreflection and reduce or turn off appropriate illumination automatically or manually. In one embodiment, an AVLED comprises a plurality of angular bins illuminating a corresponding plurality of spatial zones wherein the light flux output for one or more light sources and/or the light flux output for the corresponding plurality of angular bins are adjusted independently accordingly to different illumination and/or irradiation modes. In one embodiment, an AVLED is configured to provide a high efficiency mode for a plurality of angular bins within 40 degrees from the device axis (and the corresponding plurality of spatial zones) and a reduced or glare free illumination mode for a plurality of angular bins (and the corresponding plurality of spatial zones) greater than 40 degrees. In one embodiment, a first mode of illumination and/or irradiation (or a first set of modes of illumination and/or irradiation) extend across a first plurality of angular bins (and corresponding spatial zones) from an AVLED and a second mode of illumination and/or irradiation (or a second set of modes of illumination and/or irradiation) extend across a second plurality of angular bins of the AVLED wherein the first plurality of angular bins do not overlap angularly or partially overlap angularly. For example, in one embodiment, an AVLED is configured to provide a high efficiency mode for a first plurality of angular bins within 80 degrees from the device axis (and the corresponding plurality of spatial zones) and a reduced or glare free illumination mode for a second plurality of angular bins (and the corresponding plurality of spatial zones) greater than 40 degrees from the device axis. In this example, the second angular bins may prioritize the reduced or glare free illumination over the high efficiency mode. In one embodiment, a user may program one or more AVLEDs to illuminate a pathway in a pathway illumination mode with a first light property (such as illuminance less than 50 lux, and optionally illuminating using light of a first color such as red light from red LEDs) in the overnight hours upon detecting motion from one or more individuals such as to light a pathway from one room to another without great loss of night vision. In this embodiment, a user could, for example program an AVLED by drawing a line from their bed to the bathroom and/or to their child's room door on a display with a touchscreen displaying a plurality of images from imagers on a plurality of AVLEDs such that when a first imager detects motion late at night, the pathways light up while keeping other areas at a low illuminance (such as at 0 lux or less than 2 lux, for example). In one embodiment, the pathway illumination is predictive and may optionally turn on or off ahead, or behind, respectively, the individual as they move along the path. In one embodiment, one or more AVLEDs or an illumination system comprising one or more AVLEDs identifies one or more individuals for providing illumination and/or irradiation specific to the individual by facial recognition using one or more imagers (optionally on one or more AVLEDs), identification of a mobile device or portable device (such as smartphone, smartwatch, virtual reality headwear, augmented reality headwear, personal illumination device, portable AVLED, or other portable computing device), or device identification (such as due to a radiofrequency broadcast device name over Bluetooth and/or IEEE 802.11 protocol using Wi-Fi) associated with the individual within the environment (optionally at a specific location within the environment), or other visible or electronic tag, or article of clothing.

In one embodiment, one or more AVLEDs adjusts the light flux output for one or more light sources and/or the light flux output for the corresponding plurality of angular bins is adjusted to change the perceived color (or luminance or other light property) of one or more spatial zones, regions, surfaces, rooms, or environment by selectively (automatically or manually identified) illuminating some surface more than others to increase/decrease reflected light from the surface that has a color (or white), for example, to make room appear to have a warmer color temperature (lower correlated color temperature). For example, the AVLED could provide a higher illuminance of white light with a cool color temperature on a light brown wood floor than on a white wall such that more light is reflected from the floor onto the wall where the perceived color temperature of the wall is reduced due to the floor reflected light comprising relatively less light flux with blue wavelengths due to absorption from the floor (as opposed to direct, cooler color temperature, white light illumination of the wall). In one embodiment, dark, black or objects that absorb more than 50%, 60%, 70%, or 80% of light from a first spectrum band are illuminated with light comprising the first spectrum band such that when an individual, object, hand, etc. passes over the dark, black, or absorbing object, it is sufficiently illuminated. For example, one may provide a higher luminance on a black, dark brown, or dark gray floor than an adjacent white wall in a home in an entertainment illumination mode such that the lower luminance of the light reflected from the floor does not interfere with watching a television in the room, yet one can readily see one's foot and/or objects on the floor while walking on the floor due to the higher relative illuminance.

Open Loop or Closed Loop Mode

In one embodiment, a system comprising one or more AVLEDs or an AVLED comprises one or more light sources and one or more light sensors measuring incident light from the environment (integrated over an angular range or light from one or more angular bins measured independently) wherein the light output from one or more AVLEDs operates in a closed-loop or open loop mode. As used herein, a closed loop mode is a mode where information or feedback from sensors and targets (such an illuminance and/or color target) are directed to the system or AVLED. As used herein, open loop mode energy consumption requirements and the desired target illuminance can be analyzed to calculate the light output needed from the one or more AVLEDS or the system before sending the instructions to the AVLEDs or the system.

In one embodiment, a system comprising one or more AVLEDs or an AVLED comprises one or more light sources and one or more light sensors measuring incident light from the environment (integrated over an angular range or light from one or more angular bins measured independently) wherein the light output from one or more AVLEDs operates in a closed-loop mode such the total light output or average light output (full light output closed-loop mode where all angular bins emit light with substantially equal light flux output and each light source output is increased or decreased substantially the same) or average light output closed-loop mode (varied light output for different angular bins, each increased or decreased proportionally) is independently adjusted for each AVLED based on a target illuminance and/or color for the environment and one or more measurements from the one or more light sensors. In one embodiment, a system comprising one or more AVLEDs or an AVLED comprises one or more light sources and one or more light sensors measuring incident light from the environment received by the sensor from one or more angular bins wherein the light output from one or more AVLEDs operates in a closed-loop mode such the light output in two or more angular bins (angular bin output closed-loop mode) is independently adjusted for each angular bin and each AVLED based on a target illuminance and/or color (such as a personally chosen target based on personal preferences, based on specifications or requirements, or based on energy savings preference) at two or more locations corresponding to the two or more angular bins, respectively, in the environment.

In one embodiment, energy consumption from the one or more AVLEDs and/or the desired light field are taken into account to generate the illumination configuration before sending the commands to light sources. In one embodiment, in a closed-loop illumination mode, the illumination of zones are calculated and/or measured from feedback from one or more sensors or imagers on one or more AVLEDs or remote from an AVLED and the illumination properties for the desired or required illumination are generated for the one or more light sources from one or more angular bins of one or more AVLEDs based on the one or more modes of operation and sent to the one or more light sources of one or more angular bins of one or more AVLEDs.

Color Enhancement or Efficiency

In one embodiment, an AVLED comprises a spectrometer that receives ambient light from an AROE or scanner (that may also redirect light as an AROE for a light source array and/or redirect light toward a light sensor or imager) in one or more angular bins such that the spectral properties of light from a first angular bin can be determined. In this embodiment, when the spectral properties of the illumination light onto an object or surface are known, estimated, or measured (such as by the spectrometer measuring the light output from another AVLED through a second angular bin of the AVLED comprising the spectrometer different from the first angular bin) such that the color of the illuminated surface can be determine by evaluating the spectral reflectance properties. In this embodiment, where the spectral reflection properties (or color) of an object or surface indicate that the object absorbs a first threshold percentage of the incident light greater than one selected from the group: 30%, 40%, 50%, 60%, 70%, 80%, 90%, or 95%, less light or no light within the spectral bin from an AVLED can be directed toward the object in order to reduce unnecessary illumination (to save energy, and/or to enhance saturation of the color of the object or surface), optionally using assumptions such as spectral reflectance invariance over angle.

AVLED or system comprising an AVLED could detect light level and possibly color of reflected light in a room and compensate for color or enhance color. For example, if there is a blue carpet, more energy could be saved by not directing as much red light onto the carpet. Or if there is a red couch, the AVLED could emit more red light than a normal white balance of a specific color temperature in the corresponding angular bin for the couch while when no one is sitting on it and substantially white light could illuminated the couch when someone is on it so they can read in full white illumination. One could determine one or a set of spatial zones based on color differences in image (pixels), or (luminances on surfaces) then increase saturation of the zone, set of zones or entire environment and it the AVLED could do this automatically. Alternatively, one could similarly increase contrast one or more objects or individuals of a room by changing the color or illuminance, or other illumination property or reduce the contrast in an area by increasing the illuminance in one or more shadow regions.

In one embodiment, an AVLED or a system comprising an AVLED cycles through illumination from different light sources and/or angular zones and uses an imager (such as an imager on the AVLED) to determine the relative or absolute luminous reflectance and/or spectral reflectance of the object or individual in the environment. In this embodiment, the AVLED or system could determine if an object was substantially black by cycling through the illumination from one or more light sources from one or more angular bins of one or more AVLEDs, and optionally reduce the illumination of the black item, zone or region to increase the contrast and optionally to save electrical energy. In this embodiment, an imager on the AVLED or in communication with the AVLED could monitor the environment (optionally in real-time or a predetermine frequency, or use imagers to detect motion to signal a need for re-measurement, for example) and identify a change in one or more light properties passing a threshold and change the light flux output for one or more light sources in one or more angular bins in one or more AVLEDs based on the change. For example in the above example of a identifying if an object was substantially black (or dark such as cherry wood color) and the AVLED directed less light to the black (or less blue color to the dark red wood, for example) to conserve energy and an imager detected a change in a light property (such as a surface or spatial zone had a brighter surface (higher luminance, higher relative intensity, higher radiance, for example) where previously it was a black or dark surface, the AVLED could adjust the light output according to one or more modes or instructions (such as increasing the light flux output of light source corresponding to the angular bin and spatial zone where the increase in intensity was detected. Thus, in this embodiment, for example, the AVLED could direct less or a relatively low illuminance to a dark desk, and when a white paper is placed on the desk, more light could be directed toward the white paper for reading, if the AVLED was operating with an illuminance specification mode (primary mode) of 500 lux for reading tasks (where reading task locations may be automatically identified (such as desk recognition and/or facial recognition) and/or manually identified by the user for the desk, table, chair, couch, etc., for example) with a higher priority and/or weight than the energy savings (mode secondary mode) for the AVLED. In one embodiment, the AVLED and/or system comprising an AVLED could identify an individual near a reading task spatial zone (and/or identified reading task object or angular bin) and increase the illuminance to the illuminance target threshold (such as 500 lux) for the reading task spatial zone (and/or identified reading task object or angular bin). In this embodiment, when the user departs from (or has not yet arrived at) the reading task spatial zone (and/or identified reading task object or angular bin) one or more AVLEDs could decrease the light flux output from one or more light sources and/or one or more angular bins below the target illuminance threshold for a reading task since the individual is not there to read anything. In one embodiment, an AVLED adjusts the light flux output from one or more light sources and/or one or more angular bins based on the presence and/or absence of an individual or object identified by an imager or other sensor (such as occupancy sensor, proximity sensor, or motion detector, for example). In another embodiment, one or more AVLEDs adjusts one or more selected from the group: light flux output of one or more light sources; light flux output in one or more angular bins; an operational parameter; a specification target value for one or more light properties; a threshold specification value for one or more light properties; the on/off state of one or more modes of illumination and/or irradiation; and changes a relative priority and/or weighting of one or more modes of illumination and/or irradiation, based one more selected from the group: the presence and/or absence of an individual or object; light property of one or more surfaces and/or the environment reaching a specific value (such as upper luminance/illuminance/relative intensity threshold or lower luminance/illuminance/relative intensity threshold); and/or a change in light property of one or more surfaces and/or the environment reaching a specific value, identified by an imager or other sensor (such as occupancy sensor, proximity sensor, or motion detector, for example).

In one embodiment, an AVLED or a system comprising an AVLED, portable device comprising an AVLED, or vehicle comprising an AVLED uses angular cycling with different light colored light sources or different spectral light output (from a diffractive AROE, for example) to increase color performance (increase saturation and/or contrast), increase efficiency (sending less light where most of it (or a particular flux) where it would be absorbed), and/or increase color rendition. In one embodiment, the spectral content of the light is adjusted to maintain the color point, while reducing one or more wavelength bands (or corresponding light output from one or more sources).

For example, at the pixel level of an imager on an AVLED, if the illumination of a pixel detects a relative intensity of red greater than a first value, then the AVLED can illuminate the angle corresponding to that pixel with red at first intensity level and blue at an intensity level less than that which would generate white light illumination for that angle (for a given ambient color temperature or predetermined or default color temperature).

The AVLED or system with an AVLED could map the image pixels to set of angular bins (and/or corresponding light sources) and use angular cycling, to determine relative intensity (where the setup or calibration mode is preferably in the dark) from each color at each angle (with or without mapping 3D shape of room). The AVLED system could allow overrides, allow one to change saturation of room, or it could sync illumination properties to the camera worn on person (such as on a head-worn display, HMD, or augmented reality headset, for example) to illuminate what they can see based on their orientation and optionally eye tracking or gaze tracking. In one embodiment, an AVLED comprises an imager (or a system comprising the AVLED comprises an imager) that monitors and/or tracks the movement of individuals and/or movement of the eyes of one or more individuals and identifies the object, region, or spatial zone frequently, occasionally, and/or currently viewed by the individual and determines based on the identification of the object and viewing parameters if the object, region, or spatial zone should be illuminated for a longer period of time, more often, and/or with a higher illuminance than neighboring regions or previous predictions of illuminance values. The AVLED or system could also remove glare to the person detected by the imager. The AVLED or system comprising the AVLED could cycle through angles/colors/fixtures to map out objects, illumination profiles from one or more light sources (and optionally different colored light sources), from one or more angular bins, from one or more AVLEDs to create a spatio-angular spectral illuminance map for each light source of each angular bin of each AVLED in the system (and optionally non-AVLED light emitting devices) collectively referred to herein as a "light field map." Where the color information is not collected (such as by only illuminating with white light source(s), the collection of illumination profiles may still be referred to as a "light field map" and the imager may collect relative intensity and optionally color information.

The AVLED or system comprising the AVLED could determine and optimize the light output (to reduce energy consumption) by prioritizing direct illumination of a spatial zone over a less efficient indirect illumination mode where possible (such as where shadows prevent direct illumination of a specific zone from a specific AVLED). The AVLED could use the light field map to take into account indirect lighting (such as illuminating the ceiling or wall) such that the reflected light illuminates the zone which needs more illuminance according to one or more modes of operation of the AVLED or system comprising one or more AVLEDs.

The AVLED or system comprising one or more AVLEDs could be configured to provide increased or a predetermined luminance contrast (or illuminance contrast) and/or color contrast between two or more regions or spatial zones of an environment. For example, an object such as pole positioned along a busy pathway may be illuminated to provide a higher luminance contrast with the surrounding area and the illumination may also provide an increased (or take into account) color contrast such that the pole is more visible or has an increased visibility or contrast such that fewer people may accidentally hit the pole. Similarly, items, objects, or individuals of interest/importance may be illuminated with increased color and/or illuminance (highlighted) contrast with neighboring regions, such as in a safety or security illumination mode, in the event of a fire (illuminating a door), for example.

In one embodiment, an illumination system comprising an AVLED and imager (optionally with the imager located on the AVLED) identifies the relative proportions of red, green, and blue reflected light from one or more surfaces, regions, and/or spatial zones (such as by angular cycling and/or adjusting the light flux output from two or more light sources with different spectral light properties (such as a red, green, and blue micro-led in a micro-LED spatial array light source) and the AVLED emits relative light flux output from the corresponding colored light sources to provide illumination wherein the color of the illuminating light is substantially the same as the color of the surface, region, and/or spatial zone when illuminated with white light. In this embodiment, by using non-white illumination of a colored object, the color perceived color of the surface, region, and/or spatial zone may remain the same and/or the perceived saturation of the color may optionally be increased.

In one embodiment, the AVLED emits different light from different colored light sources into a single angular bin (such as red, green, and blue light), the flux ratios and total flux output could be maximized to maintain the correct CIE 1976 Uniform Color Scale u'v' color coordinates of the corresponding object, region, or spatial zone when illuminated with a white or other light source from one or more AVLEDs. For example, a white broadband light source from an AVLED could illuminate the object or region of interest directly (such as by only emitting light flux into the angular bin corresponding to the object (or by emitting 20, 30, or 40 times or more light flux than in adjacent angular bins) such that the reflectance spectrum and/or the color coordinate may be determined. In this example, any potential issues related to colored illumination that might occur with a substantially isotropic or wide angle sources (such as an LED bulb only providing wide angle diffuse lighting) illuminated a blue wall, for example such that the reference illumination is not standard or known is reduced or eliminated.

Sunlight Mimicry Mode

The system could measure and repeat color temperature (measure when the AVLED is off or between illumination periods or pulses) and/or measure on a surface opposite identified window. The AVLED could not only mimic the color but mimic sunlight coming through window, by only illuminating spatial zones that mimic the bright direct sunlight passing through a window and the spatial zone location could change (by changing the light output from the corresponding angular bins) to mimic the movement of the sun across the window or sky. The AVLED could also illuminate a screen or diffuser or other optical element such that the reflected light appears to be the color of the sky and it can change as the sky would change over time as the sun would rise or set. In one embodiment, one or more AVLEDs may simulate the visible light from sunlight through a real or simulated window in an environment (or even absent a simulated or real window), and optionally the same or a separate AVLED may provide infrared illumination to the region (or optionally to the region when an individual is detected in the region) to simulate the warmth due to solar radiation. In one embodiment, an AVLED or system comprising an AVLED comprises a photosensor that detects the color temperature (or approximate color temperature) of ambient light illumination (that may be automatically, or manually identified to be sunlight and the color of the light from one or more light sources in one or more angular bins is adjusted to match the color of the ambient light illumination (such as sunlight). In one embodiment, an AVLED records the changes in ambient light due to sunlight and emits light from angular zones that correspond to where the sun would illuminate the room (the same locations as identified and/or predicted paths of sunlight for a future day) when the sun illuminating the room or to enhance the illumination by the sun. Thus, for example, the color of light and light output in different angular bins of the AVLED could mimic the path and/or color of sunlight on a sunny day when it is actually a cloudy day, nighttime, winter in northern region of the globe, when the curtains are closed, or even in a room without windows (where the path could be selected, estimated based on a hypothetical window location, for example). In one embodiment, an AVLED that mimics sunlight is positioned adjacent a window, on the exterior of a window, on the interior of a window. In one embodiment, an AVLED or system comprising an AVLED comprises a beam splitter (such as a dichroic coating, partial or 50% mirror coating, reflective polarizer, optical fold due to total internal reflection from a surface of a lens, and/or optical film beamsplitter) such that when the beam splitter is positioned adjacent a window a portion of the light from outside of the window transmitting through the window transmits through the beamsplitter into the interior environment and a portion of the light output from the AVLED reflects from the beamsplitter into the environment such that it overlaps with light from the exterior (or would overlap if there is no light from the exterior such as at night). In this embodiment, for example, an AVLED could be placed just inside and adjacent the transparent portion of a window (such as a skylight or window on wall) and mimic sunlight illuminating the interior environment even on a cloudy day or at night.

Specification Maintaining Mode

During install or otherwise in use, one could have the AVLED have trigger a detector (or means for triggering and detector) corresponding to one or more determined measurement locations (spatial zones) and cycle through intensities (optionally color) by angular cycling to examine different scenarios (light properties), optionally using the light field map, for meeting or optimizing for specifications such as a specification set at install, set remotely, set by a user, or set to meet illumination building code requirements, for example (and optionally allow for lumen maintenance factor, say 10%, for example), and determine the optimal one or more light sources (and their corresponding light flux output) from one or more angular bins from one or more AVLEDs to use to meet or optimize for the requirements or specification in one or more specification maintaining modes selected from the group: illuminance specification mode, luminance specification mode, irradiance specification mode, radiance specification mode, luminance uniformity mode, illuminance uniformity mode, irradiance uniformity mode, radiance uniformity mode, color uniformity mode, and spectral uniformity mode. Each of the specification maintaining modes may have a specification (or target) minimum, maximum, or average for one or more spatial zones or angular bins.

The illuminance specification mode could be enabled such that building codes for illumination were met or optimized while enabling other features, or illumination modes for example. The illumination and/or specification or rules for the mode could be based on activity of one or more individuals (even simultaneously two different activities) such as reading, exercising, cooking, patrolling a security perimeter, or sleeping for example) and the imager and/or scanner on one or more AVLEDs, system comprising one or more AVLEDs portable device, or vehicle could analyze information to automatically determine the activity and adjust one or more light sources (and their corresponding light flux output and/or color output) from one or more angular bins from one or more AVLEDs to use to meet the requirements or specifications. In one embodiment, the output of one or more AVLEDs is adjusted such that the difference in illuminance between two or more regions or zones (which may be next to each other) is less than one selected from the group: 100, 50, 30, 20, 10, 5 and 1 lux.

Luminance, Radiance, or Relative Intensity Specification Mode

During install or otherwise, one could have the AVLED trigger a detector (or means for triggering a detector) at determined measurement locations and cycle through light flux output (luminous intensities or radiant intensity, optionally different colors) by angular cycling to examine different scenarios using the light field map for meeting a specification for luminance, radiance, or relative intensity (or estimated illuminance, estimated irradiance, or estimated relative light output) for two or more spatial zones in an environment (such as neighboring zones) and determine the optimal one or more light sources (and their corresponding light flux output) from one or more angular bins from one or more AVLEDs to use to meet the target specification (with optimum uniformity or meeting the specification with utilizing the lowest electrical power, for example). In some embodiments, the specification for one or more spatial zones may not be able to be achieved using the illumination system. In some embodiments the specification may be considered a target to optimize. The luminance specification mode, radiance specification mode (or illuminance specification mode, irradiance specification mode, or relative light output specification mode) could be enabled such that the target or specification was met while enabling other modes of illumination and/or irradiation, for example. The luminance specification (targeting a matching of the luminance to a specification) mode or illuminance specification mode or rules for the mode could be based on activity of one or more individuals (even simultaneously two different activities) such as reading, exercising, cooking, patrolling a security perimeter, or sleeping for example) and the imager and/or scanner on one or more AVLEDs, system comprising one or more AVLEDs portable device, or vehicle could analyze information to automatically determine the activity and adjust one or more light sources (such as their corresponding light flux output and/or color output) from one or more angular bins from one or more AVLEDs to use to meet the luminance specification.

Uniformity Modes

In one embodiment, the AVLED may be in a substantially uniform luminance mode, uniform illuminance mode, uniform relative intensity mode, or uniform color illuminance mode and the difference in average luminance, average illuminance, average relative intensity, or CIE 1976 (L*, u*, v*) color space Δu'v' color difference of illumination from a first region (or first spatial zone) to a second region (or second spatial zone) immediately next to (adjacent) the first region (or first spatial zone) is less than one selected from the group: 100, 50, 30, 20, 10, 5 and 1 Candela per square meter; 100, 50, 30, 20, 10, 5 and 1 lux; 50%, 40%, 30%, 20%, 10%, 5%, 2%, and 1%; and 0.5, 0.4, 0.3, 0.2, 0.1, 0.05, 0.01, 0.008, 0.006, 0.004, and 0.002, respectively. In one embodiment, the AVLED may be in a highlighting mode, emergency mode, entertainment mode, high color saturation mode, variable illumination for a camera mode (providing desired or different illumination in the foreground, background, or for one or more individuals and/or objects), or other mode and the difference in average luminance, average illuminance, average relative intensity, or CIE 1976 (L*, u*, v*) color space Δu'v' color difference from a first region (or first spatial zone) to a second region (or second spatial zone) immediately next to (adjacent) the first region (or first spatial zone) is greater than one selected from the group: 100, 50, 30, 20, 10, 5 and 1 Candela per square meter; 100, 50, 30, 20, 10, 5 and 1 lux; 50%, 40%, 30%, 20%, 10%, 5%, 2%, and 1%; 0.5, 0.4, 0.3, 0.2, 0.1, 0.05, 0.01, 0.008, 0.006, 0.004, and 0.002, respectively. In one embodiment, the AVLED is in a uniform radiance mode, uniform irradiance mode, or uniform spectral irradiance mode and the difference in average radiance, average irradiance, or average spectral irradiance of light to or from a first region (or first spatial zone) to a second region (or second spatial zone) immediately next to (adjacent) the first region (or first spatial zone) is less than one selected from the group: 1,000, 500, 100, 50, 30, 20, 10, 5 and 1 watt per steradian per square meter for a first wavelength band of interest; 1,000, 500, 100, 50, 30, 20, 10, 5, 1, 0.5, and 0.1 watt per square meter; and 1,000, 500, 100, 50, 30, 20, 10, 5, 1, 0.5, and 0.1 watt per square meter per nanometer for a first wavelength band of interest. In one embodiment, the output of one or more AVLEDs is adjusted such that the difference in luminance between two or more regions or zones (which may be next to each other) is less than one selected from the group: 100, 50, 30, 20, 10, 5 and 1 Candela per square meter.

Shadow Reduction Mode or Shadow and Dark Object Differentiation

As described above and herein, the one or more AVLEDs, system comprising one or more AVLEDs, portable device comprising an AVLED, or vehicle comprising an AVLED can be used to reduce the shadows in the environment from one or more AVLEDs, one or more light fixtures, or external light sources such as the sun, other vehicles, flashlights, portable lighting device, etc. by using angular cycling the one or more AVLEDs, creating a light field map, and illuminating the shadow region or zone using the optimum one or more light sources (and their corresponding light flux output) from one or more angular bins from one or more AVLEDs. In one embodiment, a processor on one or more AVLEDs or on the network could determine the optimum AVLED/light source/angular bin to use to increase flux incident on the shadow region of the environment (optionally based on reference measurements, calibration, and/or angular cycling, optionally determined in real time (through substantially real-time angular cycling at frequencies higher than 50 hertz or 60 hertz) or at predetermined intervals. In one embodiment, one or more AVLEDs operates in a shadow reduction mode wherein information from two or more imagers (or a single imager capturing images at two different locations) in a system comprising an AVLED is used to identify one or more shadow regions and adjust the light flux output from one or more light sources in one or more angular bins from one or more AVLEDs to increase the illuminance of the shadow region. In one embodiment, a shadow reduction mode is part of an illuminance (or luminance) specification maintenance mode and/or uniformity mode where the illuminance (or luminance) and/or luminance or color uniformity, respectively, is specified for all or specific spatial zones and/or surfaces.

In one embodiment, a system comprises at least one AVLED and one or more imagers that images an environment and the system (or component thereof such as a processor on an AVLED) compares the luminance, color, estimated color and/or estimated illuminance of two neighboring regions (or spatial zones) (and optionally increase the brightness if needed) to determine if a shadow is present, and directs more light flux output from one or more light sources in one or more angular bins in one or more AVLEDs that illuminate directly and/or indirectly the shadow in a shadow reduction mode, thus not just sending more light to dark areas (which could end up trying to light up dark objects). The angular cycling and imaging process could be used to differentiate between a shadow and dark object (such as a black object) because a black/low reflectance object would remain substantially black (have a low reflectance and/or corresponding low intensity level in the corresponding pixels of the imager) from all (or most) illumination angles, whereas a shadow would move depending on the angle of illumination and thus the region corresponding to a shadow (low relative and/or absolute luminance and/or radiance) from one illumination from one AVLED would have a higher relative and/or absolute luminance and/or radiance from a second AVLED illuminating the region of interest from a different illumination angle. In some configurations, illumination from one or more angular bins from three or more AVLEDs are needed to differentiate between shadows and dark objects. In another embodiment, a combination of one or more indirect illumination angular bins and optionally a direct illumination from an angular bin from one AVLED is used to differentiate between a shadow and dark object. In one embodiment, a plurality of AVLEDs provide illumination to an environment from one or more angular bins from each of the plurality of AVLEDs, wherein an imager (on one or more of the AVLEDs or external to the AVELDs) images the environment under the illumination from the one or more angular bins such that a shadow is differentiated from a dark object (which may have a relatively low reflectance for the wavelengths of light illuminating the environment from the one or more AVELDs). The differentiation of a shadow from a dark object may utilize spatial three-dimensional data derived from one or more sensors as disclosed herein. For example, if the spatial three-dimensional data for surfaces and/or objects in the room determine a tall structure adjacent a wall, a higher level of certainty may be obtained for differentiating the low luminance region behind the tall structure when illuminated by an AVLED imaging the structure, external light source, or other AVLED, for example, as a shadow as opposed to a region of the wall with a reflectance less than 10%, for example.

In one embodiment, one or more shadow zones are identified in a shadow reduction mode by comparing measured and/or calculated light properties in regions or spatial zones to target light properties to determine the difference between the light property values measured and/or calculated and the target light property values (such as target luminance, target radiance, target relative intensity, target illuminance, target irradiance, target color uniformity, target spectral uniformity, etc., based on one or more of user input, user adjustable threshold, minimum, predetermined value, user adjustable threshold, or other mode of illumination and/or irradiation, such as luminance uniformity mode, illuminance uniformity mode, minimum luminance mode, or minimum irradiance mode, for example), thus identifying one or more shadow zones based on the difference in light property values from the target light properties values (such as the difference in light property values meeting a threshold value) and determining the increase in light property values needed for one or more shadow zones to meet the target light properties or the difference in light property values to be less than a threshold difference in light property values. In one embodiment, identification of the shadow zones includes differentiating between shadows and dark surfaces (surfaces with an average spectral reflectance across the wavelengths of interest less than one selected from the group of 40%, 30%, 20%, and 10%) such that dark surfaces are not evaluated or treated/compensated as shadow zones for reduction (i.e. the light flux in angular bins corresponding to the dark surface is not increased to try to reach the target light property). In one embodiment, an angular cycle is performed for one or more AVLEDs with a predetermined light flux output (based on other mode or user setting, or historical calculation of light flux output for target light properties, for example) or using a light flux output sweep, and corresponding light properties are measured and compared at a plurality spatial zones, each spatial zone, or each region, for the light from one or more light sources from two or more angular bins in one or more AVLEDs using one imager or two or more imagers on one or more AVLEDs, portable devices, or vehicles which may be remote from each other to determine or estimate the change in light properties. In one embodiment, angular cycling measurements, such as previously performed angular cycling measurements, are used to determine shadow zones. In one embodiment, the optimum AVLED(s), angular bin(s), light source(s), and light source flux output for one or more light sources is determined to illuminate the shadow zone. In one embodiment, the light flux output needed from the one or more light sources in one or more angular bins of one or more AVLEDs is calculated to increase the luminance, radiance, relative intensity, illuminance, irradiance to reach the target light properties for a first shadow zone. For example, in one embodiment, a shadow zone created due to a table creating a shadow on the floor when illuminated by light from a first AVLED downlight can be identified by an imager on a second AVLED due to the shadow zone having a luminance of 20 Candelas per meter squared due to ambient sunlight determined with the first and second AVLED not emitting light (or not emitting light from one or more, or all angular bins of the first and/or second AVLED), which could be information obtained from an ambient light map. In this example, the second AVLED could measure a luminance of approximately 200 Candelas per meter squared in one or more spatial zones around the identified shadow zone due to illumination from the first AVLED when illuminating with a substantially constant illumination output in the angular bins corresponding to the shadow zone and one or more spatial zones on the floor around the shadow zone. In this example, the illumination system comprising the two AVLEDs may optionally identify the table as a tall object in the environment capable of creating a shadow from the first fixture by stereoscopic imaging (or multi-viewpoint 3D environmental surface information extraction) from the imagers on the first and/or second AVLEDs (and optionally other imagers or data input methods such as LIDAR). In this example, one or more light sources in one or more angular bins of the second AVLED may be electronically controlled to emit sufficient light flux output to illuminate the shadow zone such that the total luminance of the shadow zone is 200 Candelas per meter squared as determined from the imager in the second AVLED (or optionally a remote imager, an imager in a third AVLED, or portable device, for example). In this example, the light flux output from the second AVLED may emit light flux that provides illumination to the shadow zone such that the luminance of the shadow zone due to the second AVLED is 180 Candelas per meter squared, and when combined with the illumination of the shadow zone due to sunlight, results in a total luminance of the shadow zone due to the sunlight and the second AVLED of 200 Candelas per meter squared. In this example, instead of measuring, calculating, or estimating luminance of the spatial zones, the second AVLED could use a relative intensity measurement from monochrome and/or color measurements of the imager and the output of the light from the second AVLED could be adjusted to match the relative intensity. Also, in this example, the color (or spectral properties of the reflected light) of the shadow zone and one or more spatial zones around the shadow zone could be evaluated by the second AVLED and the spectral properties (or choice of light source such as a blue light source) of the light output from one or more sources in one or more angular bins of the second AVLED could be adjusted to provide spectral light output such that the color of the shadow zone and one or more spatial zones around the shadow zone have a uniform color along with uniform illuminance (such as the illumination system operating in a shadow reduction mode and color uniformity mode).

Light Reflecting and Light Emitting Object Differentiation Mode

The angular cycling and imaging process could be used to differentiate between an object with a high reflectance (such as an average spectral reflectance greater than one selected from the group of 70%, 80%, and 90% for the wavelengths of the light emitted by one or more AVLEDs and/or other light fixtures and/or other light sources such as the sun) and an object emitting light (such as a lamp, laptop display, etc.) in a light reflecting and light emitting object differentiation mode. A light emitting object would be identified as a bright region when the one or more AVLEDs emit 0 lumens or watts of light flux, or a constant bright region with a reduction in illumination and/or irradiation. However, the luminance, radiance, and/or relative intensity of an object determined by an imager of an AVLED or portable device with an imager will increase with an increase in illuminance or irradiance of the object from one or more angular bins from one or more AVLEDs or light emitting devices.

Predictive Illumination Mode

In one embodiment, an AVLED or system comprising one or more AVLEDs comprises one or more imagers wherein when the AVLED is operating in a security mode, the one or more AVLEDs output light in a low illumination mode for a plurality of angular bins or all angular bins and when movement is detected (such as by a light sensor or using a visible and/or infrared imager) the one or more AVLEDs emit light in one or more angular bins (or all angular bins) corresponding to (and/or including) the location of the movement and/or the predicted location of the person, object, animal (such as an animal larger than an estimated twelve inches in any dimension as estimated by the imager), vehicle, or thing based on their rate of movement. In another embodiment, the flux output of the immediate 1, 2, 3, 4, 5, 6, 7, 8, 9, or 10 angular bins adjacent the angular bin corresponding to the movement in the +theta, −theta, +phi, −phi, or other angular nomenclature used (in a plus and minus direction) is increased to a high level of illumination output. In one embodiment, an AVLED or one or more angular bins of an AVLED emitting light in a low illumination mode emit is less than one selected from the group: 60%, 50%, 40%, 30%, 20%, 10%, and 5% of the maximum operating flux output (the maximum non-overdriven flux output) or of the average of the minimum and maximum flux output for the corresponding AVLED or one or more angular bins. In one embodiment, an AVLED or one or more angular bins of an AVLED emitting light in a high illumination mode emit is greater than one selected from the group: 40%, 50%, 60%, 70%, 80%, 90%, and 95% of the maximum operating flux output (the maximum non-overdriven flux output) or of the average of the minimum and maximum flux output for the corresponding AVLED or one or more angular bins. In this embodiment, a significant power savings can be realized due to illumination in a low illumination mode until movement is detected and more illumination is needed. In one embodiment, the movement may be detected (and optionally located) based on one or more sensors in the AVLED, system comprising the AVLED, portable device, imager remote from a light emitting device, remote light sensor, or vehicle and the information may be communicated to one or more AVLEDs (optionally other AVLEDs) such that the illumination in one or more angular bins of the one or more AVLEDs (and optionally other light emitting devices) may be turned on and/or increased.

In one embodiment, AVLED or system comprising AVLED comprises one or more imagers and/or scanners (such as those describe herein) to determine movement or potential movement of one or more individuals, animals, or objects and predictively illuminates one or more possible paths of movement for the one or more individuals, animals, or objects (such as illuminating both paths down a hallway when a person moves toward a door to a hallway and reduces the illumination of the path down the hallway not chosen). The predictions may include historical time logged data of movement, conversational analysis information (such as speech from the individual indicating they are going to the garage, for example), calendar or event information, information from one or more sensors or devices (such as a doorbell would likely indicate movement toward the front door, for example).

In one embodiment, the network of AVLEDs and/or a network of imagers operatively connected to an AVLED may capture images of the environment synchronized to each light source during angular cycling. In one embodiment, one or more objects, individuals, or animals may be highlighted based on sensor information, environmental contextual information (such as a microphone and sound analyzer identifying a command to "light up John more") to cause the system to locate John (such as using facial recognition and/or 3D scanning, location of John's smartphone, for example) and increase the light flux output directed to John from one or more light sources from one or more angular bins from one or more AVLED optionally based on the light field map determined from the angular cycling (performed by an individual, automatically, at a specific time (such as overnight), or performed automatically or on demand at a rate undetectable by the individuals in the environment such as all but one light sources in the environment turned off for less than 17 milliseconds and the imager is synchronized to determine the light field map for that light source. In one embodiment, an AVLED predicts movement of an individual or object and adjusts increases the illumination of the shadow region within 1, 0.5, 0.2, and 0.1 seconds of the shadow moving.

Safety and Security Mode

In one embodiment, the AVLED operates in a warning mode wherein an object, individual, animal, thing, and/or spatial zone of interest is illuminated and/or irradiated by one or more light sources in one or more angular bins from one or more AVLEDs when a sensor or information provider or microprocessor (or algorithm) provides safety or security information suggesting a danger, security threat, or a need to illuminate. In one embodiment, the safety or security information is one or more selected from the group: smoke or fire alarm (wherein the spatial zone comprising the fire or sensor may be illuminated by green light and the optimum path to exit the environment may be illuminated in green light, green arrows, using an indicator, or increased white illuminance, for example); motion alarm for a window or door (wherein the AVELD may illuminate the corresponding window, door); intruder alert (optionally tracking and optionally dazzling the intruder by directly illuminating and/or irradiating the eyes, head, and/or body of the intruder (directly or indirectly through specular reflections) to reduce their ability to see such that the luminance for one or both eyes of the intruder of one or light output surfaces of the one or more AVLEDs is greater than one selected from the group: 300, 500, 700, 1000, 1500, 2,000, 2,500, 5,000, 7,500, and 10,000 Candela per square meter;

When an alarm occurs, the AVLED may illuminate one or more first spatial zones in the environment with a low level of illuminance and one or more second spatial zones at a higher illuminance (such as the path to one or more rooms or exits) such that an individual awaking from sleep (where sleep is optionally determined by one or more sensors or cameras or it is during sleep mode time period) is not blinded when trying to get out of bedroom in the case of a fire, for example). The illumination could gradually increase in time or closer to the exit. In another embodiment, when an alarm occurs, the AVLED may irradiate one or more first spatial zones in the environment (which may include fluorescent and/or phosphorescent markings and/or materials) with ultraviolet light and one or more second spatial zones at specific illuminance such that an individual awaking from sleep (where sleep is optionally determined by one or more sensors or cameras or it is during sleep mode time period) can see the fluorescent and/or phosphorescent markings and/or materials with a higher contrast since the noise level from light scattering from smoke is reduced due to any scattered light from smoke prior to the markings and/or materials is not visible when trying to get out of bedroom in the case of a fire, for example). For an individual (such as a security guard) the path of travel could be illuminated (either the entire path or the predicted next 5, 10, or 20 feet of travel) such that the lights a) do not provide glare to the guard, b) permit better low-level light adjustment for the environment outside of the path, c) permit light from an AVLED to illuminate a potential intruder or danger with a high illuminance (that could optionally dazzle the intruder), d) save electrical energy, e) prevent illuminating the environment such that it is easier for an intruder to see where they are going, and f) make it easier to dazzle an intruder since the ambient light level is low.

A theatre, stadium, or venue with seating could illuminate a pathway and/or seat for an individual with an AVLED when they arrive and/or when they get up from their seat (optionally causing low or no glare to other patrons). In movement detection mode, the ambient light for one or more spatial zones could be at a low level and if something or someone moves, they/it are illuminated and/or irradiated and optionally not illuminated and/or irradiated into the person's eyes (no/reduced glare) unless programmed to for security. For safety mode, stairs may have an increased luminance. During a fire, for example, one or more AVLEDs may light up an exit door in red and optionally a series of AVLEDs could light a long exit path for an individual in red, for example, optionally blinking. By illuminating in red light, and only the necessary and/or programmed spatial zones, the red light and target light decreases scattered light and increases contrast of the environment for the individual to see the exit in smoke-filled conditions, for example. The AVLED or system comprising AVLED may also analyze the furniture, debris, traffic flow, etc. to determine the optimal path (an illuminate the path with increased contrast from the surroundings) for illumination such that the individual is likely to make it to the exit more quickly. The AVLED or system may comprise an infrared imager to enable it to see or image through the smoke to determine the optimum path for illumination. The AVLED could flash some light into eyes purposefully to help light way to exits in smoke using light from one or more determined angular bins based on location information for the individual and/or eyes of the individual (from an IR imager, for example).

Environmental Monitoring Mode

In one embodiment, one or more AVLEDs operating in an environmental monitoring mode measures and/or analyzes one or more properties in the environment and uses the information to adjust the light flux output for one or more light sources, provide an alert or notification (electronic, visual, communication to a remote device, or sound output, for example), or provide light flux output from one or more light sources in one or more angular bins corresponding to the spatial zone, surface, or region where the properties in the environment have changed. In one embodiment, the properties in the environment comprise one or more of the following properties: light properties, presence of one or more gases above a threshold amount (such as methane, hydrocarbons, carbon monoxide, carbon dioxide, sulfur hexafluoride, refrigerants); presence of smoke above a threshold; air pollution; acoustic, sound or vibration properties; presence of a particular sound or acoustic frequency profile (such as the sound from a smoke detector or doorbell); temperature of one or more surfaces of objects and/or individuals; wind speed above a threshold; position, speed, and/or orientation of one or more objects or individuals; the physical properties of one or more surfaces, objects, and/or individuals (such location, size, dimension, radius, orientation, for example); the optical properties of one or more objects and/or individuals (such as color, spectral reflectance, gloss level, transmittance, absorbance, degree of scattering, light and/or radiation emissive properties); emission, reflectance, absorptance, or presence of radiation (ultraviolet radiation, X-ray, Gamma radiation, Alpha radiation, Beta radiation, Neutron radiation, Cosmic radiation, Non-ionizing radiation, Ultraviolet light, Visible light, Infrared light, Microwave radiation, radio waves, very low frequency radiation (30 Hz to 3 kHz), extremely low frequency radiation (3 to 30 Hz), thermal radiation, or black body radiation); relative humidity, water vapor, or rainfall; pressure; proximity of one or more surfaces, objects, or individuals; vibrations; occurrence of a glass break; electrical field; leak detector (such as water or gas leak detector); and radiofrequency spectrum reflectance (such as with a millimeter wave scanner), wherein the properties in the environment may be evaluated spatially (such as at a particular surface or spatial zone or region), angularly (such as from a particular angular bin), or as being present at the device.

In one embodiment, an AVLED comprises one or more sensors that detect smoke, heat, and/or carbon monoxide in a smoke, heat, or carbon monoxide detection mode. In one embodiment, an AVLED comprises an infrared imager and the AVLED or system comprising the AVLED comprises one or more processors that analyzes one or more images from the infrared imager and identifies or detects possible fire or sources of heat with temperatures higher than 150 degrees Fahrenheit. In one embodiment, the AVLED comprises a carbon monoxide sensor based on metal oxide semiconductor or one or more photosensor configured to identify the molecular absorption phenomena of CO gas within a particular range of light spectrum.

In one embodiment, one or more AVLEDs operating in a safety mode provide illumination in an emergency or specific situation or event. In one embodiment, one or more AVLEDs (optionally operating on a back-up battery) detects (using one or more sensors on the one or more AVLEDs or remote from the AVLED and in communication with the one or AVLEDs, or an event is otherwise identified or indicated) loss of power, fire or smoke, an intruder, water leak and/or flood, gas (such as carbon monoxide), open door/window, glass break, motion in a particular location, particular sounds (other alarms, tornado alarm, etc.), and/or weather event (possible tornado, hurricane, high winds, for example) and the one or more AVLEDs adjusts the light flux output from one or more light sources in two or more angular bins to illuminate the pathway(s) to one or exits or a particular object, angular bin, spatial zone, region or surface (such as a door, electrical panel, or source of fire/smoke/water/gas/intruder). In one embodiment, a portable or mobile AVLED illuminates one or more surfaces, spatial zone, angular bins due to an emergency, alarm, or one or more sensors. In this embodiment, the portable or mobile AVLED may be on a vehicle, drone (such as a drone providing illumination for emergency services such as fire or police in an earthquake, fire, explosion where the power may be out), remote controlled vehicle or craft (land, water, or air), a portable AVLED configured to be placed/hung/attached to an environment/wall/structure (such as a magnetic or comprising a hook for hooking onto an object in the environment) to provide portable illumination and/or irradiation in emergencies or for temporary event illumination and/or irradiation, for example. In one embodiment, the portable or mobile AVLED may be controlled and/or parameters for illumination and/or irradiation for one or more regions, surfaces, or spatial zones in the environment may be changed remotely (such as by Wi-Fi, cellular wireless communication, Bluetooth, IEEE 80211 wireless protocol, etc.). In one embodiment, a mobile device comprising an AVLED, such as a drone, remote controlled vehicle, remote controlled illumination vehicle or craft, vehicle, or other mobile device returns to a charging station automatically when the batteries or other AVLED power source (such as gasoline, hydrocarbon, biofuel, alcohol, compressed air, methane, hydrogen, butane, supercapacitor) is low.

Near Infrared Spectroscopy Mode

In one embodiment, an AVLED comprises at least one infrared light source emitting light with wavelengths within the wavelength range from 780 nm to 2500 nm into one or more angular bins, and the AVLED or system comprising the AVLED, comprises an imager and/or sensor suitable to detect the spectral properties of the light reflected from a plurality of spatial zones, surfaces, regions, or angular bins such that properties of the surface and/or material of the surface corresponding to the plurality of spatial zones, regions, or surfaces may be identified and/or estimated. In one embodiment, an AVLED is an angularly varying light emitting device providing hyperspectral illumination of an environment, surface, or spatial zone for one or more imagers in a hyperspectral imaging device. For example, an single AVLED may separately send infrared light flux (or other spectral light flux) into different angular bins corresponding to spatial zones over different agricultural products (or different containers of the same agricultural products) where the reflected light propagates to a sensor on the AVLED or another sensor remote from the AVLED (which may spectrally analyze the reflected light, such as using a spectrometer and/or diffraction grating). Other items or materials may be identified and/or evaluated by near-infrared illumination (or other spectral wavelength band illumination) from one or more AVLEDs (and optionally analysis by one or more sensors on one more AVLEDs or sensors remote from the one or more AVLEDs and in communication with the one or more AVLEDs) such as one or more selected from the group: plants, soils, ground cover, soil chemistry, fluid flow, pharmaceutical powder, agricultural powder, agricultural products, beverages, fats, dairy products, oils, oilseeds, protein content, coffee, tea, eggs, meat, grains, grain products, forages, vegetables, fruits, spices, and sugarcane.

Mobile Device Illumination Mode

In one embodiment, one or more mobile devices, portable devices, motorized devices, vehicle, drone, aircraft, water craft, land craft, drone, remote controlled vehicle or craft, movable devices, or device capable of self-powered and/or self-directed motion comprises an AVLED (hereinafter referred to as a mobile AVLED) and provides a first angular light output profile at a first location in an environment, moves from the first location to a second location in the environment different from the first location, and provides a second angular light output profile in the second location different from the first light output profile. In one embodiment, a plurality of mobile AVLEDs change their location in an environment to provide optimum illumination and/or irradiation under one or more modes of irradiation and/or illumination. For example, an office may comprise a plurality of mobile AVLEDs that are uniformly spaced in across the ceiling and upon the sun rising to provide increased illuminance through a window, the mobile AVLEDs move further from the window (since less light is now needed there) to provide more energy efficient directed lighting from more optimum locations operating in a high efficiency mode and mobile device mode of illumination. In one embodiment, a mobile AVLED is powered using a grid of electrical conductors or track on the ceiling providing power for movement and/or light flux output. In one embodiment, a plurality of mobile AVLEDs (such as flying devices, drones, robots, or mobile lamps, for example) move through the environment to relocate to a location more optimum for one or more modes of illumination and/or irradiation and temporarily attach themselves to a wall, ceiling, floor, power source station for recharging, or other substantially stationary surface or object or come to a stop at the location (such as a mobile AVLED floor lamp). For example, drones comprising AVLEDs may fly to a new location on a ceiling and energize an electromagnet (or reposition a permanent magnet) to affix the drone to a ceiling comprising a ferrous surface (or objects or places on the ceiling comprising ferrous "stations" for illumination). In this example, when the drone needs to move to a new location to optimize for one or modes of illumination (or to measure one or more light properties from different locations and/or orientations in the environment using an imager on the mobile AVLED), the drone can de-energize the electromagnet and fly to a new location.

Track or Find Mode, Locate Mode, and/or Identify Mode

In one embodiment, the AVLED highlights an individual or object (such as by an increasing the illuminance to the individual by increased the luminous flux in one or more angular bins or changes the color of the illumination in one or more angular bins to a different color (white to red, for example)) in a highlighting mode, such as for example, to indicate a particular level of health or health-related concern, or highlight an individual with a particular health concern in a health monitoring mode. The AVLED could illuminate the individual or region around the individual (halo effect) corresponding to the view from another individual in the environment and track the individual and illuminate more or less light flux or with a different color. The illumination could be performed by an AVLED on a drone or remote operated vehicle to track an individual, animal, or thing. The AVLED could be used to identify the location of an item, individual, object, or animal by illumination where the identification could be made by one or more sensors such as a radio signal from the object or individual, and imager and device performing recognition algorithm such as facial recognition, a 3D sensor, or other identification technology. The AVLED or system comprising an AVLED may use a microphone to track the origins of sound (such as a person or object) and optionally illuminate the region where the sound originates (such as by acoustic triangulation or other method for determining location). The AVLED may also irradiate with infrared light to provide irradiation of an individual or object for night vision applications. The AVLED may actively detect high pitch sounds from a smoke detector or fire alarm and illuminate according to a fire alarm protocol or mode (environmental monitoring mode) as discussed herein in examples of fire. The paths for illuminating in certain scenarios or response to sensors or modes may be preprogrammed or input manually or automatically, such as by drawing them on an image on a smartphone display or controller tablet display. The AVLED (such as an AVLED street light) could light up around substantially all but the eyes of moving people along a street or pedestrian path at night (safety), and keep them highlighted or illuminated indefinitely (or till post sunrise) even if they are not moving. The AVLED could be used with a sign or system comprising a sign to send flashes of to one or more angular bins corresponding to one or more individuals, respectively, such that the light draws attention to the sign without sending light everywhere (wasting light) or in a broad sweeping area. The AVLED could illuminate and/or irradiate with infrared or white or colored light for tactical reasons (highlight kidnapper/suspect), identify and lock-on (track) despite the AVLED being in a helicopter or on a police car for example. The AVLED could highlight an individual, place, thing, object, animal, etc. not just by illumination on off, but by color or on/off or by blinking or color change, and can change color around individual place, thing, etc. (halo effect), or for example, or make the surroundings a different color than the target. The AVLED or system comprising an AVLED could track and illuminate and/or irradiate a suspect even if he/she stops and/or identify and highlight visibly and/or irradiate invisibly (but visible through an IR camera, for example) suspicious activity. The AVLED could be used in conjunction with individual identifiers (police IDs via phones/device, badges, workers via device/ID, phone ID, etc.) to filter out and not illuminate them (or reduce illumination) but illuminate stranger or suspect (possibly based on their ID). In one embodiment, an AVLED comprising an imager or an imager in communication with one or more AVLEDs identifies one or more objects in an environment based on one or more selected from the group: shape, borderlines, 3D scan, calculations based on images from more than one imager, variations in one or more light properties when illuminated from different angular bins, luminous reflectance, reflectance at one or more wavelengths or wavelength ranges (or color), specular reflectance, diffuse reflectance, tags, labels, other identified objects, user provided information, lookup tables or databases comprising shape or other object recognition or identifying information. In one embodiment, the illumination from an AVLED is provided based on identification of one or more objects and one or more modes of operation or user preferences. For example, in one embodiment, a processor on an AVLED identifies a desk and white paper on the desk in an environment based on feature or shape recognition from images from an imager on the AVLED and adjusts the light flux output in one or more angular bins to illuminate the paper with 200 lux (or illuminated it such that it's measured or estimated luminance is 100 Candela per square meter) and the desk is illuminated with 100 lux (or illuminated it such that its measured or estimated luminance is 50 Candela per square meter) in a medium illumination preset mode. In this example, if a high illumination preset mode is chosen for example (or a specification maintaining mode is used for example), the AVLED could illuminate the paper with 400 lux (or illuminate it such that it's measured or estimated luminance is 200 Candela per square meter) and the desk is illuminated with 200 lux (or illuminated it such that its measured or estimated luminance is 100 Candela per square meter).

Product or Inventory Tracking and Identification Mode

In one embodiment, an AVLED, imager, or light sensor identifies one or more objects, parts, or products (such as by a UPC code on a box for example) and tracks the location in the environment. In one embodiment, the illumination or irradiation property for the one or more objects, parts, or products is adjusted based on information provided remotely from the AVLED, such as illuminating the box with green light for a box on a conveyor belt based on a destination address determined from information from a network, or determined by the AVLED, identifying that the item is close to falling off a conveyor belt, is faulty, has been recalled, has a status that warrants identification to individuals in visual range, is a safety hazard, or poses a danger. In one embodiment, an inventory tracking or monitoring system comprises one or more AVLEDs that illuminate or irradiate one or more objects, parts, or products based on information identified by the AVLED, a sensor remote from the AVLED, or from information received from a network. For example, if an object/product is determined by image analysis to be damaged, at a wrong location, late, early, in the correct location, leaking, unsealed, without proper identification, with proper identification, or targeted for a particular destination, for example, the color of illumination for that object/product could be a designated color (red light from a micro-LED array or red light from a scanning laser diode, for example) and the colored illumination could track with the product or object through the environment and optionally under illumination from multiple simultaneous or sequential AVLEDs. The rate of illumination (flashing for example), change in color (flashing green and red, for example), intensity of the illumination/irradiation could be used to further identify or highlight the object, or product.

Reduced or Glare-Free Illumination Mode,

The AVLED could track eyes/and or individuals (using camera, or ID, motion, or other means for example). The AVLED, when tracking for example, or otherwise illuminated an environment, may create a shadow of an object, individual, etc., and another AVELD can illuminate the shadow region and "fill in" the shadow to improve the illuminance uniformity of the environment. One could walk through room with camera on cellphone or portable device (or head worn device such as HMD) and perform an angular cycling (preferable at a frequency greater than 60 hz) such that glare can be determined (such as by using a camera held less than 5, 4, 3, 2, and 1 inch from eyes), or by measuring and/or calculating the direct (and/or indirect) light field map for one or more AVLEDs using one or more imagers. In one embodiment, each AVLED tracks eyes and communicates with other AVLEDs at other locations in environment (such as in a large room, down a hallway, or throughout a building, for example). The AVLED could measure, and/or calculate glare angles and which spatial zones are illuminated by specular reflection based on measured, calculated, or identified specular surfaces in the environment to reduce reflected glare. Likewise, the AVLED could measure (such as by angular cycling) and/or calculate direct glare angles from one or more AVLEDs such that when an individual (and/or an individual's eyes) enters into an glare spatial zone (spatial region receiving direct glare light from one or more fixtures or reflected glare from a reflection off of a specular surface receiving light from one or more AVLEDs) the light flux output from one or more sources from one or more angular bins from one or more AVLEDS that illuminate the glare spatial zone from an angle of illumination that causes glare for the individual is reduced or turned off. The AVLED may also determine the degree of specular reflectance from a surface through angular cycling and examining the reflected light using one or more imagers and/or angular cycling. At least one imager in a system comprising one or more AVLEDs may also detect retroreflected light from eyes (such as by IR illumination and imaging or visible light illumination and imaging) and reduce output in a spatial zone around the eyes, such as a 3D spatial zone corresponding to 0.5, 1, or 2 feet from the head of the individual from all illuminating directions. In one embodiment, the AVLED identifies a mirror or mirror-like surface and an individual and calculates/estimates the angle that would illuminate the eyes of an individual through the mirror and reduces the light flux and/or emits 0 lumens of light flux output into the angular bin corresponding to the eye glare illumination through the mirror. In one embodiment, the AVLED is in the form of a light fixture for illuminating a large venue with high seating capacity, such as a stadium, theatre, performance venue, sporting venue, concert hall, racetrack, motor speedway, festival, ballroom, auditorium, or arena, and the AVLED emits reduced (reduced relative to the flux output at less steep angles) light flux (or 0 lumens or 0 watts) into angular bins corresponding to the spatial locations of the audience wherein the angle of illuminance would be greater than 40, 45, 50 or 55 degrees from the nadir to reduce glare.

Reduced Light Trespass or Light Trespass Free Mode

In one embodiment, one or more AVLEDs (or an illumination system comprising one or more AVLEDs) reduces the light trespass from the one or more AVLEDs automatically or by user identification of one or more light trespass regions, light trespass surfaces, light trespass angular bins, and/or light trespass spatial zones, and the one or more AVLEDs reduce the light flux output from one or more light sources in one or more angular bins corresponding to the light trespass regions, light trespass surfaces, light trespass angular bins, and/or light trespass spatial zones. In one embodiment, the one or more AVLEDs identify the light trespass regions, light trespass surfaces, light trespass angular bins, and/or light trespass spatial zones by analyzing spatial three-dimensional information, property boundary information (input/identified manually, determined/estimated from satellite data, or obtained from government or third party information providers), ambient light map, angular cycling information, information from one or more sensors, information from one or more imagers on one more AVLEDs or remote devices in communication with one or more AVLEDs, user identified light trespass regions, light trespass surfaces, light trespass angular bins, and/or light trespass spatial zones (such as by tapping on regions of an image displayed on a portable device such as a tablet or smartphone). In this embodiment, the one or more AVLEDs reduce the light flux output (optionally to 0 lumens or watts) from one or more light sources in one or more angular bins corresponding to the light trespass regions, light trespass surfaces, light trespass angular bins, and/or light trespass spatial zones.

Reduced Sky Glow or Sky Glow Free Mode

In one embodiment, one or more AVLEDs (or an illumination system comprising one or more AVLEDs) reduces the sky glow (from direct and/or indirect illumination of the sky) light pollution from the one or more AVLEDs automatically or by user identification of one or more regions, angular bins, and/or spatial zones corresponding to light directed toward the sky (directly and/or indirectly via reflection), and the one or more AVLEDs reduce the light flux output from one or more light sources in one or more angular bins corresponding to the light directed toward the sky directly and/or indirectly via reflection from (and/or transmission through such as light direct through windows) one or more surfaces, spatial zones, or regions. In one embodiment, the one or more AVLEDs identify the of one or more regions, angular bins, and/or spatial zones corresponding to light directed toward the sky (directly and/or indirectly via reflection) by analyzing spatial three-dimensional information, object and/or spatial surface boundary information (input/identified manually or determined by analyzing one or more images from one or more image sensor on one or more AVLEDS), information from one or more sensors, information from one or more imagers on one more AVLEDs or remote devices in communication with one or more AVLEDs (such as ambient light map, identification of one or more stars and/or constellations, identification of the sun and/or solar movements, identification of the sky (such as identifying a blue sky, sunrise/sunset, and/or a night sky) and/or angular cycling information, for example), user identified regions, angular bins, and/or spatial zones corresponding to the sky (such as by tapping on regions of an image displayed on a portable device such as a tablet or smartphone corresponding to the sky, wherein the AVLED may determine sky border automatically by image analysis, for example). In this embodiment, the one or more AVLEDs reduce the light flux output (optionally to 0 lumens or watts) from one or more light sources in one or more angular bins corresponding to the sky.

Selective Warming Mode

The AVLED could output infrared thermal irradiation to provide selective warming. The infrared light output from this "thermal AVLED" may be independently directed to different angular bins to warm an individual and track the location of the individual (such as by the same IR imager that is used to determine that the individual is cold and/or which regions of the individual are cooler than others for irradiation of the cooler regions or user defined regions of the individual set for irradiation in a selective warming mode. The infrared imager may also look for shadows and/or reflected light to help located or track movement and/or shape for one or more individuals or things or objects in the environment. In one embodiment, the AVLED collects infrared light emitted and/or the emissivity of objects, individuals, or regions to determine its approximate temperature. In one embodiment, the AROE also collects infrared thermal radiation onto a detector in the AVLED. In one embodiment, the AVLED comprises an infrared pyrometer, spot infrared pyrometer, scanned pot pyrometer, infrared scanning system, and/or infrared thermal imaging camera. The spatial zone may be selected by the user for specific increase, decrease, or constant temperature mode of infrared thermal radiation output into the corresponding one or more angular bins of the AVLED (optionally with tracking of the object, individual or thing if it or they move). In one embodiment, one or more AVLEDs, imagers, or sensors identify one or more individuals (such as by facial recognition, smart tags, RF IDs, or tags/codes/bar codes/QR code/Matrix or 2D barcodes on a hat or outer garment, for example), and provides thermal irradiation based on the preference selected by the individual (such as the individual selecting a desired temperature or irradiation level on their smartphone using an application in communication with a system comprising one or more AVLEDs.) In this embodiment, the AVLED may also provide illumination or irradiation according to one or more other illumination or irradiation modes such as object or product inventory tracking for example.

Social Modes

The AVLED could be a variable angle illumination device for social indication or social use. For example, if a company has determined a first day is a "how you are feeling day" where if the individual says they are feeling poor they are illuminated with blue light (or they can be provided a blue halo for viewing by a another person looking at the individual by illuminating the surface around the poor feeling individual based on the viewer's location and viewing direction). In this example, a person feeling great may be illuminated with red light or a red halo. This can encourage discussion and/or interaction between people. Similarly, if today is "birthday month," each month could be color coded for illuminating an individual or a halo around an individual. Other social categories could be "favorite color day", birth location map (with color coded countries and/or states), favorite sport, college degree type-color coded, favorite hobbies (such as color coded where gardening=green, water sports=blue, white=not participating, etc.). These categories and colors that track with the individual that illuminate the individual or halo the individual can help people find common interests-engages people, provides for good networking, ice breakers at a social event and may be good for networking with people or people at a party, for example, trying to find people with common interests.

In these social illumination mode of operation, one important aspect is to only illuminate one person with the correct color corresponding to the color map for the categories(s). Each person could be a different color based on feeling, or personal preference. Since each illumination color for each person may be different, the angular resolution should be sufficiently high. One may be able to look out across a room and identify one or more individuals based on the illumination profile based on one or more categories, indicators, or social indicator for a specific color map for a category.

The AVLED could be used for a social illumination mode in a lunchroom, waiting room, conference room or other indoor or outdoor communal environment. The AVLED could help identify and know the social property or category (or other characteristic of the individual), and may use information from a badge, GPS sensor, imager connected to processor configured to perform facial recognition, and/or information from an application on a smartphone. For overhead direct illumination from an AVLED, one disadvantage of color-coded social mode is that people's hair is now red or illuminated with a distracting or undesired color of light. The AVLED may use background "halos" as described elsewhere herein. An AVLED could provide the background halo using one or more cameras to detect eyes and then know which background to illuminate (opposite background behind the individual based on the location of the individual and the light field map).

Light from an AVLED could provide notifications, outline an office cubicle or office to a door, or use perimeter lighting (more visible to others) that indicates an aspect or information for an individual (based on a color map) such as illumination representing that I'm busy/have a mtg in 5 minutes (such as a red border/illumination, possibly blinking) or "I have meeting in 20 minutes" wherein AVLED light output may be slow flashing red, "I have some time available" may provide blue AVLED light output toward the individual. The AVELD may be synchronized to a calendar for the individuals. The AVLED may promote selective engagement and/or reduce distractions at key times, may be synchronized to typing, for example, such as when an imager (and/or microphone detects typing or a sensor or imager shows that an individual is reading or typing for example) and the light output properties from an AVLED (such as illuminance and/or color of light output properties) indicate the current status of the individual (color coded or elsewise displaying an icon, for example). In one embodiment, the AVLED may illuminate a perimeter of an individual object based on information obtained from one or more sensors or devices operatively connected to the color of the AVLED light positioned above the subject on the ceiling.

Health Monitoring Mode

The AVLED could indicate poor health (help me indicator for example) by monitoring a pulse of an individual (distinguish between sleeping and gravely ill) or using IR camera to indicate fever or low temperature and could be useful with livestock to highlight sick livestock (and optionally track). An AVLED in a hospital waiting area, triage area, patient room, or operating room could indicate/show the pulse/health indicator color, and could combine with remote health monitoring, (such as by using millimeter wave radar).

In one embodiment, an AVLED or system comprising one or more AVLEDs comprises a Gigahertz millimeter-wave radio frequency transmitter and receiver wherein one or more antenna are in the form of a horn antenna or phased array. In one embodiment, the radio frequency transmitter transmits radio waves at a frequency of 60 Gigahertz. In one embodiment, an AVLED or system comprising one or more AVLEDs comprises a Gigahertz millimeter-wave radio frequency transmitter and receiver on one or more AVLEDs and the system can monitor the breathing rate and/or heartbeat of one or more individuals in the environment of the one or more AVLEDs.

Entertainment Mode

The AVLED can cycle through patterns of illuminating angular bins to simulate a disco ball or mirror ball. The AVLED could track people and illuminate them with a specific color (or change the color). The AVLED could synchronize to detected colors from a television to project the colors around (preferably not illuminating the television directly) to simulate the environment of the TV on the spatial zones around the television. The location of the television may be correlated to one or more angular bins and/or pixels of an imager in a system comprising an AVLED, such as by touching the region corresponding to the television on an image of the room displayed on a portable device in the environment, wherein the system then uses the color information from those corresponding pixels to determine the ambient color to provide to the AVLED to illuminate the environment preferably excluding illuminating the television directly. The AVLED could also project light or appearance of shadows in conjunction with content on the television, such as illuminating the environment and reducing the illumination in regions of the floor (or ceiling, or wall) to simulate the shadow of an airplane flying over when the content on the television is an airplane flying overhead from the perspective of the camera. Similarly, when a bright explosion happens off-screen from the back-left corner, the AVLED could briefly increase the light flux output into angular bins to the back left corner (and optionally illuminate with red and/or yellow light to simulate a fire explosion). The AVLED could project light into regions to create lines, patterns, or icons to simulate a game such as tic-tac-toe, chess, checkers, board games, games played on a floor mat, or other game with a playing area. In one embodiment, a target practice game could illuminate targets to be "shot" with a laser diode, and the AVLED could optionally detect a correct hit using an imager on the AVLED (and change the color and/or illuminance if the target is hit). In this game, each person could have a different color of illumination for their targets for a multi-player game or different colors could provide additional information for the game. In an entertainment mode for dancing, the AVLED could be synchronized to music or be configured to output a specific pattern or light output profile. The AVLED could also function as a graphic or image creating tool by illuminating a surface in a manner representing brush strokes, finger strokes, pen strokes, or stroke, swipe, or other gesture or motion wherein the user wishes to paint or draw on the surface as one might draw on a 2-dimensional paper or canvas. However, using a plurality of AVLEDs, one could paint around (or illuminate features of an environment) 3-D objects. For example, one could set the color to blue and touch (or gesture toward) the top of a counter so that the countertop was illuminated with blue light from one or multiple AVLEDs, set the color to red and touch (or gesture toward) sides of the counter such that the sides of the counter were illuminated with red light from multiple AVLEDs. Any 3D object could be illuminated differently along different sides, automatically determined regions (such as an imager detecting boundary regions), or manually identified sides or regions and the illumination output for each spatial zone of the object (or room, or individual or animal, etc.) could vary in color and/or intensity from each angular bin of each AVLED, for example. In one embodiment, a user may "paint" on a display via touchscreen or other user interface, or use an environmental indicator for spatial zone (such as one or more laser pointers)

to identify one or more zones and the preferred illuminance, color, irradiance, or spectral properties (including IR heat) may be programmed to vary in time in coordination with an entertainment or other mode disclosed herein. For example, a user may identify a couch and chair using a touchscreen on a tablet using an application running on the tablet in communication with one or more AVLEDs such that color and illuminance of the light from one or more AVLEDs directed to the couch and chair flashes red and off (no illumination) continuously at a predetermined time or in response to other input or as part of a program providing varying illumination color of objects in room for visual effects that may optionally be synchronized to music or location of one or more individuals using one or more sensors.

Variable Illumination for Camera

In one embodiment, the AVLED can provide illumination and/or irradiation for a camera on a portable device (or a portable camera). The AVLED could be used for a flash, a fill flash or a flash on a camera (in a phone, a DSLR, or a full frame camera). The AVLED could communicate with the device used with the imager and the AVLED could send more light to under-illuminated (and/or under-irradiated) areas and/or it doesn't direct light to the eyes of the subject being photographed/imaged to eliminate red-eye. In one embodiment, the portable device, such as a camera or smartphone comprises an AVLED illuminator and/or irradiator for images taken by the smartphone or camera. In this embodiment, the illumination and/or irradiation could be specifically tailored to provide a more uniform illumination and/or irradiation by sending less light into some angular bins (where there is more than sufficient illumination and/or irradiation) and more light into other angular bins where there may be shadows (or more illumination and/or irradiation needed). This can increase the visibility of the content for the image without requiring as much post-processing and can improve the dynamic range and/or detail contrast of the final image. The AVLED could also illuminate the background more than the foreground (such as in the case of some nighttime photos where this is needed). The AVLED could also track the subject for the photograph/image (optionally via the real-time image through the camera or smartphone) and also optionally track the camera such that the illumination and/or irradiation needed is provided by the AVLED for illuminating and/or irradiating the subject without sending light directly (or via specular reflection) toward the camera (that would create glare for the image) or directly illuminating and/or irradiating the individual taking the photos that would cause distraction or glare when not looking through the camera or smartphone screen. The camera or imager for providing illumination and/or irradiation without glare imager and filling in shadows could also be remote from the AVLED (such as a fixed position mounted on a wall) such that in Variable illumination and/or irradiation Camera #2 mode, for example, one or more AVLEDs in a system provide illumination and/or irradiation for an individual and/or scene including an individual for the field of view of a camera or imager positioned on the wall (Camera #2, for example). In this mode, the AVLED could be operating in this mode continuously while also executing other modes illumination and/or irradiation such that the Camera #2 always has a shadow-free image without glare or high or overexposure regions. More than one camera field of view can be accounted for in the variable illumination and/or irradiation camera mode for one or more AVLEDs. Using an infra-red imager, the infra-red irradiance from one or more AVLEDs may be increased or decreased to create shadow-free infra-red images (such as nigh vision images) without oversaturating the infra-red imager while increasing the signal-to-noise in the spatial zones corresponding to low irradiance when the light fixture emits light in an angularly uniform or substantially isotropic light output pattern across the angles of light output for AVLED.

Using an imager, or camera, or 3D scanner, or other sensor, the angularly adaptive lighting could account for movements of the individual and/or movement of people or things in the environment (optionally done in real-time, such as with an overall latency less than one selected from the group: 3, 2, 1, 0.5, 0.3, 0.2, 0.1, 0.05, 0.01, 0.008, 0.006, 0.004, 0.003, 0.002, 0.001, and 0.0005 seconds. The imager, on a head-worn AVLED device, for example, could continuously search for eyes to reduce glare for the one or more other individuals in the environment not wearing the device with the AVLED.

Light Field Display

In one embodiment, a light field display comprises a plurality of AVLED wherein each AVLED represents one or more pixels in a light field display. For example, an array of 20 by 20 AVLEDs providing RGB illumination toward an individual can reproduce the light field (angular information and intensity and color information) representing light from a 3-dimensional scene. Also, a single AVLED could provide a light field display for many individuals standing in front of the display. In one embodiment, an arrangement of a plurality of AVLEDs could provide a direct view light field display in a wide angle, up to 360 degree viewing angle, by directing arrays of AVLEDs with angular ranges of at least 180 degrees back to back, by directing AVLEDs along one or more curved, arcuate, stepwise, or faceted arrangements wherein the optical axis of the AVLED changes such that the 3-dimensional arrangement of AVLEDs provides a wide angle, up to 360 degree viewing angle, direct view light field display. The size of the arrangement of AVLEDs from a specific viewing angle will determine the size of the direct view light field display. The AVLED-based direct view light field display could be created by a stationary arrangement of AVLEDs, a mobile arrangement of AVLEDs (such as a plurality of drones hovering overhead to create the display), or a partially mobile arrangement (such as patrons seated in a stadium each wearing a head-mounted AVLED such that the entire audience can see a light field display from their own viewpoint). The AVLED could account for the orientation and spatial location of each AVLED such that if the AVLED is translated and/or rotated, the light sources providing illumination and/or the angular bins corresponding to the desired illumination profile (for a specific mode, for example) can be altered accordingly. In one embodiment, the AVLED accounts for the orientation and spatial location of the AVLED for personal illumination or illumination using an AVLED on a non-stationary or mobile device. In one embodiment, the output from a plurality of AVLEDs (and optionally an AROE or scanner) is directed through a lens or additional AROE to increase the angular output range (illuminating range of angles for an illuminating device or field of view for a direct view light field display based on AVLEDs). In one embodiment, the direct view light field display based on an arrangement of AVLEDs is used to provide camouflage by displaying a light field representation of an object or scene that it is difficult to differentiate between the true view of the object or scene. The arrangement of AVLEDs or a single illuminating AVLED could also create a ubiquitous display wherein light output (such as patterns, images, colors, illumination profile, etc.) represent the status of something or provide an indicator for any event or something (such as the status of the stock market or a stock, current or predicted weather, location of an individual, etc.).

Horticultural or Animal Lighting Mode

In one embodiment, the AVLED or system comprising one or more AVLED could send more/less blue/red/purple, white, or other spectral light output to a specific plant or animal in an environment. The AVLED or system comprising the one or more AVLEDs could monitor the plant and/or animal (such as by using an imager and photogrammetric analysis or other analysis to determine which plant or animal needs more or less of a specific spectral range of light) and direct more or less of the specific spectral range of light to only that specific plant or animal (or a plurality of them if more than one needs the specific illumination and/or irradiation profile). Determining the spectral properties needed could be based on one or more sensors, imagers, manually input, or calculated based on other data. One or more AVLEDs could also direct different intensities of light from different spectral ranges to different plants in an environment (optionally based on measurements, sensors, or operator entered light output profile, for example). The light output profile from one or more light sources from one or more angular bins of one or more AVLEDs at one or more time periods (that could be triggered automatically based on one or more sensors, or manually initiated) could include ultraviolet light (such as to kill a collection of insects or sanitize the environment or specific regions of the environment when the animals are not present in the environment or not present in the specific region, respectively), visible light (such as to provide a blue light to calm poultry, blue-green light to stimulate chicken growth, or red-orange to stimulate reproduction of chickens), infrared light (such as to warm a specific plant or animal), or any combination of the three. Other time based rules (such as duration and intensity) could be implemented for the AVLED for each of one or more animals or plants, such as never increase the duration or intensity of light during the growing period for a chicken and/or never decrease the duration or intensity of light during the production period, for example. In one embodiment, the system comprising one or more AVLEDs provides a different illumination and/or irradiation output profile (such as a specific illuminance and/or specific irradiance, respectively) for a specific time period for each plant, each animal, a collection of plants, or a collection of animals in an environment based on data from one or more sensors and/or controlled light output profile entered by the operator. The AVLED could also illuminate and/or irradiate individual insects in an environment. In one embodiment, the AVLED or system comprising an AVLED comprises one or more imagers and processors that identify which plants and/or animals or individuals need more and/or less water and/or other resources to maintain and/or improve the health of the individual, plant, animal, or collection of plants and/or animals.

Selective Sterilization Mode or Mold Inhibition Mode

In one embodiment, the AVLED operates in a selective sterilization mode or mold inhibition mode. In one embodiment, the AVLED emits light in the 280-315 nanometer wavelength range into one or more angular bins to reduce mold and/or decay on objects such as food. For example, in one embodiment a refrigeration system (such as a refrigerator) comprises one or more AVLEDs in the interior that selectively irradiates strawberries and/or other fruit/vegetable/meat/dairy/food within the system, device, or refrigerator when the door is closed to reduce mold and/or decay.

Light Communication

The AVLED may provide information using light communication such as Li-Fi and the light output (including visible light and/or infrared light output) from the one or more AVLEDs may follow the device with which it is communicating and provide direct communicating light to provide a higher signal to noise ratio, overcome shadowing (by changing the light output to using a different angular bin from a different AVLED), avoid noise, and possible increase the utilization efficiency of light output since the devices could independently use the same frequency of light output since the light could be modulated differently for each angular bin. Examples of types, hardware, system arrangements, protocol, networks, interfaces, etc., for light communication are known in the art and those which could be utilized with a system comprising one or more AVLEDs include those known in the art and those described in US Application Publication No. US20170310743, the entire contents are incorporated by reference herein and Handbook of Advanced Lighting Technology, Editors Robert Karlicek, Ching-Cherng Sun, Georges Zissis, Ruiging Ma, Springer International Publishing, Switzerland, 2017, Volume I, Part IV, section "Optical Wireless Applications," pp. 635-700), the pages are incorporated by reference herein. In one embodiment, each or one or more angular bins of an AVLED is configured to transmit and or receive information encoded in modulated light. In one embodiment, one or more angular bins functions as a LI-FI device, such as one that can transmit information using a micro-LED array.

Fixture or LED Performance Evaluation

The AVLEDs could monitor the light output from itself or another AVLED using one or more sensors. One or more AVLEDs could monitor the output from one or more AVLEDs and they could collectively and/or individually determine if there is a problem (lower light flux output, increased flux output, color change of light output, for example) with one or more light sources from one or more angular bins from one or more AVLEDs using one or more imagers and angular cycling and optionally adjust and/or compensate, or take into account the reduce or varied output.

Personal Illumination Device

The AVLED (or system comprising one or more AVLEDs) could provide personal illumination for vision or aided vision (such as night goggles or AR/VR applications) and the AVLED could avoid directly illuminating other cameras or eyes of the individual wearing an AVLED and/or any individuals in an environment. The AVLED could provide IR irradiation into angular bins for IR irradiation with an IR imager (possibly used in parallel with a visible light imager) to track at night, for night vision in military applications, or for a variable angle IR illuminator and/or irradiator that prevents blinding other people with IR goggles by detecting eyes with an imager and not illuminating and/or irradiating IR and/or visible light to that location or spatial zone. This type of imager could also be used by firefighters. The AVLED could combine adaptive angular lighting with gaze tracking so that the AVLED only illuminates spatial zones that need illumination and if the AVELD was mounted on the person (such as on head-worn device), the illumination could be provided "hands free." The system could also be trained to recognize another imager, specific device, or icon/label/graphic/emitting light source such that it does not illuminate it directly and introduce glare to that camera or imager (such as the imager on a fellow firefighter's AVLED or helmet-mounding imager with AVLED, for example). The AVLED system could also detect the camera/imager or other identifier and specifically not illuminate and/or irradiate a tracked region around the camera/imager (such as within a 1, 2, or 3 foot diameter, within 1, 2, 3, 4, or 5 angular bins, or within 2, 4, 6, 8, 10, 15, or 20 degrees in any direction) around the camera/imager to be sure not to cause glare with future movement of the camera/imager/device with the camera or imager, or the individual themselves and this would decrease the likelihood of causing glare, etc. and provide an illumination and/or irradiation glare-safety zone.

In one embodiment, a head worn device, arm-worn device, hand-worn device, foot-worn device, torso-worn device, wearable device, portable device, or article worn (such as a coat, belt buckle, shoe, hat) comprises one or more AVLEDs providing illumination for the individual wearing the device or article. The AVLED could be in communication with a device (such as a head-worn device) that tracks one or more eyes and/or the gaze of the wearer and the AVLED illuminates where the wearer is looking (illuminate more or turn on in that area) and/or reduces illumination in other areas (that may have a high luminance from other light sources or be problematic specular surfaces such as mirrors that would dazzle or increase glare to the wearer). The system comprising the AVLED or AVLED could use an imager to identify key elements to illuminate more or less (or with different colors or from different AVLEDs specifically) such as a watch display that is reflective to turn up illumination, a book/newspaper identification for reading, walkway or the ground in front of the wearer while walking. The AVLED or system comprising the AVLED could predictively illuminate a hazard, person, place, or thing for safety considerations and/or other people/things (or parts thereof such as optionally illuminating with reduced or glare-free illumination, Projection Mode The AVLED or system comprising one or more AVLEDs may operate in a projection mode where one or more AVLEDs emits light into a plurality of angular bins from one or more light sources with varying light output profile (color and/or light flux) such that the illuminated and/or irradiated spatial zones collectively illuminate and/or irradiate in the form of one or more selected from the group: image, video, logo, indicia, graphic, warning, highlight, indicator, a display, alarm, and customized spatial zones for an object. The system comprising two or more AVLEDs in a projection mode could emit light from two or more AVLEDs such that the angular output from each AVLED does not substantially overlap with the angular output from another AVLED (such as to provide a wider range of illumination and/or irradiation angles). The system comprising two or more AVLEDs in a projection mode could emit light from two or more AVLEDs such that the angular output from each AVLED substantially overlaps with the angular output from another AVLED (such as to provide an increased light flux output to one or more spatial zones from two or more AVLEDs. In another embodiment, a system comprising two or more AVLEDs in a projection mode could emit light from two or more AVLEDs to illuminate and/or irradiate a non-planar, 3-D environment wherein a region corresponding to a shadow from a first AVLED is illuminated and/or irradiated by a second AVLED to provide an illuminated and/or irradiated 3-D environment that can be viewed or imaged from multiple angles without shadows. The light output from two or more AVLEDs to the same, neighboring, or defined spatial zones may be coordinated to collectively provide a continuous, or predetermined illumination and/or irradiation appropriate for the image, video, logo, indicia, graphic, warning, highlight, indicator, or display. For example, light output from a first AVLED may illuminate the back side of a white couch with an image of the back of a park bench, and light output from a second AVLED directly overhead may illuminate the top of the white couch with an image of the top of a park bench and simultaneously illuminate the top of a white coffee table with an image of a campfire (and optionally, when the couch is occupied by an individual, the second (or other) AVLED may direct warming IR light to the individual to provide heat such as that which would result from the fire if the fire projected on the coffee table were real.)

Window Avoidance Mode

In one embodiment, an AVLED identifies automatically or by user input one or more angular bins and/or spatial zones that correspond to windows (such as by identifying specular reflections and/or estimating the reflectance of one or more surfaces and/or the color of reflected light) and adjust the light flux output from one or more light sources and/or one or more angular bins in one or more AVLEDs corresponding to spatial zones comprising one or windows or portions thereof such that less light (or more light depending on preferences or settings) is directed to the windows in a window avoidance mode (or window targeting mode if light more light is directed to the window(s)). For example, an AVLED used as a building exterior illumination light or facade lighting fixture may identify a plurality of windows on the building using one or more imagers and less light or no light could be directed to the windows to reduce light pollution, save energy, and/or to reduce eye strain for someone looking out of the window downward. In another embodiment, by being able to avoid directing light into windows, an AVLED configured to illuminate a first building (such as one operating in a window avoidance mode) may be placed on a neighboring second building and directed toward the first building (without directing light to one or more or all of the windows) and/or the AVLED may be able to be oriented with a directional component downward (wherein it may also be optionally configured not to illuminate the ground, sidewalk, etc. adjacent the building).

Circadian Adaptation Mode

In one embodiment, an AVLED operating in a circadian adaptation mode reduces the light flux output in the range from 430 nanometers to 500 nanometers and/or the blue light from one or more light sources in one or more angular bins in one or more AVLEDs at a preset time, user adjusted time, near sunset, or at night, to reduce circadian stimulation that could disrupt a sleep cycle for an individual. In one embodiment, the AVLED identifies one or more first surfaces, first regions, or first spatial zones (optionally non-white, and/or optionally non-uniformly colored) with a relatively high diffuse reflectance (such as greater than 50, 60, 70, or 80 percent) within a wavelength range (such as a spectrum within the wavelength range between 430 nanometers to 500 nanometers) and when the AVLED is operating in a circadian adaptation mode, the AVLED decreases the light flux output in the range from 430 nm to 500 nm from one or more second sources and/or one or more second angular bins and decreases less, or does not decrease the light flux output in the range from 430 nm to 500 nm in one or more first angular bins corresponding to the first surfaces, first regions, or first spatial zones such that an individual may be able to discern color differences and features with a higher color rendition in the first surfaces, first regions, or first spatial zones while reducing the blue light in other spatial zones.

Infrared Remote Controller Mode

In one embodiment, the AVLED emits infrared light from one or more light source into one or more angular bins corresponding to a spatial zone comprising a device with an infrared optical receiver for controlling the device, such as an audio device, stereo, television, display, mobile AVLED comprising an infrared optical receiver, remote controlled vehicle or craft, appliance, air conditioner, Blu-ray player, for example. In this embodiment, the AVLED could be programmed to interface with one or more audio and/or visual components for control, such as by a user using the AVLED to control the device to change the channel, or the AVLED turning on the audio system to broadcast an alarm or turning on the TV to display an image of an intruder from an AVLED in a security mode.

Seasonal Affective Disorder Treatment Mode

In one embodiment, one or more AVLEDs operates in a seasonal affective disorder treatment mode and provides a total first illuminance greater than or equal to 7,000, 8,000, 9,000, or 10,000 lux to one or more individuals or to a light diffusing surface (reflecting or transmitting) within 10 to 36 inches, within 10 to 30 inches, within 12 to 28 inches, or within 16 to 24 inches from the face of an individual such that the individual's eyes receive the total first illuminance from the scattered light from the light diffusing surface, optionally within 120 minutes, 90 minutes, 70 minutes, 65 minutes, or 60 minutes from the individual waking, optionally for a period of illumination from 10 to 60 minutes, 10 to 50 minutes, 15 to 45 minutes, and 20 to 30 minutes. In one embodiment, one or more AVLEDs operates in a seasonal affective disorder treatment mode and provides a total first illuminance greater than or equal to 2,000, or 2,500 lux at approximately 480 nanometer centered illumination from one or more light emitting diodes (or greater than or equal to 300 lux or 350 lux at approximately 500 nanometer centered illumination from one or more light emitting diodes) to the eyes of one or more individuals or sufficient light flux to a light diffusing surface such that the individual's eyes receives the total first illuminance from the scattered light from the light diffusing surface.

Ubiquitous Display Mode

In one embodiment, one or more AVLEDs illuminate one or more spatial zones and/or surfaces in an environment wherein the one or more light properties associated with illumination and/or irradiation display or indicate information related to an object, entity, individual (such as illuminating the area around a photo of an individual with green light to indicate positive health), event, device, item, status (such green illumination of a wall or picture as in indication of an increase in a particular stock price for the day). In one embodiment, the illuminated one or more spatial zones display or indicate information external to the environment.

Sign, Display, or Advertising Mode

In one embodiment, one or more AVLEDs illuminate one or more spatial zones and/or surfaces in an environment wherein the light displays one or more selected from the group: indicia, graphics, text, icons, logo, and images on the one or more spatial zones and/or surfaces. In one embodiment, a first plurality of angular bins of the AVLED function as a projector projecting information onto one or more spatial zones and/or surfaces and a second plurality of angular bins of the AVLED provide illumination and/or irradiation in one or more other modes of illumination and/or irradiation. In one embodiment, one or more AVLEDs illuminate one or more spatial zones and/or surfaces in an environment wherein the light displays advertising content in the form of one or more selected from the group: indicia, graphics, text, icons, logo, and images. In one embodiment, projecting advertising content in one or more spatial zones, surfaces, or regions at particular times (or continuously) subsidizes the cost of the AVLED for the user and/or business which may be used at non-advertising times or the one or more angular bins not presently displaying advertising content may be used for one or more modes of illumination and/or irradiation. In one embodiment, the AVLED provides illumination that indicates direction for a turn or continued progression, street name, or other navigational related information to aid in navigation (such as pedestrian, vehicle, navigation indoors (shopping, etc.)).

Bactericidal Mode

In one embodiment, the AVLED emits light flux from a first spectral band from one or more light sources in one or more angular bins to a surface, spatial zone, or region at a specific irradiance or radiant exposure sufficient to kill bacteria in a bactericidal mode. In on embodiment, the AVLED emits light from one or more LEDs (such as one or more micro-LEDs) with a peak wavelength in the range between 380 nanometers and 510 nanometers, 395 nanometers and 420 nanometers, or 400 nanometers to 405 nanometers into one or more angular bins corresponding to one or more spatial zones and/or surfaces wherein the light from the LED kills (inactivates) pathogenic bacteria. In this embodiment, the bacteria may include, for example, one or more selected from the group *Staphylococcus Aureus, Clostridium, Clostridium Difficile*, Coagulase-negative *Staphylococcus*, MRSA, *Enterococcus*, and *Streptococcus*. In one embodiment, an AVLED emits light flux from a first spectral band for a first period of time from one or more light sources in one or more angular bins corresponding to surfaces, regions, or spatial zones automatically identified and/or user identified for disinfecting (such as drains, bathtubs, countertop, garbage bin, dish towel, toy, phone, refrigerator door, light switch, microwave button, phone, keyboard, remote control, bathroom floors, toilets, sinks, faucets, hospital equipment, hospital walls, hospital floors, or hospital beds) optionally when people are not present and/or into angular bins that avoid exposure to people (such as identified by one or more imagers on the AVLED or in communication with the AVLED).

Phototherapy or Photobiomodulation Therapy Mode

In one embodiment, one or more AVLEDs illuminates and/or irradiates one or more individuals or animals in a phototherapy or photobiomodulation therapy mode wherein the wavelength, duration, dosage, and/or frequency of exposure is provided to generate a clinical benefit, such as mechanisms at discrete cellular cites that use photoreceptive targets that may include a performance mechanism (such as cytochrome C oxidase, a regenerative mechanism (such as a TGF-β1 activation), and/or an analgesic mechanism (such as TRPV1, Opsins). In one embodiment, the photobiomodulation therapy provides benefits for one or more selected from the group: Parkinson's disease, stroke, traumatic brain injury (TBI), chronic wounds (venous, pressure, or diabetic), mitigate the side-effects of cancer therapy (radiotherapy and/or chemotherapy), concussions, age-related macular degeneration, back pain, tendinopathy, Alzheimer's disease, diabetic retinopathy, hair growth, mitigate chemotherapy-induced oral mucositis, mitigate chronic inflammation, improve acute muscle performance and reduce muscle damage after exercise. In one embodiment, the AVLED comprises one or more scanning lasers or a spatial array light source that provides photobiomodulation therapy light flux to a target (such as an arm on an individual, for example) in one or more angular bins that may optionally be tracked automatically.

Horticulture Lighting Mode

In one embodiment, an AVLED operating in a horticulture lighting mode emits a light flux with a first wavelength spectrum for plant growth and/or flowering into one or more angular bins associated with surfaces of plants, regions with plants, or a spatial zone comprising plants. In this embodiment, energy can be saved by not supplying unnecessary spectrum of light (or less efficient spectrum of light) and also by not illuminating surfaces, regions, or spatial zones without plants (unless, for example, one or more surfaces without plants are illuminated near the plants for indirect illumination of the plants). In one embodiment, the first wavelength spectrum comprises one or more of the following: red light (630-660 nm), blue light (400-520 nm), green light (500-600 nm), and far red light (720-740 nm). In one embodiment, one or more AVLEDs may be programmed to emit light from one or more light sources in one or more angular bins to illuminate one or more regions, surfaces, objects, individuals, and/or component thereof at a specific time or interval according to one or more modes of illumination and/or irradiation, such as an AVLED emitting red and blue light flux only in angular bins corresponding to spatial zones comprising plants from midnight to 5 AM. In one embodiment, an AVLED operating in a horticulture lighting mode emits a first light flux at a first time period from one or more light sources into one or more angular bins associated with surfaces of plants, regions with plants, or a spatial zone comprising plants and a second light flux different from the first light flux in the one or more angular bins at a second time period different from the first time period. In one embodiment, an AVLED comprises an imager (or is in communication with an imager) wherein the AVLED emits light with the first wavelength spectrum in one or more angular bins correlating to the location of a particular plant or problematic portion of a plant using image analysis and increases and/or decreases the light flux in the particular angular bin based on image analysis of images from the imager. In one embodiment, an AVLED operating in a horticulture lighting mode may provide UV-C light (100-279 nanometers) and/or UV-B light (280-315 nanometers) to reduce mold, reduce decay, enhance terpene content of cannabis crops, alter the taste and/or smell, and/or fight or kill pathogens in plants in one or more spatial zones corresponding to one or more angular bins of the AVLED.

Aquacultural or Animal Husbandry Lighting Mode

In one embodiment, an AVLED operating in an aquacultural or animal lighting mode emits a light flux with a first wavelength spectrum from one or more light sources into one or more angular bins associated with direct and/or indirect illumination of one or more surface(s) of fish, surface(s) of animals, region(s) with fish, region(s) with animals, spatial zone(s) comprising fish or animals for one or more of the following: increased food uptake and/or visibility (such as increased yellow-white light flux for poultry), increased growth, increased muscle growth (such as increased green light flux for poultry), reduced aggression (such as increased red light flux for poultry), increased wakefulness (such as increased 480 nm blue light flux for cows), increased environmental maintenance without disturbance (such as night time illumination with increased red light flux for cow since they are unable to detect significant red light flux), increased disinfection (such as increased light flux in a spectrum within the range from 380 to 420 nanometers or at 405 nanometers). In one embodiment, an AVLED comprises an imager (or is in communication with an imager) wherein the AVLED emits light with the first wavelength spectrum in one or more angular bins correlating to the location of a particular animal or fish (optionally tracking the animal or fish) and/or problematic portion of an animal or fish using image analysis and increases and/or decreases the light flux in the particular angular bin associated with the animal, fish, or problematic portion thereof, based on image analysis of images from the imager to improve the health, productivity, reproduction, reduce aggression, and/or improve one or more other properties of the animal or fish.

Human Centric Lighting Mode

In one embodiment, an AVLED operating in a Human Centric Lighting (HCL) mode emits a first light flux from one or more light sources with a first HCL wavelength spectrum with a first HCL illuminance on one or more surfaces, regions, and/or spatial zones from the first light flux for high circadian stimulus during the daytime, and a second light flux less than the first light flux from one or more light sources with a second HCL wavelength spectrum with a second HCL illuminance on the one or more surfaces, regions, and/or spatial zones in the evening. In one embodiment, the first HCL wavelength spectrum comprises one or more wavelength bands providing a cool white color temperature (such as white light with a correlated color temperature (CCT) between 4600K to 6500K, 5000K, 6000K, or 6500K) and the first HCL illuminance is greater than or equal to one selected from the group 250, 275, 300, 350, and 400 lux. In another embodiment, the second HCL wavelength spectrum comprises one or more wavelength bands providing a warm white color temperature (such as white light with a correlated color temperature (CCT) between 2000K to 3000K, 2000K, 2500K, 2700K, or 3000K) and the second HCL illuminance is less than one selected from the group 250, 225, 200, 175, 150, and 100 lux.

Myopia Reduction Mode

In one embodiment, an AVLED operating in a Myopia reduction mode emits light in the morning with a first spectral irradiance ($W \cdot m^{-1} \cdot nm^{-1}$), light in the afternoon with a second spectral irradiance less than the first spectral irradiance, and light in the evening with a third spectral irradiance less than the second spectral irradiance in the wavelength range between 470 and 490 nm, 475 and 485 nm, or 478 and 482 nm into one or more angular bins corresponding to vertical and/or horizontal surfaces visible to one or more individuals in the environment. In one embodiment, the second spectral irradiance is between 40% and 80% of the first spectral irradiance, and the third spectral irradiance is between 0 and 40% of the first spectral irradiance. For example, on a wall in front of an individual (optionally different walls in different rooms over the course of a day) an AVLED emits 100 Watts per square meter at 9 AM, 60 Watts per square meter at 2 PM, and 20 Watts per square meter at 8 PM in the wavelength range between 478 and 482 nanometers. In one embodiment, the light flux from one or more light sources for wavelengths near 480 nanometers is reduced (such as reduced linearly) during daylight hours from morning till evening. In one embodiment, the AVLED comprises a first plurality of warm white light sources (optionally comprising less than 10% of the light flux in the spectral range from 470 nm to 490 nm) and a second plurality of cool white light sources (optionally comprising more than 10% of the light flux in the spectral range from 470 nm to 490 nm) wherein for one or more angular bins, the AVLED emits light from the cool white light source(s) and less than 5 lumens or no light flux from the warm white light source(s) and gradually increases the relative light flux output from the warm light source(s) and decreases the relative light flux from the cool white light source(s) over the course of the day.

Multi-User Mode

In one embodiment, one or more AVLEDs (or a system comprising one or more AVLEDs) adjusts the light flux output from one or more light sources in two or more angular bins based on requirements, operational parameters, or user preference for a plurality of users operating in the same or different modes of illumination and or irradiation. In one embodiment, the adjustment to the light flux output may be dependent upon user priority (optionally in addition to mode of illumination and/or irradiation priority and/or weighting) where the priority and or weighting could prioritize the light flux output from one or more light sources in two or more angular bins in one or more AVLEDs for one user over another (or another group). In one embodiment, each priority for each user could be higher (or lower) or weighted higher (or lower) than any particular other user and/or mode of illumination and/or irradiation for the other user. For example, in one embodiment, a parent may prioritize a safety and security mode over a first child's entertainment mode and a second child's projection mode, and the first child may independently prioritize the entertainment mode over a reduced or glare-free illumination mode. In one embodiment, each user may select one or more of the following: their desired modes of illumination and/or irradiation; one or more operational parameters for the mode (such as targets, thresholds, light properties, and/or other parameters disclosed herein); the relative priority and/or weighting for each mode of illumination and/or irradiation; one or more AVLEDs, angular bins, spatial zones, regions, surfaces, individuals, and/or objects for illumination and/or irradiation under the one or more modes of illumination and/or irradiation. In one embodiment, a high-level user, such as an AVLED administrator, business owner, or parent, for example, has the ability change the permission for one or more lower level users to change or select one of the aforementioned modes, parameters, light properties, priorities etc.

Manual Lighting Mode

The system comprising an AVLED could also use one or more key illuminance and/or irradiance registration/alignment spots or indicators that could be physical items in the environment, identified on images from an imager, or could be identified using a laser (such as a laser diode). In this embodiment, the AVLED could prioritize or adjust the illuminance or irradiance for those spots or indicators to the desired illuminance, irradiance, color, or temperature by infrared irradiation. One could use a red laser diode to decrease the white light illuminance in the spatial zone and a green laser diode (optionally on the same device as the red laser diode, such as a cellular phone) to increase the illuminance in that region. Alternatively, one could use a red, green, and blue laser diode on the same device with an increase button and decrease button for each (6 buttons in total) or a single button for each color. Pressing the red button once could turn on a constant red laser dot which could be directed to a spatial zone (and optionally the button could be pressed again to cause the dot to flash quickly to indicate selection for increase) for increasing the red illuminance to the spatial zone identified by an imager, for example, on the AVLED, and pressing the red button again could direct the dot back to a constant intensity, and when pressed again could cause the dot to blink slowly to indicate the spatial zone for decreasing the red illuminance to the spatial zone. Similarly, for the green and blue, the 3 or 6 buttons could enable one to dial in the color. Similarly, one could point on a region in an image on a display corresponding to the region of the environment and 3 pop-up slider bars could appear on the screen to adjust the red, green, or blue light output up or down for the environmental region or spatial zone (optionally for a particular AVLED) and the adjustments may be seen in substantially real-time (such as delay in response less than one selected from the group: 5, 4, 3, 2, 1, 0.5, 0.2, and 0.1 seconds). For manual light output adjustment, a user could direct the AVLED to turn on the one or more light sources corresponding to one or more angular bins, and the user could touch on a touchscreen multiple times at the location to increase (or decrease) illuminance in that area, or press and hold to increase in that area, or press and hold to set memory, or to have the region darkened then increased in illuminance in the location corresponding to the touched location when AVLED emits light to that spatial zone, or another user interface known for increasing, decreasing, turning off, or turning on the light flux and/or light source light flux output could be used. The AVLED could set a 50% base white light output for all angular bins, for example, and the adjustment (increasing or decreasing light output or changing color, from one or more AVLEDs) could be made from that base light output level.

Spatial Zone Temporal Transitions

In one embodiment, the transition of one region of illumination or spatial zone from a first illuminance and/or first color to a second illuminance and/or second color occurs linearly over a period of time less than one selected from the group: 20, 10, 5, 4, 3, 2, 1, 0.5, 0.4, 0.3, 0.2, 0.1 and 0.05 seconds. In another embodiment, the transition of one region of illumination or spatial zone from a first illuminance and/or first color to a second illuminance and/or second color occurs linearly or non-linearly over a period of time greater than one selected from the group: 30, 20, 10, 5, 4, 3, 2, 1, 0.5, 0.4, 0.3, 0.2, and 0.1 seconds. The transition time could include the dimming transition, color change transition, mode change transition, AVLED illumination transition, pre-illumination transition, or other transition occurring as a result of sensor information, programming, transition to a different mode of illumination, prioritization change (such as priority to a different individual or illumination rules for a particular mode), or other change in the system or environment.

Spatial Zone or Illuminated Region Boundaries

The AVLED may illuminate one or more regions (or spatial zones) in a hard spatial transition mode such as one where the transition of average luminance, average illuminance, average relative intensity, or CIE 1976 (L*, u*, v*) color space Au'v' color difference of illumination from a first region (or first spatial zone) to a second region (or second spatial zone) immediately next to (adjacent) the first region (or first spatial zone) may occur over a transition region less than one selected from the group: 30%, 20%, 10%, 5%, 1%, 0.5%, and 0.1% of the average spatial width of the first region (or first spatial zone) in a first plane orthogonal to the direction of optical axis of the incident light to the first region (or first spatial zone) centered on the estimated boundary between the two regions (or spatial zone) in the first plane. The AVLED may illuminate one or more regions (or spatial zones) in a soft spatial transition mode such as one where the transition of average luminance, average illuminance, average relative intensity, or CIE 1976 (L*, u*, v*) color space Au'v' color difference of illumination from a first region (or first spatial zone) to a second region (or second spatial zone) immediately next to (adjacent) the first region (or first spatial zone) may occur linearly or non-linearly over a transition greater less than one selected from the group: 30%, 20%, 10%, 5%, and 1% of the average spatial width of the first region (or first spatial zone) in a first plane orthogonal to the direction of optical axis of the incident light to the first region (or first spatial zone) centered on the estimated boundary between the two regions (or spatial zones) in the first plane.

In one embodiment, the illumination of a first region (or first spatial zone) and a second region (or second spatial zone) immediately next to (adjacent) the first region (or first spatial zone) do not overlap such that there is a substantially non-illuminated region between the first region and second region (or first spatial zone and second spatial zone) with an average luminance or average illuminance less than one selected from the group: 30, 20, 10, 5 and 1 Candela per square meter; and 30, 20, 10, 5 and 1 lux, respectively.

Adjacent Angular Bin Transitions

In one embodiment, an AVLED comprises an imager or light sensor with higher equivalent angular resolution (the subtended angle in the environment corresponding to a single imaging pixel or single light sensor) than the angular bin for a corresponding spatial array light source light emitting pixel. In this embodiment, the light properties for more than one pixel (and/or portions of neighboring pixels thereof) of an image or light sensor corresponding to the angular bin (and optionally neighboring pixels or portions thereof) may be averaged, estimated, totaled, or the maximum or minimum value for a group of pixels may be used, to represent the light property for determining the light flux for the corresponding angular bin of the spatial array light source (or scanning light source) depending on the illumination/irradiance mode. In one embodiment, the difference between light properties measured or estimated between two adjacent spatial zones (in one or more directions) in the environment is greater than a first transition value selected from the group of 20%, 30%, 40%, 50%, 60%, and 70% and light flux output in one or two angular bins corresponding to one or both of the neighboring spatial zone is adjusted to reduce the difference in illumination, irradiance, or resulting transition in light property (such as luminance or color) between the neighboring spatial zones to a second value less than the first transition value. For example, in a luminance matching mode, a dark object in a first spatial zone has a reflectance property of 10% and an adjacent spatial zone has a lighter object with a reflectance of 60% (where the reflectances may be estimated by one or more AVLEDs, for example). In this example, to match the luminance approximately 6 times the light flux could be directed toward the darker object than the lighter object, however to provide a more even transition (such as where angular bin borders do not match object borders, for example), the angular bin corresponding to all or a portion of the dark object could be only 4 or 5 times the light flux directed to the lighter object. In one embodiment, an optimized transition could be calculated for an entire environment or group of angular bins such that the ratio of the light flux output from two adjacent angular bins is less than one output flux ratio selected from the group 2, 3, 4, 5, 6, 7, 8, 9, and 10 to 1. In one embodiment, a processor on the AVLED or remote to the AVLED and in communication with the AVLED processes the image or light sensor input to identify one or more objects in the environment, determines one or more angular bins corresponding to the one or more objects, and adjusts the light flux output to the one or more angular bins to provide an output flux ratio less than one selected from the group 2, 3, 4, 5, 6, 7, 8, 9, and 10 to 1 for adjacent angular bins corresponding to all or a portion of the object and the one or more angular bins adjacent to the angular bins corresponding to all or a portion of the object. In one embodiment, the output flux ratio is minimized for all of the angular bins corresponding to the object and adjacent angular bins collectively while targeting a particular light property according to the illumination and/or irradiation mode. In one embodiment, the AVLED identifies if an illumination spot size (angular bin size) is less than or greater than an object to be illuminated (with white light or colored light) that could be identified using boundaries of color and/or luminance high contrast transitions or other identification or image/object recognition methods disclosed herein and/or that could be identified by using an imager and optionally an angular scan. In this example, if the spot size is less than the size of the object or boundary, then for illumination spatial zones within the object or region (such as in the middle of a wall), or at or near the boundary of the object or region of the environment, the transition illuminance or color may be graded along the transition (or within the region or object) such as by choosing an illuminance and/or color between the illuminance values for the spatial zones adjacent the central spatial zone being evaluated such that there is a smoother transition (no harsh illuminance or color boundaries, or visibly bright, dark, or colored spots or regions). In this and other embodiments, an imager on an AVLED may optionally validate the illuminance, irradiance, spectral output, or other light property based on one or more illumination and/or irradiation modes and the output may be optionally adjusted further based on one or more evaluations or iterations of illumination.

Setup, Calibration, and Measurement

In one embodiment, one or more AVLEDs in an illumination and/or irradiation system is pre-calibrated for absolute or relative measurement for one or more light properties (optionally for a fixed distance from the AVLED to the surface and/or a fixed environment/geometry). For relative calibration, different factors related to measurement accuracy may be taken into account may be accounted for to provide relative intensity measurements with increased relative accuracy from one spatial zone or region to another spatial zone or region, such as optical factors such as lens aberration, geometrical factors from one or more spatial three-dimensional measurements, input information for surfaces in the environment, user supplied information, for example. The aforementioned factors may also be taken into account for absolute calibration. In another embodiment, one or more AVELDs are calibrated on-site during install or by a user, on startup, at a regular/irregular interval, at a first frequency level, based on sensor input (such as light property information for one or more spatial zones from imager information), based on one or more modes of illumination and/or irradiation, on-demand, manually, and/or automatic at one or more predetermined or user configurable events or times. In one embodiment, the method of absolute or relative calibration includes one or more selected from the group: factory calibration using calibrated light sources and/or integrating spheres with light sources for uniformity calibrations/corrections (but not necessarily absolute luminance/radiance/intensity uniformity measurements); on-site measurement of light output (such as with a calibrated imaging photometer, portable lux meter, phone imager (used for relative measurements or calibrated), attachment to cellphone imager, or other portable device calibrated (or used for relative measurements) for one or more light properties translated and/or rotated in the environment to receive light from two or more angular bins from one or more AVLEDs); angular cycling (optionally with a direct measurement such as a relative calibration using a lux meter or luminance spot meter) using one or more AVLEDs; using an integrating sphere or similar enclosed uniform white surface space configured to receive and diffusely reflect light from one or more light sources such that relative uniformity corrections could be made. In one embodiment, an illumination kit comprises an AVLED and an integrating sphere (and optionally one or more light sources) that can be attached and/or used with the AVLED for relative and/or absolute calibration of an imager on the AVLED. In one embodiment, a kit for assisting with relative and/or absolute calibration of an AVLED comprises an integrating sphere or partially enclosed object with an white, diffusely reflecting interior surface (and optionally one or more light sources) that can be attached and/or used with the AVLED for relative and/or absolute calibration of an imager on the AVLED. In one embodiment, the relative or absolute calibration of one or more light properties is made at one or more parameters for the AVLED such as focal length of imager lens and/or AROE lens, size of the aperture stop diameter of the lens, entrance pupil diameter of the lens, light flux output, and/or spectral properties of light flux output.

Setup or Operational Parameters

In one embodiment, the AVLED has one or more setup or operational parameters that may be manually or automatically preconfigured at the factory, configured by the installer at installation, adjusted by the device automatically, and/or adjusted by the user (manually or automatically) on demand, at automatic (trigger) events, regular intervals, or user selected times or frequencies. In one embodiment, the operational or setup parameters may include one or more parameters (optionally for one or more modes of illumination and/or irradiation) selected from the group: user or automatically identified spatial zones (or regions or boundaries of spatial zones) for light flux output change (or exclusion from changing) from one or more light sources and/or angular bins and/or AVLEDs or monitoring using one or more sensors or imagers on one or more AVLEDs or remote devices; angular resolution of one or more sensors or imagers on one or more AVLEDs or remote devices; focal length of one or more lenses or optical components for one or more sensors or imagers on one or more AVLEDs or remote devices; angular size of one or more angular bins of light output for one or more AVLEDs (such as using two adjacent LEDs in a micro-LED array for a single angular bin instead of one angular bin for each LED (or two adjacent LEDs) in a micro-LED array); total angular range of light output in one or more light output planes for one or more AVLEDs (such as by increasing the total angular output for an AVLED comprising a scanning laser); color or spectral properties of light flux output for one or more light sources in one or more angular bins and/or one or more AVLEDs; minimum, average, duration, maximum, or frequency (when pulsed) of light flux output from one or more light sources in one or more angular bins and/or one or more AVLEDs; events, triggers, times and/or frequency for angular cycling or measurement of one or more spatial zones using one or more imagers on the one or more AVLEDS and/or remote imagers; events, triggers, times and/or frequency for measurements (such as 3D spatial scanning, thermal scanning, occupancy sensor) using one or more sensors (such as sensor disclosed herein) on the one or more AVLEDS and/or remote devices; events, triggers, times and/or frequency for communication between two or more devices in an illumination system comprising one or more AVLEDs (and optionally one or more radio transceivers) or between a device in a system comprising one or more AVLEDS and a device remote from the system comprising one or more AVLEDs; color or spectral properties of the light analyzed by one or more sensors or imagers on the one or more AVLEDS and/or remote devices (such as only analyzing pixels on a full color imaging sensor on an AVLED beneath a green color filter, averaging the red green and blue pixels of a full color imaging sensor, chromatically weighting the red, green, and/or blue filter pixel intensities for closest approximation of luminance values for white light with a specific color temperature (such as 2700K, 3000K, 3500K, 4000K, 4100K, 5000K, or 6500K, for example) or other colors, using a monochrome imaging sensor, or choosing the bit depth of the image sensor on one or more AVLEDs); the integration time for one or more imaging sensors (and/or pixels) on one or more AVLEDs; the image capture frequency of one or more imaging sensors on one more AVLEDs; the total refresh time for measurement of one or more spatial zones and/or adjustment of light flux output for one or more light sources in one or more angular bins; display properties for indication and/or adjustment of one or more of the aforementioned parameters (such as reducing the number of angular zones visible on a graphical user interface in an application on a portable phone or device for adjusting the spatial zones of importance, using a heat map for displaying spatial zones with higher or lower than average values (or specific values, predetermined values, or specification values) of measured and/or estimated light properties, indication of measured and/or estimated shadow regions, or display of one or more active modes for one or more spatial zones (such as by color-coding the spatial zones according to a color or pattern corresponding to a particular mode of illumination and/or irradiation); and selection of manual or automatic mode for adjustment of one or more of the aforementioned parameters based on measurements. In one embodiment, the AVLED or a device in communication with the AVLED (such as a portable device, smartphone, or tablet computer) displays on a display graphically or textually one or more operational parameters, output information, sensor information, communication information, light property information, other property information, spatial zone information, user parameters, or status information for one or more light sources, angular bins, one or more AVLEDs, or a system comprising a plurality of AVLEDS (such as the real-time, minute average, hourly average, daily average, or monthly average electrical power consumption for an AVLED).

In one embodiment, the AVLED has a setup, calibration, or measurement mode wherein one or more AVLEDs (optionally in a network) cycles through emitting light from each (or one or more) of their one or more light sources from each (or one or more) of their plurality of angular bins for each of the one or more AVLEDs (herein called "angular cycling") and optionally adjusting the light flux from each light source over a range (preferably while no other light sources are emitting light in the environment, i.e. a dark environment, though an illuminated and/or irradiated environment could be used and the intensity or luminance differences could be used) and the light reflected from the environment is detected by a sensor or camera on one or more selected from the group: the AVLED emitting light, each of a plurality of AVLEDs, one or more other AVLEDs, a portable device (such as a smartphone) comprising a camera, and a vehicle comprising an imager. The AVLED or system with an AVLED could map the image pixels (and corresponding spatial zones) to each energized light source or each angular bins and create a light field map (illumination light field map) that can be estimated, calculated, derived from the light reflected from the environment due to the illumination (and/or irradiation) of the environment from each light source (and/or each angular bin) independently from each AVLED. When the AVLED comprises light sources (or an AROE) with different wavelength ranges representing different colors, each light source and/or each wavelength range for an angular bin may provide illumination and/or irradiation of the environment separately such that the light field map includes color reflectance information. Additionally, the light flux output from each light source may be varied (such as progressing from 0 lumens (or watts) to the designed/configured/or set maximum lumen output or watt output). The output may be adjusted, for example increased, to overcome ambient light such that the output due to the light source may be more accurately determined. The one or more imagers may be calibrated to determine the luminance and/or illuminance for the pixels corresponding to a region in the environment (such as a spatial zone corresponding to a specific angular bin of a specific AVLED). The surface properties of the region in the environment can be estimated by evaluating the reflected light profile outside of the illuminated region. For example, a specular surface will reflect light with a relatively high intensity and often sharply defined boundaries due to the boarders of the object or illuminated light profile. The accuracy of the surface profile (level of gloss) can be increased by looking at the reflected light from multiple AVLEDs during angular cycling. Examining the reflected light from different wavelength ranges (such as infrared, ultraviolet, red, green, blue, white, amber, yellow, for example) can be used to estimate the spectral reflectance of the region (and color of the region). In one embodiment, an AVLED comprises one or more slots, a cavity, a strap, clip, clamp, snap-fit lock, or other fastener as disclosed herein for an accessory configured to hold a smartphone or other portable device comprising an imager to the AVLED to use as the imager. In this embodiment, one could use the high-resolution camera of the smartphone (and optionally an application running on the phone for calibration, setup, measurement, and/or AVLED and/or system control such as a graphical user interface using the image taken from the phone (optionally adjusted for the off-set from the light emitting portion of the AVLED, or the control automatically adjusts for the offset when selecting the light source for light flux adjustment corresponding to a region on the image) for controlling the light flux output and/or light flux into one or more angular bins of the AVLED using the smartphone display user interface, for example) by attaching it temporarily (or permanently) to the AVLED and communicating using optical (infrared LED, for example), RF (such as one or more IEEE 802.11 Wi-Fi communication protocols or Bluetooth, for example), or USB or other wired communication method to the AVLED and/or a device/server on a network or system comprising one or more AVLEDs. In this embodiment, the imager could be oriented toward the environment (such as oriented downward for a downlight AVLED) in a position such that it does not occlude the light output from the AVLED. In this embodiment, the smartphone and/or portable device could have a lens accessory attachment to go over the camera on the smartphone and/or portable device to increase the field of view to substantially match or be greater than the total angular field of the angular bins of the AVLED in one or more light output planes. In one embodiment, the AVLED comprises a mounting mechanism that mounts the portable device comprising an imager such that the optical axis of the imager is fixed and/or rotatable to one or more angles selected from the group: theta=0 degrees, phi=0-360 degrees (such as parallel to the optical axis or device axis of the AVLED), and theta=45 degrees, phi=0, 45, 90, 135, 180, 225, 270, 315, and/or 360 degrees, where the optical axis or device axis of the AVLED is parallel to theta=0 degrees, phi=0 degree. In one embodiment, the AVLED comprises an electronically rotating mounting mechanism that mounts the portable device comprising an imager such that the optical axis of the imager automatically rotates to record light properties (such as in angular cycling) from a larger field of view than a fixed orientation imager. In one embodiment, the automatic rotation of the imager is controlled by the AVLED (or device in communication with the AVLED) wherein the measurements and/or estimations may be used for calibrations, determining operational parameters, and/or measurements of light properties (such as for angular cycling).

The illumination used for measurement by one or more sensors or imaging sensors in one or more AVLEDs (or remote devices in communication with one or more AVLEDs) may be one or more selected from the group: fixed or predetermined angular light flux output from the one or more AVLEDs (including all light sources emitting 50% of their maximum light flux output, all red light sources emitting 100% of their maximum light flux output, or manually directing light output to one or more spatial zones selected by the user, for example); angular cycling (including one or more light sources (possibly one or more wavelength bands and one or more light flux output levels) within one or more angular bins of one or more AVLEDs); and ambient lighting sources (light sources or light emitting devices that may be external light sources (external to the system comprising one or more AVLED), light emitting devices controllable by the system comprising one or more AVLEDs, light emitting devices with a constant relative angular light output profile, light fixtures, lamps, bulbs, the sun, the moon, light emitting displays (televisions, monitors, tablets, phones, etc.), light emitting signs, or light emitting indicators).

The light output from the AVLED may be pre-measured (such as by using a photometric goniometer or other methods such as imaging photometers as known in the lighting industry or display industry) and the light output may optionally be configured to provide a predetermined light flux output range for each angular bin which may be substantially the same for each angular bin, substantially multiplied by the cosine of the angle from the optical axis of the AVLED (or nadir, for example) to the optical axis of the corresponding angular bin, or substantially divided by the cosine of the angle from the optical axis of the AVLED (or nadir, for example) to the optical axis of the corresponding angular bin. By creating a 3D spatial map of the environment using methods disclosed herein, the illuminance and/or irradiance on a surface region of the environment may be estimated using the size, shape, orientation, and distance and direction from the AVLED to the illuminated and/or irradiated surface of the region using the pre-measured output from the AVLED. An AVLED may be evaluated by the manufacturer or third-party post-production and the photometric and/or radiometric light output measured (including spectral, optical watts, and/or lumen output over angle), optionally for each light source and each angular bin (optionally for each light output level for the light source, or a fixed light output level (such as dimmed to 50%, for example). The output measured may be continuously monitored by the AVLED using feedback to determine relative performance (such as a decrease in output by 5% after the first 1000 hours of service measured by a photosensor receiving stray or predetermined light, one or more built-in detectors, one or more remote AVLEDs sensors or imagers, or remote sensors or imagers to provide intensity depreciation and/or lumen depreciation information or monitoring to maintain accurate estimation of the illuminance or irradiance for the surface of the region.

Alternatively, or in addition, the reflected luminance and/or radiance and/or relative light intensity (such as from a calibrated imager on the AVLED, imager on a portable device or imager remote from the AVLED) may be measured (or determined from measurements) and when the reflective spectral properties (and diffuse or reflective properties) of the region and the location and orientation geometry factors of the imagers and AVLEDs are taken into account, the illuminance or irradiance may be estimated by one or more AVLEDs or the system and the accuracy may be increased by using more than one AVLED and/or one or more calibrated and/or non-calibrated imagers.

Uncalibrated imagers may be used to provide an illuminance and/or irradiance estimation, such as by evaluating the image intensity corresponding to the reflectance from a white sheet of paper (or stack of white paper, reflectance standard, or other reference which may or may not be provided with the AVLED or system) illuminated by a particular light source (such as a calibrated, known, or estimated LED light output) from a particular location and orientation. In one embodiment, the setup or operational parameters include manual override, choice of preset reference data or calibration data or acquisition of the data, environmental scan choices, angular cycling choices, mode priority, input from other AVLEDs or devices in communication with one or more AVLEDs, and output type and ranges of output from the AVLED.

Angular Cycling

The angular cycling could include discrete steps that can each be evaluated by one or more sensors such as a plurality of imagers. In one embodiment, one or more AVLEDs perform an angular cycle where the light flux output (at a fixed light output (on/off) or a sweep of flux light output) for each (or one or more) light source in each (or two or more) angular bins in each (or one or more) AVLEDs, is varied and is time synchronized with imager detection receiving an image of the illuminated or irradiated environment for each light source(s) where the light flux output is varied. The light source emission of light for one or more (or each) angular bins for one or more AVLEDs (and/or the sensor image capture exposure duration) may last less than one selected from the group: 1000, 100, 50, 25, 17, 15, 10, 8, 5, 2 or 1 milliseconds in duration.

In the angular cycling descriptions below, A is followed by a two digit number referencing the number for a particular AVLED, followed by L and a two digit light source number for a light source within an angular bin, followed by a W and a 2 digit number referencing a wavelength band reference number (if different colors of light sources are present), followed by the letter I and a two digit number referencing the light flux output level for the source from 1 to 100% (maximum), followed by B and a two digit number referencing the bin number. For example, A02L02W04I20B66 references AVLED #2 to energize to emit light from the second light source with a wavelength band number 04 (which may correspond to light output substantially between 450 nanometers to 480 nanometers, for example) at 20% maximum light flux output in angular bin number 66. For some AVLEDs, the notation may be shortened. For example, in a scanning RGB laser-based AVLED, there may only be 1 effective source with 3 different wavelength bands such as a red laser (wavelength band #1), a green, laser (wavelength band #2), and a blue laser (wavelength band #3), for example, such that the light source number may be omitted and A03W02I30B33 references driving on AVLED #3 the green laser at 30 percent of the maximum radiant flux in angular bin 33. More than 2 digits may be used for sources, wavelength band, intensity bands, or angular bins as needed. The AVLEDs may cycle through each of the corresponding numbers in any particular fashion for angular cycling, such as starting with A01L01W01I01B01 to A01L99W01I01B01 where the AVLED #1 cycles through the 99 light sources in a first wavelength band in the first angular bin at an intensity of 1%. One or more portions may be kept constant for the cycling such as driving each light source at 50% light flux output. The light output for each source, each wavelength band, each intensity level, in each angular bin, in each AVLED may be evaluated by a one or a plurality of imagers or sensors on the AVLED emitting light, on an AVLED remote from the AVLED emitting light, mounted or positioned in the environment, on a portable device, or on a vehicle. The imagers or sensors may be mounted at a range of orientations including upward, downward, horizontal, etc., preferably to image the entire environment including the ceilings, floors, and walls, for example. In another embodiment, one or more sensors on a portable device (such as a portable phone) may be repositioned around the environment and/or reoriented in the environment to collect the illumination and/or irradiation information from different locations and/or orientations, optionally collecting the full angular cycling information (from each imager or sensor receiving light from each light source in each angular bin in each AVLED) at each location and/or each orientation.

For example, a first AVLED emitting white light into angular bin 44 illuminates an office area that includes a desk. The imager on the first AVLED does not see the floor behind the desk because it is occluded by the desk. The imager on the second AVLED sees a first dark (low luminance or relative intensity) region behind the desk when angular bin 44 from the first AVLED illuminates the office. At this point, it is not clear if there is a shadow or a black rug (or red) rug behind the desk. The second AVLED emits white light into angular bin 33 and the imager on the second AVLED measures a bright increase in luminance (or relative intensity) in all of the spatial areas surrounding the first region and a slight increase in luminance (or relative intensity) in the first region. The second AVLED can then emit red, green, and blue light from angular bin 33 and examine the luminance (or relative intensity) in the first region for each of the red, green, and blue illuminations. In this example, the red illumination light has a bright increase in luminance in the first region and the area around the first region, while the blue and green illuminations have a relative low increase in luminance (or relative intensity) in the first region compared to the regions around the first region. Therefore, the system comprising the AVLEDs may deduce that there is a red rug (or material with a strong reflectance of red light) behind the desk. In this example, the system may illuminate the region in many different ways, such as a) illuminate the first region with sufficient white light from the second AVLED (or AVLED other than the first AVLED) to match the luminance of one or more of the surrounding regions (or a target luminance), b) illuminate the first region with sufficient white light from the second AVLED (or AVLED other than the first AVLED) to meet an estimated illuminance for the first region to match the estimated illuminance of one or more of the neighboring regions (or a target illuminance), c) illuminate the first region from the second AVLED (or AVLED other than the first AVLED) with red, green, and blue light at a proportion such that the total illuminance of the first region matches the luminance of the neighboring regions (which may be illuminated with white light) and d) illuminate the first region with more red light and less blue and green light to match the luminance of one or more neighboring regions (or a target luminance). In the above example, for a system with substantially only white light output (or perhaps where substantially only the color temperature of white light can vary), options a) or b) may be used. Options c) or d) have the opportunity to realize an energy savings since some of the blue light and green light that would be absorbed anyway does not necessarily need to be emitted from the second AVLED. In the above example, the light output from angular bin 22 from a third AVLED may provide a more precise coverage of the first region due to its location, for example, and the system may direct it to emit white (or red, green, and blue, for example) to illuminate the first region. In some embodiments, more than one AVLED may be directed to illuminate the same region or spatial zone in order to increase efficiency (optical efficiency for target illuminance, luminance, and/or color, thus increased electrical efficiency). Similarly, if the rug in the first region were determined to be substantially black, less light flux from each of the red, green, and blue light sources (or less flux from the corresponding white light source(s)) for the corresponding angular bin could be directed toward the first region.

An AVLED may initially perform an angular cycle from all of its light sources and from image analysis from one or a plurality of imagers (optionally with 3D scanning of the environment (such as by LIDAR or imaging photogrammetry) which may be performed substantially near the same time or at the same time as the angular cycling), the shadows and reflections (including specular reflections) may be determined and a light field map for the first AVLED is created. This could be repeated for a second AVLED, third AVLED, and many other AVLEDs illuminating an environment, for example. Preferably, the angular cycling is performed without other substantial illumination (i.e. in the dark). Non-AVLED illumination source (angular invariant light sources) such as a traditional LED bulb in a lamp may optionally be analyzed in the on and off (or at different dimming levels) to produce their light field map and the system could also adjusted the light output profile from the one or more AVLEDs to account for the dimming level of the non-AVLED illumination source (or it could optionally also control the non-AVLED illumination source) and also take into account personal preferences from the user (such as use the lamp when seated at the desk) or other requirements or illumination priorities for one or more illumination modes described herein. In some embodiments, a subset of the angular bins may be illuminated to reduce the processing requirements and/or time required to capture images etc. In another embodiment, information from one or more sensors is processed and the angular bins to be cycled in angular cycle are based on the processing results. For example, if movement is detected in a room, the angular cycling could cycle through the angular bins corresponding to the regions surrounding (and optionally including the individual) and optionally the regions corresponding to the predicted path of the individual based on the movement to verify and/or modify the illumination based on one or more modes. For example, if the individual stands up and creates a shadow from a first AVLED, the system may recognize the shadow (as disclosed above) through an angular cycle that is limited to the region around the individual and the second AVLED could illuminated the shadow (using direct and/or indirect illumination), for example. The angular cycling may be off or in a coarse angular cycling mode (with only 5% of the angular bins illuminating, for example), such as when no motion is detected by a motion sensor.

In the above example with a desk in the environment, analyzing the images from the imager from the first AVLED and the imager from the second AVLED may deduce that the light from angular bin 55 from the first AVLED illuminates a wall opposite the desk such that the light reflected from the wall partially illuminates the first region and that light from angular bin 65 from the first AVLED illuminates the ceiling above the desk such that the light reflected from the ceiling illuminates the first region and the combined indirect illumination from angular bin 55 and angular bin 65 on the first region may match the neighboring or target illuminance or luminance. Thus, in this case, light from the first AVLED could illuminate what would normally be a shadow region using indirect illumination. The indirect illumination could also be supplemented by direct and/or indirect illumination from the second AVLED or other AVLED.

In one embodiment, a sensor or image sensor on one or more AVLEDS, on a portable device, on a vehicle or in communication with one or more AVLEDs measures and/or estimates one or more light properties for two or more spatial zones, angular bins, and/or surfaces from the illumination (such as a fixed or predetermined angular light flux output from one or more AVLEDs, angular cycling one or more AVLEDs, and/or ambient illumination). In one embodiment, an illumination system comprising one or more AVLEDs automatically choses to illuminate and/or irradiate areas based on which AVLED (or other light fixture) has better coverage (such as higher illuminance), such as a first AVLED having less occlusion of light toward the region of interest from than a second AVLED. Better coverage may include increased angular resolution. For example, a first AVLED far-away from the illumination region of interest may be able to provide base illumination, but a second AVLED closer to the illumination region of interest than the first AVLED may result in a higher illuminance, higher resolution (more angular bins for the region of interest or spatial zone) in the region of interest, and optionally, cumulatively, the smaller coverage spots from the second AVLED could fill in gaps in the illumination from the first AVLED if they both are utilized. An imager or camera in a system comprising one or more AVLEDs could image and match estimated illuminances and/or irradiances and/or relative reflected intensity using the estimated illuminances (or irradiances or relative reflected intensity) from one or more cameras/detectors (taking the average illuminance of that region (which may correspond to different spatial zones for different AVLEDs), for example), and can take into account glare and historical or current walking path for determining the best angular bin(s) from one or more AVLEDs to use for providing illumination to be sure light glare from the one or more AVLEDs does not arise when an individual walks along the path, for example.

In one embodiment, one or more AVLEDs performs angular cycling for an environment and one or more imagers on the one or more AVLEDs or remote from the one or more AVLEDs measures and/or estimates one or more light properties, the AVLED (or a device or processor in communication therewith) analyzes the information from the one or more imagers to determine one or more of the following: the reflectance (optionally spectral reflectance) of one or more regions, spatial zones, and/or surface; identify a shadow region; identify and/or locate an individual, and face, eyes, or object and its orientation and/or speed; identify a high specular reflectance region (such as a mirror or window); degree of reflected scattering (such as a portion of a Bi-directional Reflectance Distribution Function); and with spatial three-dimensional information for the one or more regions, spatial zones, and/or surfaces (optionally determined using photogrammetric image analysis of the images from the one or more imagers, LIDAR, structured light projection, or other spatial three-dimensional measurement techniques, etc. or user input) the AVLED adjusts the light flux output from one or more light sources in two or more angular bins to reach a target luminance, illuminance, or other light property for the one or more regions, spatial zones, and/or surfaces, or a surface adjacent or near thereof.

In one embodiment, one or more imagers (or mobile AVLEDs comprising one or more imagers) automatically change (and/or one can manually change) their position and/or orientation in an environment to measure one or more light properties from two positions and/or orientations in the environment to provide light property information (or information from which light property information can be obtained) to optimize the light output from one or more AVLEDs for one or more regions, spatial zones, and/or surfaces at one or more times of illumination according to one or more modes of illumination and/or irradiation. In one embodiment, one AVLED performs angular cycling at a first location in an environment, moves to a second location in the environment different from the first location, and performs second angular cycling at the second location wherein an imager and/or processor on the AVLED, on another AVLED, or in communication with the AVLED measures and/or estimates one or more light properties based at least in part on the information from the imager in the two locations and the distance between the two locations (and optionally using spatial three-dimensional information for the environment).

In one embodiment, an AVLED or device in communication with an AVLED or illumination system comprising an AVLED identifies and/or calculates one or more of the following objects, places, surfaces, light properties, or other properties (such as from angular cycling and/or measurements from imagers or other sensors): automatic identification of one or more individuals, objects (such as tables, pictures, tv, couches, seats, desks, monitors, doors, windows, or other items common to a room), rooms, or environments; the shape of a room and/or object, their physical surfaces locations, and/or orientations; location, orientation, and/or speed of one or more individuals or objects; the effect on light properties, reflective or transmission properties, diffuse or angular scattering properties, spectral reflection properties, and/or transmission properties of illumination on each (or one or more) surface(s), region(s), spatial zone(s), from each (or one or more) color light source(s) and/or each (or one or more) light source(s) from each (or one or more) angular bin(s) from each (or one or more) AVLED(s) in the illumination and/or irradiation system; and the approximate color of one or more objects and/or surfaces; ambient lighting effects on each (or one or more) surface(s), region(s), spatial zone(s). In one embodiment, the automatically identified (or optional user validated and/or user verified automatically identified) object, individual, or place may be automatically categorized into group (such as tables) for which one or more operational parameters for one or more modes of illumination and/or irradiation may be set. In one embodiment, by angular cycling one or more AVLEDs (or providing light flux output to a plurality of angular bins), and analyzing the light properties from one or more imagers (optionally on the one or more AVLEDs or remote from the one or more AVLEDs) the location of the one or more AVLEDs (and optionally the spatial three-dimensional information for a room, environment or surfaces) may be estimated and/or calculated (such as by examining the angles of a plurality of shadows and triangulating or using photogrammetric image analysis).

Measurement Times

The AVLED may perform angular cycling and imager measurements (from the same AVLED or one or more other AVLEDs such as to create a light field map) and optionally other measurements (such as motion sensor or 3D scanning) at one or more times or intervals selected from the group: upon initial startup (turn on); during time periods based on sensor input such as during periods where substantially no motion is detected for a period of time such as 2, 5, or 10 minutes; when triggered by a sensor (such as a motion sensor); at regular intervals such as an interval less than or equal to substantially every 0.05, 0.1 seconds, 0.5 seconds, 1 seconds, 2 seconds, 5 seconds, 10 seconds, 30 seconds, 1 minute, 2 minutes, 5 minutes, 10 minutes, 15 minutes, 30 minutes, 1 hour, 2 hours, 6 hours, 12 hours, 24 hours, and 5 days, continuously in real-time, at specific trigger events, or at other predetermined frequency.

By repeating the angular cycling and measurements at particular times or intervals, the properties of the room can be updated at an appropriate rate for one or more illumination and/or irradiation modes, for example, to account for movement of objects or individuals, movement of the AVLED or device comprising the AVLED, movement of one or more of the imagers, external illumination, or other factors such as entertainment mode color enhancement for a television which may require a fast response and update.

In one embodiment, a system comprising one or more AVLEDs, an AVLED, a portable device, and/or a vehicle comprises one or more imagers wherein the imagers are substantially calibrated for luminance, radiance, reflective spectral properties, and/or color for one or more lens apertures (or AROE apertures), one or more focal lengths for one or more lenses directing light to the one or more imagers. For example, in one embodiment, prior to installation in a ceiling, one or more imagers of an AVLED is illuminated by light from a uniform luminance integrating sphere where the luminance is known and the apertures and lens focal lengths are changed and the lens and imager correction factors are determined (which can take into account lens vignetting, for example) for each pixel and optionally for different light colors such as red, green, blue, warm white, cool white, or other white color temperatures.

In one embodiment, the light output from an AVLED is not symmetrical or off-axis from a direction orthogonal to the mounting surface. In this embodiment, the orientation may be adjusted, selected from a configuration control panel (on a smartphone application for example), or the one or more imagers (in the AVLED or another AVLED or remote from the AVLEDs) automatically determines the relevant light output during the angular cycling regardless of the orientation.

The AVLED may also perform a color sweep for the angular cycling wherein the color output from one cycle to the next cycle varies. For example, the AVLED may energize the corresponding red light source(s) as the AVLED cycles through each angular bin so that the red light field map is created by an imager on the AVLED (and optional from other imagers which may be on other AVELDs), then the AVLED may energize the corresponding green light source(s) as the AVLED cycles through each angular bin so that the green light field map is created by an imager on the AVLED (and optional from other imagers which may be on other AVELDs), then the AVLED may energize the corresponding blue light source(s) as the AVLED cycles through each angular bin so that the blue light field map is created by an imager on the AVLED (and optional from other imagers which may be on other AVELDs). Optionally, the intensity for each color vary over a wide range, 2 intensity levels, 3 intensity levels, etc. before moving to the next angular bin. In another embodiment, the AVLED may cycle through each color, such as red, green and blue light source(s) for a single angular bin, then move to the next angular bin and repeat sequentially illuminating the red, green, and blue light source(s). Optionally, the intensity for each color in the angular bin may vary over a wide range, 2 intensity levels, 3 intensity levels, etc.

The system comprising the AVLED could optionally direct other AVLEDs (and/or non-AVLED illuminating devices) to not emit light during the angular cycling, or the system could detect the windows of time wherein the one or more other AVLEDs are not emitting light (such as between pulse periods in a pulse-width modulated light source) and perform all or a portion of the cycling during the windows of time. In one embodiment, the system could adjust the pulse widths, intervals, amplitude, etc. for one or more AVLED or non-AVLED light emitting devices in order to open windows for angular cycling. The angular cycling could occur in illumination and/or irradiation off-duty cycles (or non-light emitting periods) and be split up to occur over a range of time between periods of illumination and/or illumination.

The light field for each AVLED (as optionally evaluated from more than one imager) and optionally using 3D environmental data for each color could be used to calculate the reflectance matrix for a particular surface or region. Using individual colors and/or white light illumination, the degree of gloss, diffuse reflectance, and/or anisotropic reflectance parameters for each surface may also be evaluated. On or more visible or infrared imagers may also be used to determine solar irradiation in the environment and the reflections from the surfaces. The angular cycling by one or more AVLEDs may also be used to determine the 3D arrangement of the room (including the locations of the AVLEDs relative to each other), such as by looking at relative intensities, shadows, reflections (each from direct and/or indirect illumination) from multiple angular bins from a single AVLED and/or from multiple AVLEDs and one or more imagers (on the AVLEDs or remote from the AVLEDs) and image analysis such as photogrammetric analysis.

In one embodiment, based on the AVLED positions and/or orientations and the components of the rooms including possibly other imagers, there may be shadow area (or region without enough resolution from the imagers) where the imagers are not able to see to ascertain (or ascertain with enough resolution and/or accuracy) the relative or estimated illuminance, luminance, or relative intensity, and the AVLED may highlight the region on a display on a smartphone with a camera or other portable device with an imager such that the operator of the portable device may direct the smartphone imager at the region (optionally indicating for the user to move closer or further back from the region) for all or a portion of an angular cycling routine of one or more AVLEDs such that the relative or estimated illuminance, luminance, or relative intensity may be determined for one or more angular bins of one or more AVLEDs. The AVLED or system comprising the AVLED in this instance may indicate when sufficient data has been collected so that the user may move the portable device.

In one embodiment, the light flux output from one or more light sources in two or more angular bins in one or more AVLEDs is determined for one or more modes of illumination and/or irradiation using one or more selected from the group: measured or obtained three-dimensional spatial information of the environment; measured or obtained information on the reflectance properties of one or more surfaces in the environment (such luminous reflectance, spectral reflectance for one or more wavelengths of interest); measured or obtained reflective angular distribution properties (such as all or portions of a Bi-directional Reflectance Distribution Function, BRDF) for one or more surfaces (or spatial zones) when illuminated from one or more light sources in one or more angular bins from one or more AVLEDs); measured or obtained information related to the identification of (or distinction between) low reflectance (or low luminance or radiance) surfaces and/or shadow regions; information related to the identification of (or distinction between) high reflectance surfaces (or high luminance or radiance) and/or external light sources or light emitting devices; and measured or obtained information related to identification of specific objects or features in the environment (such as eyes, mirrors, windows, vehicles, signs, displays, monitors, facial recognition, for example) where the measured information may be measured by one or more sensors on the AVLED or remote from the AVLED. In one embodiment, a light field map comprising one or more light properties for one or more light sources in one or more angular bins in one or more AVLEDs is generated based on, in part, information from angular cycling one or more AVLEDs. In one embodiment, the light field map information is stored, and/or saved on a non-transitory computer readable media on one or more AVLEDs, a system comprising one or more AVLEDs, or on a device in operable communication with a system comprising one or more AVLEDs. In one embodiment, the light flux output for one or more light sources in two or more angular bins in one or more AVLEDs is determined based at least partly on the light field map for the one or more light sources in two or more angular bins in one or more AVLEDs. In one embodiment, a processor on one or more AVLEDs or a device in a system comprising one or more AVLEDs uses the light field map for the one or more light source in the two or more angular bins in one or more AVLEDs to calculate and/or optimize (locally and/or globally) the light flux output for the one or more light sources in two or more angular bins in one or more AVLEDs for one or more modes of illumination and/or irradiation.

Angular Cycling Reduction

In one embodiment, the information from the light field map (such as the estimated or measured luminance, radiance, relative intensity of light on object, spectral reflectance, illuminance, irradiance, or relative light intensity emitted, based on sensor (such as imager) information) from one or more AVLEDs and/or imagers during one or more angular cycling events may be used to determine where light property information from the light map may be estimated or deemed to be static (or below a first threshold of change) for one or more spatial zones, angular bins, and/or surfaces such that the angular cycling may be reduced by (1) not emitting light from one or more light sources and/or one or more angular bins and/or one or more AVLEDs during one or more angular cycling events or other measurement event, and/or (2) the information for one or more regions of an imager or sensor (which may correspond to one or more regions, surfaces, angular bins, and/or spatial zones) from one or more AVLEDs, portable devices, and/or vehicles does not need to be evaluated and/or measured (or a portion of a scan from a scanning detector does not need to be evaluated for light properties). For example, if the relative intensity (or measured or estimated luminance or illuminance) for a first spatial zone on the ceiling of a room comprising a first AVLED and a second AVLED due to illumination from the third angular bin from the first AVLED does not change after 5 measurements over a 20 minute time period (once every 4 minutes), then the frequency of measurement and/or evaluation for the first spatial zone may be changed to one evaluation/measurement every 30 minutes, 60 minutes, 2 hours, 1 day, etc. (optionally unless a trigger event occurs from one or more sensors). In one embodiment, after one or more angular cycles is performed by one or more AVLEDs, the system comprising one or more AVLEDs may use a determined angular light output (for one or more illumination and/or irradiation modes) as a new reference to evaluate and determine a change in the environment. For example, a system for illumination comprising two AVLEDs illuminating an environment in a maximum efficiency mode for a particular uniformity level (such as luminance uniformity greater than or equal to 70% for each neighboring spatial zone (or across all evaluated spatial zones) may optimize the angular light output for the two AVLEDs and maintain the optimized relative light output from each angular bin of each of the two AVLEDs and monitor the information estimated and/or measured from the environment (such as the estimated luminance in each spatial zone of interest). In this example, if the information estimated and/or measured from the environment does not change, then angular cycling from one or more AVLEDs does not need to be performed (or may be performed at a less frequent interval). Likewise, in this example, the change in the information estimated and/or measured from the environment for one or more spatial zones changes, then this change triggers one or more angular cycles from one or more AVLEDs (or increases the frequency of the angular cycling from one or more AVLEDs). In this example, if a person walked into the room, the location and reflectivity of the person changes the luminance in one or more spatial zones corresponding to person (and possibly spatial zones corresponding to their shadow), and a full angular cycle from one or more AVLEDs may be started to compensate for the change according to one or more modes of illumination and/or irradiation, or a subset of light sources and/or a subset of angular bins and/or a subset of AVLEDs may be angular cycled as part of the angular cycling (optionally based on learned and/or historical measurements from people walking into the room along the same path).

In one embodiment, a subset of full angular cycling is performed for one or more AVLEDs in an illumination or irradiation system comprising one or more AVLEDs. Subset angular cycling is angular cycling using one or more of the following: fewer than the maximum light sources in an angular bin; fewer angular bins than the maximum number of angular bins for one or more AVLEDs; light output from fewer AVLEDs in the system; fewer imaging sensors than the maximum number of imaging sensors (or other sensors) in the system (such as not using the imager from one AVLED where each AVLED in the system comprises an imaging sensor); and analyzing or measuring fewer spatial zones from images from one or more imagers. Subset angular cycling may be based on one or more selected from the group: user preference, identified information changing (such as a light property change greater than 2%, 5%, or 10%) with a frequency less than a first frequency level, and predicted or learned information from historical evaluations of the light properties of one or more spatial zones (optionally with spatial three-dimensional information of surfaces in the environment). In one embodiment, a user may program or otherwise indicate to the illumination and/or irradiation system to not angular cycle one or more light sources, one or more angular bins, one or more AVLEDs, or measure (or evaluate) using one or more imagers on one or more AVLEDs. In one embodiment, the first frequency level is one selected from the group of 1, 2, 5, 10, 15, 30, 60, 120, 300, 600, 1800, 3600, and 7200 seconds.

Alignment or Registration of AVLED to Environment

In one embodiment, the AVLED emits light into one or more angular bins creating a light output pattern for alignment of the angular bins, thus light output, to features, surfaces, or aspects of the environment. In this embodiment, the AVLED may be positioned, oriented, aligned and/or rotated during installation to align the light output to features, surfaces, or aspects of the environment. For example, in one embodiment, an AVLED comprises a rectangular spatial array light source and AROE that redirects the light from the rectangular spatial array light source into angular bins defining a rectangular light output pattern. In this example all of the light sources (or a subset such as the corners or outer borders or another plurality of sources) in the rectangular spatial array light source may emit light flux to align the rectangular light output pattern of the total of all the angular bins (or a subset) to a rectangular shaped room, rectangular shaped office, rectangular shaped desk, or rectangular shaped hallway, for example. In another embodiment, an AVLED comprises one or more motors (for electrical alignment) or manual adjustment mechanisms to position, orient, and or rotate the AVLED to align the light output with one or more features, surfaces, or aspects of the environment. In one embodiment, an AVLED, such as a first AVLED, comprises a laser and a scanner or a laser and a DOE or HOE that scan or diffract, respectively, the laser light into alignment marks, such as an alignment and/or diffractive pattern aligned (optionally aligned at the factory) to the angular borders (shapes) of one or more angular bins (or the outer boarder or corners of the outer angular bins) such that when the environment illuminated with the alignment and/or diffractive pattern is imaged by an imager (on a the AVLED, on a second AVLED, on a portable device, or on a vehicle, for example), the locations of the angular bins may be readily identified for adjustment through an interface (such as a graphical display on a portable device) or readily identified by the second AVLED or device other than the first AVLED for determining the illumination pattern from the first AVLED. In one embodiment, one or more light sources (registration light sources) are used to register a surface, region, and/or angular in the environment (or a device) to one or more AVLEDs. In one embodiment, a high brightness LED on a smartphone emits light (optionally strobes or is in an on-off pattern for increased location accuracy and discrimination from other light sources/surfaces/devices in the environment) and one or more AVLED estimates the location of the device, three-dimensional spatial location of the light source, and/or identifies the angular bin corresponding to the location for future control of the light emitted into that angular bin. For example, a user sitting on a couch could place a smartphone with an application running on the smartphone that emits light from a high brightness LED on the smartphone and is in communication with one or more AVLEDs (or other device on a system and/or network comprising an AVLED), and the user could place the smartphone at the four corners of a table to identify the angular bins of one or more AVLEDs for the four corners of the table (thus the angular bins/light sources corresponding to the top of surface of the table). In one embodiment, a plurality of AVLEDs simultaneously detect the light from the registration light source (such as external illumination LED on a smartphone used as a camera flash) to identify the angular bin, spatial zone, and/or surface for registration with the plurality of AVLEDs. In one embodiment, the light source could be a display of the smartphone or portable device that may optionally display a pattern, graphic, image, or indicia, such as white cross-hairs or a white-line grid on a black background, for example, that could further aid in the registration and/or identification of the surface such as determining the angle of the surface upon which the portable device is positioned on because of the perspective of the image at a non-zero angle to the horizon and/or angle of the surface greater less than 90 degrees from the optical axis and/or device axis of the AVLED. In one embodiment, a laser pointer or other laser illuminates one or more regions in an environment and a portable device (such as the laser pointer or smartphone), or other device in communication with the AVLED or a device in a network or system comprising an AVLED communicates to an imager on a AVLED (or multiple imagers on multiple AVLEDs) or an imager in communication with one or more AVLEDs or a system or network comprising one or more AVLEDs that the illuminated spot/pattern indicates a region of interest, angular bin, and/or spatial zone for a future change in illumination from one or more angular bins (by adjusting the light flux output for one or more light sources corresponding to the angular bin that illuminates the region/spatial zone comprising the surface reflecting the light from the laser (or other light source). In one embodiment, the registration and/or offset (optionally including translational and/or orientational offset) compensation of the AVLED light flux output in a plurality of bins and one or more pixels or grouping of pixels on the imager is calculated and/or measured at the factory, or measured and/or estimated in-situ in the installed or located environment.

AVLED Control Methods and Interfaces

One or more AVLEDs or the system comprising one or more AVLEDs, the modes, and/or the output, settings, or configuration may be adjusted by a control device such as a touchscreen on a display of a device such as a smartphone or portable device wired device and the control interface may display an image of the environment from one or more viewpoints from one or more cameras or imagers (optionally on one or more AVLEDs) or menus or icons, dials, sliders, etc. on a displayed control panel, for example. The view may be an interpolated (or actual) view from a virtual camera displaying the interpreted view from above the center of the environment (such as a room) looking down and/or a virtual camera displaying the interpreted view from below the center of the room looking up toward the ceiling, (or from one or more walls, boundaries, or places of interest in the environment (such as from within a chair, on a couch or as one would see walking down a walkway, for example). The interface may include a virtual reality display, augmented reality display, mixed reality display, or other display means that includes a portion of a virtual and/or real image of the environment. The interface may be any of those interfaces known to be used for control of an electronic device, such as for changing the color of a room or relative intensity of a room, color charts, color wheels, color sliders, light level sliders, and may include a range of gestures for a touchscreen, gesture recognition (such as using a camera or LIDAR or other interface device known to be usable with a computer or portable device such as a smartphone or cellular phone), audio commands to a smartphone, and audio commands to a portable device, smart home device, speaker, or hub such as Google Home by Google Inc. or Echo by Amazon Inc.

In one embodiment, one or more regions, surfaces, angular bins, and/or spatial bins are associated with an object name, category name, and/or mode of illumination such that direct control of the light properties associated with the one or more regions, surfaces, angular bins, and/or spatial bins may be controlled by selection of the object name, category name, and/or mode of illumination by touch interfaces, voice control, gesture input, textual input, graphical selection, computer mouse selection, and/or other mode of human-computer interface. For example, all of spatial zones corresponding to the chairs and couches in a living room may be identified or grouped into a chair category and be set using operational parameters to be illuminated with 50 lux of warm white light from one or more AVLEDs operating in an entertainment mode when a user speaks a verbal command to a smart speaker to turn on entertainment mode or entertainment lighting mode.

In one embodiment, methods for controlling one or more light sources of an AVLED, an AVLED, a vehicle comprising an AVLED, a portable device comprising an AVLED, or system comprising an AVLED include one or more selected from the group: control algorithms, color control methods, color indicators, illumination methods or devices, spectral control and feedback, transillumination methods, items comprising light emitting diodes or light sources, smart units, modular LED units, arrayed LED, control hardware (including input control devices, switches, controlling software, light module, input signals, circuits, data signals, pan or tilt control, illumination environments, alert systems, environmental conditions (such as temperature, physical conditions of the environment, humidity, noise level, sound level, etc.), extracting data from entertainment system (such as television or video, radio, etc.), ornamental effects, aesthetic effects, and light emitting devices and systems, such as described in U.S. Pat. No. 6,340,868, the entire contents are incorporated by reference herein.

In one embodiment, command and/or control modes and interfaces in which inputs can be directed to a processor may include a graphical user interface (GUI), auditory command interface, clickable icons, navigable lists, virtual reality interface, augmented reality interface, heads-up display, semi-opaque display, 3D navigation interface, command line, virtual touch screen, robot control interface, typing (e.g. with persistent virtual keyboard locked in place), predictive and/or learning based user interface (e.g. learns what the wearer does in a 'training mode', and when and where they do it), simplified command mode (e.g. hand gestures to kick off an application, etc.), Bluetooth controllers, cursor hold, lock a virtual display, head movement around a located cursor, and the like, and combinations of the same.

In one embodiment, applications or programs on the controller, AVLED, portable device comprising the AVLED, vehicle comprising the AVLED, smartphone, portable device, vehicle, or mounted device that can use commands and/or respond to inputs may include military applications, weapons control applications, military targeting applications, war game simulation, hand-to-hand fighting simulator, repair manual applications, tactical operations applications, mobile phone applications (e.g. iPhone apps), information processing, fingerprint capture, facial recognition, information display, information conveying, information gathering, iris capture, entertainment, easy access to information for pilots, locating objects in 3D in the real world, targeting for civilians, targeting for police, instructional, tutorial guidance without using hands (e.g. in maintenance, assembly, first aid, etc.), blind navigation assistance, communications, music, search, advertising, video, computer games, video, computer games, eBooks, advertising, shopping, e-commerce, video-conferencing, and the like, and combinations of the same.

In one embodiment, communications or connections on the controller, AVLED, portable device comprising the AVLED, vehicle comprising the AVLED, smartphone, portable device, vehicle, or mounted device to external systems and/or devices may include a microcontroller, microprocessor, digital signal processor, steering wheel control interface, joystick controller, motion and sensor resolvers, stepper controller, audio system controller, program to integrate sound and image signals, application programming interface (API), graphical user interface (GUI), navigation system controller, network router, network controller, reconciliation system, payment system, gaming device, pressure sensor, and the like.

In one embodiment, one or more angular bins of an AVLED directs light to an image sensor remote from the AVLED (such as on a second AVLED) and the light source corresponding to the illumination of the image sensor is modulated for optical communication from the first AVLED to the second AVLED. In one embodiment, by angular cycling the first AVLED, the second AVLED communicates to the first AVLED (such as wirelessly through a radio transceiver, through a wired connection over a network or by the second AVLED emitting light with a particular pattern (such as a double pulse of light) when it receives light from the first AVLED) such that the AVLED (optionally through an imager on the first AVLED) can identify which light source and/or angular bin corresponds to light illuminating the second AVLED (for purposes of optical communication and/or illumination and/or irradiation calculations, for example) and optionally identifying and/or approximating the relative and/or absolution location of the second AVLED.

In one embodiment, a system comprising one or more AVLEDs may comprise a user interface based on a display (such as on a cellphone or tablet) where one or more live images from imagers on one or more AVLEDs is displayed and the user may touch the display at a location to identify a person/object/animal, etc. and select to track (follow with illumination or irradiance) and/or chose options such as illumination and/or irradiation modes (such as provide different colored illumination to highlight or provide IR illumination for military training, for example). In another embodiment, the user may point a laser or other light source with a narrow divergence (such as less than 10 degrees FWHM luminous intensity, for example) at and object/individual/animal, etc. and press or press and hold a button on the device or other remote or portable device to identify the object/individual/animal of interest to the processor for the AVLED with the imager imaging the object/individual or animal or a processor remote from the AVLED receiving information or images from the AVLED with the imager. After identification for example, a menu could pop-up or a button (region on a screen) could be pressed to change one or more light properties or illumination or irradiation properties for the object, individual, or animal. In one embodiment, the processor may identify the object from the imager in the AVLED or a remote imager and discriminate from other objects, individuals, animals, or regions based on edge detection, color detection, user generated lines or borders, shining a laser or light source around the border, 3D scan, image analysis to produce 3D representations, or other object or edge detection method disclosed herein and the calculated, estimated or identified border may displayed as an overlay on the screen around the border and/or filled in with a color or an increased luminance overlay. In one embodiment, the user may select the border between two regions (or spatial zones) and choose for a soft transition, hard transition (high luminance contrast) or degree of color morphing along the line or boundary (such as along a line connected the color coordinates between the two regions or spatial zones. The user may also select for example, the desired minimum, maximum, or average luminance, illuminance, or irradiance, desired color or color range, hue, saturation, or mode of illumination or irradiance and the time period for the property, time for changing the property, schedule for change, and electronic trigger to cause the change (such as real switch, meter, or gauge or virtual switch or trigger event identified by a smart home controller system or other system receiving input or triggers from an external network and/or the internet).

Privacy Protection

In one embodiment, one or more AVLEDs or a system comprising one or more AVLEDs prevents users from accessing or visualizing images from an imager or AVLED comprising an imager of the system. In one embodiment, the relevant light property information and spatial/angular information is extracted from the image using one or more processors in the AVLED and the light property information may be further processed (or used as part of an analysis for illumination or irradiation) or transmitted to other AVLEDs and/or a remote processor, or it can be accessed remotely. In one embodiment, the information from one or more imagers in an AVLED or an imager or light sensor in communication with one or more AVLED is display in an angular map (such as a concentric circular radar plot, circular or rectangular heat map) such that the information is display at a resolution matching the angular bins or less than the resolution of the imager. In one embodiment, moving individuals or objects or animals are removed from the images or video from the imager by one or more processors in an AVLED. In one embodiment, the AVLED recognizes an individual in an image or video and removes the individual from the image or video. In one embodiment, an AVLED or system comprising one or more AVLEDs comprises the means for a user or factory settings to turn off access to the images and/or video that could comprise one or more individuals from one or more AVLEDs or cameras or light sensors in communication with one or more AVLEDs. In one embodiment, the data from one or more AVLEDs or imagers or light sensors in communication with one or more AVLEDs does not comprise any personally identifiable images or information.

Accessories or Options for AVLED

In one embodiment, a system comprising an AVLED or an AVLED comprises one or more fasteners to connect an accessory or component to the AVLED (such as temporarily connecting a smartphone to the AVLED) or the AVLED to a device. In one embodiment, the fastener is one or more selected from the group: adhesive, pressure sensitive adhesive, silicone, epoxy, glue, weld, fastener, magnet, pin, threaded fastener, screw, bolt, nut, fixed tab, bendable tab operatively configured to attach components, tie, clamp, clasp, flange, latch, retainer, hook and loop fastener, rivet, clamp, tightening screw, set screw, clamp, tightening and unlocking mechanism, protrusion, pin, strap, ring, clip, clamp, one or more slots for sliding in a component such as a smartphone, magnetic mount, mount that clamps the sides of a smartphone, and other temporary or permanent locking mechanisms or a suitable fastener known in the art. In one embodiment, the AVLED or system comprising the AVLED comprises an optical accessory that redirects a portion of the light from the AVLED to achieve a different angular light output profile. In one embodiment, the AVLED or system comprising the AVELD comprises a light reflecting accessory comprising two fasteners (such as two bolts passing through a hole in each of two arms of the accessory) that may be screwed into holes of the AVLED to secure the light reflecting accessory (and optionally allow re-orientation and/or physical adjustment of the location of the light reflecting accessory relative to the AVLED). In one embodiment, the light reflecting accessory comprising a light transmitting material or light reflecting material that totally internally reflects light such that it reflects light with component in a direction opposite to the direction of the optical axis of the AVLED where the light reflecting accessory may allow the AVLED to provide up-lighting, for example, when attached to an AVLED in the form of a downlight to be attached to a ceiling. In one embodiment, the AVLED comprises a glass cover lens that transmits infrared radiation from the AVLED.

The AVLED may also include or be a component of one or more selected from the group: one or more speakers or sirens, an audio amplifier, one or more directional speakers, ionization-based smoke detector, photoelectric smoke detector, carbon monoxide detector, a non-AVLED light emitting device, a display, a controller method or interface, a server, processor, non-transitory computer readable media, components of a computer, power supply, battery, photovoltaic device, fuel cell, one or more sensors (such as one disclosed herein), a video or graphic interface port (such as an HDMI input port), radio transceiver, wired connection port, Edison style bulb connector for screwing into an Edison style socket, wires for connected to a power supply, cables with an Edison adaptor on one end and wire connector on the opposite end for retrofitting into an Edison bulb socket, for example, mounting hardware for mounting into a recessed can or standard junction box, fan, heatsink, heat pipe, other heat dissipation device, fan for cooling a room such as a ceiling fan, insulation (with an R value greater than 2, 4, 6, 8, or 10) such as foam board to position between the AVLED and the ceiling to insulate heat that may be generated from the AVLED from the ceiling (such as with an AVLED that outputs infrared light in a warming mode, sprinkler output, a translucent (average ASTM D1003-00 haze greater than 20%, 15%, 10%, 8%, or 5%, or clear (average ASTM D1003-00 haze less than 5%, 4%, 3%, 2%, or 1%) globe substantially covering the outer surface of the AVLED (such as for ornamentation), window, skylight, radar device, LIDAR device, head-worn device, head-worn display, watch, vehicle, air craft, water craft, land craft, headphone, earphone, microphone, hub, router, camera, smartwatch, musical instrument, haptic device, weapon, gun, gaming system, television, monitor, appliance, refrigerator, dishwasher, space heater, clothes dryer (where the AVELD could selectively increase infrared output to regions of clothes that are more wet than others as detected by an imager, laser or other sensor, for example) medical device, display projector, HVAC controller, thermometer, keyboard, other device, thermostat, computing device or accessory disclosed herein. In one embodiment, the AVLED and/or a component thereof derives power from a wired electrical connection, a battery, solar power, wind power, fluid motion (such as hydroelectric), DC connection, AC connection, a fuel cell, and/or an electrical electricity conducting grid (such as a ceiling). In one embodiment, an AVLED derives the electrical power for illumination, the electrical power for one or more sensors or imagers, and/or the electrical power for processing one or more images and computing one or more light properties and/or environmental properties (such as a spatial three-dimensional model of the environment).

FIG. 1 is a side view of an embodiment of an illumination system 100 comprising a first AVLED 101 and a second AVLED 102. The first AVLED 101 illuminates a room 105 with light from a first angular bin 111 and light from a second angular bin 112. The illumination from the first angular bin 111 creates a shadow region 103. The second AVLED 102 may comprise an imager that detects the shadow region 103. The second AVLED 102 emits light flux into a first angular bin 121 to illuminate the shadow region 103 and reduce the illuminance difference from neighboring regions of the room. The second AVLED 102 also directs light into a second angular bin 122. In one embodiment, the light from the second angular bin 122 provides indirect illumination by illuminating a wall that reflects light that illuminates the shadow region 103. In one embodiment, the second AVLED 102 comprises an imager and operates in a shadow reduction mode.

Figure 2:
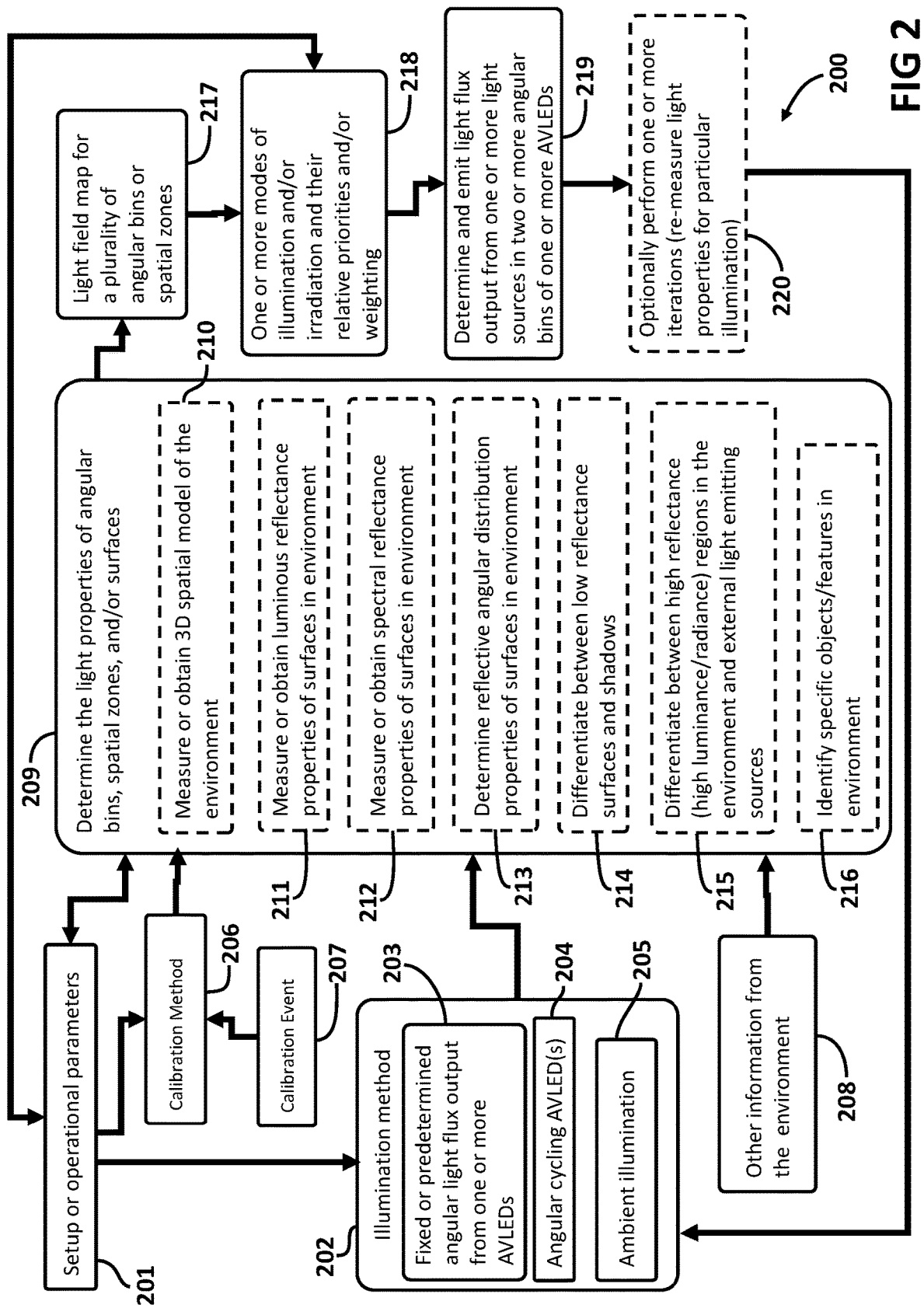
FIG. 2 is a flow diagram illustrating an embodiment of a method of providing illumination in an environment including angular cycling an angularly varying light emitting device.

FIG. 2 is a flow diagram illustrating an embodiment of a method of providing illumination in an environment including angular cycling an AVLED and providing light flux output to one or more light sources in two or more angular bins in one or more AVLEDs 200. In this embodiment, information from setup or operational parameters 201 are provided (or set by default) for one or more illumination methods 202 which may include fixed or predetermined angular light flux output from one or more AVLEDs 203, angular cycling of one or more AVLED 204, or ambient illumination 205, and may be provided to a calibration method 206 which may occur at a calibration event 207. The setup or operational parameters 201 provide information to determine the light properties of angular bins, spatial zones, and/or surfaces 209 (such as by using one or more imagers). In one embodiment, other information from the environment 208 (such as information from other sensors (LIDAR, other photosensors, other AVLEDs) and/or information received across a network or system through radiofrequencies, Wi-Fi, Bluetooth, etc., for example) is provided to determine the light properties of angular bins, spatial zones, and/or surfaces 209. In one embodiment, determine the light properties of angular bins, spatial zones, and/or surfaces 209 (such as by using one or more imagers) provides feedback for one or more setup or operational parameters 201 (such as historical information, measurement duration, peak values, minimum values, etc. which may be used for setting one or more setup or operational parameters). In one embodiment, determine the light properties of angular bins, spatial zones, and/or surfaces 209 (such as by using one or more imagers) optionally includes one or more steps selected from the group: measure or obtain 3D spatial model of the environment 210, measure or obtain luminous reflectance properties of surfaces in environment 211, measure or obtain spectral reflectance properties of surfaces in environment 212, determine reflective angular distribution properties of surfaces in environment 213, differentiate between low reflectance surfaces and shadows 214, differentiate between high reflectance (such as high luminance/radiance) regions in the environment and external light emitting sources 215, and identify specific objects/features in environment 216 (such as eyes, mirrors, windows, or facial recognition, for example). In this embodiment, information from determine the light properties of angular bins, spatial zones, and/or surfaces 209 is compiled to generate a light field map for a plurality of angular bins or spatial zones 217. Using information from the light field map for a plurality of angular bins or spatial zones 217, setup or operational parameters 201, and one or more modes of illumination and/or irradiation and their relative priorities and/or weighting 218, one or more processors on one or more AVLEDs can determine and emit light flux output from one or more light sources in two or more angular bins of one or more AVLEDs 219 that satisfy one or more modes of illumination and/or irradiation. The method may include optionally perform one or more iterations (re-measure light properties for particular illumination) 220 such as in order to improve accuracy, adapt to a changing environment, or mode of illumination and/or irradiation.

FIG. 3 is a tabular presentation illustrating examples of modes of illumination and/or irradiation 300 for one or more AVLEDs in an illumination and/or irradiation system comprising one or more AVLEDs. Each of the modes of illumination and/or irradiation 301 may have variables, operational parameters, thresholds, specifications, targets, priorities, and/or relative weightings.

Figure 4:
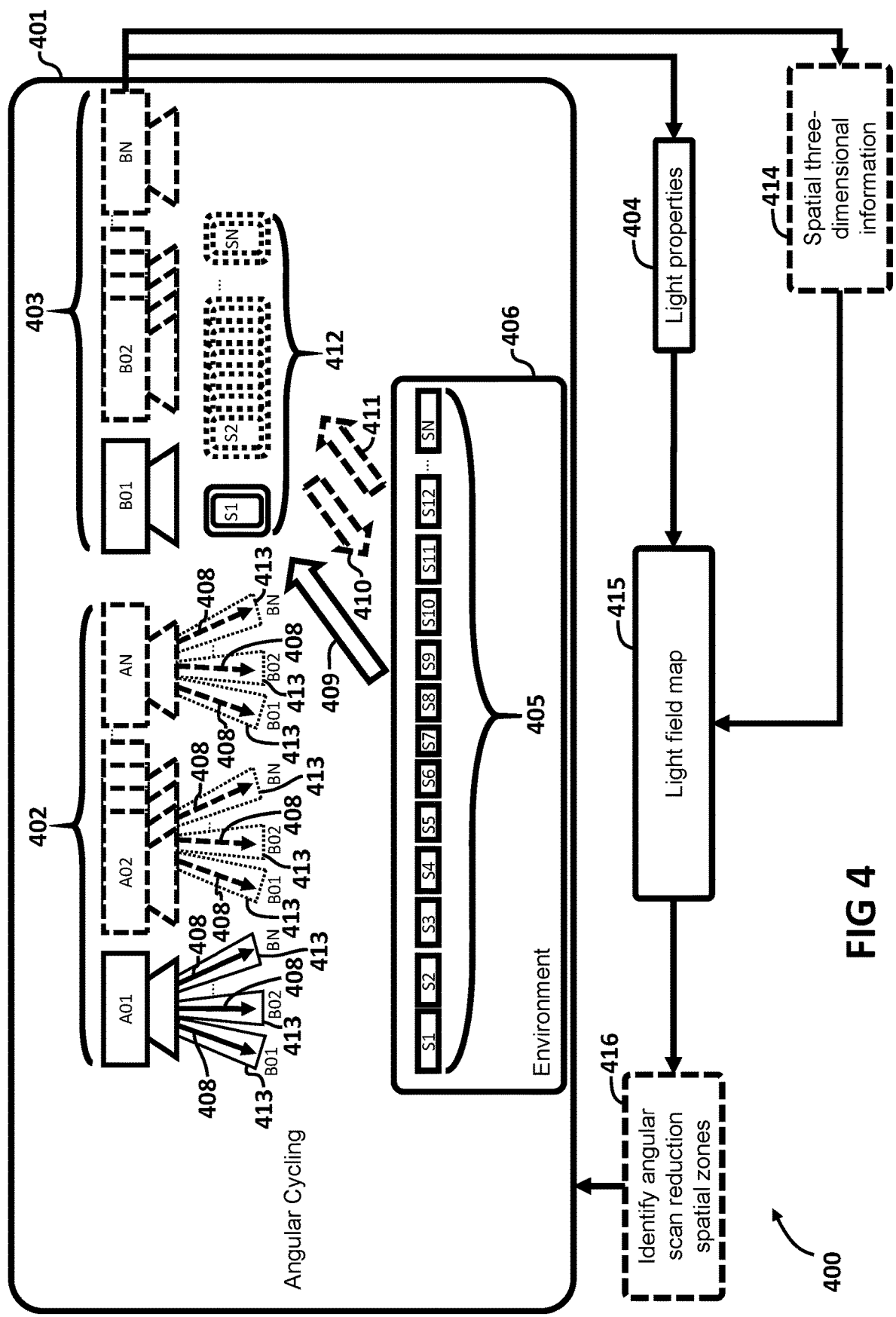
FIG. 4 is a flow diagram illustrating a method of generating a light field map including angular cycling one or more AVLEDs.

FIG. 4 is a flow diagram illustrating a method of generating a light field map 400 including angular cycling 401 one or more AVLEDs 402 and optionally other steps (outlined by dashed lines or otherwise noted as optional). In one embodiment, a method of generating a light field map 400 includes angular cycling 401 one or more AVLEDs 402 (such as AVLEDs numbered A01 to AN where N is the number of AVLEDs) wherein angular cycling 401 includes adjusting the light flux output 408 from one or more light sources in one or more angular bins 413 (such as angular bins 413 numbered B01 to BN where N is the number of angular bins 413 for a particular AVLED (they may be different in one or more AVLEDs) in one or more AVLEDs 402 and measuring and or estimating light properties 404 (such as luminance, radiance, relative intensity of light on object, spectral reflectance, illuminance, irradiance, or relative light intensity emitted) from the reflected light 409 from one or more surfaces and/or spatial zones 405 (such as spatial zones numbered S1 to SN where N is the number of spatial zones 405 corresponding to the number of angular bins 413) in the environment 406 based on sensor information (such as imager information) from one or more sensors (such as image sensors) on one or more AVLEDs comprising image sensors 403 (such as AVLEDs numbered B01 to BN where N is the number of AVLEDs), fixtures, cameras, vehicles, portable devices, and/or other sensors 412 (such as sensors numbered S1 to SN where N is the number of sensors). In one embodiment, the one or more AVLEDs comprising image sensors 403 are the same as the one or more AVLEDs 402 emitting light flux output 408. In one embodiment the one or more AVLEDs comprising image sensors 403 optionally receive first light or other radiation 411 comprising spatial three-dimensional information 414 from one or more surfaces and/or spatial zones 405. In one embodiment, the one or more AVLEDs comprising image sensors 403 may the optionally emit light or other radiation 410 (such as laser light in a LIDAR system) that reflects from the one or more surfaces and/or spatial zones 405 to become the light or other radiation 411 comprising spatial three-dimensional information 414. In this embodiment, the measured and/or estimated light properties 404 from the angular cycling 401, optionally along with spatial three-dimensional information 414, is stored in a light field map 415 for the one or more surfaces and/or spatial zones 405 for the one or more light sources in the one or more angular bins 413 in the one or more AVLEDs 402. In one embodiment, light properties 404 and/or information from the light field map 415 (optionally with spatial three-dimensional information 414) is used to identify angular scan reduction zones 416 such that for a future event, calibration, or measurement, the angular cycling 401 may be reduced by (1) reducing or emitting no light flux output 408 from one or more light sources and/or one or more angular bins 413 and/or one or more AVLEDs 402 and/or (2) the information for one or more regions of an imager or sensor on one or more AVLEDs comprising image sensors 403, fixtures, cameras, vehicles, portable devices, and/or other sensors 412 (which may correspond to one or more regions, angular bins 413, and/or the one or more surfaces and/or spatial zones 405) does not need to be evaluated and/or measured (or a portion of a scan from a scanning detector does not need to be evaluated for light properties 404).

In another embodiment, the method of generating a light field map from angular cycling one or more AVLEDs includes one or more steps selected from the group: manual input and/or automatic position and/or orientation information for or one or more AVLEDs, light emitting devices (including the orientation of the optical axis of the light output), and/or sensors such as imagers (optionally including the field of view and orientation of the optical axis of the imager or sensor); determining ambient lighting map; determining static regions (spatial zones and/or angular bins) where angular cycling frequency can be reduced or not be performed until secondary event; obtaining and using spatial three-dimensional information for the surfaces/objects/people in the environment to generate the light field map (optionally with the light property at the surface/object/person in the environment).

In one embodiment, determining the ambient lighting map includes turning off (or reducing) light flux output for one or more (preferably all) light emitting devices in environment and measuring/estimating/calculating light properties at two or more spatial zones using one or more imagers. Determining the ambient lighting map may include measuring/estimating/calculating the light property in one or more spatial zones from light emitted by light sources or light emitting devices that may be external light sources (external to the system comprising one or more AVLED), light emitting devices controllable by the system comprising one or more AVLEDs, light emitting devices with a constant relative angular light output profile, light fixtures, lamps, bulbs, the sun, the moon, light emitting displays (televisions, monitors, tablets, phones, etc.), light emitting signs, or light emitting indicators, etc. The light properties of these light sources or light emitting devices may be measured at particular times and/or events, in on-state, in the off-state, or at varying light flux levels if dimmable (optionally light flux output controllable by the system comprising AVLED). In one embodiment, the light properties at two or more spatial zones for the light sources or light emitting devices evaluated for the ambient light map may be measured/calculated/estimated (by an AVLED, system comprising an AVLED, or remote device) at particular times (such as regular, random, scheduled, or on-demand times, for example), events such as when the system is turned, or upon a sensor detecting a particular event (such as trigger event such as an occupancy sensor detecting movement).

Figure 5:
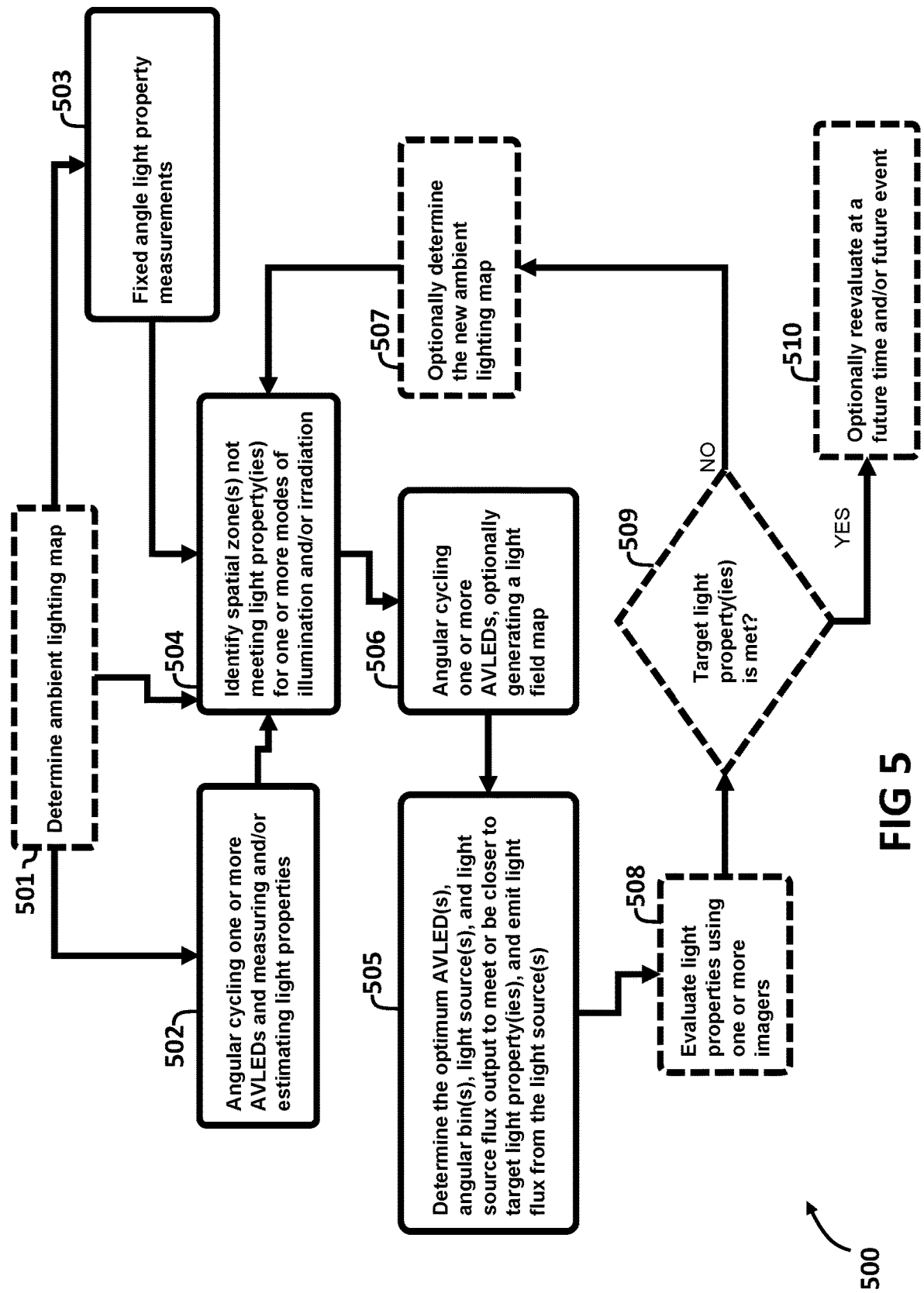
FIG. 5 is a flow diagram illustrating a method of light flux output adjustment in two or more angular bins for one or more modes of illumination and/or irradiation.

FIG. 5 is a flow diagram illustrating a method of light flux output adjustment in two or more angular bins for one or more modes of illumination and/or irradiation 500 including optional steps (outlined by dashed lines or otherwise noted as optional). In this embodiment, information from angular cycling one or more AVLEDs and measuring and/or estimating light properties 502 and fixed angle light property measurements 503 are used to initially identify spatial zone(s) not meeting target light property(ies) for one or modes 504. This initial information is used along with angular cycling one or more AVLEDs, optionally generating a light field map 506, to determine the optimum AVLED(s), angular bin(s), light source(s), and light source flux output to meet or be closer to the target light property(ies), and emit light flux from the light source(s) 505. In one embodiment, a method of light flux output adjustment in two or more angular bins for one or more modes of illumination and/or irradiation 500 optionally includes evaluate light properties using one or more imagers 508, evaluating if the target light property(ies) is met 509, and if yes, then optionally reevaluate the light properties at future time and/or future event 510, and if no, optionally determine a new ambient lighting map 507 (if needed due to something in the environment moving or changing, for example) and identify spatial zone(s) not meeting light property(ies) for one or more modes. In one embodiment, the method of light flux output adjustment in two or more angular bins for one or more modes of illumination and/or irradiation 500 optionally includes determine ambient lighting map 501 which may be subtracted from the angular cycling one or more AVLEDs and measuring and/or estimating light properties 502, subtracted from the fixed angle light property measurements 503, and/or used to initially identify spatial zone(s) not meeting target light property(ies) for one or modes 504.

Figure 6:
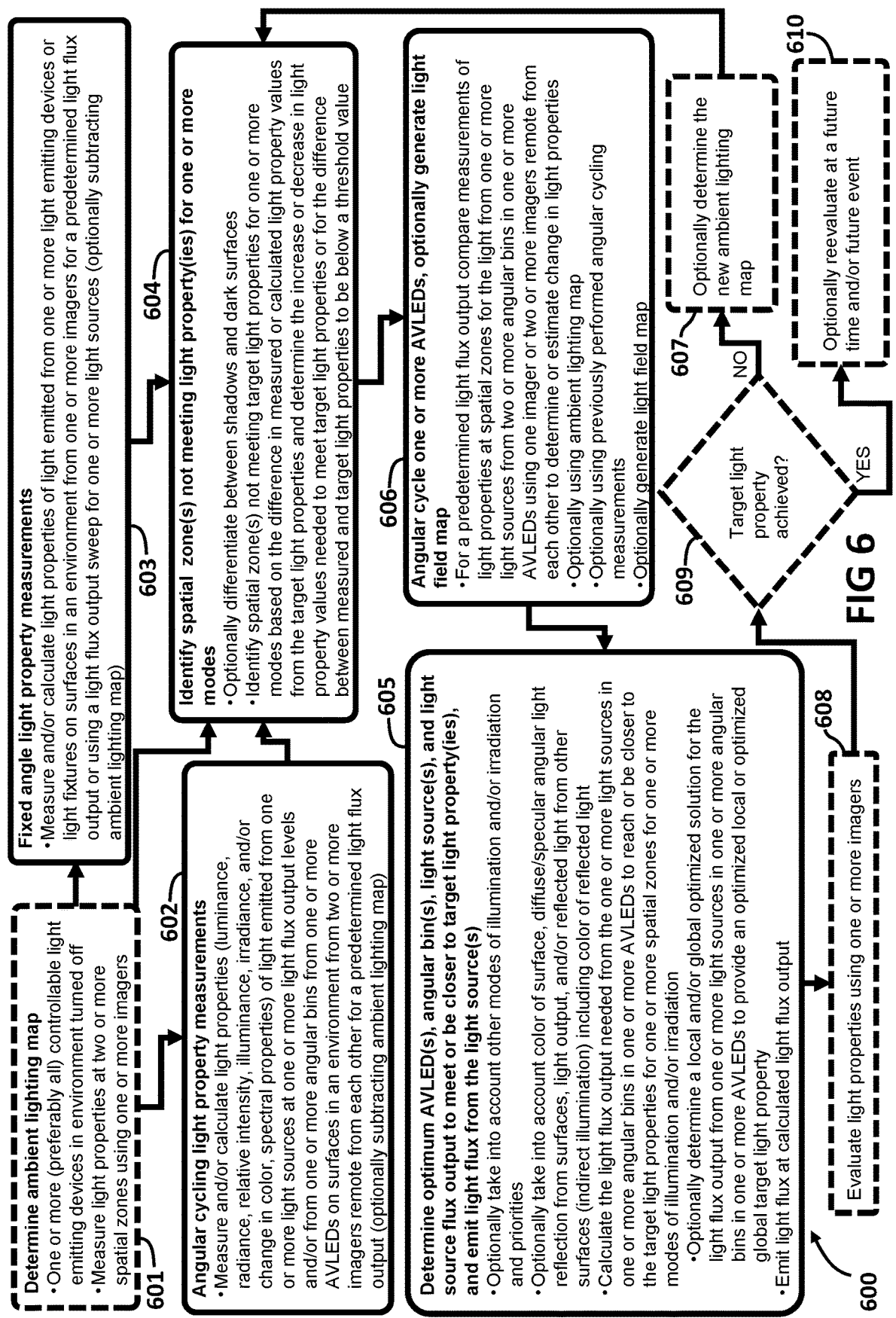
FIG. 6 is a flow diagram illustrating a second method of light flux output adjustment in two or more angular bins for one or more modes of illumination and/or irradiation.

FIG. 6 is a flow diagram illustrating a second method of light flux output adjustment in two or more angular bins for one or more modes of illumination and/or irradiation 600 including optional steps (outlined by dashed lines or otherwise noted as optional) and parameters, details, or sub-steps. In this embodiment, information from angular cycling one or more AVLEDs and measuring and/or estimating light properties 602 and fixed angle light property measurements 603 are used to initially identify spatial zone(s) not meeting target light property(ies) for one or modes 604. This initial information is used along with angular cycling one or more AVLEDs, optionally generating a light field map 606, to determine the optimum AVLED(s), angular bin(s), light source(s), and light source flux output to meet or be closer to the target light property(ies), and emit light flux from the light source(s) 605. In one embodiment, a method of light flux output adjustment in two or more angular bins for one or more modes of illumination and/or irradiation 600 optionally includes evaluate light properties using one or more imagers 608, evaluating if the target light property(ies) is met 609, and if yes, then optionally reevaluate the light properties at future time and/or future event 610, and if no, optionally determine a new ambient lighting map 607 (if needed due to something in the environment moving or changing, for example) and identify spatial zone(s) not meeting light property(ies) for one or more modes. In one embodiment, the method of light flux output adjustment in two or more angular bins for one or more modes of illumination and/or irradiation 600 optionally includes determine ambient lighting map 601 which may be subtracted from the angular cycling one or more AVLEDs and measuring and/or estimating light properties 602, subtracted from the fixed angle light property measurements 603, and/or used to initially identify spatial zone(s) not meeting target light property(ies) for one or modes 604.

In one embodiment, a method of light flux output adjustment in two or more angular bins for one or more modes of illumination and/or irradiation in an environment comprises measuring light properties for an environment using fixed angle light property measurements or angular cycling light property measurements; identifying spatial zone(s) not meeting target light properties for one or more modes; angular cycling one or more AVLEDs if not already performed in the measurement step; determining optimum AVLED(s), angular bin(s), light source(s), and light flux output for one or more light sources to reach the target light properties for one or one or more modes of illumination and/or irradiation. In a further embodiment, the method of light flux output adjustment further includes one or more steps selected from: determining the ambient lighting map data for the environment; subtracting the ambient light map data from the fixed angle light property measurements or the angular cycling light property measurements; taking into account other modes of illumination and/or irradiation in determining the optimum light flux output properties; taking into account the color or spectral properties of a surface, the light output, and/or reflected light from other surfaces (indirect illumination or irradiation) including color or spectral properties of light reflected from a neighboring surface or other surface(s) in the environment; evaluating the light properties of the environment at the calculated and/or optimized light flux output using one or more imagers; determining a new ambient lighting map if the light properties evaluated do not meet the target light properties; and re-evaluating the light properties at a future time and/or future event if the light properties evaluated do meet the target light properties.

In one embodiment, determining the ambient lighting map includes turning off (adjust to zero light flux output) one or more (preferably all) light fixtures or light emitting devices (such as system controlled light fixture and/or light emitting devices) in an environment and measuring light properties at two or more spatial zones using one or more imagers on one or more AVLEDs, vehicles, or portable devices. In one embodiment, fixed angle light property measuring includes measuring and/or calculating light properties of light emitted from one or more AVLEDs, one or more light emitting devices, light fixtures, one or more vehicles, one or more portable light sources on surfaces in an environment from two or more imagers remote from each other (optionally one imager on an AVLED and one imager remote from the AVLED, or a single imager repositioned and/or reoriented in the environment to record the properties from a different measurement angle and/or position such as by moving a camera on a cellphone in the environment, for example) for a predetermined light flux output (based other mode, predetermined value, or user setting, such as all light sources emitting 100% maximum flux, or 70% maximum flux, etc.) or using a light flux output sweep for one or more light sources (optionally subtracting ambient lighting map data). In one embodiment, angular cycling light property measuring includes measuring and/or calculating light properties of light emitted from one or more AVLEDs, one or more light fixtures, one or more vehicles, one or more portable light sources at one or more light flux output levels and/or from one or more angular bins from one or more AVLEDs on surfaces in an environment from two or more imagers remote from each other (optionally one imager on an AVLED and one imager remote from the AVLED, or a single imager repositioned and/or reoriented in the environment) for a predetermined light flux output (based on another mode, predetermined value, or user setting, such as all light source emitting maximum flux) which could be a light flux output sweep for one or more light sources (optionally subtracting the ambient lighting map data). In another embodiment, identifying one or more spatial zones not meeting target light properties for one or more modes includes comparing measured and/or calculated light properties in spatial zones to target light properties to determine the difference between the light property values measured and/or calculated and the target light property values (such as target luminance, target radiance, target relative intensity, target illuminance, target irradiance, target color uniformity, target spectral uniformity, etc., based on one or more of user input, user adjustable threshold, minimum, predetermined value, user adjustable threshold, one or modes of illumination and/or irradiation, such as uniform luminance mode, uniform illuminance mode, minimum luminance, or minimum irradiance mode, for example), thus identifying one or more spatial zones where adjustment is needed based on the difference in light property values from the target light properties values (such as the difference in light property values greater than a threshold value) and determining the increase or decrease in light property values needed for one or more spatial zones to meet the target light properties or the difference between measured and/or calculated light property values and the target light property values to be less than a threshold difference in light property values. In one embodiment, an angular cycle is performed for one or more AVLEDs with a predetermined light flux output (based on other mode or user setting, or historical calculation of light flux output for target light properties, for example) or using a light flux output sweep, and corresponding light properties are measured and compared at a plurality spatial zones, each spatial zone, or each region, for the light from one or more light sources from two or more angular bins in one or more AVLEDs using one imager or two or more imagers on one or more AVLEDs, portable devices, or vehicles which may be remote from each other to determine or estimate the change in light properties due to the light emitted. In one embodiment, the angular cycling generates a light field map for one or more AVLED (and optionally fixed angle light emitting devices or fixtures). In one embodiment, angular cycling measurements are used to determine one or more spatial zones where the light properties of the one or more spatial zones are not meeting the target light properties, optionally including information from the ambient lighting map and/or using previously performed angular cycling measurements.

In one embodiment, the optimum AVLED(s), angular bin(s), light source(s), and light source flux output for one or more light sources is determined to meet the target light properties for one or more surfaces (including objects, walls, people, eyes of a person, for example) or spatial zones in the environment under one or more modes of illumination and/or modes of irradiation. In one embodiment, the light flux output needed from the one or more light sources in one or more angular bins of one or more AVLEDs is calculated to increase or decrease the luminance, radiance, relative intensity, illuminance, irradiance and/or change the color (spectral properties) of the light output from the one or more AVLEDs to reach the target light properties for one or more surfaces or spatial zones in the environment. In another embodiment, a local and/or global optimized solution for the light flux output from one or more light sources in one or more angular bins in one or more AVLEDs is calculated to provide an optimized local (such as a spatial zone of interest and the neighboring spatial zones, or spatial zones with a particular light property and spatial zones neighboring the spatial zone with a particular light property, for example) or optimized global (all spatial zones in an environment or spatial zones of interest in an environment, such as desks and pathways in an office environment, for example) target light property (such as luminance uniformity, illuminance uniformity, relative intensity uniformity, color uniformity), or desired light properties based on one or more modes of illumination and/or irradiation (such as reduced or glare free illumination). In one embodiment, multiple modes of illumination and/or irradiation and their relative priorities with respect to each other are accounted for in calculating (and optionally optimizing locally or globally) the light flux output from one or more light sources in one or more angular bins in one or more AVLEDs. In another embodiment, the color or spectral properties of a surface, the light output, and/or reflected light from other surfaces (indirect illumination or irradiation) including color or spectral properties of light reflected from a neighboring surface or other surface in the environment are used in calculating (and/or optionally optimizing locally or globally) the light flux output from one or more AVLEDs. In another embodiment, the scattering and/or reflective properties (such as identification or estimation of diffuse reflection, specular reflection, degree of gloss, reflected light angular scatter profile, anisotropic reflectance parameters, and/or all or a portion of reflective angular distribution properties (such as all or portions of a Bi-directional Reflectance Distribution Function, BRDF)) for one or more surfaces (or spatial zones) when illuminated from one or more light sources in one or more angular bins from one or more AVLEDs are used in calculating (and/or optionally optimizing locally or globally) the light flux output for one or more light sources in two or more angular bins in one or more AVLEDs. In a further embodiment, one or more AVLEDs emits light at the calculated (and/or optionally optimized locally or globally) light flux output. In another embodiment, the light properties based on the calculated (and/or optimized locally or globally) light flux output for one or more light sources in one or more angular bins in one or more AVLEDs are evaluated using one or more imagers and the target light properties for one or more modes of illumination and/or irradiation. In one embodiment, a new ambient lighting map is determined if the light properties evaluated do not meet the target light properties. In another embodiment, the light properties are re-evaluated at a future time and/or future event if the light properties evaluated do meet the target light properties.

Figure 7:
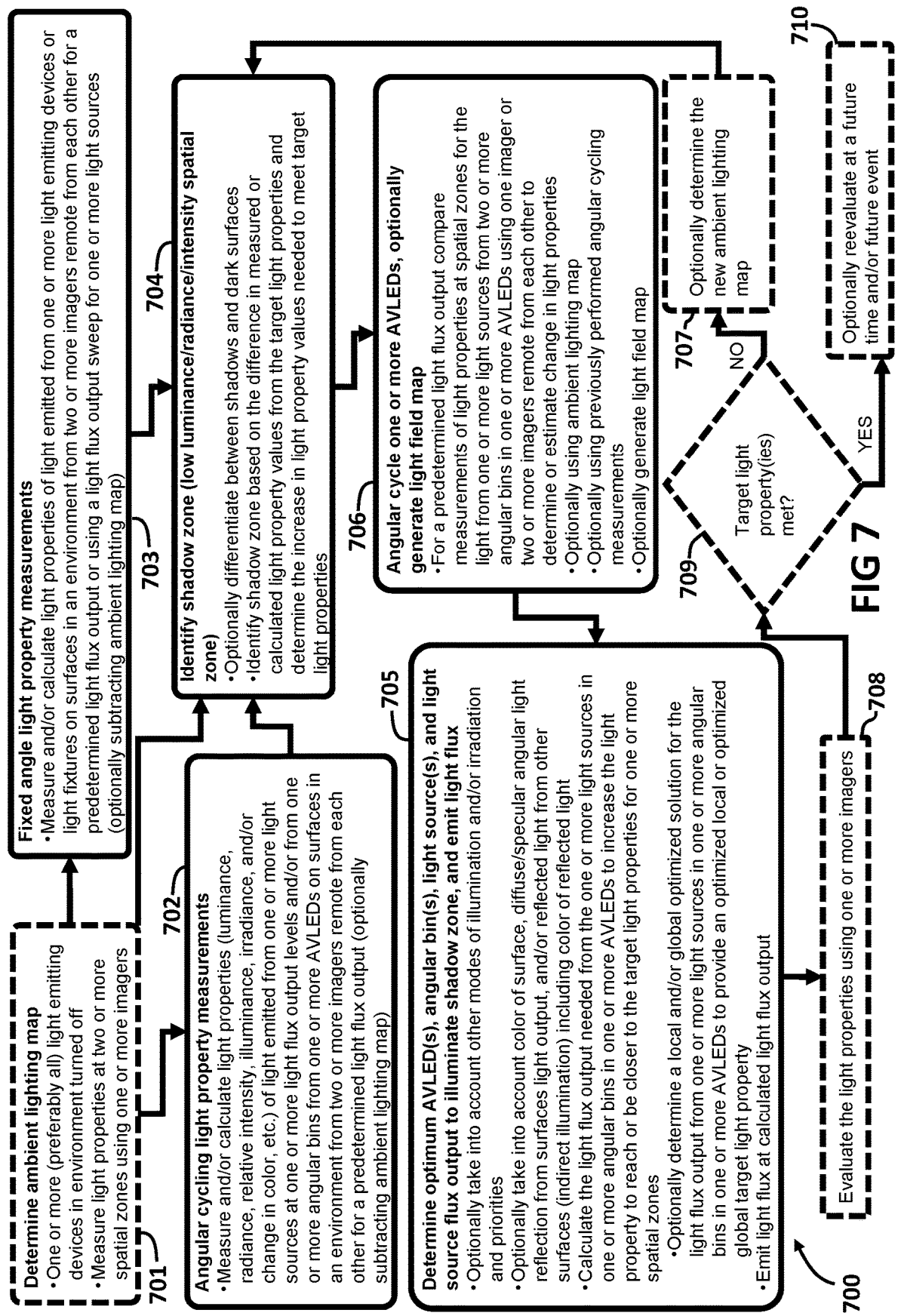
FIG. 7 is a flow diagram illustrating a method of light flux output adjustment in two or more angular bins to reduce shadow zones.

FIG. 7 is a flow diagram illustrating a method of light flux output adjustment in two or more angular bins to reduce shadow zones (shadow zone reduction method) in an environment including optional steps (outlined by dashed lines or otherwise noted as optional) and parameters, details, or sub-steps. In one embodiment, a method of reducing shadow zones 700 in an environment comprises one or more steps selected from: initially measuring light properties for an environment using fixed angle light property measurements 703 or angular cycling light property measurements 702; identifying shadow zones 704 by comparing the measured light properties with target light properties; angular cycling one or more AVLEDs 706 if not already performed in the initial or prior measurement step; and determining optimum AVLED(s), angular bin(s), light source(s), and light flux output for one or more light sources to reach the target light properties for one or more spatial zones and emitting light flux 705 at the calculated and/or optimized light flux output from the one or more light sources in the one or more angular bins from the one or more AVLEDs. In a further embodiment, the method of reducing shadow zones 700 in an environment further includes one or more steps selected from: determining the ambient lighting map 701 data for the environment; subtracting the ambient light map data from the fixed angle light property measurements or the angular cycling light property measurements; differentiating between shadows and dark surfaces; taking into account other modes of illumination and/or irradiation in determining the optimum light flux output properties; taking into account the color or spectral properties of a surface, the light output, and/or reflected light from other surfaces (indirect illumination or irradiation) including color or spectral properties of light reflected from a neighboring surface or other surface(s) in the environment; evaluate the light properties 708 of the environment at the calculated and/or optimized light flux output using one or more imagers; determine if the target light property(ies) is met 709; determining a new ambient lighting map 707 if the light properties evaluated do not meet the target light properties; and re-evaluating the light properties at a future time and/or future event 710 if the light properties evaluated do meet the target light properties.

In another embodiment, a local and/or global optimized solution for the light flux output from one or more light sources in one or more angular bins in one or more AVLEDs is calculated to provide an optimized local (such as a shadow zone and the neighboring spatial zones or low luminance/radiance/intensity spatial zone and neighboring spatial zones) or optimized global (all spatial zones in an environment or spatial zones of interest in an environment (such as desks and pathways in an office environment) target light property (such as luminance uniformity, illuminance uniformity, or relative intensity uniformity), or desired light properties based on one or more modes of illumination and/or irradiation. In another embodiment, other modes of illumination and/or irradiation and their relative priorities with respect to each other and the shadow reduction mode are accounted for in calculating (and optionally optimizing locally or globally) the light flux output.

FIG. 8 is a flow diagram illustrating a method of differentiating between a shadow region and a dark object 800. In this method, one or more of the following steps provides input information to the step differentiate between shadow region and dark object 804: examine luminance/radiance/relative intensity of region when illuminated using different angular bins from one AVLED 801; examine luminance/radiance/relative intensity of region when illuminated using one or more angular bins from each of two or more AVLEDs 802; and examine luminance/radiance/relative intensity of region when illuminated using one or more angular bins from each of N (whole number) or more AVLEDs 803. In one embodiment, examine luminance/radiance/relative intensity of region when illuminated using different angular bins from one AVLED 801 includes illumination using two or more indirect illumination angular bins and/or illumination using a direct illumination angular bin and one or more indirect illumination angular bins. In one embodiment, the step examine luminance/radiance/relative intensity of region when illuminated using one or more angular bins from each of two or more AVLEDs 802 includes one or more steps selected from the group: illumination using two or more direct illumination angular bins; illumination using two or more indirect illumination angular bins; and illumination using at least one direct illumination angular bin and one or more indirect illumination angular bins. In one embodiment, the step examine luminance/radiance/relative intensity of region when illuminated using one or more angular bins from each of N (whole number) or more AVLEDs 803 includes one or more steps selected from the group: illumination using N or more direct illumination angular bins; illumination using N or more indirect illumination angular bins; and illumination using at least one direct illumination angular bin and N or more indirect illumination angular bins. In one embodiment, the method of differentiating between a shadow region and a dark object 800 optionally uses spatial three-dimensional data for surfaces in the environment 805 as input for the step differentiate between shadow region and dark object 804.

Figure 9:
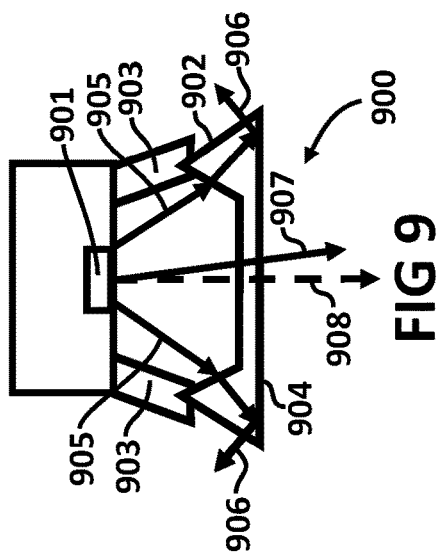
FIG. 9 is a cross-sectional view of one embodiment of an AVLED with an axially redirecting optical element (AROE) that totally internally reflects light from one or more light sources.

FIG. 9 is a cross-sectional view of one embodiment of an AVLED 900 (such as a ceiling-mounted AVLED) with an AROE 902 that totally internally reflects first light 905 from one or more light sources 901. In this embodiment, the AVLED 900 has an optical axis 908 parallel to the nadir and comprises an AROE 902 with a lower surface 904 suspended below the one or more light sources 901 of the AVLED 900 by support arms 903 such that first light 905 from the one or more light sources 901 above a first angle from the optical axis 908 of the AVLED 900 (and/or the nadir) enters the AROE 902 and totally internally reflects from the lower surface 904 of the AROE 902 and exits 906 the AROE 902 into directions with a directional component in a direction opposite to the optical axis 908 of the AVLED 900 (back toward the ceiling around the AVLED in an AVLED downlight, for example). Second light 907 at angles less than the first angle from the optical axis 908 of the AVLED (and/or the nadir) transmits through the AROE 902 (optionally reflected and/or refracted by the AROE 902) and exits the AROE 902 and/or AVLED 900 with a directional component parallel to the optical axis 908 of the AVLED 900 (and/or parallel to the nadir). In one embodiment, the first angle is greater than one selected from the group: 30, 40, 45, 50, 55, 60, and 65 degrees.

Figure 10:
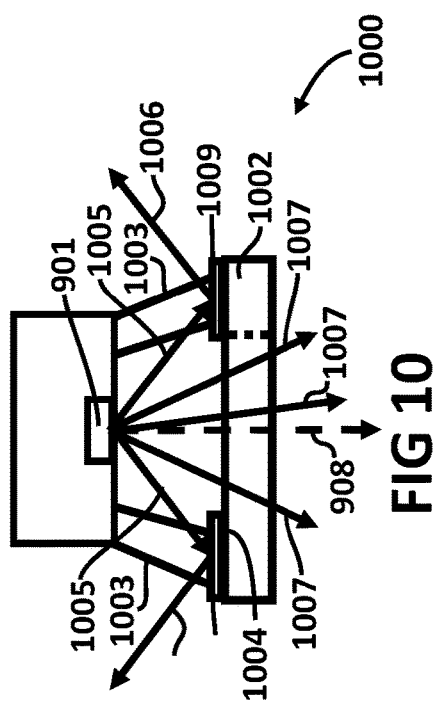
FIG. 10 is a cross-sectional view of one embodiment of an AVLED with an AROE that reflects light.

FIG. 10 is a cross-sectional view of one embodiment of an AVLED 1000 (such as a ceiling-mounted AVLED) with an AROE 1002 that reflects first light 1005 from one or more light sources 901. In this embodiment, the AVLED 1000 has an optical axis 908 parallel to the nadir and comprises an AROE 1002 with a reflective coating 1009 in an annular shape (when viewed from below) on an upper surface 1004 of the AROE 1002 which is suspended below the one or more light sources 901 of the AVLED 1000 by support arms 1003 such that first light 1005 from the one or more light sources 1001 above a first angle from the optical axis 908 of the AVLED 1000 (and/or the nadir) reflects from the reflective coating 1009 of the AROE 1002 and exits 1006 the AVLED 1000 into directions with a directional component in a direction opposite to the optical axis 908 of the AVLED 1000 (back toward the ceiling around the AVLED in an AVLED downlight, for example). Second light 1007 at angles less than the first angle from the optical axis 908 of the AVLED (and/or the nadir) transmits through the AROE 1002 (optionally reflected and/or refracted by the AROE 1002) and exits the AROE 1002 and/or AVLED 1000 with a directional component parallel to the optical axis 908 of the AVLED 1000 (and/or parallel to the nadir). In one embodiment, the first angle is greater than one selected from the group: 30, 40, 45, 50, 55, 60, and 65 degrees.

Figure 11:
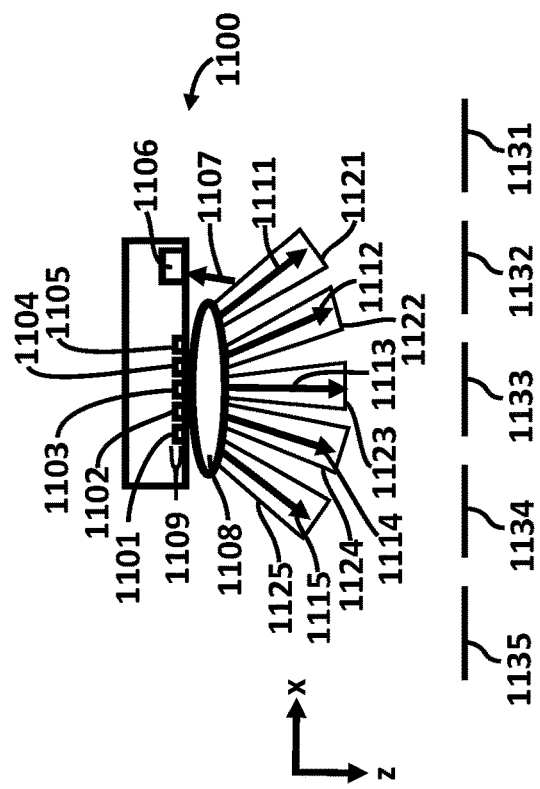
FIG. 11 is a cross-sectional side view of an AVLED comprising a spatial array light source, an AROE, and an imager.

FIG. 11 is a cross-sectional side view of an AVLED 1100 comprising a spatial array light source 1109, an AROE 1108, and an imager 1106. The spatial array light source 1109 (such as a micro-led array) comprises a first light source 1101, second light source 1102, third light source 1103, fourth light source 1104, and fifth light source 1105. As FIG. 11 is a cross-sectional view, only one row of light sources in the x direction is visible whereas the spatial array light source 1109 comprises columns of light sources parallel to the y direction (into and out of the page). First light 1111 from the first light source 1101 is directed by the AROE 1108 into a first angular bin 1121 corresponding to a first spatial zone 1131 in the environment. Second light 1112 from the second light source 1102 is directed by the AROE 1108 into a second angular bin 1122 corresponding to a second spatial zone 1132 in the environment. Third light 1113 from the third light source 1103 is directed by the AROE 1108 into a third angular bin 1123 corresponding to a third spatial zone 1133 in the environment. Fourth light 1114 from the fourth light source 1104 is directed by the AROE 1108 into a fourth angular bin 1124 corresponding to a fourth spatial zone 1134 in the environment. Fifth light 1115 from the fifth light source 1105 is directed by the AROE 1108 into a fifth angular bin 1125 corresponding to a fifth spatial zone 1135 in the environment. The imager 1106 on the AVLED 1100 receives reflected light 1107 from one or more surfaces or zones including the first spatial zone 1131, the second spatial zone 1132, the third spatial zone 1133, the fourth spatial zone, 1134, and the fifth spatial zone 1135. In one embodiment, the light flux output from one or more of the first light source 1101, the second light source 1102, the third light source 1103, the fourth light source 1104, and the fifth light source 1105 is adjusted based at least in part on measurements and/or evaluations of light properties using the imager 1106 and optionally one or more modes of illumination and/or irradiation. In one embodiment, the AROE is a Fresnel lens with an average thickness less than one selected from the group of 2, 1, 0.5, 0.3, 0.2, 0.1 millimeters.

Figure 12:
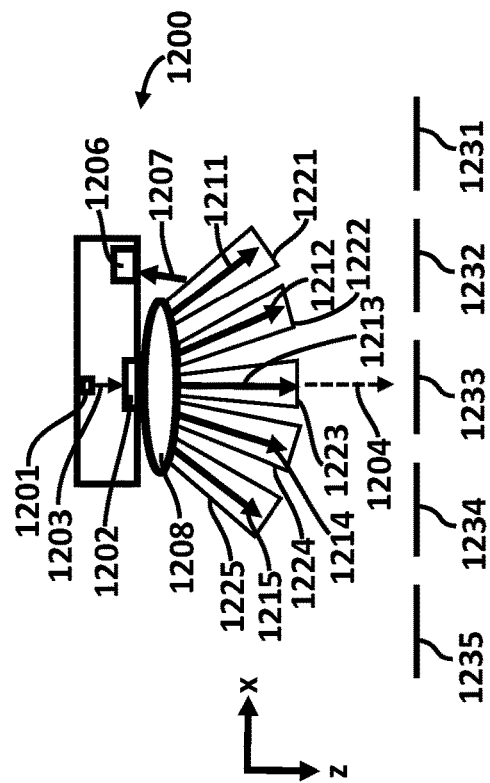
FIG. 12 is a cross-sectional side view of an AVLED comprising a laser, a scanner, an AROE, and an imager.

FIG. 12 is a cross-sectional side view of an AVLED 1200 comprising a laser 1201, a scanner 1202, an AROE 1208, and an imager 1206. Laser light 1203 emitted from the laser 1201 is scanned by the scanner 1202 with directional components in the x-z plane and y-z planes (scanned in theta and phi from an optical axis 1204 of the AVLED 1200 parallel to the +z axis and the nadir) and is received by the AROE 1208 and redirected by the AROE 1208 (most light is directed into larger angles from the optical axis 1204) including first light 1211 in a first angular bin 1221 corresponding to a first spatial zone 1231 in the environment, second light 1212 in a second angular bin 1222 corresponding to a second spatial zone 1232 in the environment, third light 1213 in a third angular bin 1223 corresponding to a third spatial zone 1233 in the environment, fourth light 1214 in a fourth angular bin 1224 corresponding to a fourth spatial zone 1234 in the environment, and fifth light 1215 in a fifth angular bin 1225 corresponding to a fifth spatial zone 1235 in the environment. As FIG. 12 is a cross-sectional view, only one row of angular bins with directional components the +x or −x direction is visible whereas the laser light 1203 from the laser 1201 is also scanned in the y-z plane with directional components in the +y or −y directions. The flux of the laser light 1203 emitted by laser 1201 may be adjusted at for the first angular bin 1221, second angular bin 1222, third angular bin 1223, fourth angular bin 1224, and/or fifth angular bin 1225 based at least in part on measurements and/or evaluations of light properties using the imager 1106 and optionally one or more modes of illumination and/or irradiation. In one embodiment, a collimated, high-brightness light source, such as collimated LED, is scanned instead of the laser 1201. In one embodiment, the AROE 1208 is not used and the scan angles (and corresponding angular bins) are determined by the scanner 1202.

Figure 13:
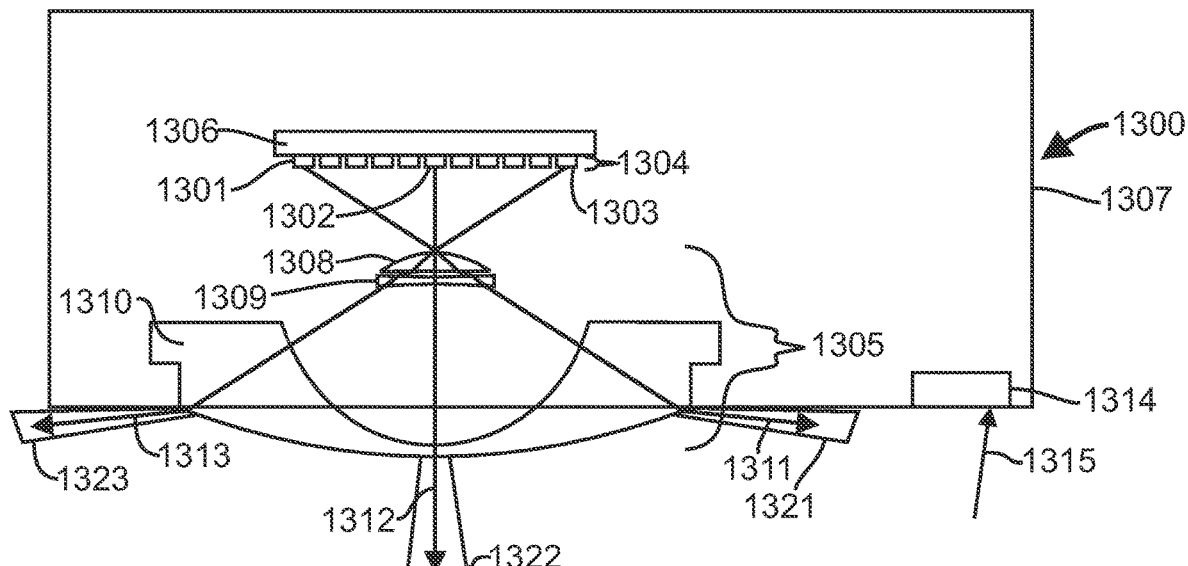
FIG. 13 is a cross-sectional side view of an AVLED comprising a spatial array light source on a substrate.

FIG. 13 is a cross-sectional side view of an AVLED 1300 comprising a spatial array light source 1304 (such as a micro-LED array) on a substrate 1306, and an AROE 1305 in a housing 1307. In this embodiment, the AROE 1305 comprises a planoconvex lens 1308, a biconcave lens 1309, and negative meniscus lens 1310 (in order seen by light from the spatial array light source 1304). As FIG. 13 is a cross-sectional view, only one row of light sources in the x direction is visible whereas the spatial array light source 1304 comprises columns of light sources parallel to the y direction (into and out of the page). First light 1311 from the first light source 1301 of the spatial array light source 1304 is directed by the AROE 1305 into a first angular bin 1321. Second light 1312 from the second light source 1302 of the spatial array light source 1304 is directed by the AROE 1305 into a second angular bin 1322. Third light 1313 from the third light source 1303 of the spatial array light source 1304 is directed by the AROE 1305 into a third angular bin 1323. The AVLED 1300 further comprises an imager 1314 that receives reflected light 1315 from the environment due to illumination from the AVLED 1300 (or from external illumination sources such as other AVLEDs). The light flux output from each of the light sources in the spatial array light source is adjusted based at least in part on measurements and/or evaluations of light properties using the imager 1314 and optionally one or more modes of illumination and/or irradiation. In one embodiment, the AVLED 1300 comprises an optical fold device (such as a partial mirror, dielectric coating, reflective polarizer, or total internal reflection surface of a lens, for example) oriented at an angle such as 45 degrees to the optical axis of the AROE 1305 such that the light output from the spatial array light source 1304 and the reflected light 1315 input to the imager 1314 share at least a portion of the same optical axis and/or all or a portion of the optical path through the AROE 1305. For example, in one embodiment, the AROE is a ultra-wide-angle lens, and the AVLED comprises a reflective polarizer between the AROE and the spatial array light source such that the AROE directs light from the spatial array light source into wide angles and the AROE directs wide angle light received from the environment to the imager. In this example, only one ultra-wide-angle lens is needed for the AVLED and the spatial zones from the angular bins are substantially aligned with the image in the imager since they may be coaxial such that fewer calculations are needed to align the regions (pixels) of the imager to the spatial zones.

Figure 14:
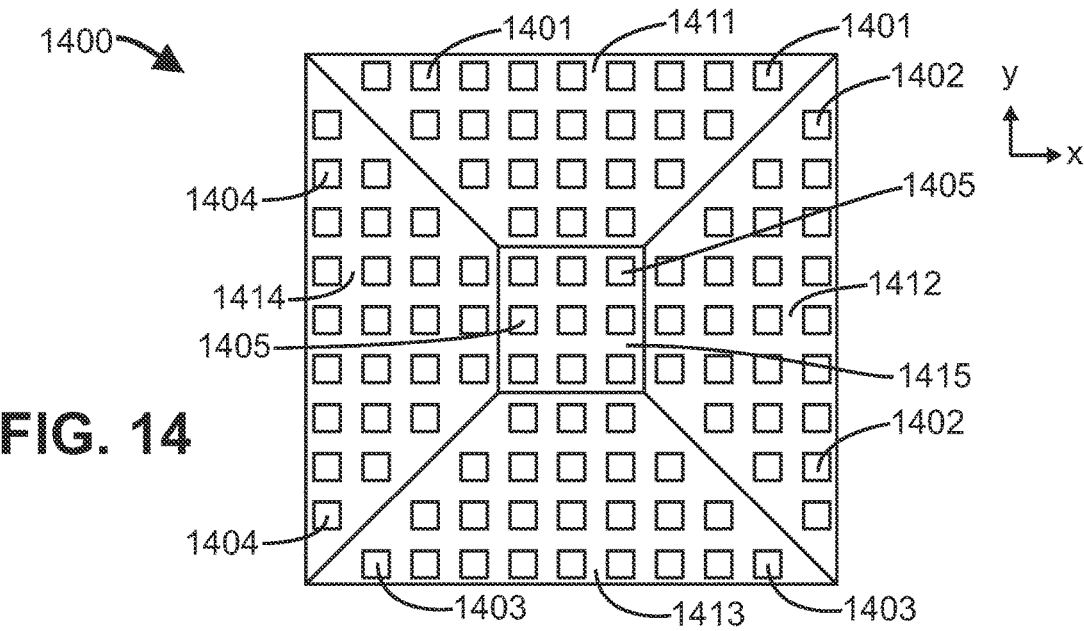
FIG. 14 is a top view of a spatial array light source comprising a plurality of substrates oriented at an angle to each other.

FIG. 14 is a top view of a spatial array light source 1400 suitable for use in an embodiment of an AVLED, the spatial array light source comprising a plurality of substrates oriented at an angle to each other. In this embodiment, the spatial array light source 1400 comprises a first substrate 1411 comprising a first set of light sources 1401 (such as micro-LEDs) oriented at a first substrate angle less than a first angle (such as less than −20 degrees) to a first axis 1406 (see FIG. 15) in a first output plane (y-z plane), a second set of light sources 1402 on a second substrate 1412 oriented at a second substrate angle 1422 less than a second angle (such as less than −20 degrees) to the first axis 1406 (see FIG. 15) in a second output plane (x-z plane) orthogonal to the first output plane, a third set of light sources 1403 on a third substrate 1413 oriented at a third substrate angle greater than a third angle (such as greater than +20 degrees) to the first axis 1406 (see FIG. 15) in the first output plane (y-z plane), a fourth set of light sources 1404 on a fourth substrate 1414 oriented at a fourth substrate angle 1424 greater than a fourth angle (such as greater than +20 degrees) to the first axis 1406 (see FIG. 15) in the second output plane (x-z plane), and a fifth set of light sources 1405 on a fifth substrate 1415 oriented substantially orthogonal to the first axis 1406 (see FIG. 15) (thus substantially in the x-z plane). In one embodiment, an AVLED comprises the spatial array light source 1400 and an AROE. In one embodiment, a spatial array light source comprises a plurality of light sources on a plurality of substrates at angles greater than 0 degrees to each other (or on a surface curved outward in the light emitting direction), wherein the plurality of light sources have an angular full-width at half maximum intensity less than 20, 15, 10, 8, 5 or 3 degrees. In one embodiment, the first axis 1406 is the optical axis of the AVLED, optical axis of the AROE, optical axis of the spatial array light source, or device axis of the AVLED. In one embodiment, a spatial array light source comprises a plurality of light sources on a plurality of substrates at angles greater than 0 degrees to each other (or on a surface curved outward in the light emitting direction), wherein the plurality of light sources have an angular full-width at half maximum intensity less than 20, 15, 10, 8, 5 or 3 degrees.

Figure 15:
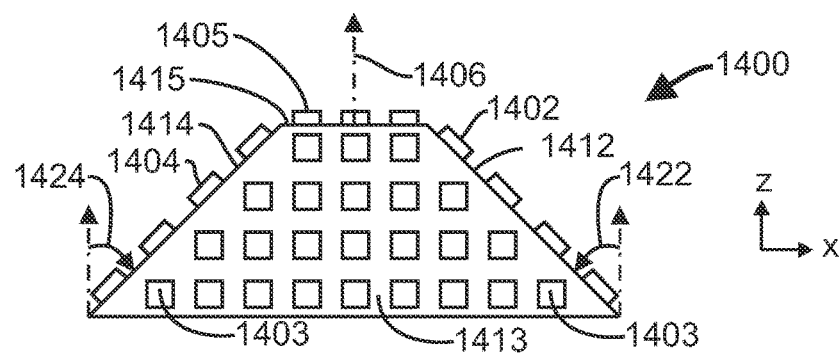
FIG. 15 is a side view of the spatial array light source of FIG. 14.

FIG. 15 is a side view of the spatial array light source 1400 of FIG. 14.

In one embodiment, a system comprises a first light emitting device comprising one or more light sources collectively emitting light out of the first light emitting device into at least a first angular bin and a second angular bin different from the first angular bin wherein a first light flux output from the first angular bin directly illuminates a first region of the environment and a second light flux output from the second angular bin directly illuminates a second region of the environment different from the first region, and the first light flux output from the first angular bin and the second light flux output from the second angular bin are each independently controlled; and a first imager positioned and oriented to substantially image the light reflected from the environment due to illumination from the first light emitting device, wherein the first imager captures a first image of the reflected light from the environment due to illumination from only the first light flux output and a second image of the reflected light from the environment due to only the second light flux output; and a second light emitting device positioned at a distance greater than 3 feet from the first light emitting device, the second light emitting device comprising one or more light sources collectively emitting light out of the second light emitting device into at least a third angular bin and a fourth angular bin different from the third angular bin, wherein a third light flux output from the third angular bin directly illuminates a third region of the environment and a fourth light flux output from the fourth angular bin directly illuminates a fourth region of the environment different from the third region, and the third light flux output from the third angular bin and the fourth light flux output from the fourth angular bin are each independently controlled; and a second imager positioned and oriented to substantially image the light reflected from the environment due to illumination from the second light emitting device, wherein the imager captures a third image of the reflected light from the environment due to illumination from only the third light flux output, a fourth image of the reflected light from the environment due to only the fourth light flux output, and a fifth image of the reflected light from the environment due to only the first light flux output, wherein, if the fifth image indicates a sub-region of the first region is a shadow region of the environment due to a shadow from the first light flux output interacting with a surface of the environment, and the third region at least partially overlaps the sub-region, the second light emitting device emits light into the third angular bin when the first light emitting device emits light into the first angular bin. In one embodiment, a method of illuminating an environment comprises emitting a first light flux from one or more first light sources in an angularly varying light emitting device into a first angular bin at a first time period, the first light flux directly illuminating a first spatial zone in the environment; capturing a first image of the environment including light from the first light flux reflected from the environment using a first imager within the first time period; emitting a second light flux different from the first light flux from one or more second light sources in the light emitting device different from the one or more first light sources into a second angular bin different from the first angular bin at a second time period different from the first time period, the second light flux directly illuminating a second spatial zone in the environment different from the first spatial zone; capturing a second image of the environment including light from the second light flux reflected from the environment using the first imager within the second time period; determining or estimating one or more light properties of a region of the environment based at least in part on analyzing the first image and the second image using one or more processors; and increasing or decreasing the first light flux due to at least in part to the one or more light properties of the region of the environment. In one embodiment, the increasing or decreasing the first light flux includes increasing or decreasing the first light flux due in part to the specification, operational parameters, target value, threshold value, or measured or evaluated light property for one or more modes of illumination and/or irradiation. In one embodiment, the angular widths in theta and phi spherical coordinates of the first angular bin and the second angular bin are less than 10 degrees, 5, degrees, or 2 degrees. In one embodiment, the method of illuminating an environment further comprises emitting a third light flux from one or more third light sources in the light emitting device different from the one or more first light sources and the one or more second light sources into a third angular bin different from the first angular bin and the second angular bin at a third time period different from the first time period and the second time period, the third light flux directly illuminating a third spatial zone in the environment different from the first spatial zone and the second spatial zone; and capturing a third image of the environment including light from the third light flux reflected from the environment using the first imager, wherein determining or estimating the one or more light properties for the region of the environment is further based at least in part on analyzing the third image using the one or more processors. In one embodiment, the one or more light properties of the region of the environment includes illuminance of the region due to the first light flux and the second light flux. In one embodiment, the region of the environment includes all or a portion of the first spatial zone or the second spatial zone. In one embodiment, the first light flux indirectly illuminates the region of the environment by reflecting off of one or more surfaces of the environment. In another embodiment, the first imager is calibrated for luminance, radiance, or relative intensity. In one embodiment, the first imager is an imager on a portable device, the angularly varying light emitting device comprises the first imager, or a second angularly varying light emitting device comprises the first imager. In one embodiment, the angularly varying light emitting device comprises a spatial array light source comprising the one or more first light sources and the one or more second light sources. In one embodiment, the spatial array light source is an array of light emitting diodes or a micro-LED array. In one embodiment, a method of illuminating an environment comprises angular cycling angular light flux output in a plurality of different angular bins of an angularly varying light emitting device by increasing and decreasing light flux output from each light source of a plurality of light sources, each light source of the plurality of light sources is associated with a different angular bin of the plurality of different angular bins; capturing using an imager a plurality of images of the environment synchronized with the light flux output from each light source of the plurality of light sources; determining a measured or estimated illuminance in a first spatial zone corresponding to a first angular bin of the plurality of different angular bins due to each light source of the plurality of light sources based at least in part on analysis of the plurality of images of the environment; and independently adjusting the light flux output from one or more light sources of the plurality of light sources to achieve a target illuminance in the first spatial zone based at least in part on the measured or estimated illuminance in the first spatial zone. In one embodiment, the angularly varying light emitting device comprises a micro-LED array, and the plurality of light sources are micro-LEDs in the micro-LED array. In one embodiment, a method of illuminating a surface in an environment comprises angular cycling angular light flux output in a plurality of different angular bins of an angularly varying light emitting device by increasing and decreasing light flux output from each light source of a plurality of light sources, each light source of the plurality of light sources is associated with a different angular bin of the plurality of different angular bins; capturing using an imager a plurality of images of the environment synchronized with the light flux output from each light source of the plurality of light sources; determining a measured or estimated illuminance of the surface in the environment due to each light source of the plurality of light sources based at least in part on an analysis of the plurality of images of the environment; and independently adjusting the light flux output from one or more light sources of the plurality of light sources to achieve a target illuminance at the surface based at least in part on the measured or estimated illuminance of the surface. In one embodiment, the angularly varying light emitting device comprises a micro-LED array, wherein the micro-LED array comprises the plurality of light sources. In another embodiment, light flux output from a first light source of the plurality of light sources indirectly illuminates the surface by reflecting from a second surface in the environment, and determining a measured or estimated illuminance of the surface in the environment includes determining a measured or estimated illuminance of the surface due to indirect illumination from the first light source.

EQUIVALENTS

Those skilled in the art will recognize or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. This application is intended to cover any adaptations or variations of the specific embodiments discussed herein. Therefore, it is intended that this disclosure be limited only by the claims and the equivalents thereof.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

What is claimed is:

1. A light emitting system comprising:
a first angularly varying light emitting device comprising one or more first light sources, the first angularly varying light emitting device operable to adjust light flux output into an environment from the one or more first light sources into different angular bins individually;
a second angularly varying light emitting device comprising one or more second light sources, the second angularly varying light emitting device operable to adjust light flux output into the environment from the one or more second light sources into different angular bins individually;
a light sensor positioned on the second angularly varying light emitting device to receive light reflected from the environment from the first angularly varying light emitting device and the second angularly varying light emitting device; and
one or more processors,
wherein when the first angularly varying light emitting device emits first light flux onto on object or individual in the environment and the object or individual occludes the first light flux creating a shadow region on a surface of the environment, the one or more processors receive information from the light sensor, identify the shadow region, and direct the second angularly varying light emitting device to emit second light flux from one or more second light sources into one or more angular bins that illuminates the shadow region.

2. The light emitting system of claim 1 wherein the second angularly varying light emitting device illuminates the shadow region with the second light flux such that the shadow region meets a target luminance or a luminance of one or more of regions of the environment adjacent the shadow region.

3. The light emitting system of claim 1 wherein the second angularly varying light emitting device illuminates the shadow region with the second light flux such that the shadow region meets a target illuminance or matches an estimated illuminance of one or more of regions of the environment adjacent the shadow region.

4. The light emitting system of claim 1 wherein the second light flux from the second angularly varying light emitting device illuminates the shadow region such that a difference in illuminance in the shadow region and a region of the environment adjacent the shadow region is reduced.

5. The light emitting system of claim 1 wherein the light sensor comprises an imager and the information from the light sensor or information processed by the one or more processors to identify the shadow region comprises an estimated illuminance, luminance, or relative intensity of the shadow region.

6. The light emitting system of claim 1 wherein the one or more processors identify the shadow region in part by differentiating between a possible dark surface and a region comprising a shadow.

7. The light emitting system of claim 6 wherein differentiating between the possible dark surface and the region comprising the shadow is based at least in part on spatial three-dimensional data for surfaces in the environment.

8. The light emitting system of claim 6 wherein differentiating between the possible dark surface and the region comprising the shadow includes directly illuminating a region of the environment from at least one angular bin from the first angularly varying light emitting device and directly illuminating the region of the environment from at least one angular bin from the second angularly varying light emitting device.

9. The light emitting system of claim 6 wherein differentiating between the possible dark surface and the region comprising the shadow includes directly illuminating a region of the environment from at least one angular bin from the first angularly varying light emitting device and indirectly illuminating the region of the environment from at least one angular bin from the second angularly varying light emitting device.

10. The light emitting system of claim 6 wherein differentiating between the possible dark surface and the region comprising the shadow includes indirectly illuminating a region of the environment from at least one angular bin from the first angularly varying light emitting device and indirectly illuminating the region of the environment from at least one angular bin from the second angularly varying light emitting device.

11. The light emitting system of claim 6 wherein differentiating between the possible dark surface and the region comprising the shadow includes analysis of spatial three-dimensional data for surfaces and/or objects in the environment.

12. The light emitting system of claim 1 wherein the second light flux from the one or more second light sources emitted that illuminates the shadow region is based at least in part on ambient light reflected to the light sensor from the shadow region when the first angularly varying light emitting device and the second angularly varying light emitting device are not emitting light.

13. The light emitting system of claim 1 wherein the processor receives information from the light sensor corresponding to a light property of the environment at an interval less than or equal to 0.05 seconds.

14. The light emitting system of claim 1 wherein the one or more first light sources is a planar spatial array of first light emitting diodes, each first light emitting diode has a largest dimension of a light emitting surface less than 0.1 millimeter, and the one or more second light sources is a planar spatial array of second light emitting diodes, each second light emitting diode has a largest dimension of a light emitting surface less than 0.1 millimeter.

15. A system for illuminating an environment, the system comprising:
a first light fixture comprising a first angularly varying light emitting device comprising one or more first light sources, the first angularly varying light emitting device operable to adjust light flux output into the environment from the one or more first light sources into different angular bins individually;
a second light fixture comprising a second angularly varying light emitting device comprising one or more second light sources, the second angularly varying light emitting device operable to adjust light flux output into the environment from the one or more second light sources into different angular bins individually; and
the second light fixture further comprises an imager positioned to receive light reflected from the environment from the first angularly varying light emitting device and the second angularly varying light emitting device,
wherein when the first angularly varying light emitting device emits first light flux onto on object or individual in the environment and the object or individual occludes the first light flux creating a shadow region on a surface of the environment, the second angularly varying light emitting device emits second light flux from one or more second light sources into an angular bin that illuminates the shadow region.

16. The system of claim 15 wherein the second angularly varying light emitting device illuminates the shadow region to meet at least one of a target luminance, target illuminance, luminance of one or more of regions of the environment adjacent the shadow region, and estimated illuminance of one or more of regions of the environment adjacent the shadow region.

17. The system of claim 15 wherein the first angularly varying light emitting device and the second angularly varying light emitting device provide direct illuminations of a region of the environment from one or more angular bins, and the shadow region is identified and differentiated from a possible dark object based at least in part on processed images from the imager of the light reflected from the region due to the direct illuminations.

18. The system of claim 15 further comprising one or more processors that receive information from the imager corresponding to a light property of the environment at an interval less than or equal to 0.05 seconds.

19. The system of claim 15 wherein the one or more first light sources is a planar spatial array of first light emitting diodes, each first light emitting diode having a largest dimension of a light emitting surface less than 0.1 millimeter, and the one or more second light sources is a planar spatial array of second light emitting diodes, each second light emitting diode having a largest dimension of a light emitting surface less than 0.1 millimeter.

20. A method of illuminating an environment, the method comprising:
illuminating a region of the environment with light from one or more angular bins of a first angularly varying light emitting device operable to adjust light flux output into the environment from one or more first light sources into different angular bins individually;
identifying a shadow region from the region of the environment illuminated by the first angularly varying light emitting device using information from a light sensor on a second angularly varying light emitting device operable to adjust light flux output into the environment from one or more second light sources into different angular bins individually, identifying a shadow region including differentiating the shadow region from a surface that absorbs greater than 70% of incident light from the one or more first light sources using the information from the light sensor; and
illuminating the shadow region from one or more angular bins from the second angularly varying light emitting device such that the difference in illuminance in the shadow region and a region of the environment adjacent the shadow region is reduced.

21. The method of claim 20 wherein illuminating the shadow region includes illuminating the shadow region such that the shadow region meets at least one of a target luminance, target illuminance, luminance of one or more of regions of the environment adjacent the shadow region, and estimated illuminance of one or more of regions of the environment adjacent the shadow region.

22. The method of claim 20 wherein the one or more first light sources is a planar spatial array of first light emitting diodes, each first light emitting diode having a largest dimension of a light emitting surface less than 0.1 millimeter, and the one or more second light sources is a planar spatial array of second light emitting diodes, each second light emitting diode having a largest dimension of a light emitting surface less than 0.1 millimeter.

* * * * *